United States Patent
Arnold

(10) Patent No.: US 12,259,878 B2
(45) Date of Patent: Mar. 25, 2025

(54) IMPLEMENTING SUPERSET-GUARANTEEING EXPRESSIONS IN QUERY EXECUTION

(71) Applicant: Ocient Holdings LLC, Chicago, IL (US)

(72) Inventor: Jason Arnold, Chicago, IL (US)

(73) Assignee: Ocient Holdings LLC

( * ) Notice: Subject to any disclaimer, the term of this patent is extended or adjusted under 35 U.S.C. 154(b) by 156 days.

(21) Appl. No.: 17/448,242

(22) Filed: Sep. 21, 2021

(65) Prior Publication Data

US 2023/0091018 A1    Mar. 23, 2023

(51) Int. Cl.
G06F 16/242      (2019.01)
G06F 16/22       (2019.01)

(52) U.S. Cl.
CPC ...... G06F 16/2425 (2019.01); G06F 16/2272 (2019.01)

(58) Field of Classification Search
CPC .......................... G06F 16/2425; G06F 16/2272
See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,633,772 B2 | 10/2003 | Ford | |
| 7,130,145 B1* | 10/2006 | Carret | G11B 17/225 |
| 7,499,907 B2 | 3/2009 | Brown | |
| 7,908,242 B1 | 3/2011 | Achanta | |
| 2001/0051949 A1 | 12/2001 | Carey | |
| 2002/0032676 A1 | 3/2002 | Reiner | |
| 2003/0093408 A1* | 5/2003 | Brown | G06F 16/2272 |
| 2003/0093415 A1* | 5/2003 | Larson | G06F 16/24539 |
| 2004/0044662 A1* | 3/2004 | Ganesan | G06F 16/24528 707/999.005 |
| 2004/0162853 A1 | 8/2004 | Brodersen | |
| 2007/0239673 A1* | 10/2007 | Barsness | G06F 16/24542 |
| 2008/0133456 A1 | 6/2008 | Richards | |

(Continued)

OTHER PUBLICATIONS

Wikipedia, "Tee Command", https://web.archive.org/web/20190212104530/https://en.wikipedia.org/wiki/Tee_(command) (Year: 2019).*

(Continued)

*Primary Examiner* — Mark D Featherstone
*Assistant Examiner* — Brooks T Hale
(74) *Attorney, Agent, or Firm* — Garlick & Markison; Katherine C. Stuckman; Bruce E. Stuckman

(57) ABSTRACT

A method includes determining a query expression indicating a query for execution against a plurality of rows. A superset-guaranteeing expression is generated in conjunctive normal form (CNF) based on the query expression. A query operator execution flow is generated to include a plurality of index-based IO operators based on the superset-guaranteeing expression and to further include at least one additional operator. Execution of the query is facilitated by applying the plurality of index-based IO operators to identify a first subset of rows as a proper subset of the plurality of rows based on index data stored of the plurality of rows, and by applying the at least one additional operator to the first subset of rows to identify a second subset of rows as a subset of the first subset of rows.

20 Claims, 75 Drawing Sheets

(56) References Cited

U.S. PATENT DOCUMENTS

| | | | |
|---|---|---|---|
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | McWilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |

OTHER PUBLICATIONS

Gupta, "Union vs Union Distinct", https://nidhig631.medium.com/union-vs-union-distinct-vs-union-all-aa79343d590f (Year: 2021).*
Seema Singh, "Sampling Techniques", Towards Data Science, https://towardsdatascience.com/sampling-techniques-a4e34111d808 (Year: 2018).*
A new high performance fabric for HPC, Michael Feldman, May 2016, Intersect360 Research.
Alechina, N. (2006-2007). B-Trees. School of Computer Science, University of Nottingham, http://www.cs.nott.ac.uk/~psznza/G5BADS06/lecture13-print.pdf. 41 pages.
Amazon DynamoDB: ten things you really should know, Nov. 13, 2015, Chandan Patra, http://cloudacademy. .com/blog/amazon-dynamodb-ten-thing.
An Inside Look at Google BigQuery, by Kazunori Sato, Solutions Architect, Cloud Solutions team, Google Inc., 2012.
Big Table, a NoSQL massively parallel table, Paul Krzyzanowski, Nov. 2011, https://www.cs.rutgers.edu/pxk/417/notes/contentlbigtable_html.
Distributed Systems, Fall2012, Mohsen Taheriyan, http://www-scf.usc.edu/-csci57212011Spring/presentations/Taheriyan.pptx.
International Searching Authority; International Search Report and Written Opinion; International Application No. PCT/US2017/054773; Feb. 13, 2018; 17 pgs.
International Searching Authority; International Search Report and Written Opinion; International Application No. PCT/US2017/054784; Dec. 28, 2017; 10 pgs.
International Searching Authority; International Search Report and Written Opinion; International Application No. PCT/US2017/066145; Mar. 5, 2018; 13 pgs.
International Searching Authority; International Search Report and Written Opinion; International Application No. PCT/US2017/066169; Mar. 6, 2018; 15 pgs.
International Searching Authority; International Search Report and Written Opinion; International Application No. PCT/US2018/025729; Jun. 27, 2018; 9 pgs.
International Searching Authority; International Search Report and Written Opinion; International Application No. PCT/US2018/034859; Oct. 30, 2018; 8 pgs.
MapReduce: Simplified Data Processing on Large Clusters, OSDI 2004, Jeffrey Dean and Sanjay Ghemawat, Google, Inc., 13 pgs.
Rodero-Merino, L.; Storage of Structured Data: Big Table and HBase, New Trends in Distributed Systems, MSc Software and Systems, Distributed Systems Laboratory; Oct. 17, 2012; 24 pages.
Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37

FIG. 21 node 37 query expression processing module 2512

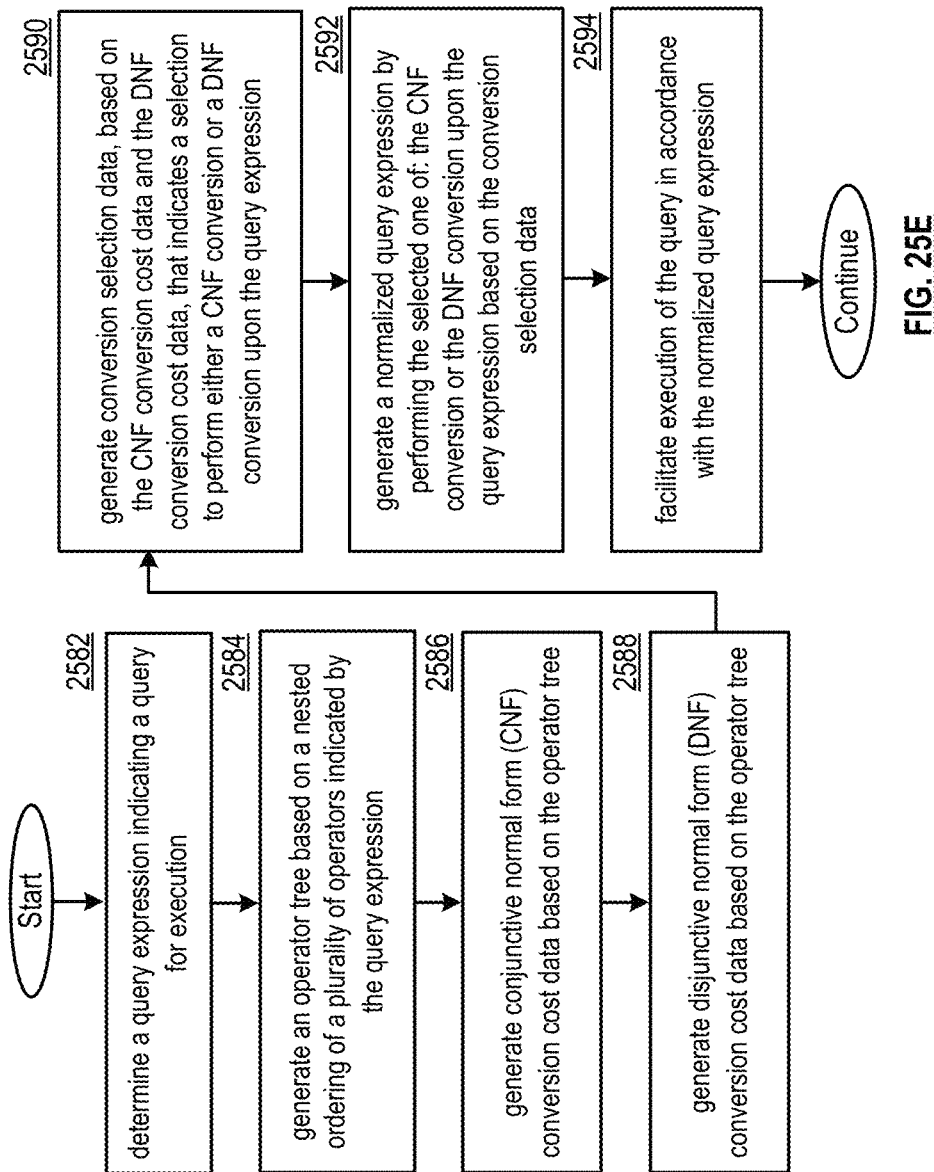

node 37 node 37 query execution module 2504

IO operator execution module 2840 query processing system 2802 query processing system 2802

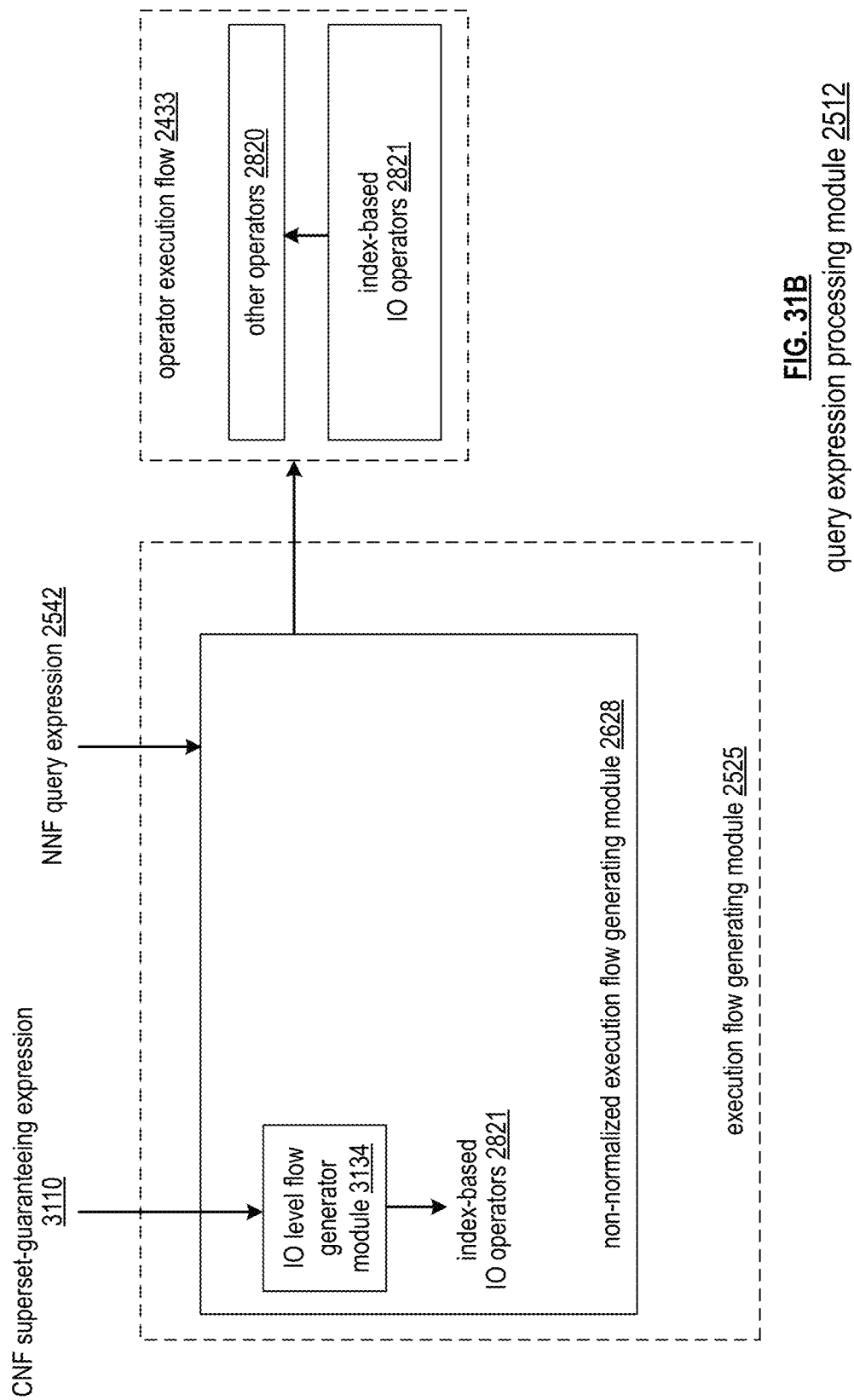

query operator execution flow 2433 query processing system 2802

CNF superset-guaranteeing expression generating module 3128

CNF superset-guaranteeing expression generating module 3128

CNF superset-guaranteeing expression generating module 3128

CNF superset-guaranteeing expression generating module 3128 query execution module 3300 overlapping geospatial region determination module 3315

IMPLEMENTING SUPERSET-GUARANTEEING EXPRESSIONS IN QUERY EXECUTION

CROSS-REFERENCE TO RELATED APPLICATIONS

None

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 25E is a logic diagram illustrating a method of selecting a normalized form for conversion of a query expression in accordance with various embodiments of the present invention;

FIG. 31B is a schematic block diagram of an embodiment of a query expression processing module that processes a superset-guaranteeing expression in accordance with various embodiments;

DETAILED DESCRIPTION OF THE INVENTION

Figure 1:
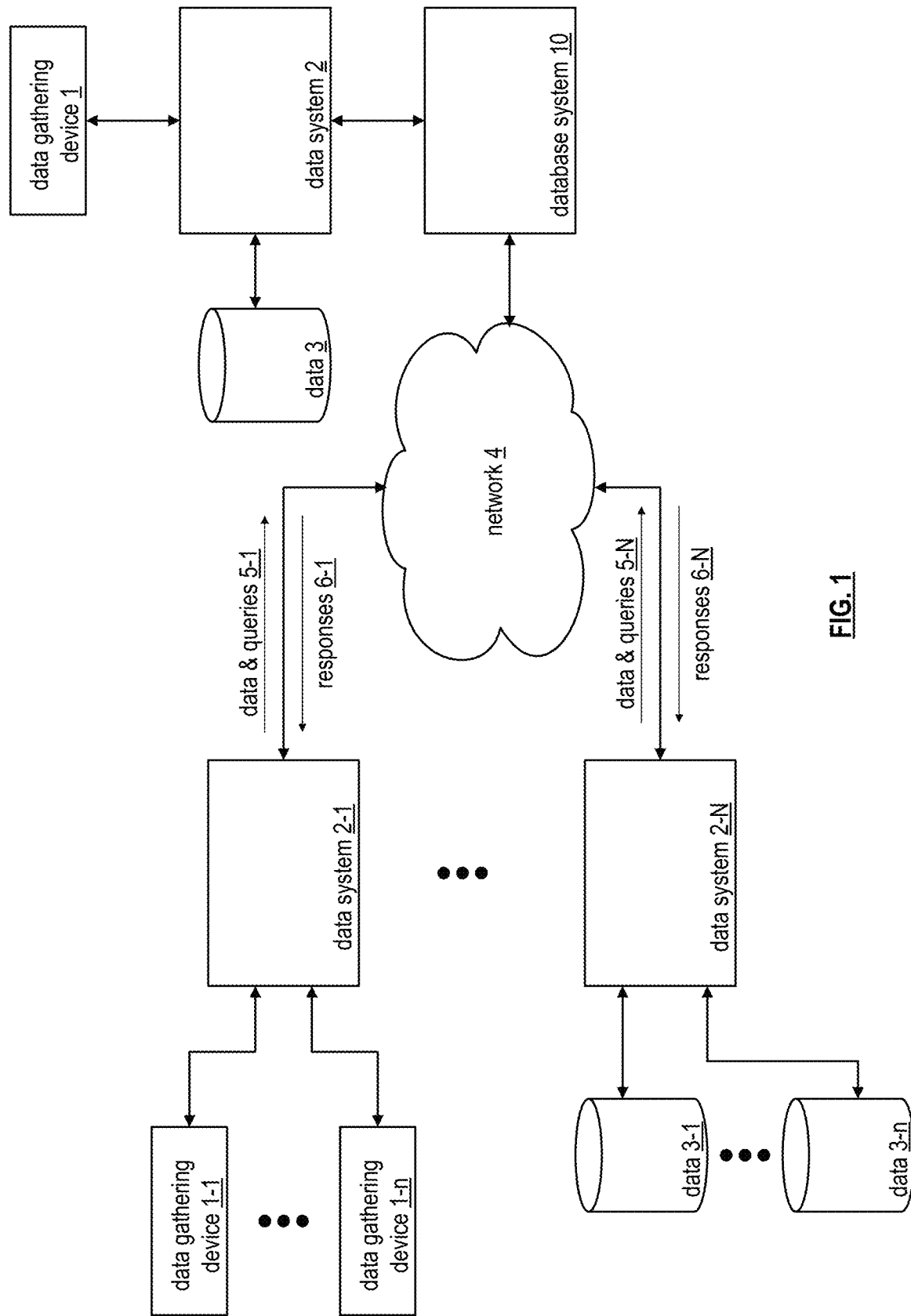
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
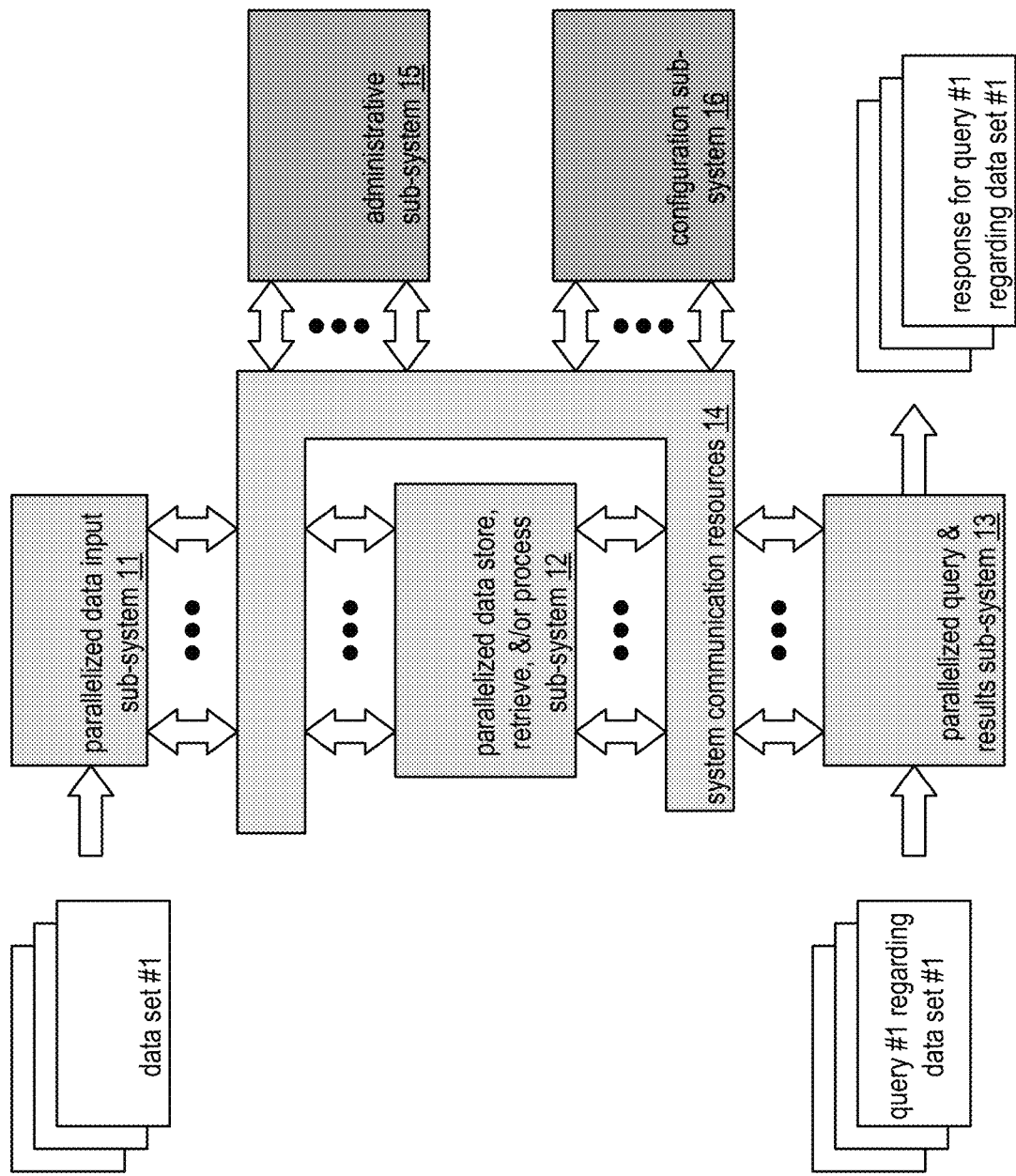
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
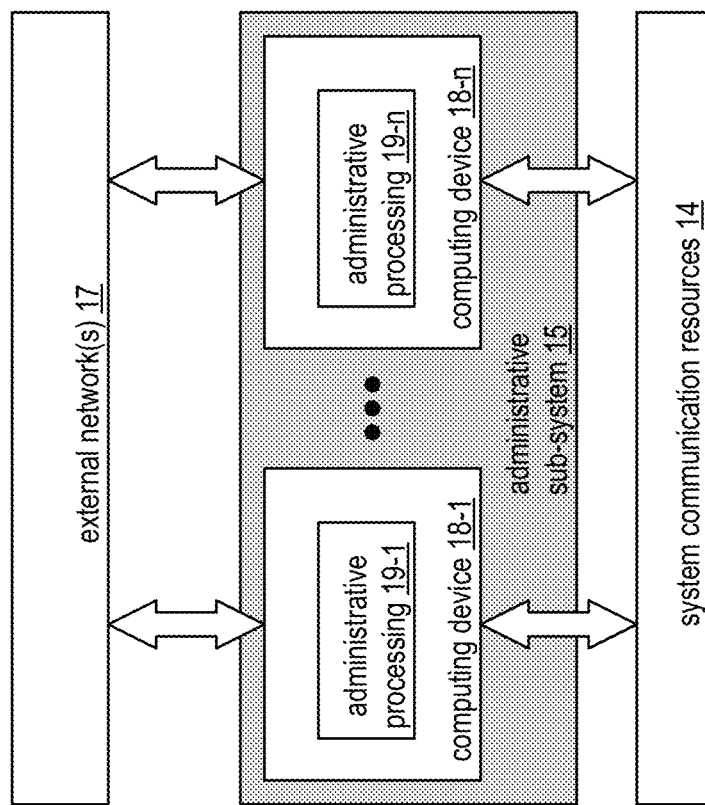
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
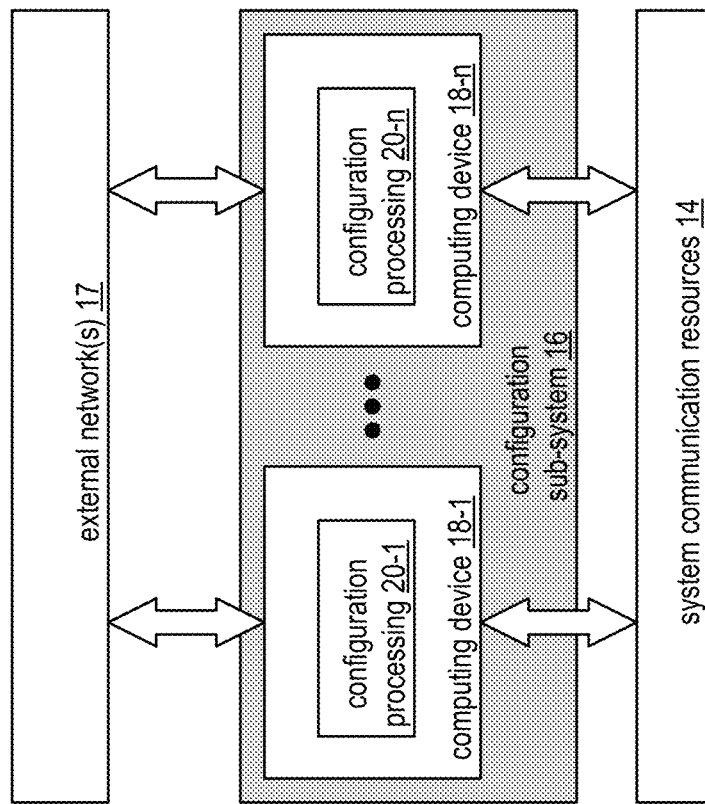
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
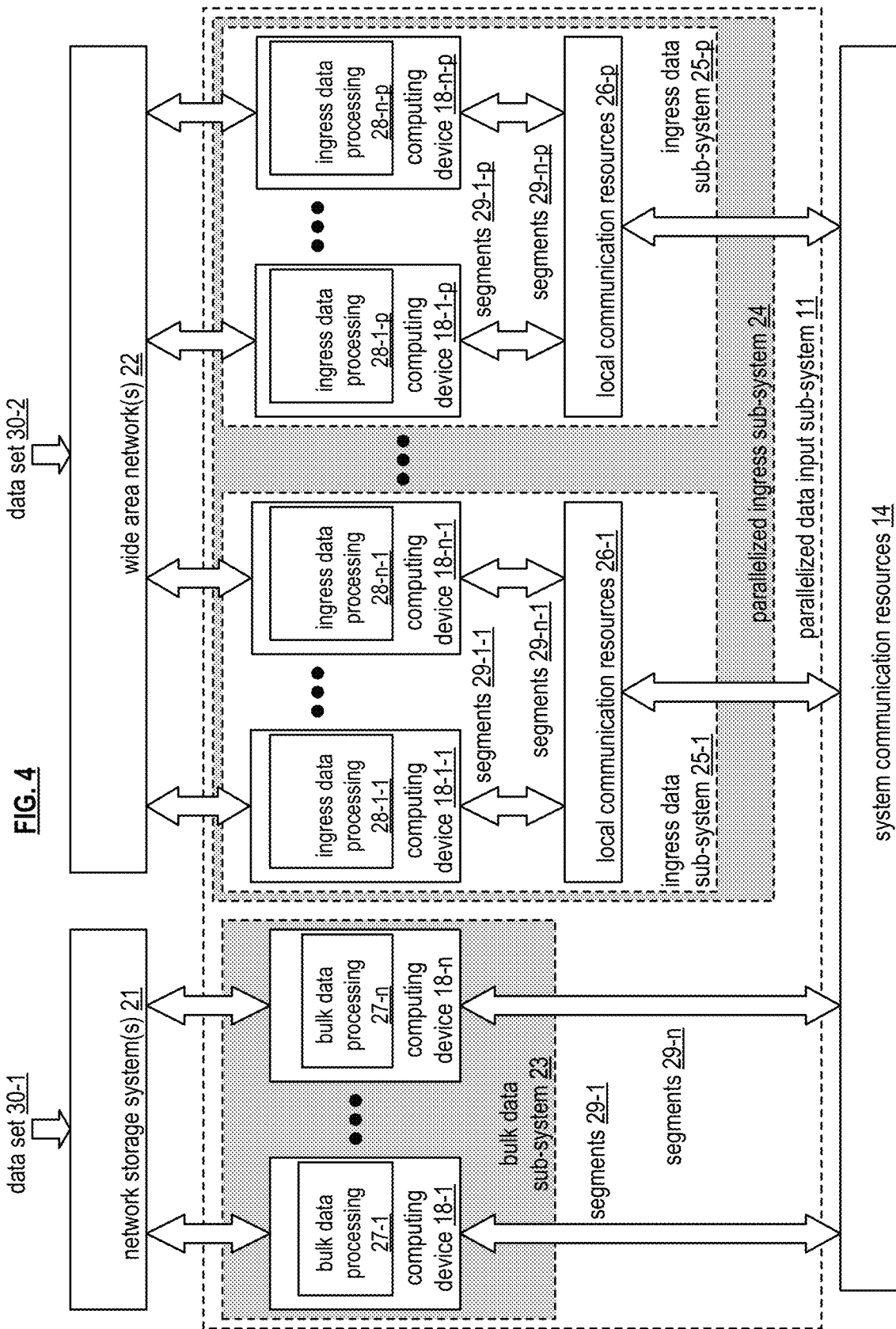
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
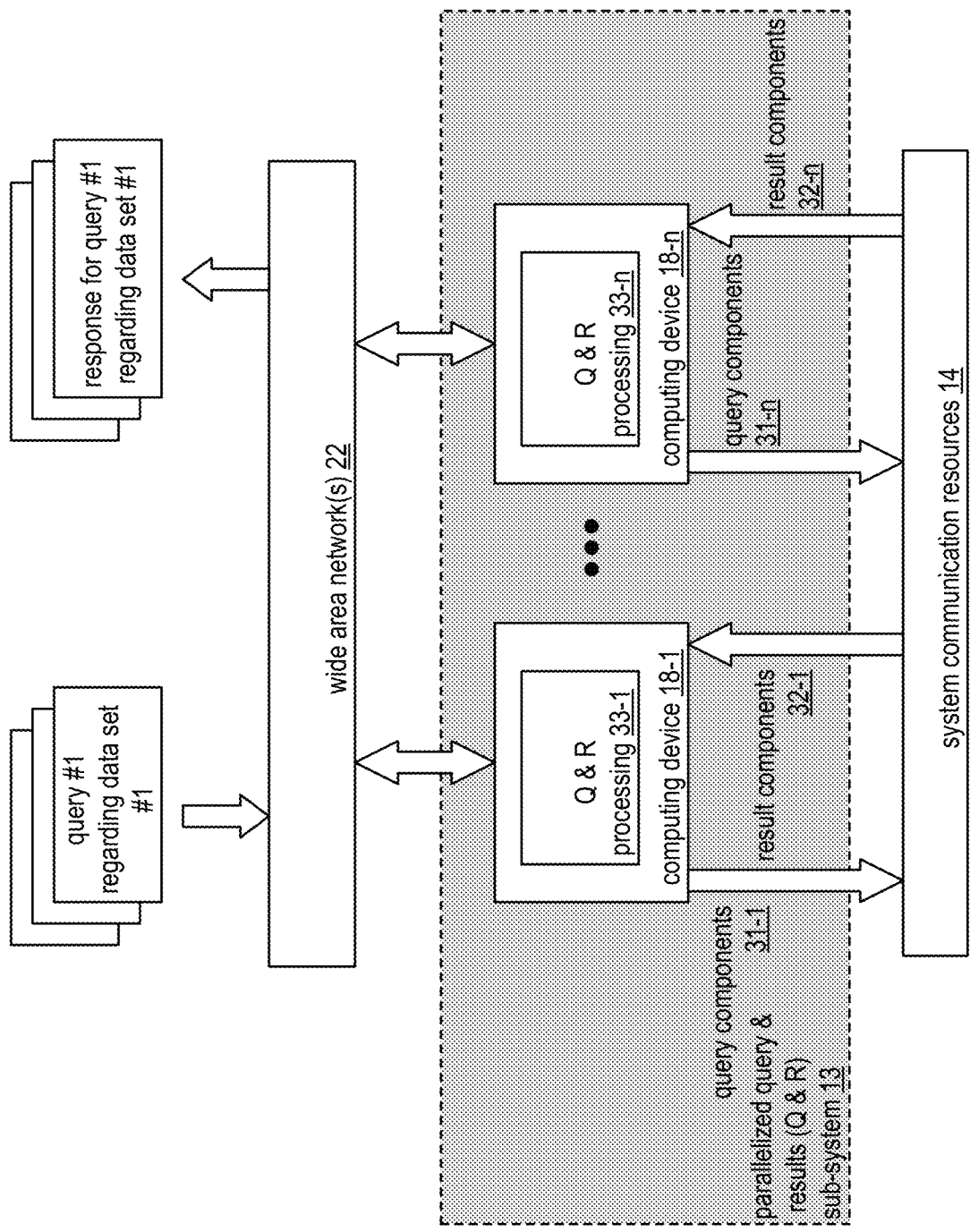
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
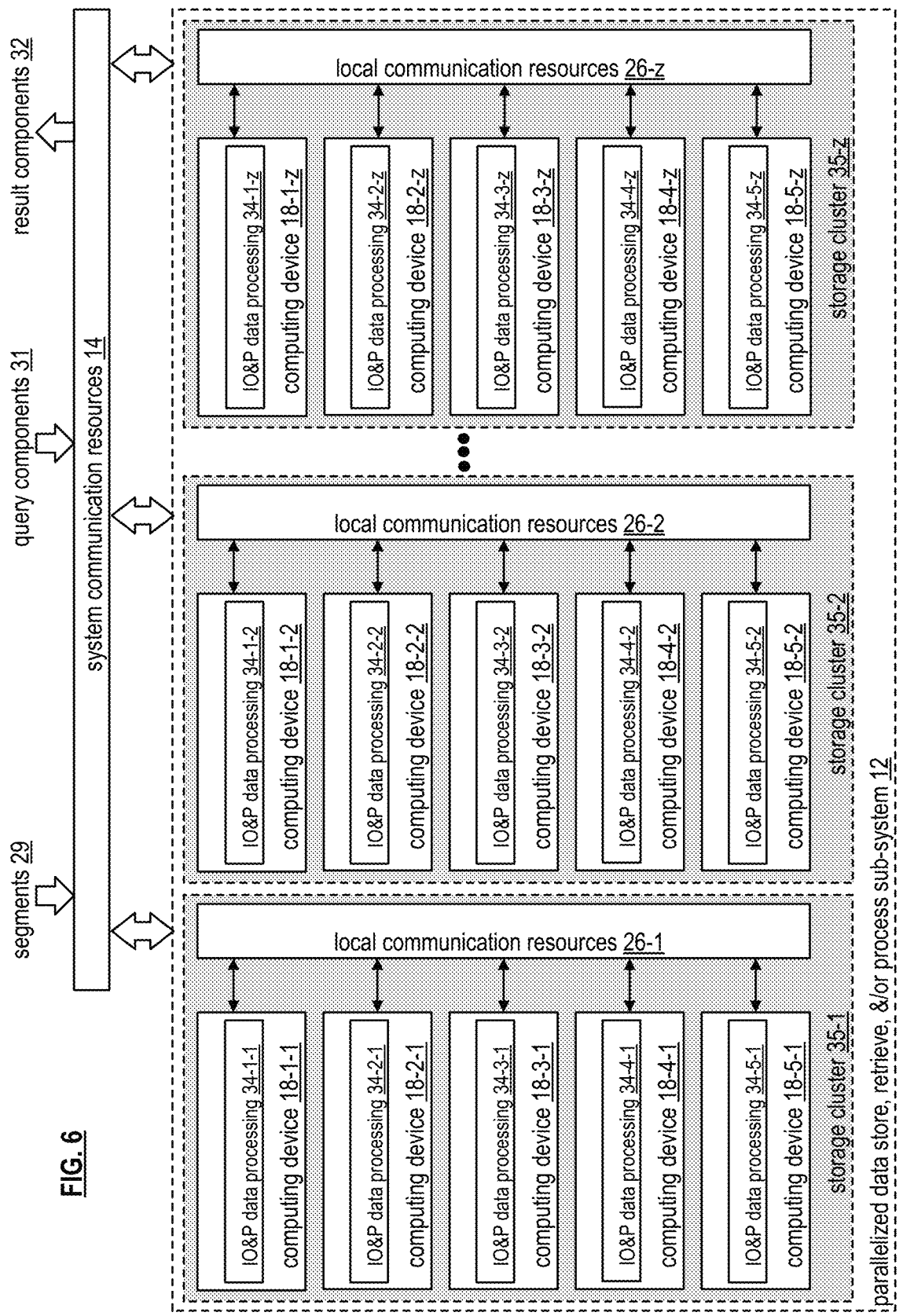
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (TO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
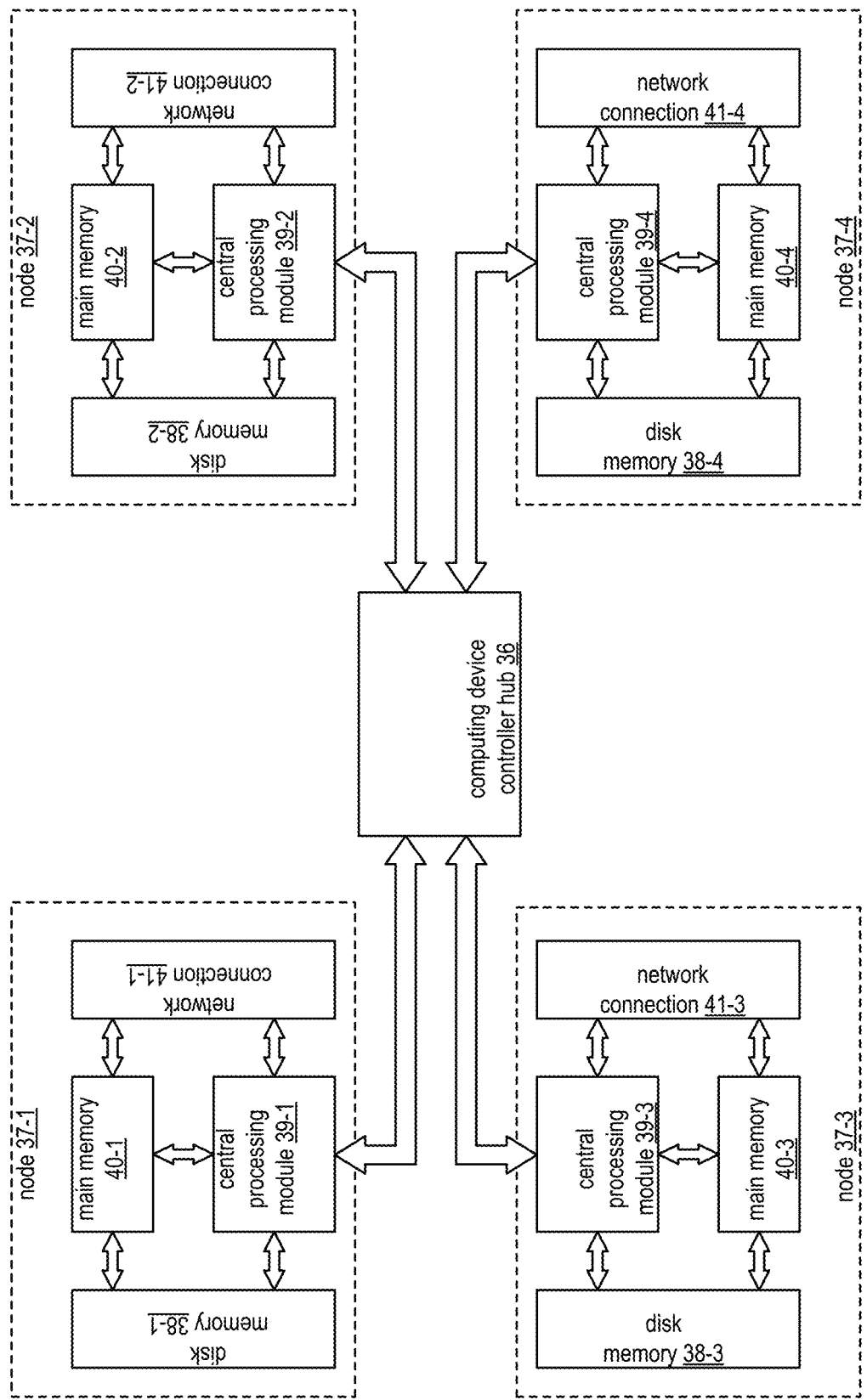
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
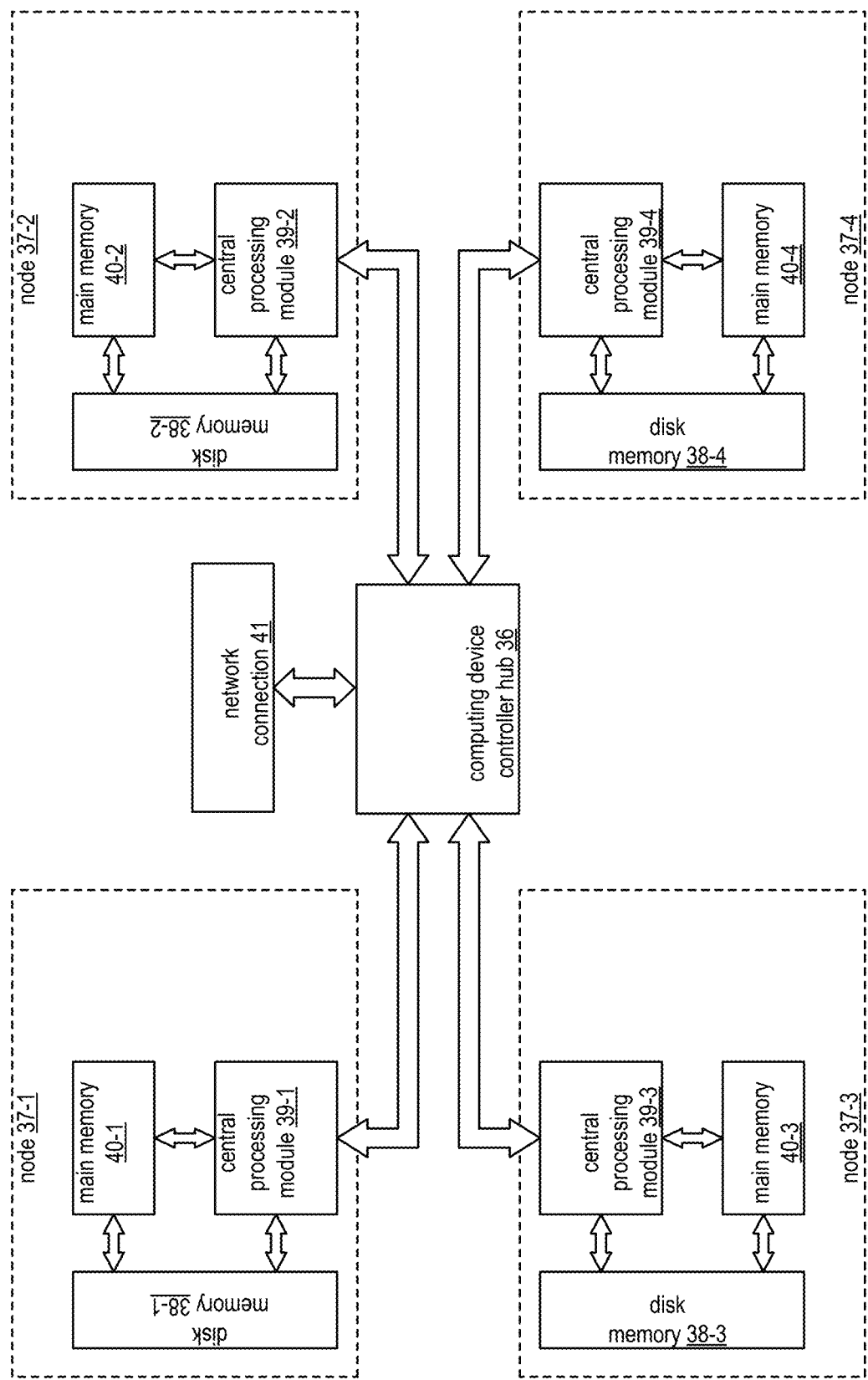
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
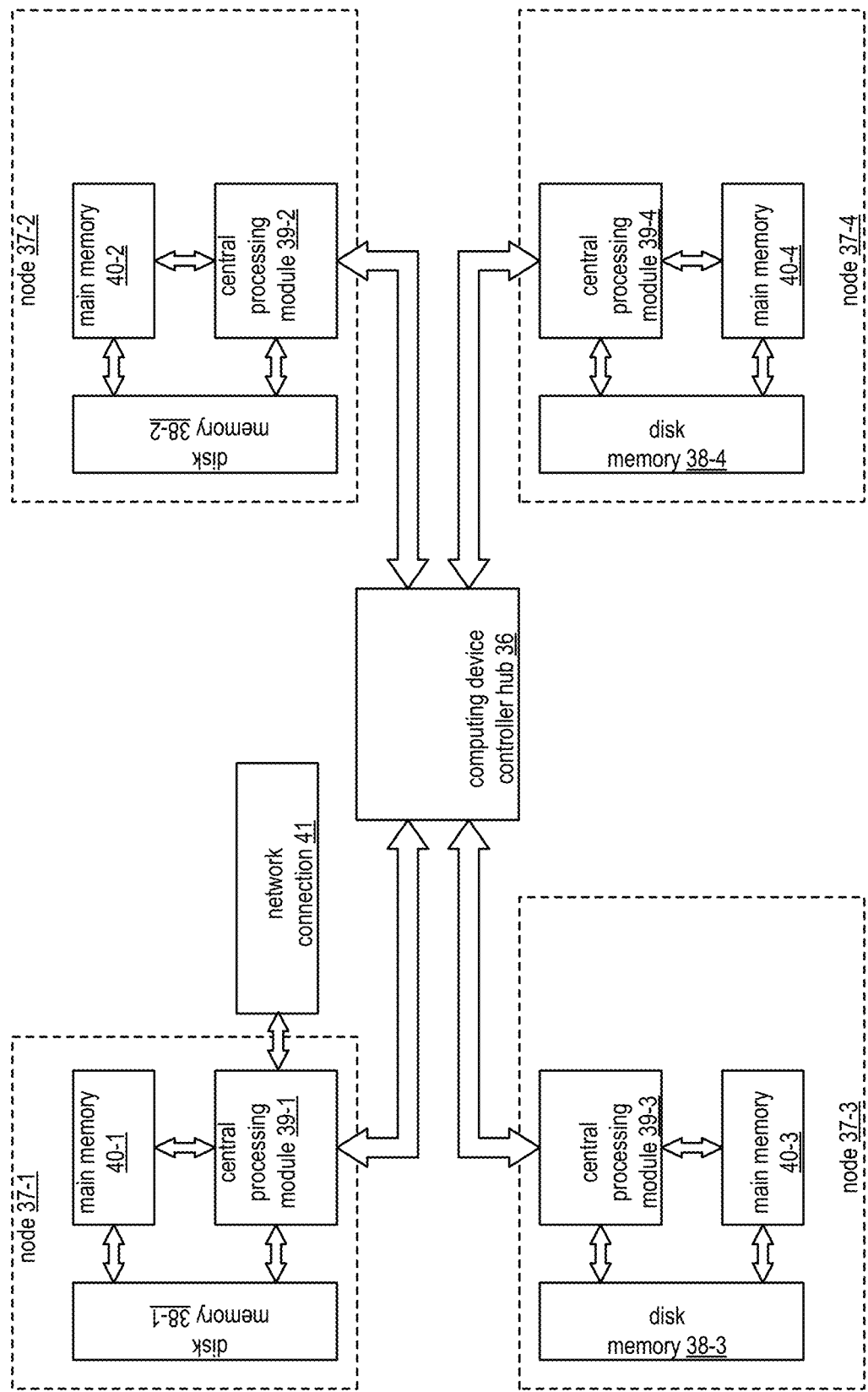
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
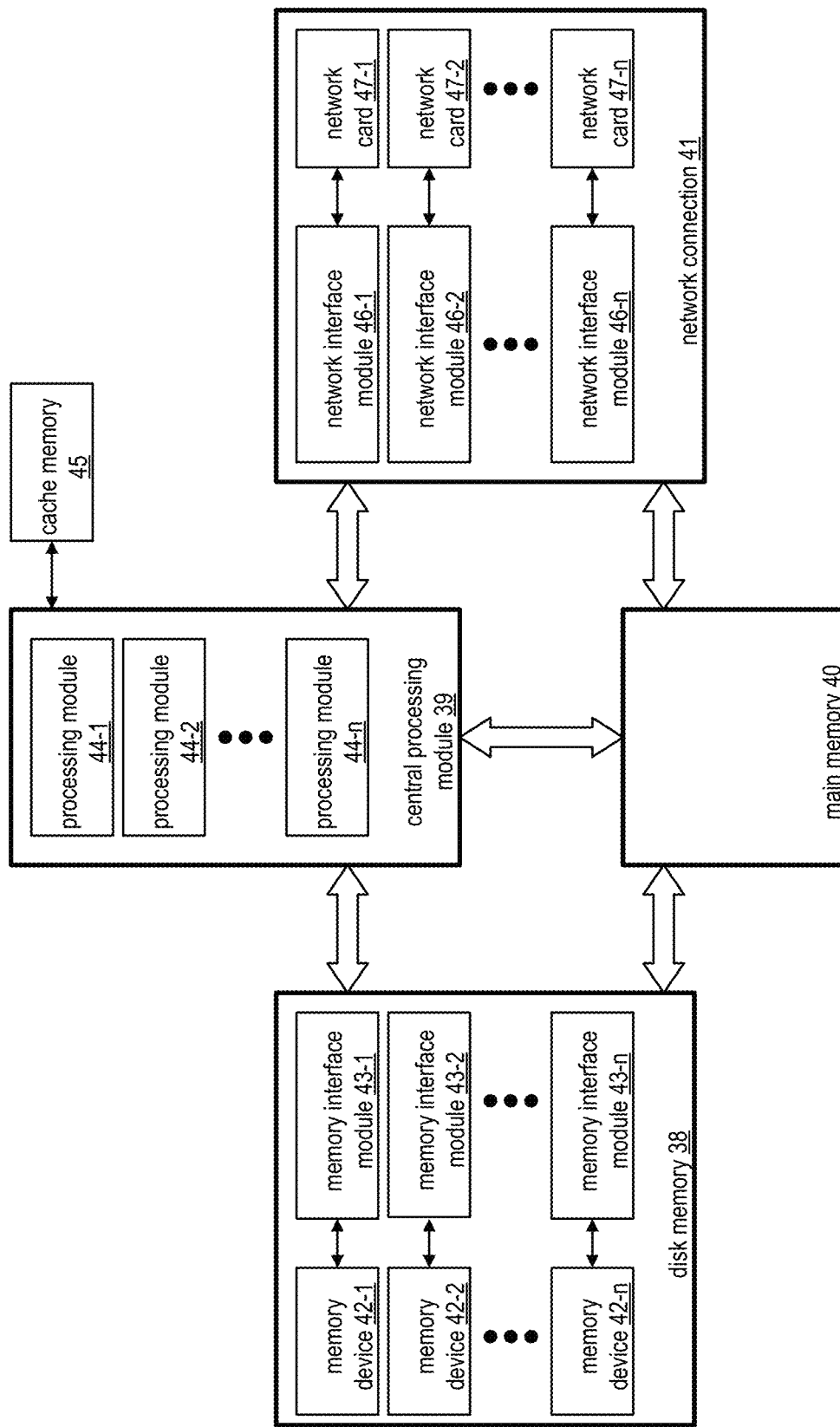
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
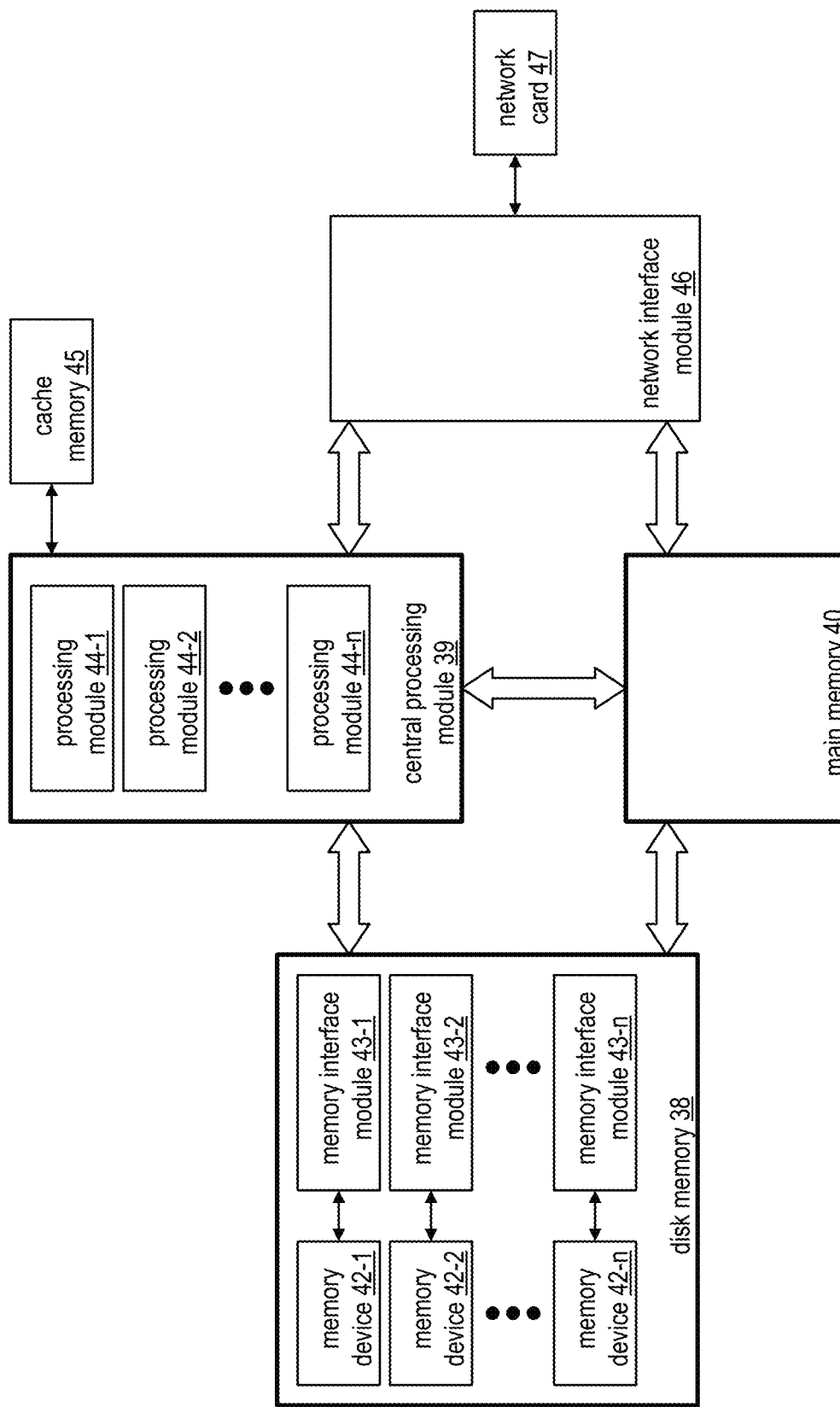
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
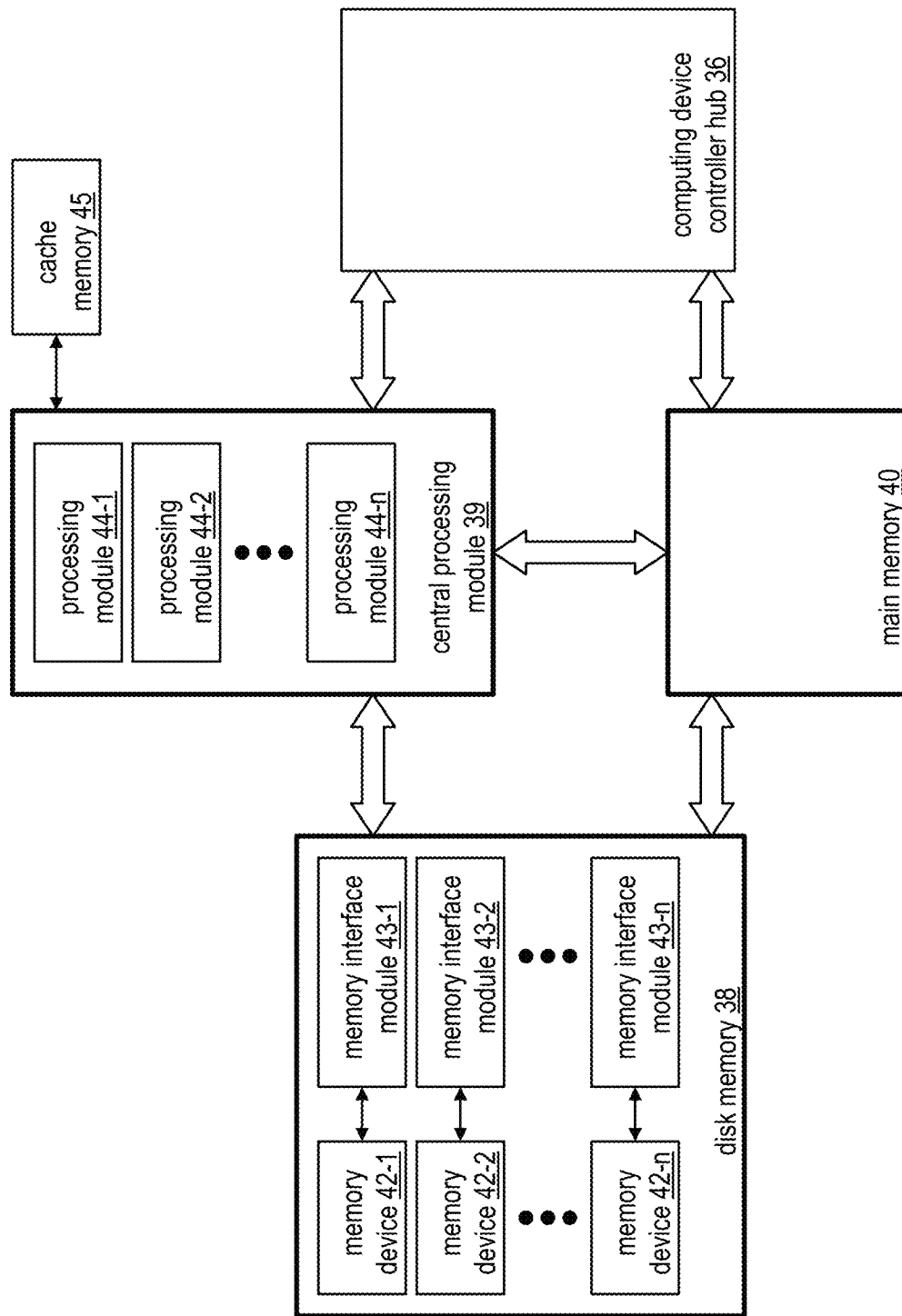
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
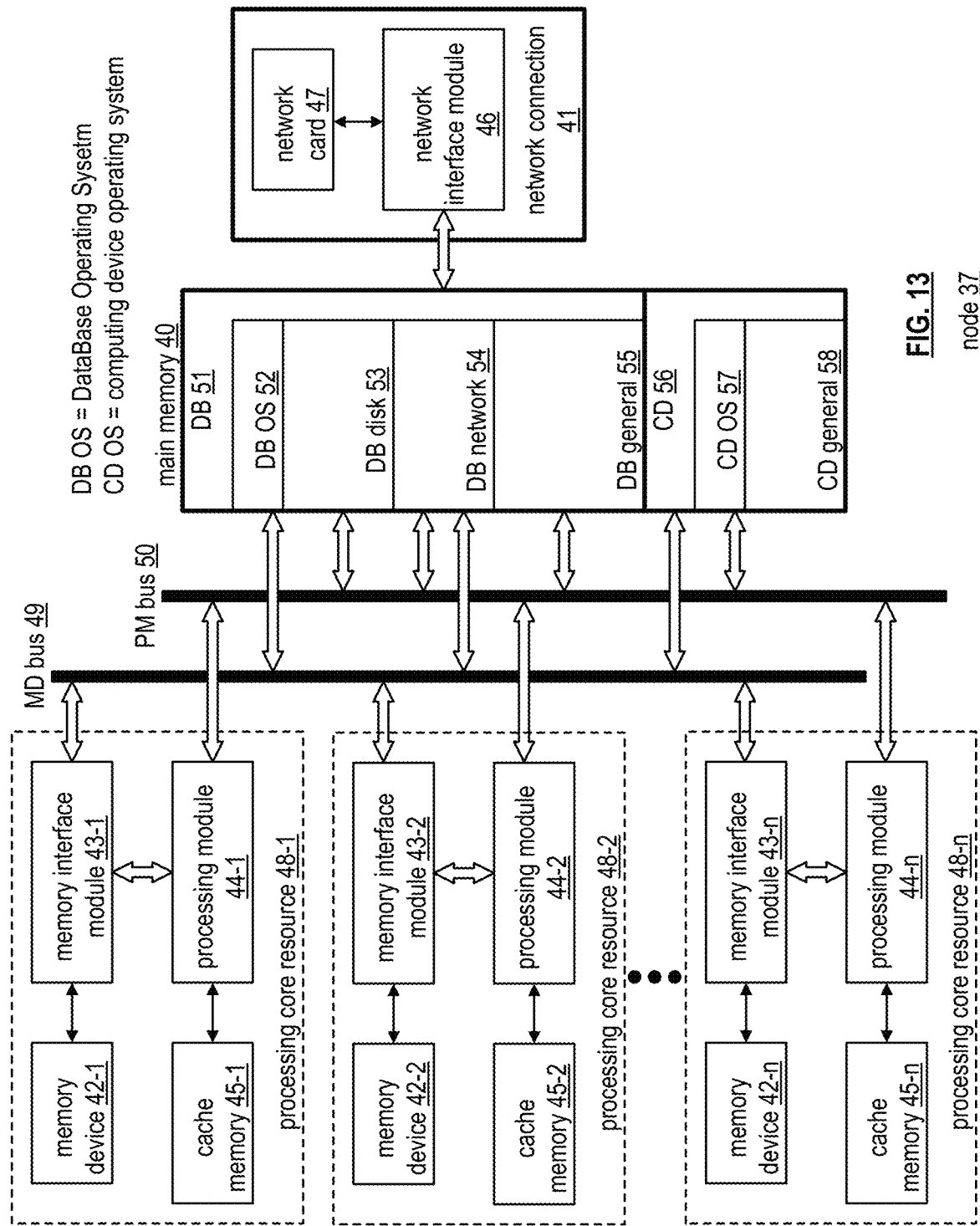
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
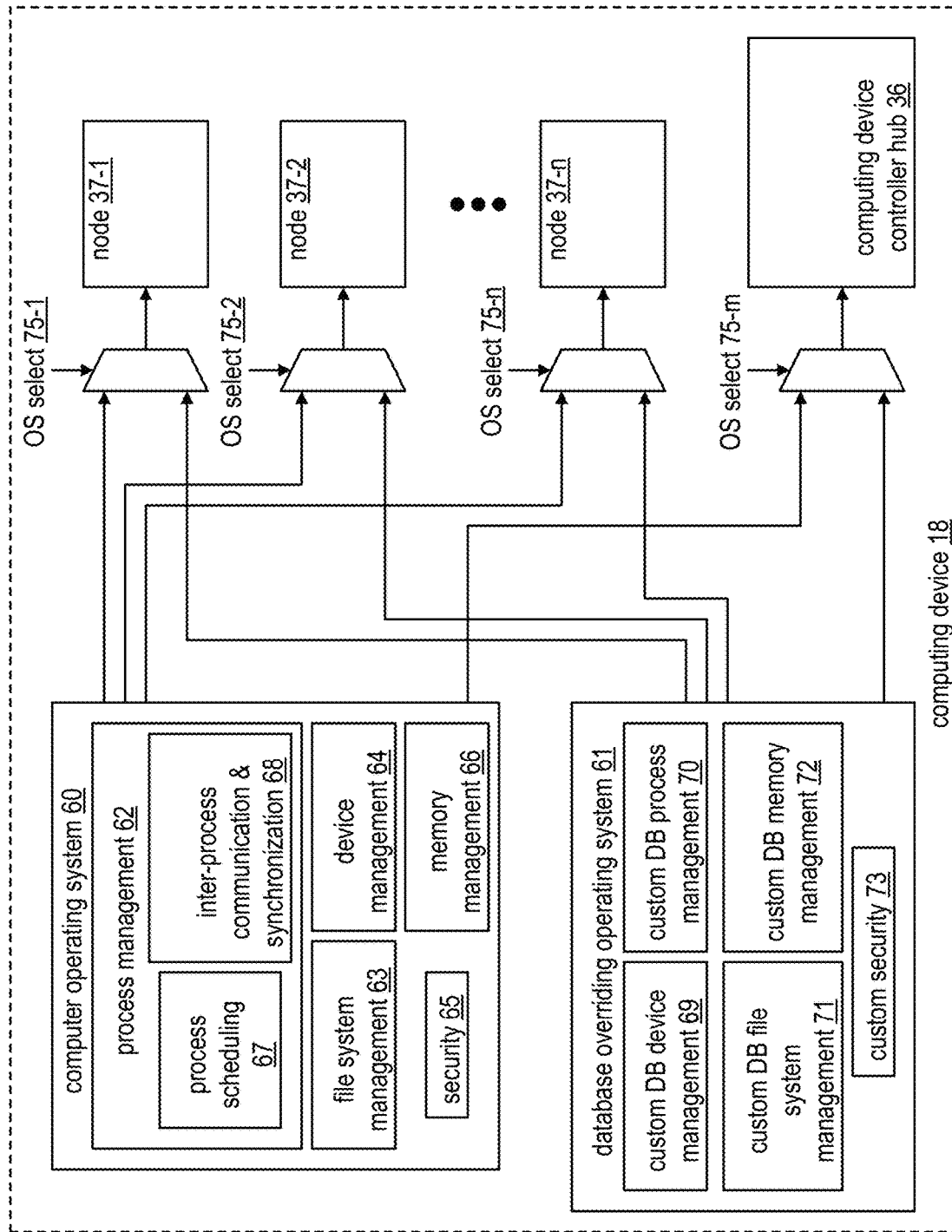
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
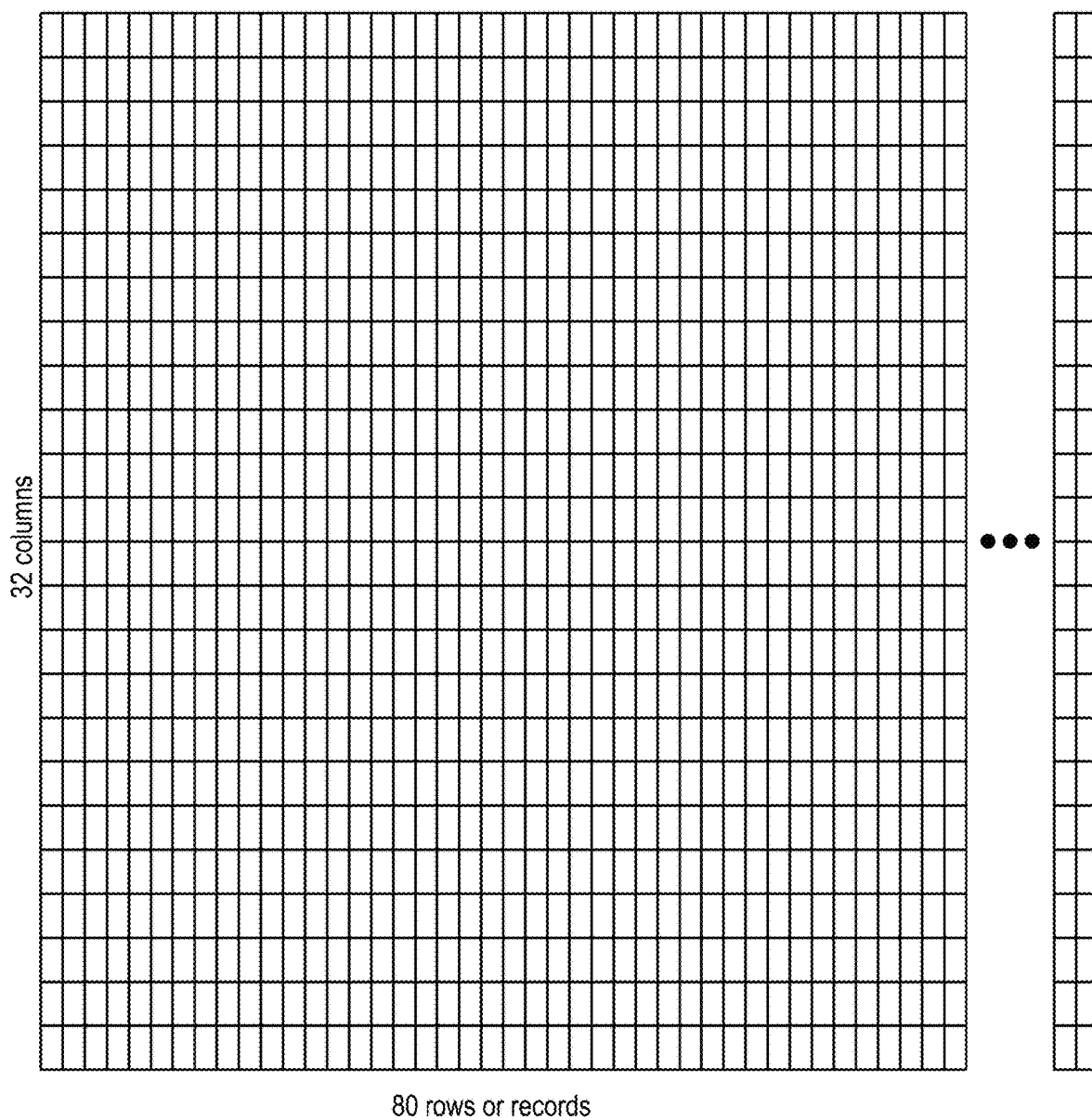

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
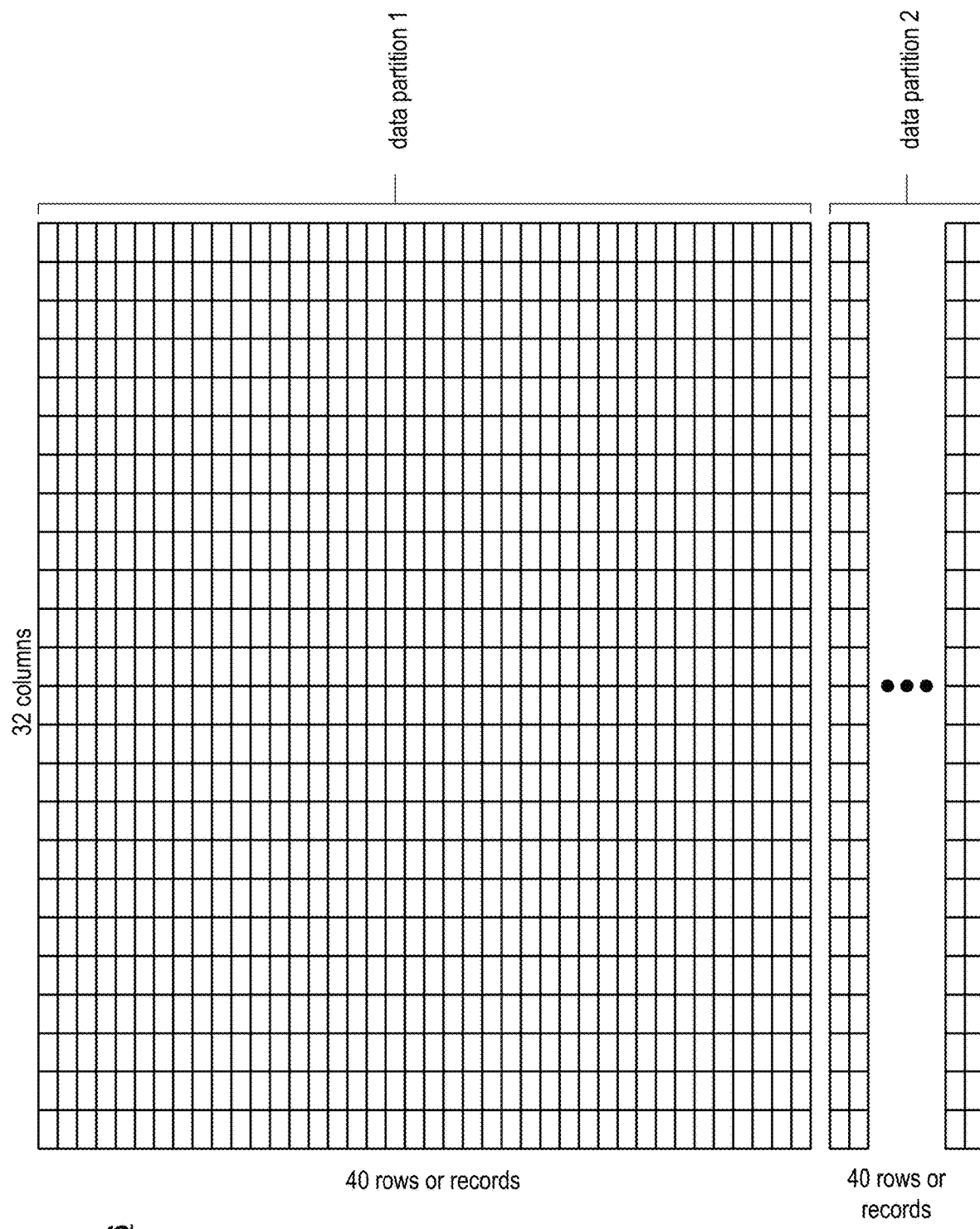

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
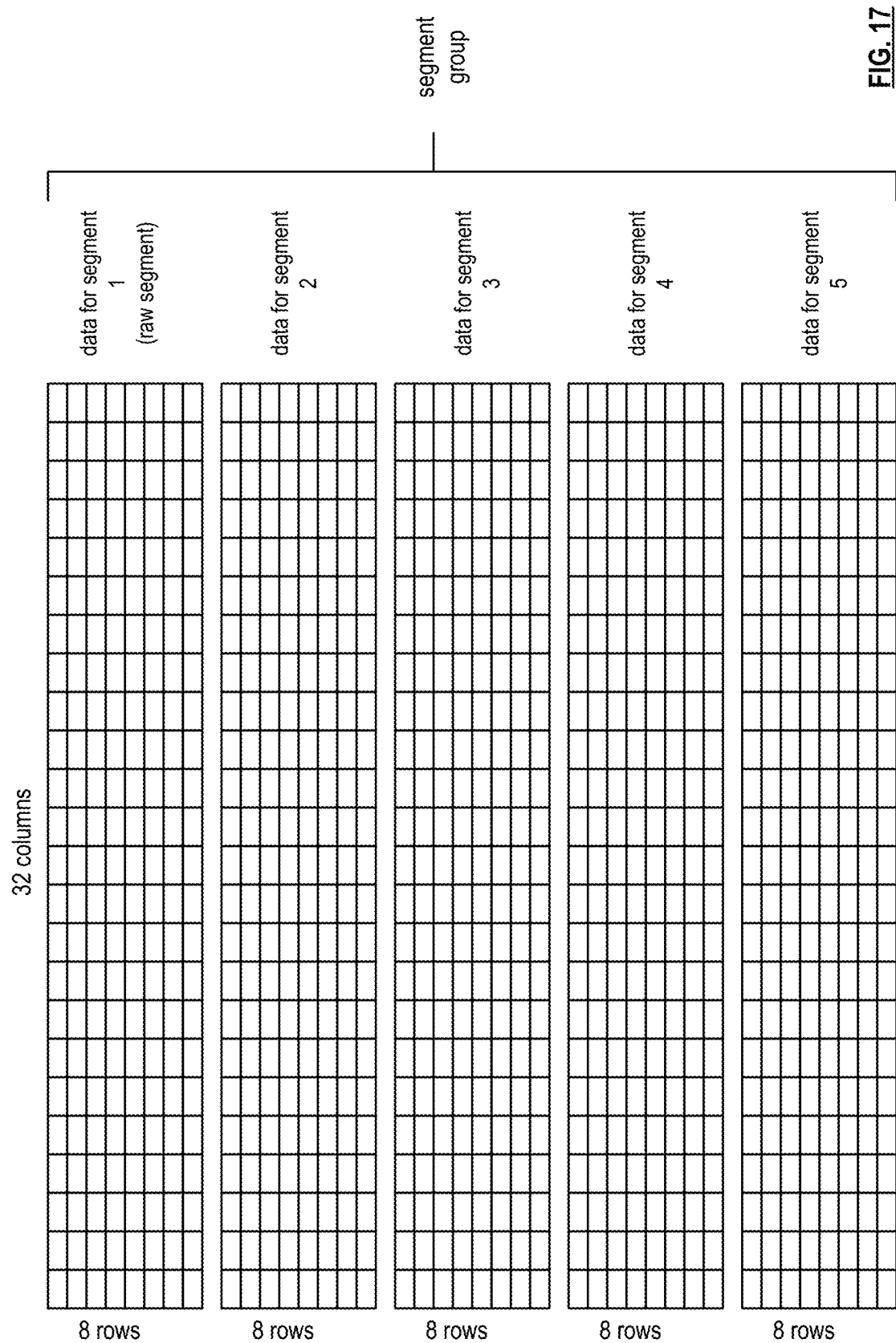

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
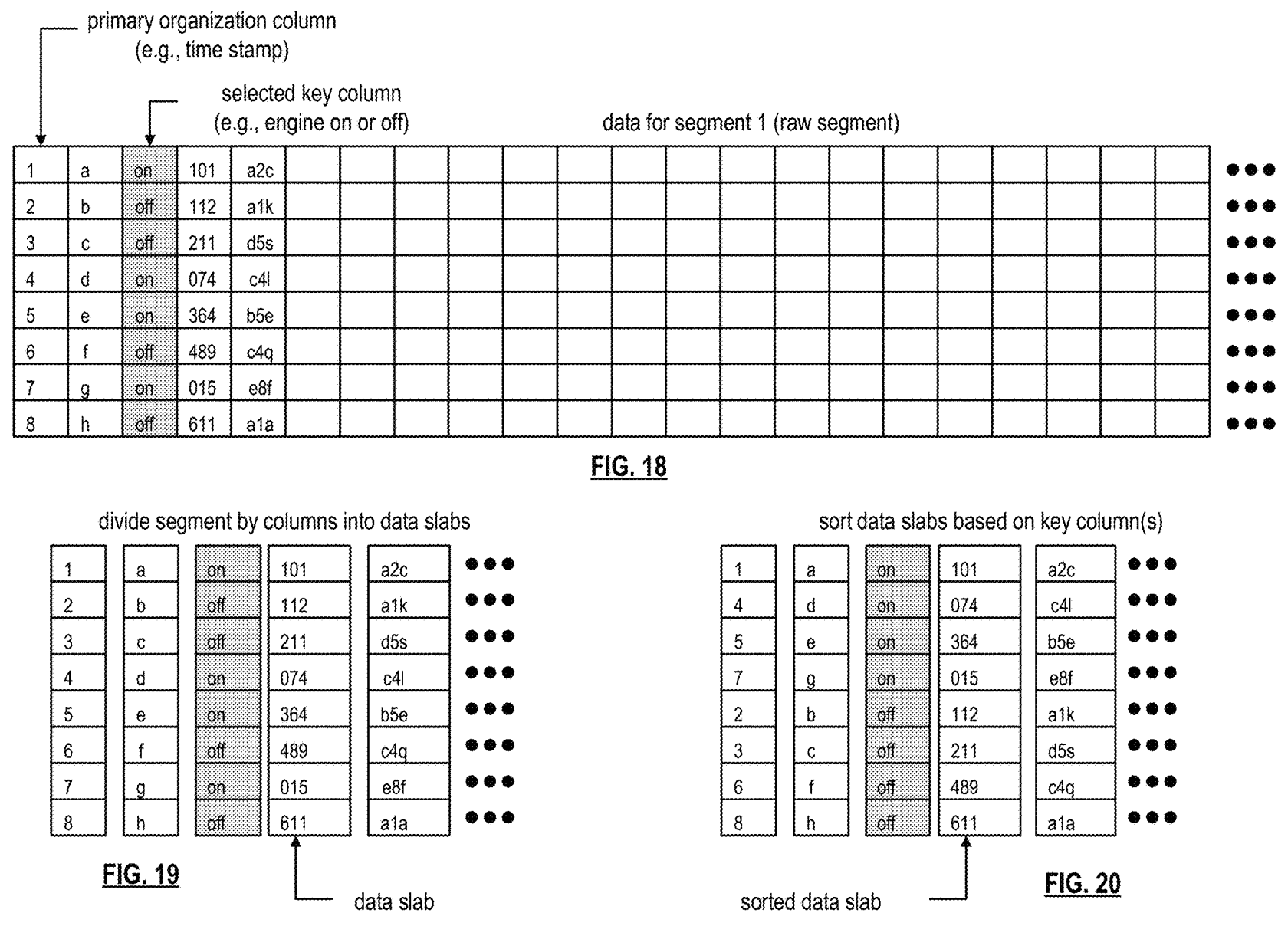

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
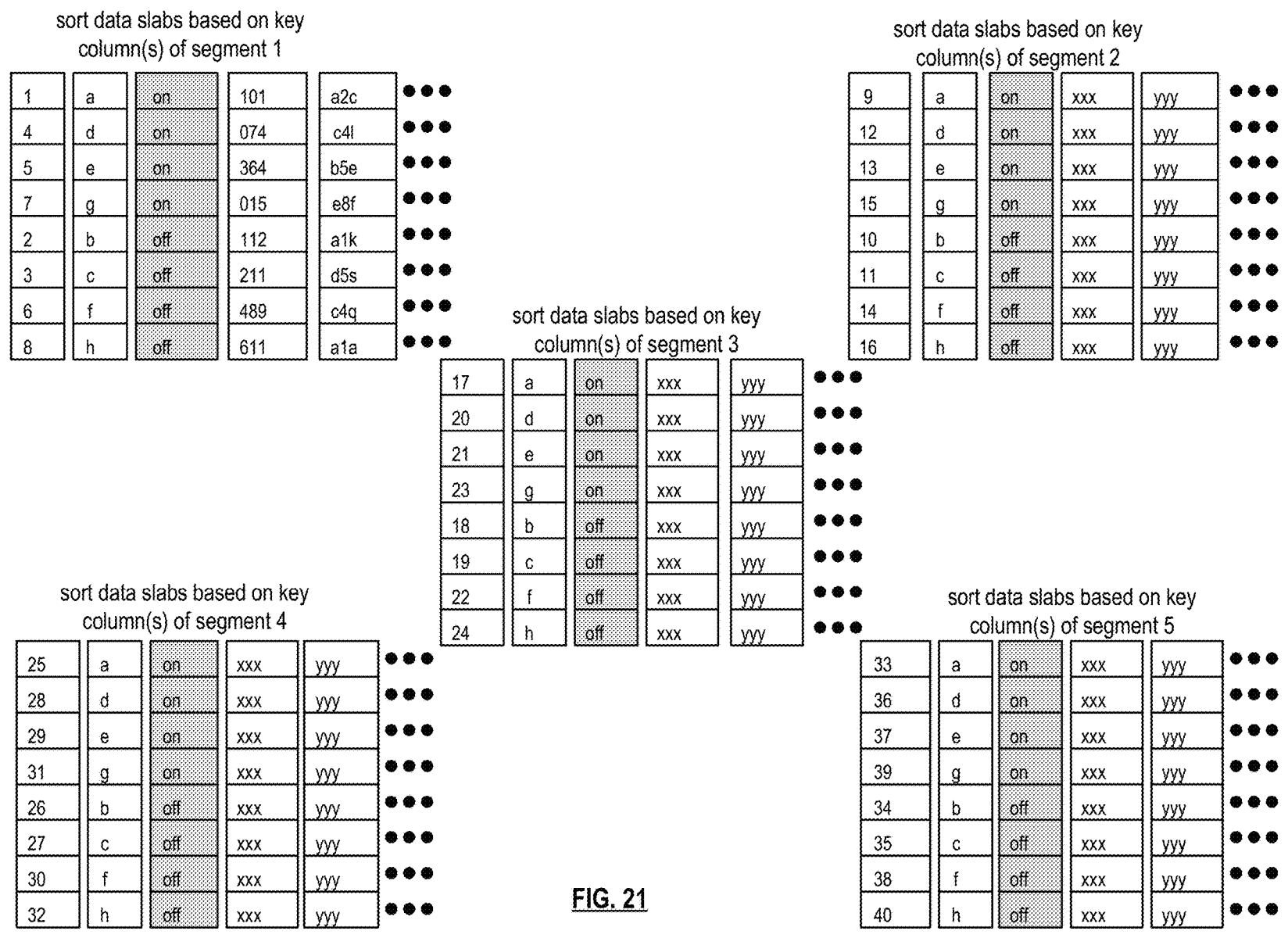

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
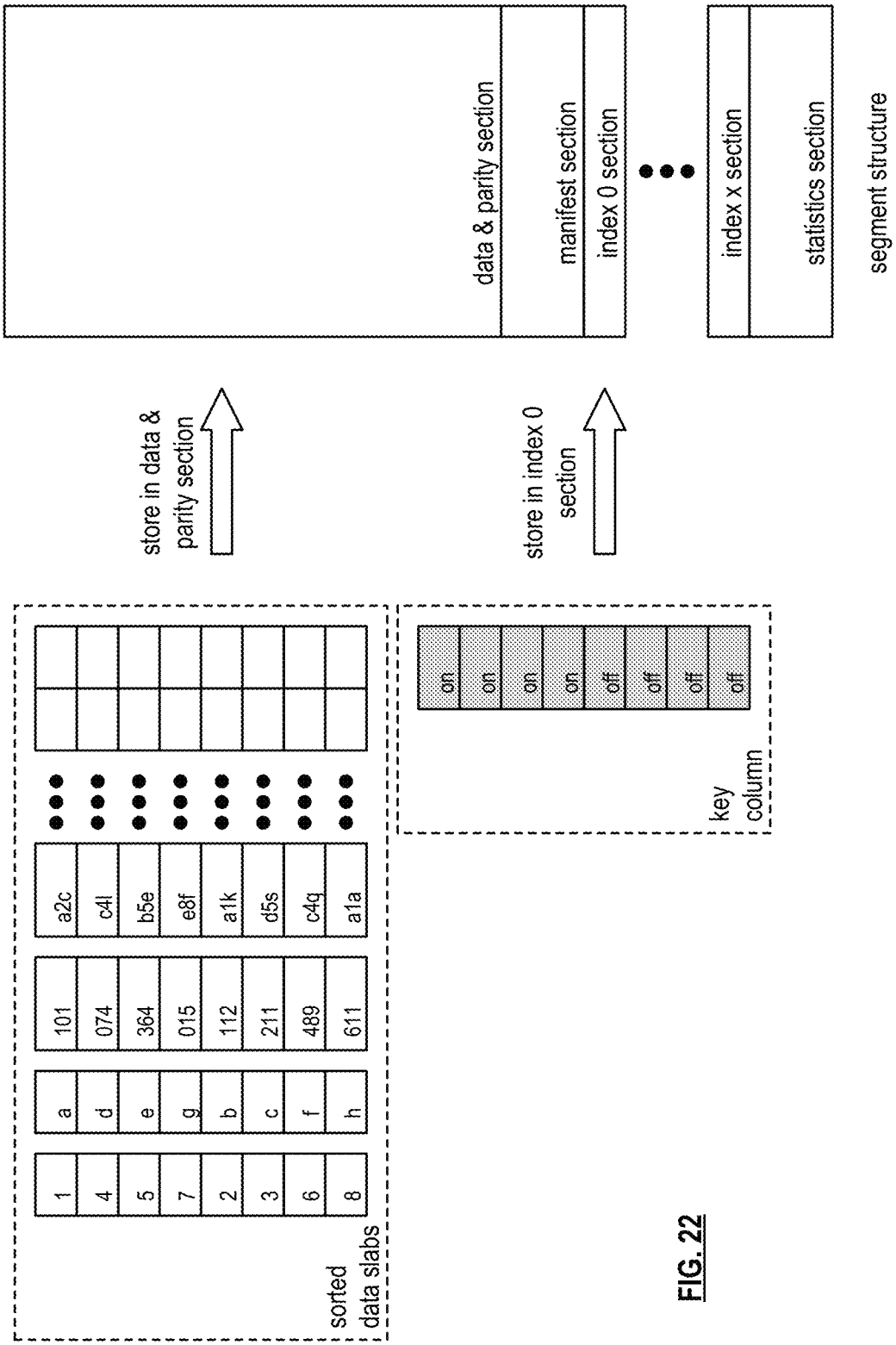

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
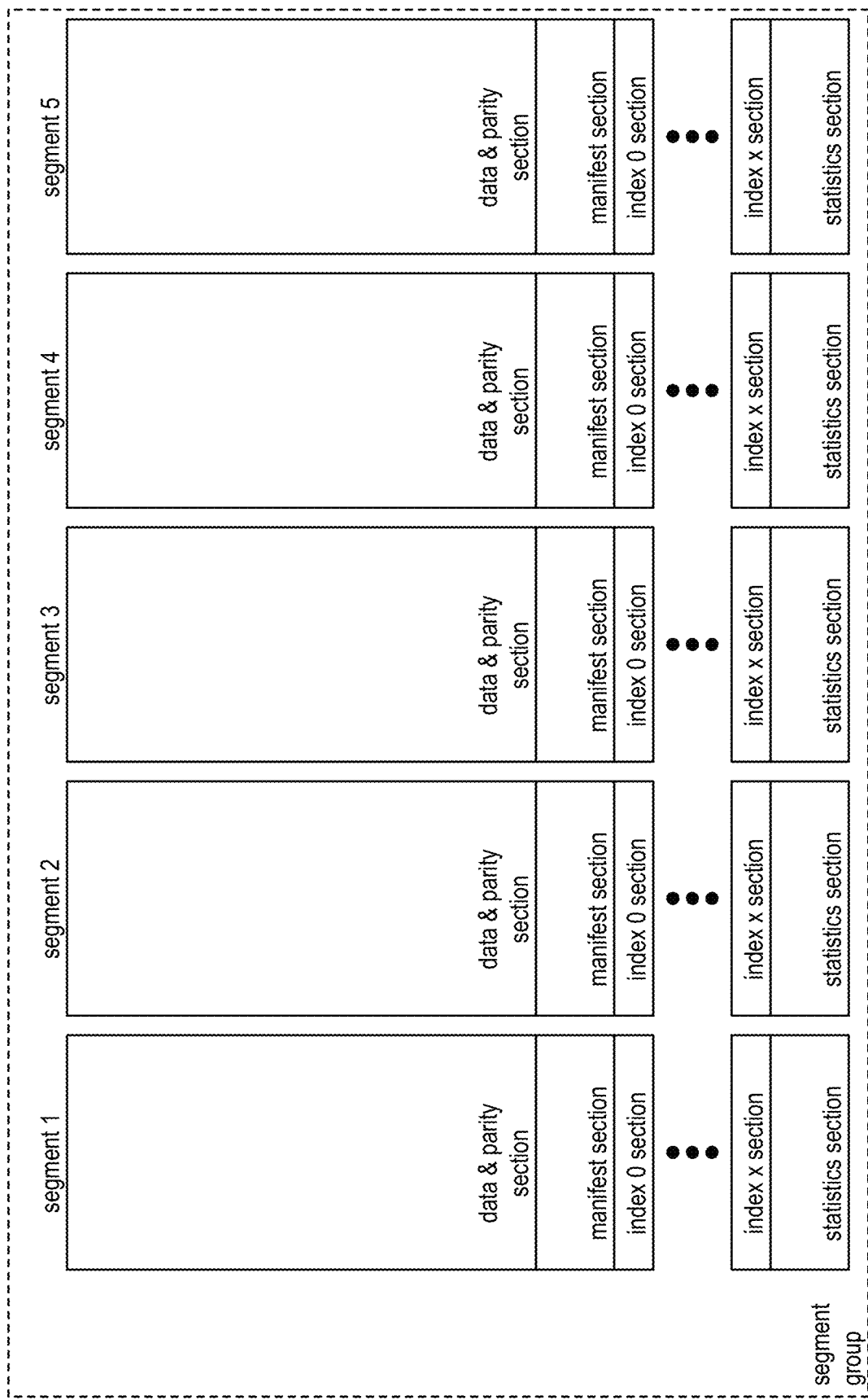

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
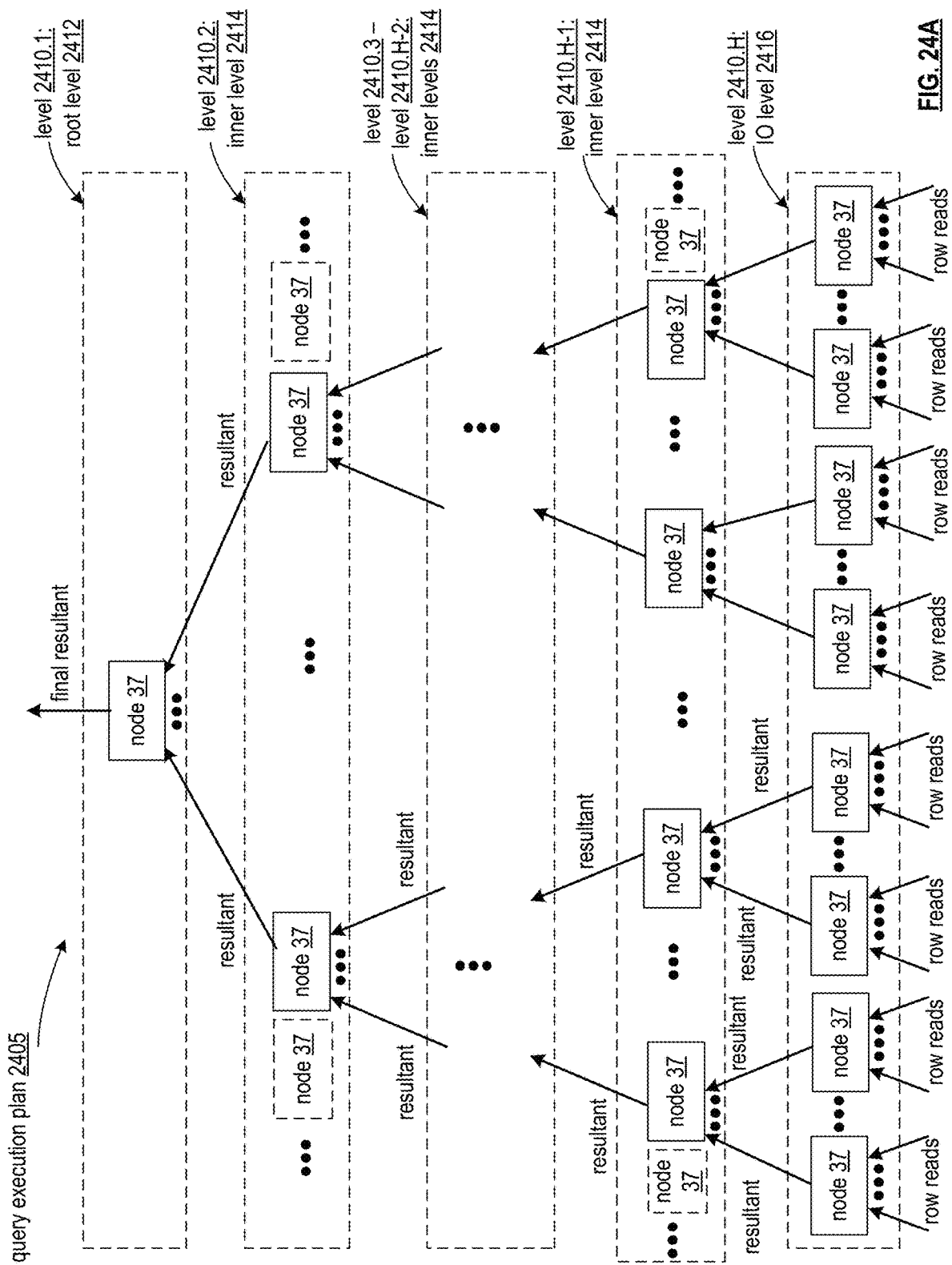
FIG. 24A is a schematic block diagram of a query execution plan in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-$z$ and/or all nodes in all storage clusters 35-1-35-$z$. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H−1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
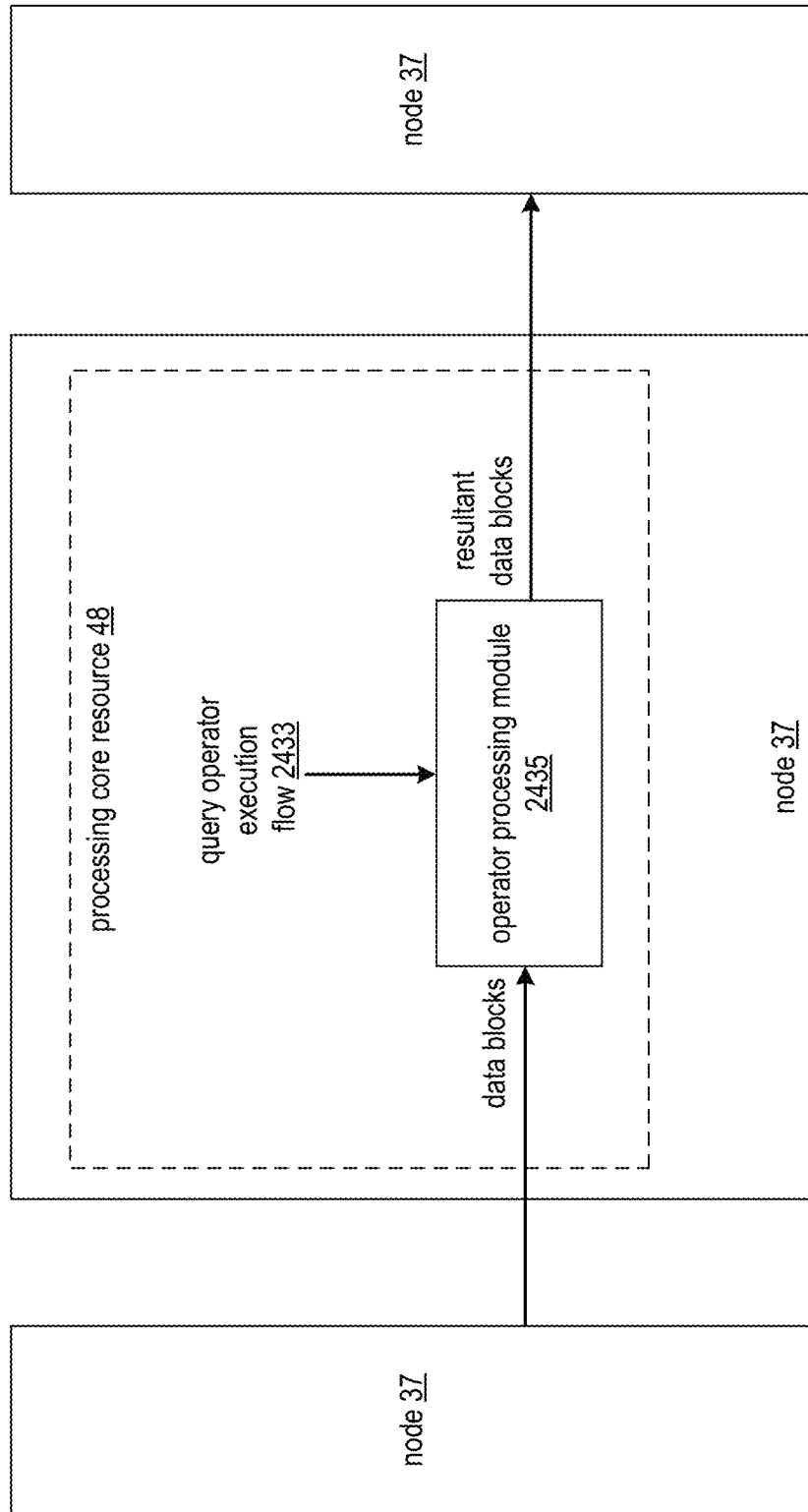
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing an operator processing module 2435. The operator processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes an operator processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2416 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2412 can be gathered into a final result of the query, for example, by the node 37 at root level 2412 if this inner level is the top-most inner level 2414 or the only inner level 2414. As another example, resultants generated by each of the plurality of nodes at this inner level 2412 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the operator processing module 2435 can be implemented by a single processing core resource 48 of the node 37, for example, by utilizing a corresponding processing module 44. In such embodiments, each one of the processing core resources 48-1-48-n of a same node 37 can be executing at least one query concurrently via their own operator processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query. Alternatively, the operator processing module 2435 can be implemented via multiple processing core resources 48 and/or via one or more other processing modules of the node 37.

Figure 24C:
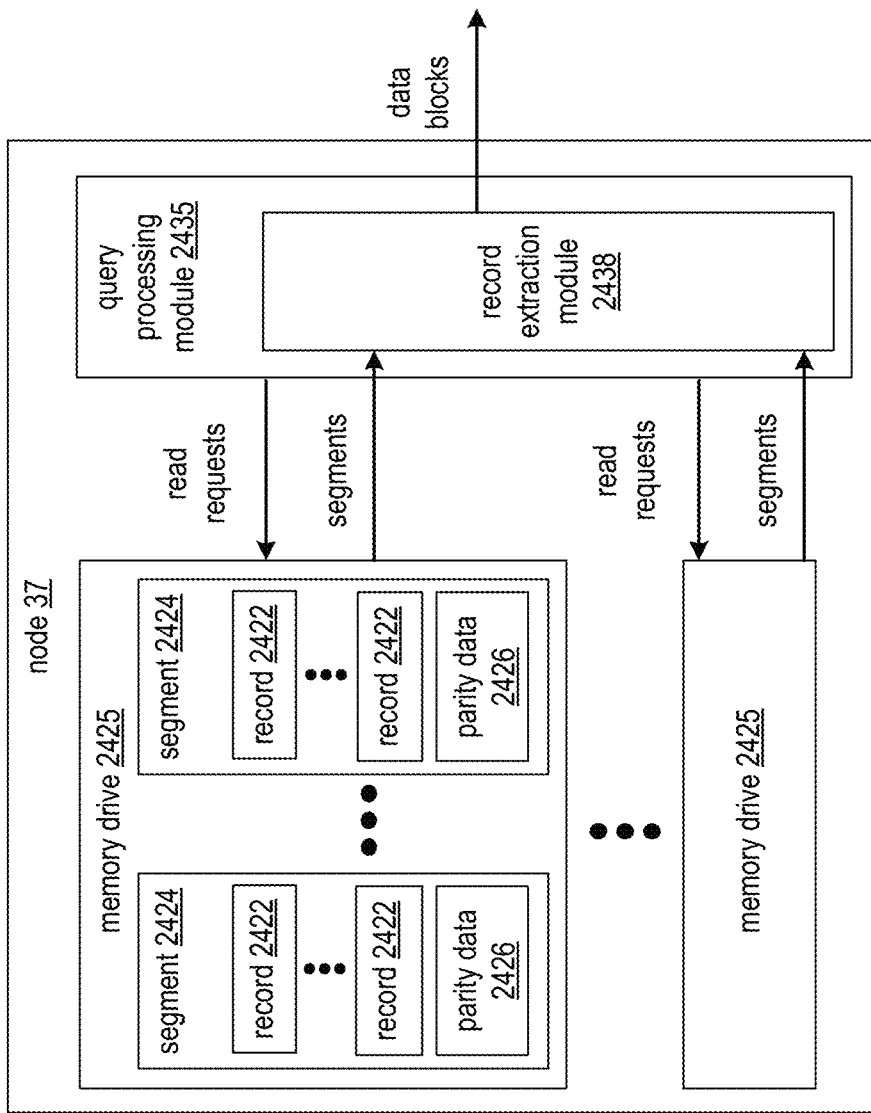

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
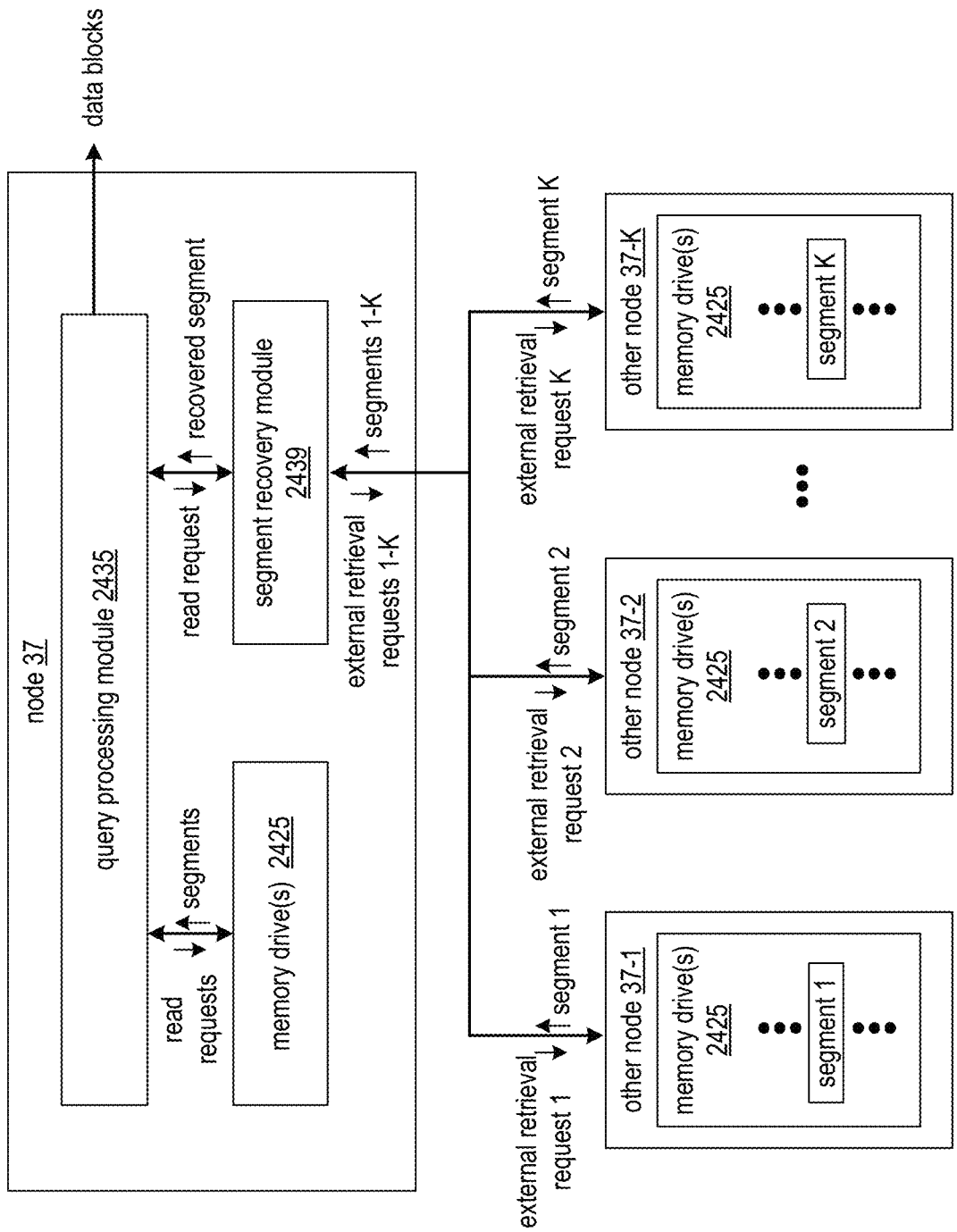

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
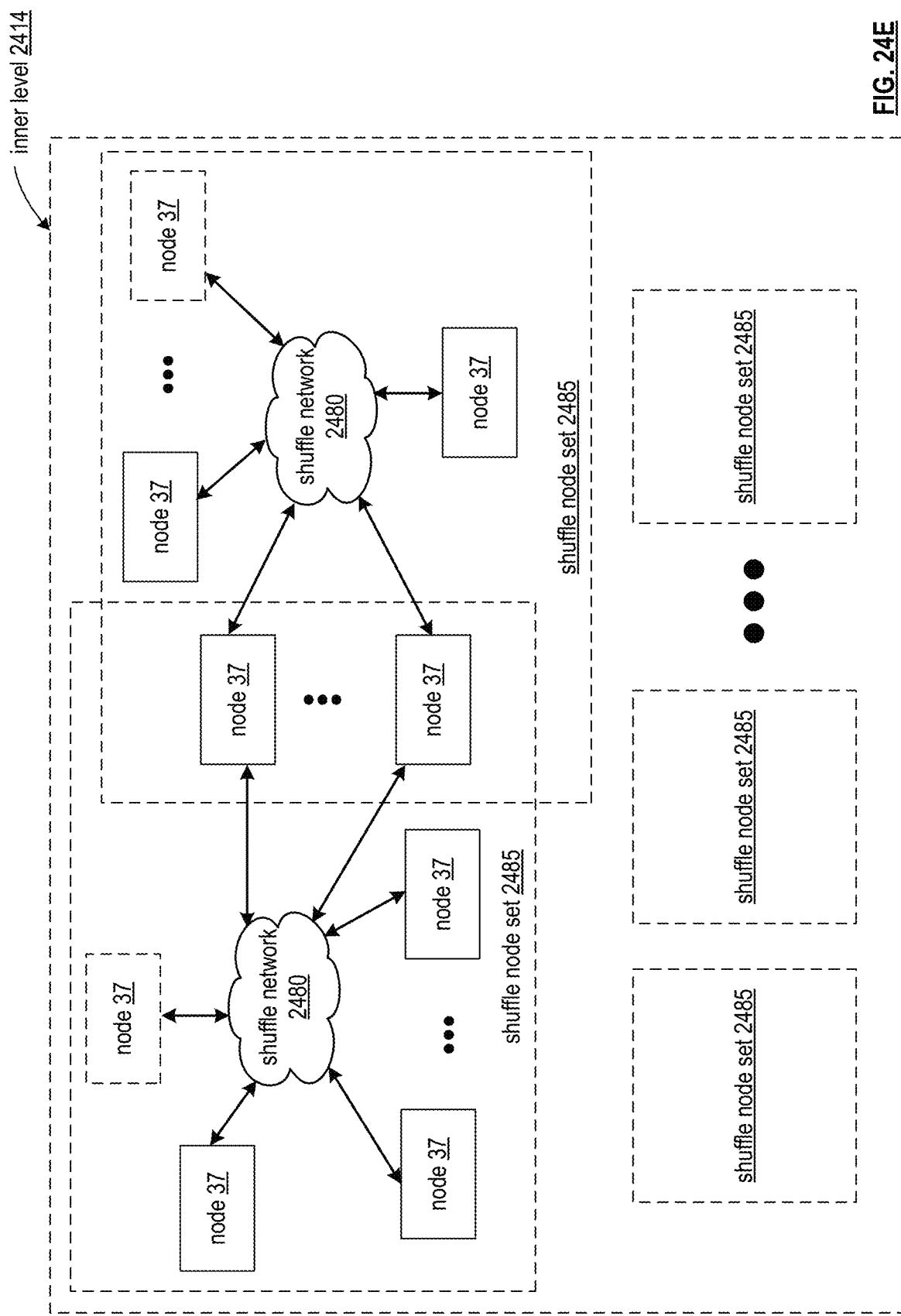
FIG. 24E is an embodiment is schematic block diagrams illustrating a plurality of nodes that communicate via shuffle networks in accordance with various embodiments of the present invention.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set that do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

FIGS. 25A-25D present an embodiments of a query expression processing module 2512 that is operable to generate the query operator execution flow 2433 of FIG. 24B. In particular, a given query expression, for example, received via user input, may present a plurality of operators of the query in a non-normalized form. The query expression processing module 2512 discussed in conjunction with FIGS. 25A-25D can be operable to convert the given query expression into a normalized form and is operable to generate the query operator execution flow 2433 in accordance with the normalized form.

Figure 25A:
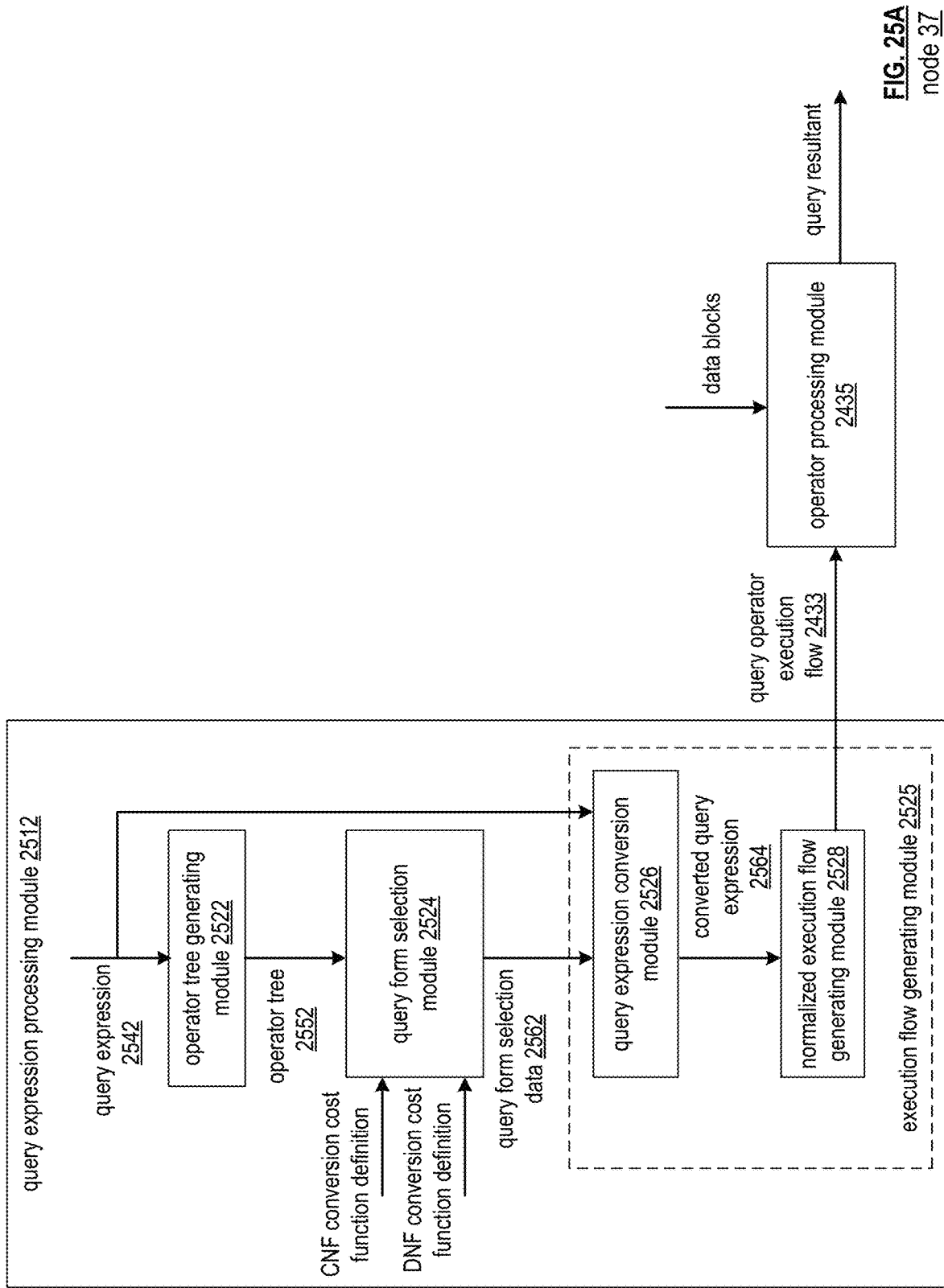
FIG. 25A is a schematic block diagrams of a node that implements a query expression processing module and an operator processing module in accordance with various embodiments of the present invention.

FIG. 25A illustrates an embodiment where the query expression processing module 2512 is implemented by node 37, for example, where some or all nodes 37 discussed herein are operable to implement the query expression processing module 2512. In such embodiments, all query expression processing modules 2512 implemented by all nodes at a same level of the query execution plan 2405 can be operable to deterministically generate query operator execution flows 2433 in the same fashion, for example, where each node at this same level of the query execution plan 2405 independently determines the same query operator execution flows 2433 for its execution of a same given query. In some embodiments, the query expression processing modules 2512 can be implemented by the core processing resource 48 utilized to implement the corresponding operator processing module 2435, where each one of a set of query expression processing modules 2512-1-2512-n and a corresponding one of a corresponding set of operator processing modules 2435-1-2435-n are implemented by one of the set of processing core resources 48-1-48-n. At least one processing module 44 and/or at least one other processing module of the node 37 can be otherwise utilized to implement the query expression processing module 2512.

In other embodiments, the query expression processing module 2512 can be alternatively implemented by another one or more processing modules of the database system 10, such as a centralized processing module that communicates with multiple nodes 37, such as some or all nodes at a same level of the query execution plan 2405 or some or all nodes across multiple levels of the query execution plan 2405. For example, the query operator execution flow 2433 can be generated and/or otherwise determined by a centralized processing module for a given query via the query expression processing module 2512 as discussed herein. A notification indicating the query operator execution flow 2433 determined by the query expression processing module 2512 can be sent by the centralized processing module to multiple nodes of the query execution plan 2405, where these nodes utilize this query operator execution flow 2433 indicated in the notification received from the centralized processing module for the given query to process the given query. The query expression processing module 2512 can otherwise be implemented utilizing processing resources of the parallelized query and results sub-system 13.

Rather than converting every query expression in the same fashion to generate all query operator execution flows in accordance with the same normalized form, the query expression processing module 2512 discussed in conjunction with FIGS. 25A-25D is operable to intelligently select the query form that will be utilized for each given query from a plurality of query options, based on determining the cost associated with converting and/or processing the given query in accordance with each of the plurality of query form options. This introduces improvements to database systems that enable faster, more efficient, and/or less memory consumption in query expression conversion and/or query execution. In particular, by selecting a lowest cost query form option for each incoming query for execution, each query can be converted and/or executed in accordance with the most cost-effective option, such as the fastest option, the least memory-intensive option, and/or otherwise the most efficient option.

For example, this plurality of query form options can include conjunctive normal form (CNF form) and disjunctive normal form (DNF form). In particular, some incoming query expressions may be in a non-normalized form that is almost CNF form and/or is easily converted to CNF form.

These queries can be significantly more costly to convert to DNF form than CNF form and/or may be significantly more costly to execute in accordance with a DNF query operator execution flow than a CNF query operator execution flow. Similarly, other incoming query expressions may be in a non-normalized form that is almost DNF form and/or is easily converted to DNF form. These queries can be significantly more costly to convert to CNF form than DNF form and/or may be significantly more costly to execute in accordance with a CNF query operator execution flow than a DNF query operator execution flow. Rather than requiring that all queries be converted to the same normalized form, thus resulting in inefficient conversion and/or execution of queries via the required normalized form that would be more efficiently converted and/or executed via a different normalized form, the query expression processing module 2512 illustrated in FIGS. 25A-25D enable some queries to be converted and executed in accordance with CNF form, and others to be converted and executed in accordance with DNF form.

As illustrated in FIG. 25A, the query expression processing module can be implemented via an operator tree generating module 2522, a query form selection module 2524, a query expression conversion module 2526, and/or a normalized execution flow generating module 2528. The query expression conversion module 2526, and/or a normalized execution flow generating module 2528 can be utilized to implement an execution flow generating module 2525 of the query expression processing module 2512. Each of the operator tree generating module 2522, a query form selection module 2524, a query expression conversion module 2526, and/or a normalized execution flow generating module 2528 can be implemented via one or more processing modules, such as one or more processing modules, such as one or more processing modules 44, of a same node or of a plurality of different nodes 37; one or more processing modules of a same processing core resource 48 of a plurality of different processing core resource 48 of a same or of a plurality of different nodes; and/or one or more other processing modules of the database system 10.

The query expression processing module 2512 can receive and/or otherwise determine a query expression 2542 indicating a query to be executed by a corresponding operator processing module 2435. This query expression 2542 can correspond to and/or be based on the raw query expression received by the database system, such as a raw query expression generated via user input to a client device communicating with the database system 10 and/or graphical user interface associated with the database system 10 to prompt a user to enter a query for execution. The query expression 2542 can indicate an original, nested ordering of a plurality of operators associated with the raw query expression.

The operator tree generating module 2522 can be utilized to generate an operator tree 2552 by processing the determined query expression 2542. The operator tree 2552 can indicate and/or be based on the original, nested ordering of a plurality of operators. The operator tree 2552 can be generated by parsing the determined query expression 2542 to extract the plurality of operators while preserving the original, nested ordering of the plurality of operators indicated in query expression 2542. In particular the operator tree 2552 can indicate and/or be represented as a hierarchical tree of operator nodes corresponding to predicates of the query expression 2542. This can include conditional statements relating to particular columns of a table included in the domain of the query that are utilized to filter data to be included in the resultant.

Operator nodes that are leaf nodes can correspond to simple predicates of the query expression. For example, one simple predicate can correspond to "COLUMN_A<100", and another simple predicate can correspond to "COLUMN_B=='BLUE'" where COLUMN_A and COLUMN_B are particular fields and/or columns of a table and/or relational database of the database system 10. Operator nodes of the operator tree 2552 that are not leaf nodes and instead have at least one child operator node can correspond to complex predicates that are a function of its child operator nodes via an operator applied to the child operator nodes. For example, a complex predicate of the query expression can indicate "COLUMN_A<100 AND COLUMN_B=='BLUE'", for example, to indicate only a selection of rows where both the value of COLUMN_A is less than 100 and where the value of COLUMN_B is equal to 'BLUE.' This complex predicate can be represented in the operator tree as an AND operator node of the operator tree with two leaf nodes corresponding to the two simple predicates "COLUMN_A<100" and "COLUMN_B=='BLUE'". The operator tree can indicate its operator nodes as operators of the query expression to be performed as a function of the results of execution of each of its child operator nodes, where a root operator node corresponds to a final operator to be performed to generate the resultant. The hierarchical tree structure can thus directly correspond to the nested ordering of the plurality of operators indicated in query expression 2542. An example query expression 2542 and corresponding operator tree 2552 are presented in FIG. 25C.

A query form selection module 2524 can be implemented to generate query form selection data 2562 based on the operator tree 2552. In particular, the query form selection module 2524 can perform a plurality of cost functions that correspond to each of the plurality of query form options upon the operator tree 2552. In the example presented in FIG. 25A, the query form selection module 2524 utilizes a CNF conversion cost function and a DNF conversion cost function, for example, indicated by a CNF conversion cost function definition and a DNF conversion cost function definition that are received by, stored in memory accessible by, and/or otherwise determined by the query expression processing module 2512.

The query form selection data 2562 can indicate a selected one of the plurality of query form options for execution of the given query. For example, the query form selection module 2524 can determine a plurality of cost data for each of the plurality of query form options as output to each of the corresponding plurality of cost functions performed on the operator tree. The query form selection module 2524 can then select the one of the plurality of query form options with the most favorable cost data, for example, indicating the one of the plurality of options is determined to be and/or estimated to be most efficient for conversion and/or execution of the given query.

The execution flow generating module 2525 can utilize the query form selection data 2562 to generate the query operator execution flow 2433. In particular, the execution flow generating module 2525 can generate the query operator execution flow 2433 in accordance with the selected one of the plurality of query form options. As illustrated in FIG. 25A, this can include utilizing the query expression conversion module 2526 to generate a converted query expression 2564, for example, by performing one of a plurality of conversion functions corresponding to the selected one of the plurality of query form options upon the query expression 2542 and/or upon the operator tree 2552.

For example, if the query form selection data 2562 indicates a selection to process the query in CNF form, the query expression conversion module 2526 can perform a CNF conversion function upon the query expression 2542 to generate the converted query expression 2564, where the converted query expression 2564 indicates a different nested ordering of the same or different plurality of operators as the query expression 2542 that is in accordance with CNF form. Similarly, if the query form selection data 2562 indicates a selection to process the query in DNF form, the query expression conversion module 2526 can perform a DNF conversion function upon the query expression 2542 to generate the converted query expression 2564, where the converted query expression 2564 indicates a different nested ordering of the same or different plurality of operators as the query expression 2542 that is in accordance with DNF form.

The query expressed by converted query expression 2542 can be generated to be equivalent to the query expression 2542 and/or can be generated to otherwise render the same resultant as the query expression 2542, despite the converted query expression 2564 indicating a different nested ordering of the same or different plurality of operators as the query expression 2542. In some cases, the query expression is already expressed in accordance with the selected query form indicated by the query form selection data 2562, and the converted query expression 2564 can thus indicate the same nested ordering of the plurality of operators as the query expression 2542.

As illustrated in FIG. 25A, the execution flow generating module 2525 can utilize the normalized execution flow generating module 2528 to generate the query operator execution flow 2433 from the converted query expression 2564. This can include performing one of a plurality of query flow generating functions corresponding to the selected one of the plurality of query forms indicated in the query form selection data 2562 upon the converted query expression 2564. This can include applying one or more conversion rules corresponding to the to the selected one of the plurality of query forms indicated in the query form selection data 2562 to generate the query operator execution flow 2433 from the converted query expression 2564. This can include generating a normalized operator tree, for example, by utilizing the same or different operator tree generating module 2522 to generate an operator tree from the converted query expression 2564, and can further include utilizing this normalized operator tree to generate the query operator execution flow 2433. The resulting query operator execution flow 2433 can indicate and/or be based on the nested ordering of the plurality of operators indicated by the converted query expression 2564 and/or can be in accordance with the selected one of the plurality if query forms.

The query operator execution flow 2433 can be utilized to execute the query by one or more nodes 37 that implement the query expression processing module 2512, and/or that communicate with the query expression processing module 2512 via system communication resources 14. These one or more nodes 37 can execute the query via the query operator execution flow 2433 generated by the query expression processing module 2512 by utilizing the operator processing module 2435 to generate resultant data blocks from input data blocks in accordance with execution of the operators of the query operator execution flow 2433, as discussed in further detail herein.

Figure 25B:
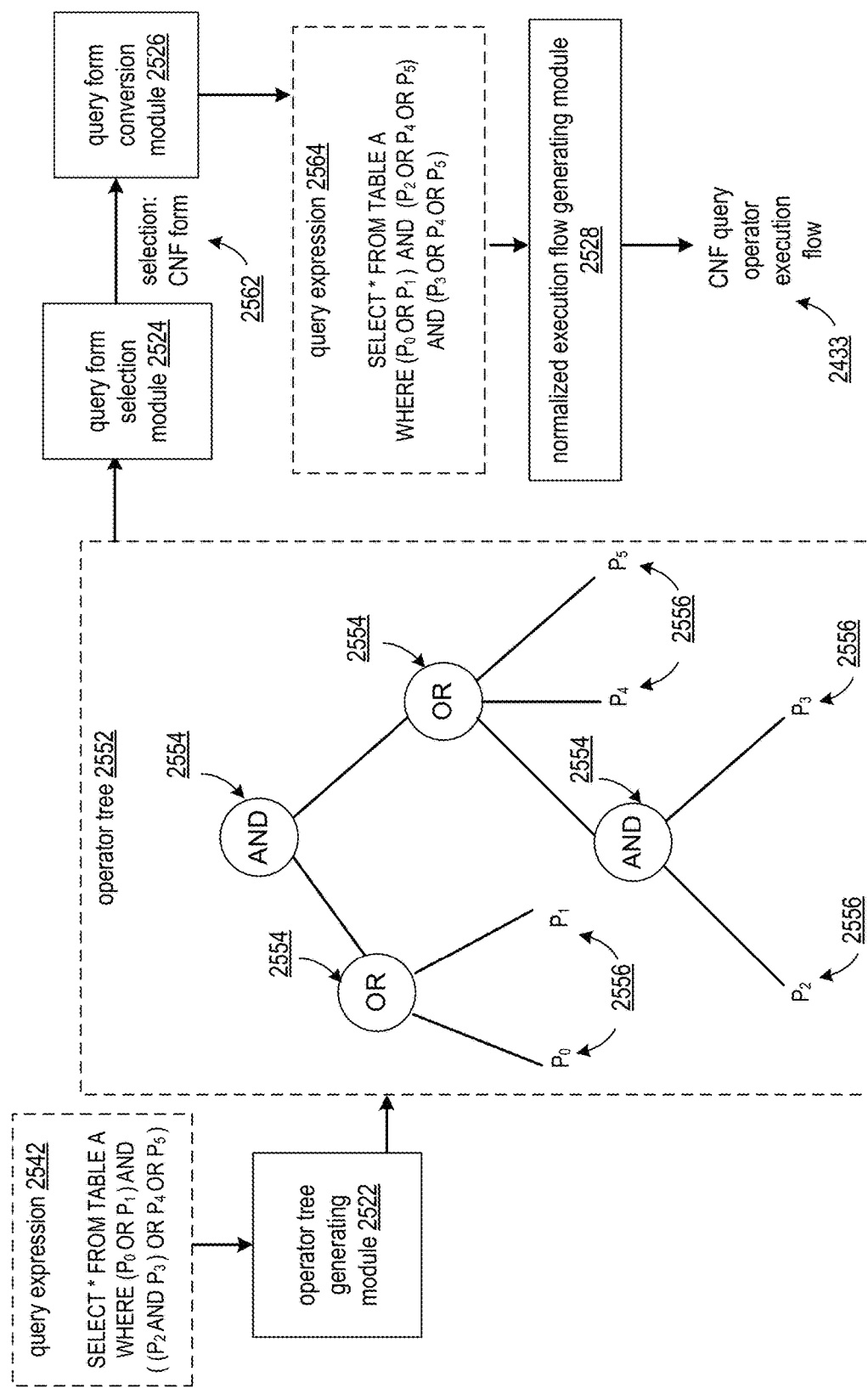
FIG. 25B is a schematic block diagram of a query expression processing module in accordance with various embodiments of the present invention.

FIG. 25B illustrates a particular example of utilizing query expression processing module 2512 to generate a query operator execution flow 2433. In this example, a query expression 2542 is determined for a given query that includes, indicates, and/or is based on the SQL query expression "SELECT*FROM TABLE A WHERE ($P_0$ OR $P_1$) AND (($P_2$ AND $P_3$) OR $P_4$ OR $P_5$)". In this example, $P_0$, $P_1$, $P_2$, $P_3$, $P_4$, and $P_5$ are simple predicates of the query expression. Operator tree generating module 2522 generates the example operator tree 2552 illustrated in FIG. 25B from this example query expression 2542, preserving the nested ordering of the query operators as a hierarchical structure indicating the simple predicates $P_0$, $P_1$, $P_2$, $P_3$, $P_4$, and $P_5$ as a plurality of leaf nodes 2556 of the operator tree 2552 and indicating the plurality of operators performed upon these simple predicates as a plurality of inner nodes 2554 of the operator tree 2552.

In this example, the query form selection module 2524 can generate query form selection data 2562 indicating a selection of CNF form. The query form conversion module can generate a converted query expression 2564 by converting the query expression 2542 into CNF form based on the query form selection data 2562 indicating a selection to process the query in accordance with CNF form. In this example, the converted query expression 2564 can indicate and/or can be based on the expression "SELECT*FROM TABLE A WHERE ($P_0$ OR $P_1$) AND ($P_2$ OR $P_4$ OR $P_5$) AND ($P_3$ OR $P_4$ OR $P_5$)." The converted query expression 2564 can otherwise express in CNF form the same query as query expression 2542. In some cases, a converted operator tree expressing the query in CNF form can be generated instead of in addition to the converted query expression 2564. A normalized execution flow generating module 2528 can generate query operator execution flow 2433 as a CNF query operator execution flow from the corresponding converted query expression 2564 that is in CNF form.

Figure 25C:
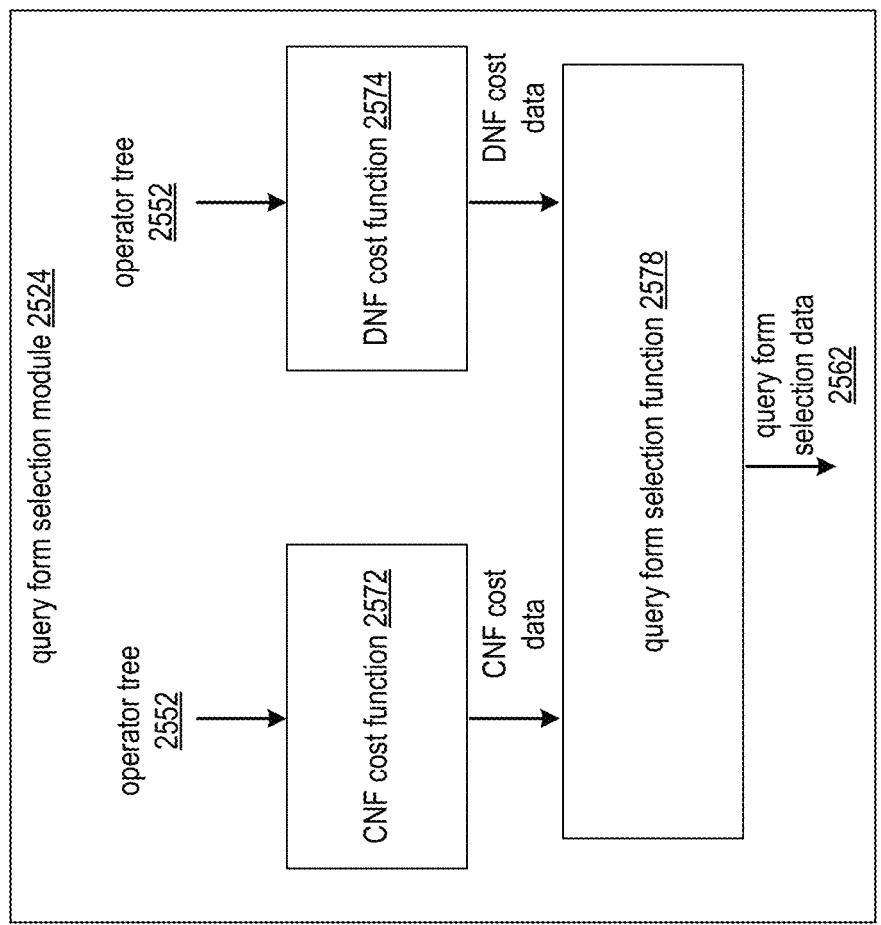
FIG. 25C is a schematic block diagram of a query form selection module in accordance with various embodiments of the present invention.

FIG. 25C illustrates an embodiment of the query form selection module 2524 that selects from a plurality of query form options that include CNF form and DNF form. A CNF cost function 2572 can be performed upon operator tree 2552 to generate CNF cost data, and a DNF cost function 2574 can be performed upon the operator tree 2552 to generate DNF cost data. The CNF cost data can indicate a determined and/or estimated processing cost value and/or a determined and/or estimated memory cost value associated with converting the query expression to CNF form and/or associated with executing the query of the query expression via a query operator execution flow 2433 that is in accordance with CNF form. The DNF cost data can indicate a determined and/or estimated processing cost value and/or a determined and/or estimated memory cost value associated with converting the query expression to DNF form and/or associated with executing the query of the query expression via a query operator execution flow 2433 that is in accordance with DNF form. A query form selection function 2578 can be performed by the query form selection module 2524. For example, performing the query form selection function 2578 can include comparing the CNF cost to the DNF cost. Performing the query form selection function 2578 can include selecting CNF form in the query form selection data 2562 in response to determining the CNF cost data is more favorable than the DNF cost data and/or in response to determining the CNF cost compares favorably to a predetermined CNF cost threshold. Performing the query form selection function 2578 can include selecting DNF form in the query form selection data 2562 when the DNF cost data is more favorable than the CNF cost data and/or when the DNF cost data compares favorably to a predetermined DNF cost threshold.

The CNF cost function 2572 and DNF cost function 2574 can be performed via a recursive function performed upon the operator tree 2552 and/or otherwise via a depth-first traversal of the operator tree 2552. In particular, performing the CNF cost function 2572 can include assigning each node a CNF cost as a function of the CNF costs assigned to its child nodes. Similarly performing the DNF cost function 2574 can include assigning each node a DNF cost as a function of the DNF costs assigned to its child nodes. As both cost functions require a same depth-first traversal of the operator tree, a single recursive function and/or single depth-first traversal of the operator tree 2552 can be performed to generate both the CNF cost data and the DNF cost data in tandem. Thus, performing the CNF cost function 2572 and DNF cost function 2574 can include performing a single recursive cost function that generates both CNF cost data and DNF cost data at each node of the operator tree as a function of the CNF cost data and DNF cost data, respectively, generated for its child nodes.

Figure 25D:
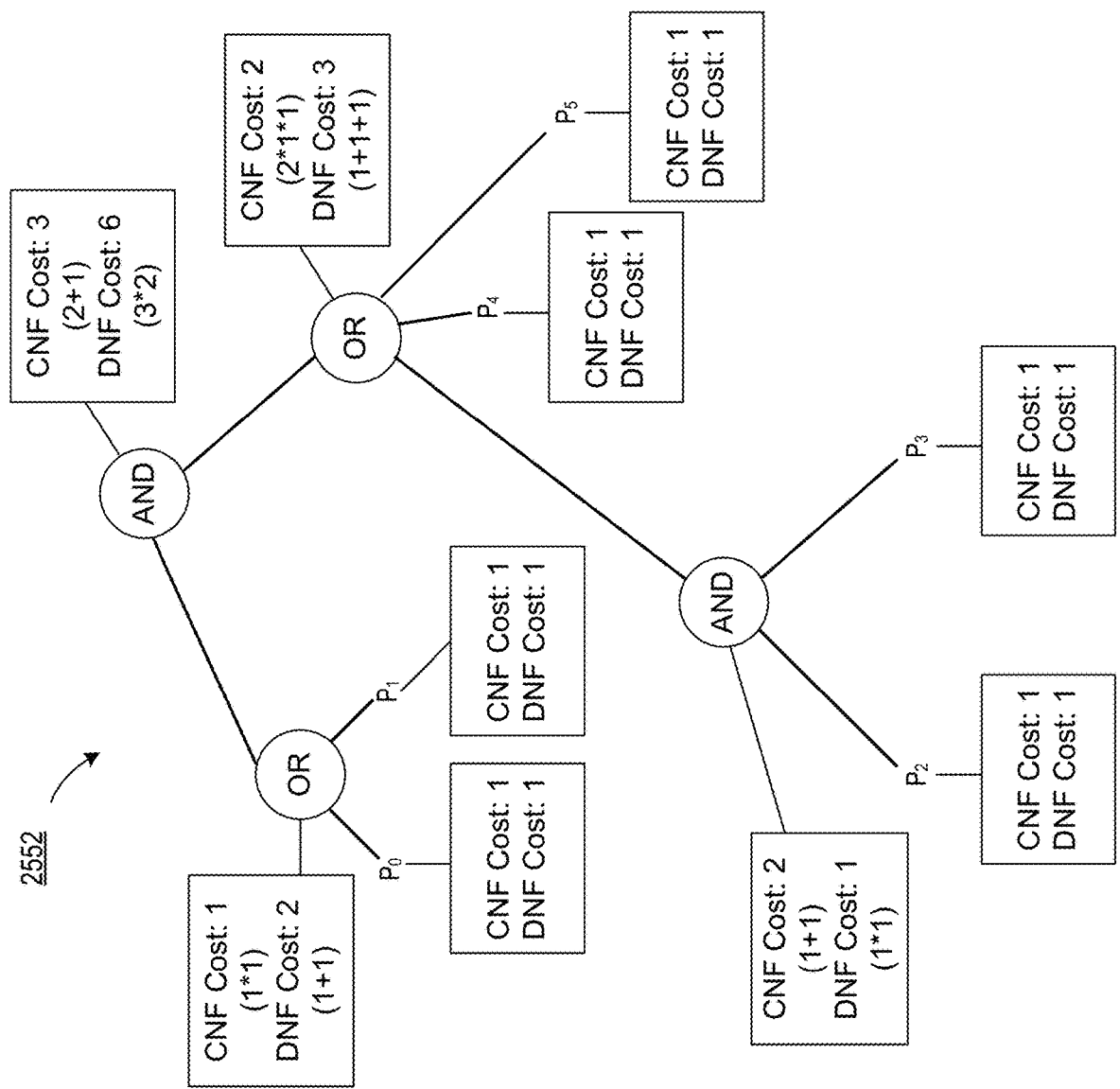
FIG. 25D illustrates an example of generating a conjunctive normal form cost and a disjunctive normal form cost for an example operator tree in accordance with various embodiments of the present invention.

FIG. 25D illustrates a particular example of generating the CNF cost data and DNF cost data by applying an example CNF cost function 2572 and example DNF cost function 2574 to the example operator tree 2552 of FIG. 25B. In this example, the CNF cost function dictates that the CNF cost of every leaf node 2556 is equal to 1, or another same value. The DNF cost function also dictates that the DNF cost of every leaf node 2556 is equal to 1, or another same value. In other embodiments, the CNF cost and DNF cost of a given node can similarly be set equal to any same value in applying the CNF cost function and DNF cost function, respectively. Alternatively, in some embodiments, the CNF cost and DNF cost of a given node can be set equal to different values.

In the example CNF cost function of FIG. 25D, the CNF cost function further dictates that the CNF cost assigned to inner nodes 2554 corresponding to AND operators is calculated as the sum of the CNF costs of its child nodes. The CNF cost function further dictates that the CNF cost assigned to inner nodes 2554 corresponding to OR operators is calculated as the product of the CNF costs of its child nodes. In the example DNF cost function of FIG. 25D, the CNF cost function further dictates that the DNF cost assigned to inner nodes 2554 corresponding to OR operators is calculated as the sum of the DNF costs of its child nodes. The DNF cost function further dictates that the DNF cost assigned to inner nodes 2554 corresponding to AND operators is calculated as the product of the DNF costs of its child nodes.

Propagating these calculated costs up the operator tree yields CNF costs and DNF costs for every node of the tree, where the CNF cost and DNF cost of the root node are ultimately calculated. The CNF cost of the operator tree can be equal to or based on the CNF cost calculated for the root node, and the DNF cost of the operator tree can be equal to or based on the DNF cost calculated for the root node. Thus, applying these example recursive definitions to the root node of the operator tree to generate a CNF cost and DNF cost of the root node yields the CNF cost and DNF cost, respectively, of the operator tree. In the particular example of FIG. 25D, calculating the CNF cost of the example operator tree 2552 in this fashion yields a CNF cost of 3, and calculating the DNF cost of the operator tree in this fashion yields a DNF cost of 6.

The CNF cost function of a node as presented in this example can be expressed as the following recursive definition CNF cost applied to a node:

```
CNF_cost(node) {
    if(node.children == null)
        return 1
    if (node.type == AND)
        return Σ_{i=1}^{node.children.len} CNF_cost(node.children[i]))
    if (node .type == OR)
        return Π_{i=1}^{node.children.len} CNF_cost(node.children[i])) }
```

Similarly, the DNF cost function of a node as presented in this example can be expressed as the following recursive definition DNF_cost applied to a node:

```
DNF_cost(node) {
    if(node.children == null)
        return 1
    if (node.type == OR)
        return Σ_{i=1}^{node.children.len} DNF_cost(node.children[i]))
    if (node .type == AND)
        return Π_{i=1}^{node.children.len} DNF_cost(node.children[i])) }
```

In these example recursive definitions, node.children corresponds to a set or list of the children of the node indexed from 1 to the number of child nodes, where node.children.len corresponds to the number of children in the set or list of the children of the node, and where node.children[i] corresponds to the ith child node of the node in set or list of the children of the node. Node.type can correspond to the type of the node, for example, indicating the particular type of operator. The CNF cost of the operator tree can be generated by applying this CNF_cost definition to the root node, for example, as a recursive function performed on the root node. The DNF cost of the operator tree can similarly generated by applying this DNF_cost definition to the root node, for example, as a recursive function performed on the root node.

While this example CNF cost function 2572 and example DNF cost function 2574 only defines costs associated with AND or operators, other operators, such as all other possible query operators of a query expression and/or all types of operators utilized to express a query expression as an operator tree can have similar recursive definitions as a calculation performed upon the costs of their child node.

When CNF cost and DNF cost is calculated in this fashion, performing the query form selection function 2578 can include determining the lower value of the CNF cost and DNF cost determined for the operator tree, as the lower value corresponds to the more favorable cost in this example. The corresponding query form can be selected to generate the query form selection data 2562. In the example illustrated in FIG. 25B, CNF form is selected in the query form selection data 2562 in response to the CNF cost of 3 being less than the DNF cost of 6 as illustrated in FIG. 25D.

In some embodiments, a scaling factor is determined for the CNF cost and/or the DNF cost. For example, the scaling factor for the DNF cost can be greater than the scaling factor of the CNF cost based on a DNF query expression operator flow generally being more costly to generate than a CNF query expression operator flow. In some cases, the DNF scaling factor is larger than one, and the CNF is not assigned a scaling factor and/or is assigned a scaling factor of exactly one. A raw CNF cost and DNF cost can be generated based on the operator tree as illustrated in FIG. 25D, for example, where the raw CNF cost in the example illustrated is equal to 3 and the raw DNF cost is equal to 6. The raw CNF cost can be multiplied by a predetermined CNF scaling factor to generate a final CNF cost, and/or the final CNF cost can be set equal to the raw CNF cost based on the CNF scaling factor being equal to one. The raw DNF cost can be multiplied by a predetermined DNF scaling factor to generate a final DNF cost.

For example, if the CNF scaling factor is equal to one and the DNF scaling factor is equal to two, in the particular example illustrated in FIG. 25D, the final CNF cost is equal to the raw CNF cost of 3 multiplied by the CNF scaling factor of 1, yielding a final CNF cost of 3. The final DNF cost is equal to the raw DNF cost of 6 multiplied by the DNF scaling factor of 2, yielding a final DNF cost of 12. In this example, the CNF form is still chosen because the final CNF cost is lower than the final DNF cost.

Consider another example where the predetermined CNF scaling factor is again equal to one and where the predetermined DNF scaling factor is again equal to two. In this example, suppose the raw CNF cost calculated for the operator tree is equal to four, and the raw DNF cost calculated for the operator tree is equal to three. Despite the raw DNF cost being lower than the raw CNF cost, the final DNF cost is equal to two multiplied by three, yielding a final DNF cost of six, while the final CNF cost is equal to four. Because the final CNF cost is lower, and thus more favorable, due to the DNF scaling factor being higher than the CNF scaling factor, the CNF form will be selected in performing the query form selection function 2578.

In some embodiments, the query expression processing module and/or another processing module of the database system determines the predetermined CNF scaling factor and/or the predetermined DNF scaling factor. In particular, the DNF scaling factor can be determined, relative to a fixed CNF scaling factor of one, as a function of a relative increase in time, memory, and/or processing resources required to create a DNF query expression operator flow from a converted expression in DNF form rather than creating a CNF query expression operator flow from a converted expression in CNF form. The value of the scaling factor can be computed based on measuring the time for generating a CNF query expression operator flow and a DNF query expression operator flow for each of a plurality of query expressions. In particular, each of a plurality of different query expressions can be converted into CNF form and into DNF form. A CNF query expression operator flow can be generated for each of the query expressions based on their CNF form, and the time and/or processing resources required to generate each CNF query expression operator flow from their respective converted query expression in CNF form can be measured to generate a corresponding plurality of CNF query expression operator flow processing measurements. A DNF query expression operator flow can be generated for each of the query expressions based on their DNF form, and the time and/or processing resources required to generate each DNF query expression operator flow from their respective converted query expression in DNF form can be measured to generate a corresponding plurality of DNF query expression operator flow processing measurements. The average of and/or other aggregation of the CNF query expression operator flow processing measurements can be generated and compared to the average of and/or other aggregation of the DNF query expression operator flow processing measurements. In particular, the scaling factor can be equal to and/or generated based on a ratio of the average value of the DNF query expression operator flow processing measurements divided by the average value of the CNF query expression operator flow processing measurements.

In some cases, a set of different CNF query expression operator flow processing measurement averages and a set of different CNF query expression operator flow processing measurement averages can be determined for each of a set of subsets of this plurality of query expressions, where each different subset in the set of subsets corresponds to a different type of query expression. In this case, a set of DNF scaling factors can be determined, where each scaling factor is generated for a corresponding one of the set of groupings and thus corresponds to one of a set of different types of query expressions. In particular, each DNF scaling factor in the set can be generated as a ratio of, or otherwise based on, the average of the DNF query expression operator flow processing measurements in the corresponding subset and the average of the CNF query expression operator flow processing measurements in the corresponding subset. For incoming query expressions, one of the set of DNF scaling factors can be selected based on determining which one of the set of query expression types the incoming query expression corresponds to or compares most favorably to, and by selecting the DNF scaling factor that corresponds to this corresponding query expression type. This selected DNF scaling factor can be applied to the raw DNF cost to generate the final DNF cost. In this case, the CNF scaling factor for every type of query expression can optionally the same, for example, where each of a corresponding set of CNF scaling factors are all equal to one. Alternatively, the CNF scaling factor for some types of query expressions can be greater than the DNF scaling factor for these types of query expressions based on generation of the CNF query expression operator flow for query expressions of the corresponding type having an average time and/or requiring average processing resources that are greater and/or less favorable than the average time and/or average processing resources determined to be required for the query expressions of the corresponding type.

In various embodiments, a query expression processing module 2512 of a database system includes at least one processor and a memory that stores executable instructions. The executable instructions, when executed by the at least one processor, cause the query expression processing module to determine a query expression indicating a query for execution. An operator tree is generated based on a nested ordering of a plurality of operators indicated by the query expression. Conjunctive normal form (CNF) conversion cost data is generated based on the operator tree, and disjunctive normal form (DNF) conversion cost data is also generated based on the operator tree. Conversion selection data is generated based on the CNF conversion cost data and the DNF conversion cost data. The conversion selection data indicates a selection to perform either a CNF conversion or a DNF conversion. A normalized query expression is generated by performing either the CNF conversion or the DNF conversion upon the query expression, based on the which one of these two conversions are selected in the conversion selection data. Execution of the query is facilitated in accordance with the normalized query expression, for example, by the query expression processing module and/or by an operator processing module that communicates with the query expression processing module.

FIG. 25E illustrates a method for execution by a node 37. For example, the node can utilize at least one processing module of the node 37 to execute operational instructions stored in memory accessible by the node, where the execution of the operational instructions causes the node 37 to execute the steps of FIG. 25E. Different nodes 37 of the same or different computing device 18 can independently execute the method of FIG. 25E concurrently, for example, based on different queries for different queries assigned to the different nodes. In some cases, the method of FIG. 25E is performed by a particular processing core resource 48 of a node 37, where different processing core resources 48 of the same node can independently execute the method of FIG. 25E concurrently, for example, on different query expressions for different queries assigned to the different processing core resources 48. The method of FIG. 25E can be performed by a node 37 in accordance with embodiments of node 37 discussed in conjunction with FIGS. 25A-25D, and/or in conjunction with other embodiments of node 37 discussed herein. Some or all of the method of FIG. 25E can be performed by another processing module of the database system 10.

In particular, the method of FIG. 25E can be performed by a query expression processing module 2512 and/or an operator processing module 2435. For example, the query expression processing module 2512 and/or the operator processing module 2435 can include a processor and memory that includes executable instructions. The executable instructions, when executed by the processor, cause the query expression processing module 2512 and/or the operator processing module 2435 to execute some or all of the steps of FIG. 25E.

Step 2582 includes determining a query expression indicating a query for execution. Step 2584 includes generating an operator tree based on a nested ordering of a plurality of operators indicated by the query expression. Step 2586 includes generating conjunctive normal form (CNF) conversion cost data based on the operator tree. Step 2588 includes generating disjunctive normal form (DNF) conversion cost data based on the operator tree. Step 2590 includes generating conversion selection data, based on the CNF conversion cost data and the DNF conversion cost data, that indicates a selection to perform either a CNF conversion or a DNF conversion. Step 2592 includes generating a normalized query expression by performing either the CNF conversion or the DNF conversion upon the query expression, based on the which one of these two conversions are selected in the conversion selection data. Step 2594 includes facilitating execution of the query in accordance with the normalized query expression.

In various embodiments, the nested ordering of the plurality of operators indicated by the query expression is presented in a non-normalized form. In various embodiments, the normalized query expression is different from the query expression.

In various embodiments, the operator tree indicates the plurality of operators as a plurality of operator nodes of the operator tree. Generating the CNF conversion cost data includes calculating a CNF cost for each of the plurality of operator nodes of the operator tree. Generating the DNF conversion cost data includes calculating a DNF cost for each of the plurality of operator nodes of the operator tree. In various embodiments, calculating the CNF cost for each of the plurality of operator nodes of the operator tree includes applying a depth-first CNF calculation via a recursive process applied to the operator tree. In various embodiments, calculating the DNF cost for each of the plurality of operator nodes of the operator tree conversion cost data includes applying a depth-first DNF calculation via the recursive process applied to the operator tree.

In various embodiments, calculating the CNF cost for each of the plurality of operator nodes of the operator tree includes, for each OR node in the operator tree, multiplying the CNF cost of each child node of the each OR node. In various embodiments, calculating the CNF cost for each of the plurality of operator nodes of the operator tree includes, for each AND node in the operator tree, summing the CNF cost of each child node of the each AND node. In various embodiments, calculating the DNF cost for each of the plurality of operator nodes of the operator tree includes, for each OR node in the operator tree, summing the DNF cost of each child node of the each OR node. In various embodiments, calculating the DNF cost for each of the plurality of operator nodes of the operator tree includes, for each AND node in the operator tree, multiplying the DNF cost of each child node of the each AND node.

In various embodiments, every leaf node of the operator tree is assigned a same DNF cost and is further assigned a same CNF cost, such as the value of one. In various embodiments, every leaf node's DNF cost is equal to every leaf node's CNF cost. In various embodiments, the DNF conversion cost data and the CNF conversion cost data are generated concurrently by generating a CNF cost and DNF cost for each of a plurality of operator nodes of the operator tree by performing a single depth-first traversal of the operator tree.

In various embodiments, generating the conversion selection data includes selecting the CNF conversion when the CNF conversion cost data is more favorable than the DNF conversion cost data, and generating the conversion selection data includes selecting the DNF conversion when the DNF conversion cost data is more favorable than the CNF conversion cost data. In various embodiments, the CNF conversion cost data is more favorable than the DNF conversion cost data when a CNF cost value calculated for the operator tree that is indicated in the CNF conversion cost data, is greater than a DNF cost value calculated for the operator tree that is indicated in the DNF conversion cost data. In various embodiments, generating the conversion selection data includes selecting the CNF conversion when the CNF cost value indicated in the CNF conversion cost data is equal to the DNF cost value indicated in the DNF conversion cost data.

In various embodiments, generating the conversion selection data includes automatically selecting the CNF conversion when the CNF conversion cost data compares favorably to a predetermined threshold CNF conversion cost. For example, the CNF conversion is selected in response to determining a CNF cost value calculated for the operator tree is less than, equal to, and/or otherwise compares favorably to a predetermined CNF value. In such cases where the CNF conversion cost data compares favorably to the predetermined threshold CNF conversion cost, the CNF conversion is selected regardless of the DNF conversion cost. For example, the DNF conversion cost data can indicate a more favorable conversion cost than the CNF conversion cost data, but the conversion selection data is generated to indicate selection of the CNF conversion based on the CNF conversion cost data comparing favorably to the predetermined threshold CNF conversion cost. As a particular example, the DNF cost value calculated for the operator tree is less than the CNF cost value calculated for the operator tree, but the conversion selection data is generated to indicate selection of the CNF conversion based on the CNF cost value calculated for the operator tree comparing favorably to the predetermined threshold CNF cost value.

In various embodiments, generating the conversion selection data includes automatically selecting the CNF conversion when the DNF conversion cost data compares unfavorably to a predetermined threshold DNF conversion cost. For example, the DNF conversion is selected in response to determining a DNF cost value calculated for the operator tree is less than, equal to, and/or otherwise compares unfavorably to a predetermined DNF value. In such cases where the DNF conversion cost data compares unfavorably to the predetermined threshold DNF conversion cost, the CNF conversion is selected regardless of the CNF conversion cost. For example, the DNF conversion cost data can indicate a more favorable conversion cost than the CNF conversion cost data, but the conversion selection data is generated to indicate selection of the CNF conversion based on the DNF conversion cost data comparing unfavorably to the predetermined threshold DNF conversion cost. As a particular example, the DNF cost value calculated for the operator tree is less than the CNF cost value calculated for the operator tree, but the conversion selection data is generated to indicate selection of the CNF conversion based on the DNF cost value calculated for the operator tree comparing unfavorably to the predetermined threshold DNF cost value.

In various embodiments, the normalized query expression is automatically set to the query expression in response to determining the query expression is either CNF form or DNF form. In various embodiments, the method includes determining whether or not the query expression is already in either CNF form or DNF form. For example, determining whether the query expression already in either CNF form or DNF form can be based on the operator tree generated in step 2584. The method further includes foregoing the generating of the CNF conversion cost data and the generating of the DNF conversion cost data in response to determining the query expression is already in either CNF form or DNF form. For example, steps 2586, 2588, and/or 2590 are not performed when the query expression is determined to be in either CNF form or DNF form already. The CNF conversion cost data and the DNF conversion cost data are generated in response to determining the query expression is not already in CNF form or DNF form, for example, where steps 2586, 2588, and/or 2590 are only performed when the query expression is determined to not already be in either CNF form or DNF form.

In various embodiments, facilitating execution of the query in accordance with the normalized query expression includes generating a query operator execution flow based on the normal query expression and further includes performing a plurality of operator executions of a plurality of operators of the query operator execution flow.

In various embodiments, the CNF conversion is selected in the conversion selection data. The normalized query expression is generated by performing the CNF conversion upon the query expression based on the CNF conversion being selected in the conversion selection data. The method further includes determining a second query expression indicating a second query for execution; generating a second operator tree based on a nested ordering of a second plurality of operators indicated by the second query expression; generating second CNF conversion cost data based on the second operator tree; generating second DNF conversion cost data based on the second operator tree; generating second conversion selection data, based on the second CNF conversion cost data and the second DNF conversion cost data, that indicates a selection to perform upon a DNF conversion upon the second query expression; generating a second normalized query expression by performing the DNF conversion upon the second query expression based on the second conversion selection data; and/or facilitating execution of the second query in accordance with the second normalized query expression.

In various embodiments, facilitating execution of the query includes performing a first plurality of operator executions of a first plurality of operators in accordance with a CNF query operator execution flow generated for the query based on the query expression undergoing a CNF conversion. Performance of the first plurality of operator executions spans a first temporal period, for example, from a time of the first one of the plurality of operator executions to time of the last one of the plurality of operator executions. Facilitating execution of the second query includes performing a second plurality of operator executions of a second plurality of operators in accordance with a DNF query operator execution flow generated for the second query based on the query expression undergoing a CNF conversion. Performance of the second plurality of operator executions spans a second temporal period, for example, from a time that the first one of the second plurality of operator executions is performed to time that the last one of the second plurality of operator executions is performed.

The first temporal period can have a non-null overlap with the second temporal period. For example, the query and the second query can be concurrently executed by the operator processing module 2435 based on selecting operators from a plurality of operator execution flows for execution in each of a plurality of operator execution steps, as discussed in greater detail in conjunction with FIG. 29A. In each operator execution step, one of a plurality of queries that includes the query and second query is selected to undergo an operator execution of one of its operators. The plurality of queries can be selected over a sequential set of the plurality of operator execution steps, for example, in accordance with a turn-based ordering of the plurality of queries.

In various embodiments, a non-transitory computer readable storage medium includes at least one memory section that stores operational instructions that, when executed by a processing module that includes a processor and a memory, cause the processing module to determine a query expression indicating a query for execution. An operator tree is generated based on a nested ordering of a plurality of operators indicated by the query expression. Conjunctive normal form (CNF) conversion cost data is generated based on the operator tree, and disjunctive normal form (DNF) conversion cost data is also generated based on the operator tree. Conversion selection data is generated based on the CNF conversion cost data and the DNF conversion cost data. The conversion selection data indicates a selection to perform either a CNF conversion or a DNF conversion. A normalized query expression is generated by performing either the CNF conversion or the DNF conversion upon the query expression, based on the which one of these two conversions are selected in the conversion selection data. Execution of the query is facilitated in accordance with the normalized query expression.

Figure 26A:
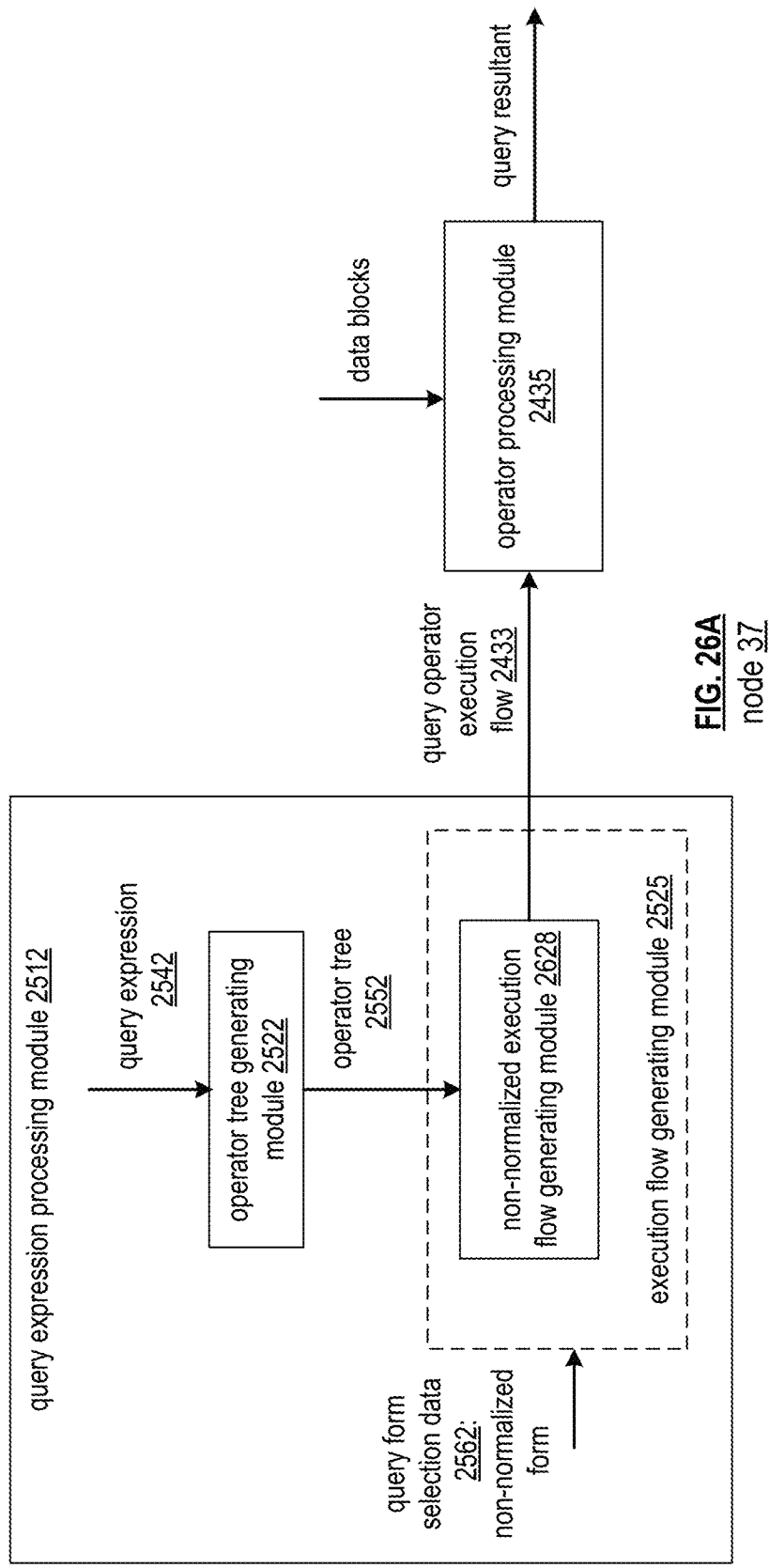
FIG. 26A is a schematic block diagrams of a node that implements a query expression processing module and an operator processing module in accordance with various embodiments of the present invention.
Figure 26B:
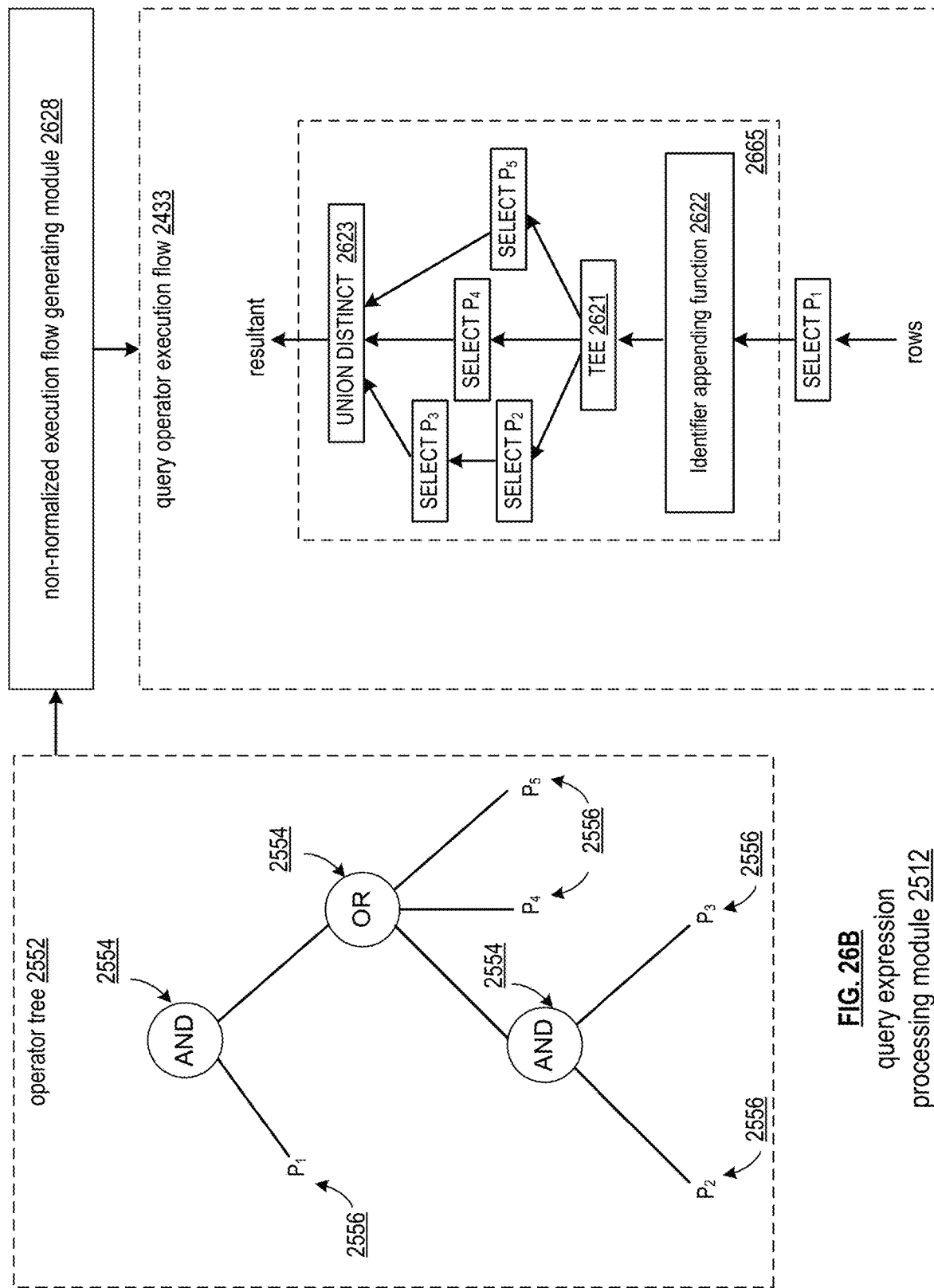
FIG. 26B is a schematic block diagram of a query expression processing module in accordance with various embodiments of the present invention.
Figure 26C:
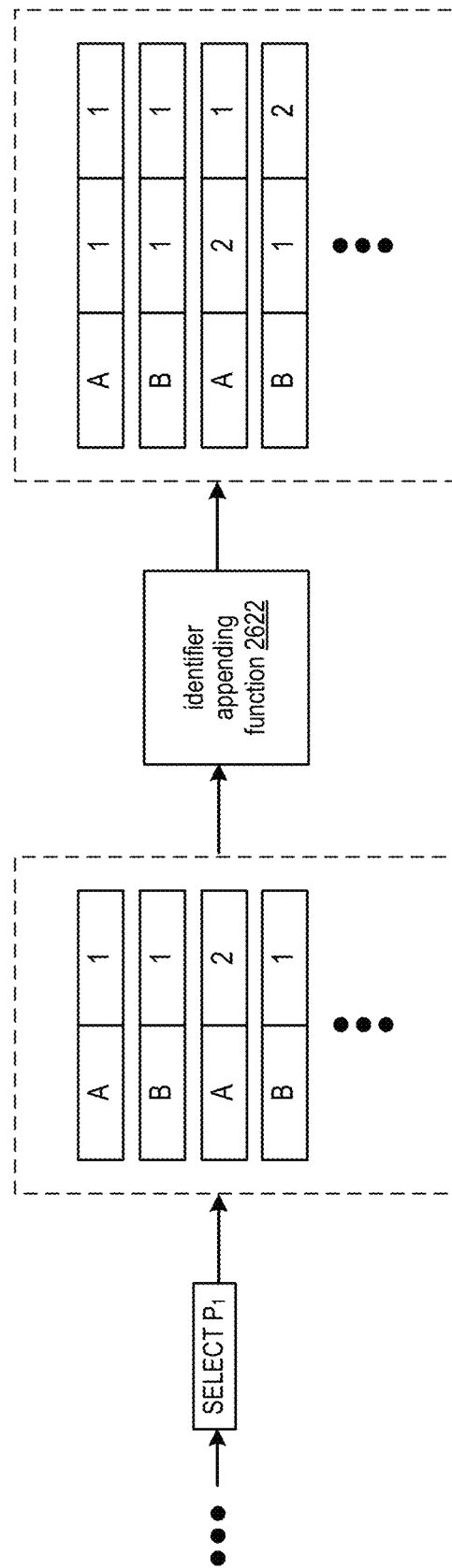
FIG. 26C illustrates an example of utilizing an identifier appending function upon an example set of rows in accordance with various embodiments of the present invention.

FIGS. 26A-26C illustrates another embodiment of the query expression processing module 2512. The query expression processing module 2512 of FIGS. 26A-26C can be implemented instead of or in addition to the query expression processing module 2512 of FIGS. 25A-25D. The query expression processing module 2512 of FIGS. 26A-26C can be implemented via any one or more processing modules of the database system 10, as discussed in conjunction with the embodiments of query expression processing module 2512 of FIGS. 25A-25D.

The query expression processing module 2512 of FIGS. 26A-26C is operable to implement the same or different execution flow generating module 2525 as illustrated in FIG. 26A. In particular, the execution flow generating module 2525 can be implemented by utilizing a non-normalized execution flow generating module 2628 that generates query operator execution flows 2433 for given queries that are not in accordance with CNF form or DNF form and/or are otherwise not necessarily in accordance with a normalized form. In particular, the non-normalized execution flow generating module 2628 is operable to generate a query operator execution flow 2433 based on the form of the determined query expression 2542, even if this given query expression 2542 is in CNF form or DNF form. The resulting query operator execution flow 2433 can reflect the nested ordering of the plurality of operators of the given query expression 2542 prior to any conversion into CNF form or DNF form, even if the given query expression is not in accordance with CNF form or DNF form. For example, the non-normalized query operator execution flow 2433 can be generated based on the operator tree 2552 generated for the determined query expression 2542 and reflecting the nested ordering of the plurality of operators of the query expression 2542. Alternatively, the query expression 2542 itself can be processed to generate the query operator execution flow 2433 in accordance with the non-normalized form, for example, where an operator tree 2552 is not generated and/or not utilized to generate the query operator execution flow 2433. Such embodiments of the query expression processing module 2512 presents improvements to database systems by enabling queries to be executed in their original expressed form without necessitating a costly conversion process to convert the query into a normalized form and/or without necessitating a more complicated and/or costly execution of the query in accordance with the normalized form.

The execution flow generating module 2525 can determine implement the non-normalized execution flow generating module 2628 to generate query operator execution flow 2433 for a given query expression based on query form selection data 2562 indicating to execute the query in non-normalized form. In some cases as discussed in further detail in conjunction with FIGS. 27A, a query form selection module 2524 of the query expression processing module 2512 can select from a plurality of query form options that includes a non-normalized form option, and the non-normalized execution flow generating module 2628 is implemented to generate query operator execution flow only when the query form selection data 2562 indicates the selection to execute the query in non-normalized form. The indication to execute the query in accordance with the non-normalized form can be otherwise received and/or determined by the query expression processing module 2512. In other embodiments, the non-normalized execution flow generating module 2628 is utilized to generate non-normalized query operator execution flows 2433 for every incoming query. In some cases, the query operator execution flow 2433 generated for a given query is in accordance with a normalized form such as either CNF form or DNF form, for example, based on the original query expression 2542 being already expressed in either CNF form or DNF form without any conversion.

Generating a normalized query operator execution flow in accordance with either CNF form or DNF form includes adhering to particular rules that guarantees that execution of the corresponding query via the normalized query operator execution flow will yield a correct resultant. This includes ensuring that the resultant does not include duplicated rows and/or aggregation values that were generated based on output of another operator that included duplicated rows. Generating the non-normalized query operator execution flow 2433 similarly requires ensuring that the corresponding query is guaranteed to execute correctly, producing the same resultant as would be produced if the query operator execution flow 2433 was in accordance with a normalized form.

Consider a query operator execution flow 2433 utilized by an operator processing module 2435 of a node 37 in accordance with the node's execution of a corresponding query. The operator processing module 2435 can process data blocks in accordance with an "upward" flow of data via the query operator execution flow 2433, where flow of data blocks is propagated "upwards" in accordance with an ordering of operators in the query operator execution flow 2433 from the bottom of the query operator execution flow 2433 to the top of the query operator execution flow 2433. The bottom of the query operator execution flow 2433 can correspond to reads of and/or access to data blocks corresponding to the domain of the query, such as input data blocks received from another node at the IO level 2416 of the query execution plan and/or input data blocks that otherwise include rows extracted from stored segments of the database system. The top of the query operator execution plan can correspond to the resultant outputted by the query, such as a plurality of resultant data blocks.

In embodiments where this node 37 is included in an inner level 2414 of the query execution plan 2405, and where the query execution plan 2405 includes exactly one inner level 2414, the query operator execution flow 2433 utilized by this node's operator processing module 2435 to facilitate the node's execution of the corresponding query can correspond to the entirety of the plurality of operators of the corresponding query expression 2542. In particular, when the query operator execution flow 2433 is generated by the non-normalized execution flow generating module 2628, this query operator execution flow 2433 can further correspond to and/or reflect the original nested ordering of the plurality of operators of the corresponding query expression 2542.

FIG. 26B illustrates a particular example of a query operator execution flow generated by a non-normalized execution flow generating module 2628 for an example operator tree 2552 for a query expression with a nested ordering of a plurality of operators that is in neither CNF nor DNF form. Generating the query operator execution flow can include building the query operator execution flow recursively from the operator tree, for example, via a depth-first approach. In particular, individual sub-flows of the query operator execution flow can be generated based on corresponding operator nodes. For example, simple predicates of the leaf nodes 2556 can correspond to select operators or filtering operators of the query operator execution flow. As the depth-first approach propagates up the operator tree, a set of distinct sub-flows already generated for child operator nodes of a particular operator node of the tree can be combined, based on the type of the particular operator node, to generate a single sub-flow that includes and/or is based on the set of distinct sub-flows.

Each of a set of sub-portions for each of a set of child operator nodes of an AND operator node can be placed in series in the query operator execution flow, where data blocks are processed by each sub-flow one at a time in accordance with a serial ordering, and where output of each sub-flow is utilized as input to a next sub-flow in the serial ordering, enabling the upward propagation of data blocks. Each of a set of sub-flows for each of a set of child operator nodes of an OR operator node can be placed in parallel in the query operator execution flow, where each sub-flow can be executed concurrently and/or where their output is not utilized as input to other sub-flows that are children of the OR operator node.

In a non-normalized query operator execution flow, the bottom of a sub-flow generated for an OR operator node in a corresponding operator tree can include a TEE operator that allows all incoming data blocks to be duplicated and/or otherwise branched as input data blocks to each of the set of sub-flows corresponding to the child nodes of the OR operator node in the operator tree 2552. This enables each parallelized sub-flow to process all incoming data separately. The top of a sub-flow generated for an OR node can include a UNION operator that performs a union upon all data blocks outputted by each of the OR's parallelized sub-flows via operators of one or more serialized sub-flows contained within each parallelized sub-flow. Correct query output is guaranteed despite this UNION operator in non-normalized query execution flows, as additional filtering parameters are included in each parallelized sub-flow in generation of non-normalized query execution flows to guarantee no two parallel sub-flows are capable of including the same row of their output. For example, an OR of two simple predicates $P_1$ and $P_2$ can be reflected in a CNF query operator execution flow via three parallelized branches: one branch performs $P_1$ AND $P_2$ via a serialized selection of $P_1$ from the input, and then a selection of $P_2$ from the output of the selection of $P_1$; a second branch performs $P_1$ AND $!P_2$, where "!" denotes the negation operation, via a serialized selection of $P_1$ from the input, and then a selection of $!P_2$ from the output of the selection of $P_1$; and a second branch performs $!P_1$ AND $P_2$, via a serialized selection of $!P_1$ from the input, and then a selection of $P_2$ from the output of the selection of $!P_1$. However, such mechanisms can rely on the structure of query expressions, such as the inclusion of only simple predicates as children of OR operator nodes in the operator tree, to yield this correct output, requiring that the query expression be converted into the corresponding normalized form.

To similarly guarantee query correctness without converting the query into a normalized form such as CNF or DNF form, the non-normalized execution flow generating module 2628 can employ a different mechanism in generating the query operator execution flow 2433. In particular, consider a sub-flow 2665 of the query operator execution flow 2433 that is generated based on the OR operator node of the example operator tree 2552 in FIG. 26B. This sub-flow includes a TEE OPERATOR 2621 branching to three sub-flows generated for each of the OR operator node's three child nodes in the operator tree 2552, in a similar fashion as a TEE included for OR operator nodes of non-normalized query expressions. However, prior to the TEE in the query operator execution flow, an identifier appending function 2622 is serially included. This identifier appending function 2622, when executed on individual row included in incoming data blocks to the sub-flow 2665, is operable to append and/or label each individual row with an identifier, for example, by appending an additional column to each incoming row that includes an identifier determined for the row that, alone or in conjunction with other values of other columns of the incoming row, uniquely identifies the row and/or otherwise distinguishes the row from other incoming rows. These rows with the appended identifiers are generated as output of the identifier appending function 2622, and are thus utilized as input to the TEE OPERATOR 2621.

Once each parallel sub-flow corresponding to the children of this OR operator node processes its incoming data blocks received from TEE OPERATOR 2621, the outputted data blocks can be utilized as input to a UNION DISTINCT operator 2623. This UNION DISTINCT operator is included in OR operator node's corresponding sub-flow 2665 rather than a normal UNION operator. The UNION DISTINCT operator can implement the logical definition of a union distinct operation, and can thus be operable to remove all duplicate rows received as input. The UNION DISTINCT operator can be implemented in a same or similar fashion as a distinct operator.

While removing duplicate rows could render the query incorrect if multiple rows with duplicate data were included in the input data blocks of sub-flow 2665, the appended identifier distinguishes these duplicate rows that must be included in the output of the sub-flow 2665 for query correctness. Thus, the combination of the identifier appending function 2622 and the UNION DISTINCT operator 2623 ensures that all identical rows originally present the incoming data blocks to sub-flow 2665 are distinguishable and therefore preserved by UNION DISTINCT operator 2623. The combination of the identifier appending function 2622 and the UNION DISTINCT operator 2623 further ensures that all identical rows that are present due to being outputted by multiple parallel branches of the TEE OPERATOR 2621 and that were not originally included incoming data blocks to sub-flow 2665 are detected as duplicates based on having identical row values, including the identical appended identifier, and are therefore removed by UNION DISTINCT operator 2623. This mechanism of guaranteeing both preservation of identical rows of the database system as well as removal of duplicated rows in output of the multiple parallel branches of the TEE OPERATOR 2621 guarantees query correctness with regards to the OR operator, and enables queries to be processed correctly in the non-normalized form.

In embodiments where the query expression includes multiple OR operators, multiple corresponding OR operator sub-flows 2665 can be generated in this fashion. For example, all sub-flows generated for OR operators can include the identifier appending function 2622 prior to TEE OPERATOR 2621, and can include the UNION DISTINCT rather than a UNION. In some embodiments, only one, outermost OR operator of a plurality of nested OR operators in the operator tree 2552 has a corresponding OR operator sub-flow 2665 with the identifier appending function 2622 and the UNION DISTINCT. In some embodiments, nested OR operators included in one or more of the parallel sub-flows of this OR operator, based on branching from the outermost operator at least one node down the operator tree 2552 as a descendent node of the OR operator, need not include their own identifier appending function 2622 and the UNION DISTINCT in their corresponding sub-flow that is nested within the outermost OR operator's sub-flow 2622, as all duplicates will be eventually removed by the UNION DISTINCT of the outermost OR. In such embodiments, these nested OR operators will be generated to have corresponding sub-flows with a UNION operator rather than a UNION DISTINCT operator, no identifier appending function 2622 is included.

In some embodiments, serial OR operators, such as a plurality of outermost OR operators adjoined in series as children or descendants of an AND operator or other operator in the operator tree, can each include their own identifier appending function 2622 prior to TEE OPERATOR 2621, and can include the UNION DISTINCT rather than a UNION. This can be favorable, as the additional memory and/or processing resources required to maintain the appended identifier of each row and/or to maintain propagation of a plurality of unnecessary duplicates in serial flow of the query operator execution plan can be unnecessarily costly and can be reduced by removing all duplicates for each serial application of an OR statement upon the data.

Alternatively, for a plurality of serial OR operators, a plurality of serialized corresponding OR operator sub-flows 2665 are generated, where only the bottom-most OR operator sub-flow 2665 in the query operator execution flow 2433 includes the identifier appending function 2622 prior to TEE OPERATOR 2621, and where this bottom-most OR operator sub-flow 2665 includes a UNION rather than a UNION DISTINCT. This bottom-most OR operator can be flagged, for example, via the recursive process employed to generate the query operator execution flow 2433 from the operator tree, and/or the identifier appending function 2622 can otherwise be included in the OR operator sub-flow 2665 that is determined to be the bottom-most one of a plurality of OR operator sub-flows. Alternatively, the bottom-most TEE operator of a plurality of TEE operators in the query operator execution flow 2433 can be identified and/or flagged in the recursive process, and the query operator execution flow can be updated after being fully generated to insert the identifier appending function 2622 prior to this bottom-most TEE operator. In some embodiments, one or more other OR operator sub-flows 2665 for one or more serial ORs are generated to not include the identifier appending function 2622, where the non-normalized query operator execution flow 2433 includes no more than one identifier appending function 2622, regardless of how many OR operators are present in the query expression.

In some cases, for the plurality of serialized corresponding OR operator sub-flows 2665, only the top-most OR operator sub-flow 2665 in the query operator execution flow 2433 is generated to include the UNION DISTINCT operator 2623 rather than a UNION operator, where all other OR operator sub-flows 2665 include the UNION rather than the UNION DISTINCT. In some embodiments, the non-normalized query operator execution flow 2433 can therefore include no more than one UNION DISTINCT operator 2623, regardless of how many OR operators are present in the query expression. In such embodiments, the top-most OR can be flagged and/or identified in the recursive process and/or can be identified in the resulting query operator execution flow 2433, for example, where only the top-most UNION identified in the query operator execution flow 2433 is converted to a UNION DISTINCT to generate the final query operator execution flow 2433 for the non-normalized query expression, for example, in conjunction with inserting the one identifier appending function 2622 only before the bottom-most TEE in the query operator execution flow 2433.

In some embodiments, the non-normalized execution flow generating module 2628 can determine whether or not to include UNION DISTINCTS and identifier appending function 2622 in other OR operator sub-flows 2665. This determination can be based on the expected number and/or proportion of unique rows to the corresponding TEE, which can be determined based on tracking of historical information and/or based on known distribution of values of the data, for example, as discussed in conjunction with FIGS. 31A-31B. This determination can be based on applying a cost comparison of performing a union distinct versus a normal union, for example, based on tracked performance metrics for utilization of union distinct versus a normal union for additional nested and/or serial OR operator sub-flows 2665 historically.

In some embodiments, the non-normalized execution flow generating module is operable to generate an updated, negation-free operator tree by propagating all negation operators in the operator tree to the leaf nodes, where some or all of the leaf node simple predicates are negated as a result. Propagation of a negation operators can include applying De Morgan's law to child nodes of the negation operator in the operator tree 2552 to reflect an equivalent logical expression. For example, when a negation node of the operator tree has an AND node as a child, the AND node can be converted into an OR node, where the children of prior AND node are negated as children of the OR node. Similarly, when a negation node of the operator tree has an OR node as a child, the OR node can be converted into an AND node, where the children of prior OR node are then negated as children of the new AND node. These negations can be further propagated as necessary until all negations are at the leaf node level of the operator tree. The non-normalized query operator execution flow can then be generated without any negation operators, where instead the SELECT operators reflect the negated simple predicate for the leaf node-level negations of the updated operator tree.

In some embodiments, the TEE OPERATOR 2621 and/or the UNION DISTINCT operator 2623 can be implemented as custom operators, for example, that are not otherwise implemented via a corresponding existing query language and/or that are not standard to an existing database system. For example, query expressions are written and/or executed in accordance with a query language, and the TEE OPERATOR 2621 and/or the UNION DISTINCT operator 2623 are custom-implemented to enable the functionality described herein, despite not being built-in operators for traditional use in SQL queries.

FIG. 26C illustrates an example embodiment of the identifier appending function 2622. In this example, the identifier appending function 2622 is operable to append a column containing a value indicating the of the count of other incoming rows thus far that are identical to the given row. This value can be incremented for a set of identical columns as each new row with exactly the set of identical columns is processed.

In the particular example presented in FIG. 26C, the incoming rows include two columns. The identifier appending function 2622 appends a third column to each row indicating the current count of received rows that include the exact set of values in the first two rows. The counter begins at one in this example, where rows appended with the value of one denotes the set of values of the set of all previous columns in the row correspond to the first instance of the set of the set of values for the set of all previous columns for incoming rows received thus far. A first instance of a row that includes the value 'B' in the first column and the value '1' in the second column is thus appended with a column indicating the value '1'. However, a second instance of a row that includes the value 'B' in the first column and the value '1' in the second column is appended with a column indicating the value '2', indicating this is the second instance of a row with these two values in its two columns.

The identifier appending function 2622 of FIG. 26C can be implemented by utilizing a window function, such as the SQL WINDOW function. In particular, the ROW NUMBER function can be performed over a window function that includes a PARTITION BY and/or ORDER BY function to achieve these results. The identifier appending function 2622 of FIG. 26C can otherwise be operable to increment a counter for each particular set of values in response to each particular set of values being processed. In other embodiments, the identifier appending function 2622 instead increments another counter, for example, where every identifier itself is unique across all incoming rows. This can include assigning a unique identifier appended to each row, where each unique identifier is different from all other unique identifiers appended to all other rows, or is different from all other unique identifiers appended to all other rows with a sufficiently high probability. In some embodiments, such a unique identifier can be alternatively appended to the rows in storage, for example, when the rows are received for storage and/or are processed for storage. In such cases, the same unique identifier is utilized for a given row in every query operator execution flow. In these embodiments, the identifier appending function 2622 is not included in query operator execution flow, as the unique identifier has already been appended and/or otherwise assigned to the row.

Figure 26D:
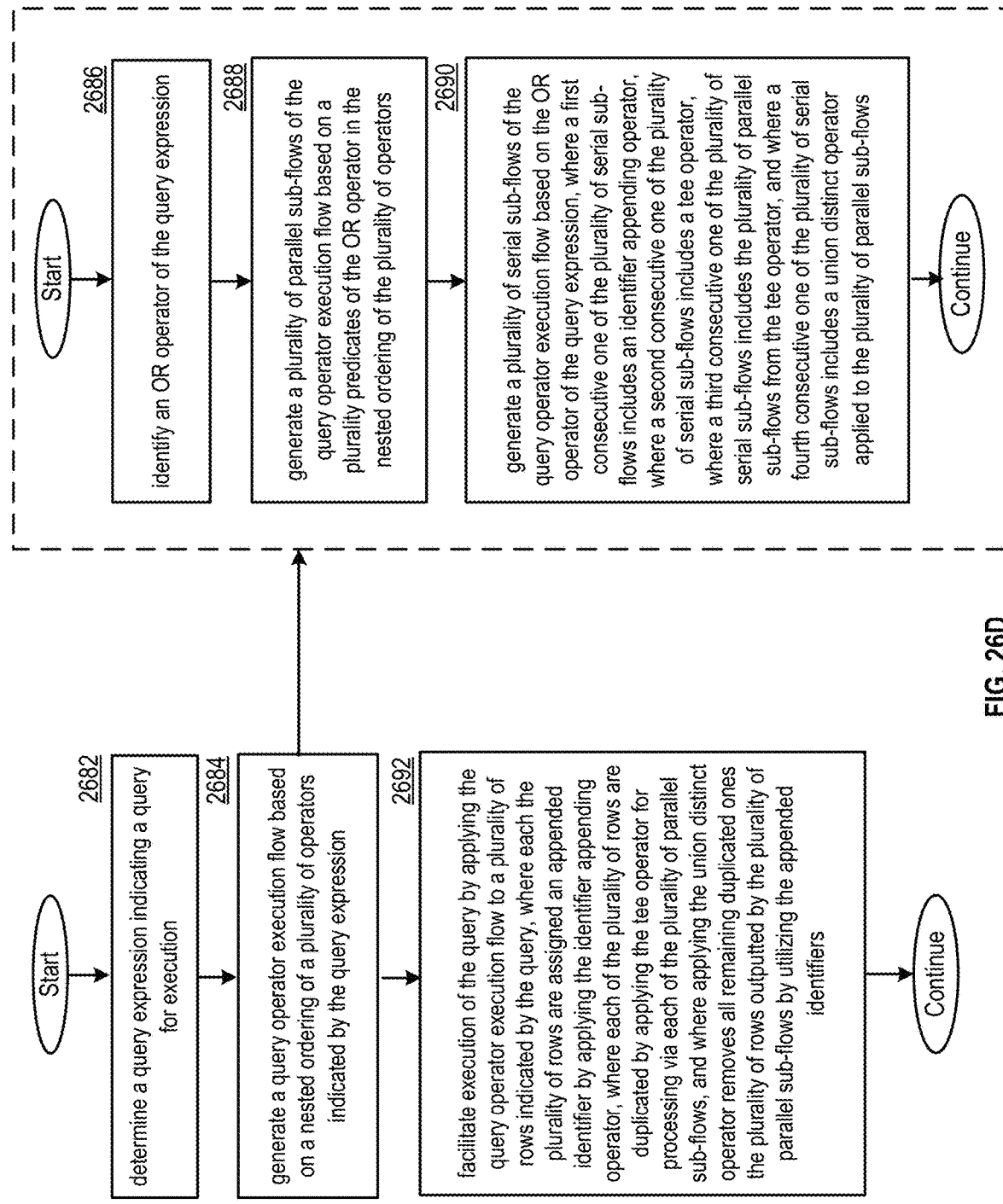
FIG. 26D is a logic diagram illustrating a method of executing a query in accordance with a non-normalized form in accordance with various embodiments of the present invention.

FIG. 26D illustrates a method for execution by a node 37. For example, the node can utilize at least one processing module of the node 37 to execute operational instructions stored in memory accessible by the node, where the execution of the operational instructions causes the node 37 to execute the steps of FIG. 26D. Different nodes 37 of the same or different computing device 18 can independently execute the method of FIG. 26D concurrently, for example, based on different query expressions for different queries assigned to the different nodes. In some cases, the method of FIG. 26D is performed by a particular processing core resource 48 of a node 37, where different processing core resources 48 of the same node can independently execute the method of FIG. 26D concurrently, for example, on different query expressions for different queries assigned to the different processing core resources 48. The method of FIG. 26D can be performed by a node 37 in accordance with embodiments of node 37 discussed in conjunction with FIGS. 26A-26C, and/or in conjunction with other embodiments of node 37 discussed herein. Some or all of the method of FIG. 26D can be performed by another processing module of the database system 10.

In particular, the method of FIG. 26D can be performed by a query expression processing module 2512 and/or an operator processing module 2435. For example, the query expression processing module 2512 and/or the operator processing module 2435 can include a processor and memory that includes executable instructions. The executable instructions, when executed by the processor, cause the query expression processing module 2512 and/or the operator processing module 2435 to execute some or all of the steps of FIG. 26D.

Step 2682 includes determining a query expression indicating a query for execution. Step 2684 includes generating a query operator execution flow based on a nested ordering of a plurality of operators indicated by the query expression. Generating the query operator execution flow of step 2684 can be accomplished via performance of the sub-method of FIG. 26D that includes steps 2686, 2688, and 2690. Step 2682 includes identifying an OR operator of the query expression. Step 2688 includes generating a plurality of parallel sub-flows of the query operator execution flow based on a plurality predicates of the OR operator in the nested ordering of the plurality of operators. Step 2690 includes generating a plurality of serial sub-flows of the query operator execution flow based on the OR operator of the query expression. A first consecutive one of the plurality of serial sub-flows includes an identifier appending operator, such as the identifier appending function 2622. A second consecutive one of the plurality of serial sub-flows includes a tee operator, such as TEE operator 2621. A third consecutive one of the plurality of serial sub-flows includes the plurality of parallel sub-flows from the tee operator. A fourth consecutive one of the plurality of serial sub-flows includes a union distinct operator, such as UNION DISTINCT operator 2623, applied to the plurality of parallel sub-flows. In various embodiments, the query operator execution flow generated in step 2684 is in neither CNF form nor DNF form.

Step 2692 can be performed once generating the query operator execution flow of step 2684 is complete, for example, based on steps 2686, 2688, and 2690 of the sub-method being performed to facilitate performance of step 2684. Step 2692 includes facilitating execution of the query by applying the query operator execution flow to a plurality of rows indicated by the query, for example as a plurality of input data blocks to the query operator execution flow. Each the plurality of rows is assigned an appended identifier by applying the identifier appending operator. Each of the plurality of rows are duplicated by applying the tee operator for processing by applying each of the plurality of parallel sub-flows. Applying the union distinct operator removes all remaining duplicated ones the plurality of rows outputted by the plurality of parallel sub-flows by utilizing the appended identifiers.

In various embodiments, at least two of the plurality of rows are identical. The at least two of the plurality of rows are assigned different appended identifiers, and none of the at least two of the plurality of rows are removed by applying the union distinct operator based on being assigned the different appended identifiers. In various embodiments, applying the identifier appending operator to each of the at least two of the plurality of rows includes incrementing a value of the appended identifier for each subsequently processed one of the at least two of the plurality of rows based on determining the subsequently processed one of the at least two of the plurality of rows is identical to at least one previously processed one of the at least two of the plurality of rows. In various embodiments, a set of different rows in the plurality of rows have a same appended identifier assigned by applying the identifier appending operator to each of the set of different rows, and none of the set of different rows are removed by applying the union distinct operator based on each of the set of different rows being distinct from all other ones of the set of different rows.

In various embodiments, generating the query operator execution flow includes generating an operator tree based on the ordering of a plurality of operators indicated by the query expression. The operator tree indicates the plurality of operators as a plurality of operator nodes of the operator tree. In various embodiments, generating the query operator execution flow includes identifying at least one negation operator in the operator tree, and further includes generating a modified operator tree by propagating the at least one negation operator to leaf nodes of the operator tree. In various embodiments, propagating the at least one negation operator to leaf nodes of the operator tree includes applying a plurality of propagations of each negation operator down the operator tree by at least one operator node of the operator tree. Applying each of the plurality of propagations at a corresponding operator node of the operator tree includes applying De Morgan's law to perform a conversion of the corresponding operator node. Performing the conversion of the corresponding node includes one of: converting the corresponding node from an AND operator to an OR operator; or converting the corresponding node from an OR operator to an AND operator.

Figure 27A:
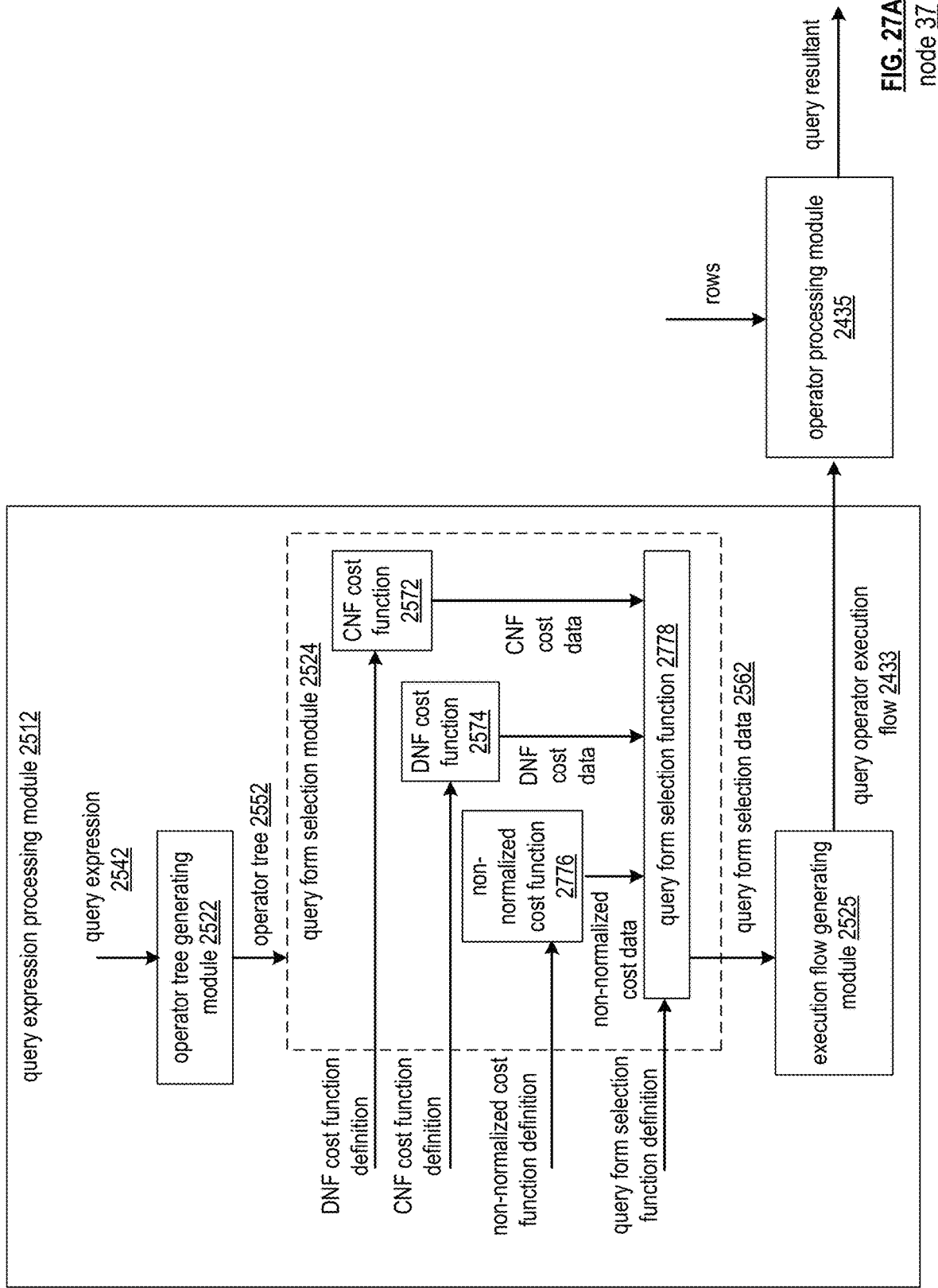
FIG. 27A is a schematic block diagrams of a node that implements a query expression processing module and an operator processing module in accordance with various embodiments of the present invention.

FIG. 27A illustrates an embodiment of the query expression processing module 2512 that is operable to generate query form selection data 2562 indicating a selection from CNF form, DNF form, and a non-normalized form, such as the non-normalized form discussed in conjunction with FIGS. 26A-26C. As discussed in conjunction with FIGS. 25A-25D, it can be favorable to elect between CNF form and DNF form for incoming queries, rather than performing a conversion to the same form for all queries. As discussed in FIG. 26A-26C, the non-normalized query execution flow can also be a favorable option. Some query expressions may be most efficiently processed when a non-normalized query execution flow is generated from the query expression and utilized for execution of the corresponding query, where the non-normalized query operation execution flow is more efficient than or otherwise favorable over a DNF query operation execution flow or a CNF query operation execution flow for the given query expression. However, some query expressions may be more efficiently processed when a CNF or DNF query operation execution flow is generated and executed. In particular, CNF form can be more favorable than both DNF form and non-normalized form for query expressions that are already in CNF form and/or are very similar to CNF form where only a minor conversion is required. Similarly, DNF form can be more favorable than both CNF form and non-normalized form for query expressions that are already in DNF form and/or are very similar to DNF form where only a minor conversion is required.

The embodiment presented in FIG. 27A enabling the form of the query operator execution flow that will be generated and utilized to execute incoming queries to be selected from three options: CNF form, DNF form, and a non-normalized form. This improves database systems by increasing efficiency of generating of the query operator execution flows based on the query expression and/or by increasing efficiency of query execution by ensuring that a favorable form of query operator execution flow is being executed for each given query.

As illustrated in FIG. 27A, an operator tree 2552 can be generated via the operator tree generating module 2522 from a query expression 2542. The query form selection module 2524 can generate CNF cost data, DNF cost data, and non-normalized cost data from the operator tree 2552 and/or the query expression 2542 itself. In particular, a CNF cost function 2572 can be performed upon the operator tree 2552 to generate CNF cost data; a DNF cost function 2574 can be performed upon the operator tree 2552 to generate DNF cost data; and a non-normalized cost function 2776 can be performed upon the operator tree 2552 to generate non-normalized cost data. The CNF cost function, DNF cost function, and/or non-normalized cost function can be performed in accordance with a corresponding CNF cost function definition, a corresponding DNF cost function definition, and/or a corresponding non-normalized cost function definition, respectively. The CNF cost function definition, the DNF cost function definition, and/or the non-normalized cost function definition can be received by the query expression processing module 2512, stored in memory accessible by the query expression processing module 2512, and/or can otherwise be determined by query expression processing module 2512.

The CNF cost function 2572 can be implemented to determine and/or estimate one or more costs, such as time cost, processing cost, memory cost, and/or other efficiency cost associated with converting the query expression to CNF form, generating the CNF query operator execution flow from the converted query expression, and/or executing the query in accordance with the CNF query operator execution flow. The DNF cost function 2574 can be implemented to determine and/or estimate one or more costs, such as time cost, processing cost, memory cost, and/or other efficiency cost associated with converting the query expression to DNF form, generating the DNF query operator execution flow from the converted query expression, and/or executing the query in accordance with the DNF query operator execution flow. While a non-normalized execution flow does not necessarily require conversion of the query expression, the non-normalized cost function 2776 can be implemented to determine and/or estimate one or more costs, such as time cost, processing cost, memory cost, and/or other efficiency cost associated generating the non-normalized query operator execution flow from the query expression and/or the operator tree, and/or executing the query in accordance with the non-normalized query operator execution flow.

The CNF cost function 2572, DNF cost function 2574, and/or non-normalized cost function 2776 can be based on the positioning of particular operator nodes, such as AND nodes and OR nodes, in the operator tree. This positioning can be utilized to determine whether resulting query operator execution flows in each form would have large numbers of parallelized sub-flows, whether generation of the resulting query operator execution flows would be complicated, and/or whether execution of the resulting query operator execution flows would be costly to execute. This information can dictate the corresponding costs associated with each of the three query forms.

In some embodiments, the CNF cost function 2572 and DNF cost function 2574 as discussed in conjunction with FIGS. 25C and 25D can be performed upon the operator tree to generate the CNF cost data and DNF cost data, respectively, of FIG. 27A. In some cases, this can include generating a final DNF processing cost based on multiplying a raw DNF processing cost by a DNF scaling factor and/or can include generating a final CNF processing cost based on multiplying a raw CNF processing cost by a CNF scaling factor, as discussed previously in conjunction with FIGS. 25A-25E. In some cases, a non-normalized scaling factor can be similarly utilized to generate a final non-normalized cost as a product of a raw non-normalized cost, for example, generated based on the operator tree, multiplied by the non-normalized scaling factor.

The non-normalized scaling factor can similarly be determined based on measuring a processing time and/or resources associated with generating non-normalized query operator execution flows for each of a same or different plurality of query expressions from which DNF query operator execution flows and/or CNF query operator execution flows are generated with their corresponding processing time and/or resources measured, as discussed previously discussed previously in conjunction with FIGS. 25A-25E. In particular, an average processing time and/or resources measured to generate a plurality of or CNF query operator execution flows from converted CNF expressions of the plurality of query expressions can be calculated and/or determined; an average processing time and/or resources measured to generate a plurality of DNF query operator execution flows from converted DNF expressions of the plurality of query expressions can be calculated or determined; and/or an average processing time and/or resources measured to generate a plurality of or non-normalized query operator execution flows from converted non-normalized expressions, and/or the original expression, of the plurality of query expression can be calculated and/or determined. The relative averages calculated for generation of this plurality of CNF query operator execution flows, this plurality of DNF query operator execution flows, and this plurality of non-normalized query operator execution flows, can be compared and/or utilized to generate the corresponding scaling factors. For example, the ratios between the CNF scaling factor, the DNF scaling factor, and/or the non-normalized scaling factor can be set equal to and/or selected based on the corresponding ratios between the average processing time and/or resources calculated for generation of the plurality of CNF query operator execution flows, the plurality of DNF query operator execution flows, and the plurality of non-normalized query operator execution flows.

While the CNF cost function 2572 and DNF cost function 2574 of FIGS. 25C and 25D are related to cost of conversion and/or generating the resulting query operator execution flow, the corresponding cost data can also be correlated with and/or related to the ultimate processing cost, such as execution costs of executing the query in the corresponding form. In particular, an increasing complexity of conversion to CNF or DNF, indicated by higher corresponding CNF or DNF costs generated via the method of FIG. 25D, can be indicative of a more complicated query operator execution flow that would be generated from the conversion, which could me more inefficient in execution than a query operator execution flow resulting from a more simple conversion. For example, a complicated DNF conversion can result in a large number of parallelized sub-flows, which can require greater amounts of memory for execution and/or can be otherwise more inefficient than query operator execution flows with a smaller number of parallelized sub-flows. Alternatively, a different CNF cost function 2572 and DNF cost function 2574 can be performed to generate different the CNF cost data and DNF cost data, for example, where additional runtime considerations are utilized to generate the CNF cost data and DNF cost data.

In some embodiments, the non-normalized cost function can be based on the positioning of the single UNION DISTINCT operator 2623 and the corresponding identifier appending function 2622 in the non-normalized query operator execution flow. For example, the cost can be based on the duration of execution in which duplicates are required to be stored and processed. For example, non-normalized query operator execution flows with a greater number of operators between the UNION DISTINCT operator 2623 and the corresponding identifier appending function 2622 in the flow can have a greater cost than non-normalized query operator execution flows with a smaller number of operators between the UNION DISTINCT operator 2623 and the corresponding identifier appending function 2622 in the flow. As another example, non-normalized query operator execution flows with a smaller number of operators between the top of the flow and the UNION DISTINCT operator 2623 can have a greater cost than non-normalized query operator execution flows with a greater number of operators between the top of the flow and the UNION DISTINCT operator 2623. As another example, non-normalized query operator execution flows with a smaller number of operators between the bottom of the flow and the identifier appending function 2622 can have a greater cost than non-normalized query operator execution flows with a greater number of operators between the bottom of the flow and the identifier appending function 2622. As another example, non-normalized query operator execution flows with a UNION DISTINCT operator being processed over a higher number of parallelized sub-flows can have a greater cost than non-normalized query operator execution flows with the UNION DISTINCT operator being processed over a higher number of parallelized sub-flows.

In some embodiments, determining the positioning of the UNION DISTINCT operator 2623 and the corresponding identifier appending function 2622 is a function of the operator tree and/or is determinable based on the operator tree, where the non-normalized query operator execution flow itself need not be generated to compute the non-normalized cost. Alternatively, the non-normalized query operator execution flow can be first generated to determine the positioning of the operators in the flow, where the non-normalized cost function 2776 is performed upon, and/or utilizes the positioning of operators indicated by, the generated non-normalized query operator execution flow.

Once the CNF cost data, DNF cost data, and non-normalized cost data is generated for the given query expression 2542 based on the operator tree 2552, a query form selection function 2778 can be performed, for example, in accordance with a query form selection function definition that is received by the query expression processing module 2512; stored in memory accessible by the query expression processing module 2512, and/or otherwise determined by the query expression processing module 2512. The query form selection function 2778 can include selecting the one of the three query forms with the most favorable cost data, for example, indicating the corresponding query form is the most efficient query form for processing the given query.

In some embodiments, it can be favorable to utilize a CNF query operator execution flow 2433, even when a cost value of the CNF cost data is not the most favorable. In particular, generation and/or utilization of a query operator execution flow in CNF form can be generally less complicated than other forms. In such cases, CNF form can be automatically selected, regardless of the DNF cost data or non-normalized cost data, when the CNF cost data compares favorably to a predetermined CNF cost threshold. For example, if the value of the CNF cost generated in accordance with the example of FIG. 25D is less than or equal to, or otherwise compares favorably to, a predetermined maximum CNF cost value, CNF form is automatically selected. This automatic selection of CNF form can occur even if the value of the DNF cost generated in accordance with the example of FIG. 25D is less than or otherwise more favorable than the value of the CNF cost, and/or if the value of a non-normalized cost indicated in the non-normalized cost data is less than or otherwise more favorable than the value of the CNF cost.

If the CNF cost data compares unfavorably to the predetermined CNF cost threshold the query form selection function can then evaluate the DNF cost and non-normalized cost, and can select the form from CNF form, DNF form, and non-normalized form based on the CNF cost, DNF cost, and non-normalized cost. For example, if the CNF cost data compares unfavorably to the predetermined CNF cost threshold, the query form with the most favorable cost data, such as the query form with lowest corresponding cost across all three query forms, can be selected in generating the query form selection data 2562.

In some cases, the CNF cost data is generated first via the CNF cost function 2572, and the CNF cost data is compared to the predetermined CNF cost threshold. If the CNF cost data compares favorably to the predetermined CNF cost threshold, the DNF cost function and/or the non-normalized cost function are not performed, where DNF cost data and non-normalized cost data is not generated, and CNF form is automatically selected in generating the query form selection data. If the CNF cost data compares unfavorably to the predetermined CNF cost threshold, the DNF cost function and/or the non-normalized cost function are then performed, and the final query form is selected from CNF form, DNF form, and non-normalized form based on the generated CNF cost data, DNF cost data, and non-normalized cost data.

In some embodiments, other considerations can be utilized to determine whether to remove any of the options from consideration. In particular, because DNF conversion and corresponding query operator execution flow can be especially costly, DNF form can be automatically removed as an option for consideration when the DNF cost compares unfavorably to a predetermined DNF cost threshold. For example, if the value of the DNF cost generated in accordance with the example of FIG. 25D is greater than or equal to, or otherwise compares unfavorably to, a predetermined maximum DNF cost value, DNF form is automatically not selected and/or is removed from the set of options for selection. In this case, either CNF form or non-normalized form will be selected, for example, where the query form with the more favorable cost data is selected and/or where CNF form is automatically selected based on the CNF cost data comparing favorably to the predetermined CNF cost threshold. When the DNF cost compares favorably to the predetermined DNF cost threshold, the selection can be performed across all three query forms, for example if the CNF cost data was already determined to compare unfavorably to the predetermined CNF cost threshold. In particular, when the CNF cost data is determined to compare unfavorably to the predetermined CNF cost threshold, and when the DNF cost is determined to compares favorably to the predetermined DNF cost threshold, the query form can be selected from CNF form, DNF form, and non-normalized form, for example, where the one of these three query forms with the most favorable cost data is selected.

In some embodiments of performing the query form selection function 2778 by the query form selection module 2524, the non-normalized form is not considered, and the form is selected from CNF and DNF form only, for example based on their respective costs. For example, the selection from either CNF form or DNF form can be instead determined via performing the query form selection function 2578 discussed in conjunction with FIG. 25C. In some cases, the query form selection module 2524 can additionally determine, for some or all incoming query expressions, whether to generate the non-normalized cost data via performance of the non-normalized cost function 2776 and/or whether the non-normalized form should be considered as an option. The selection is made from CNF and DNF form only when the non-normalized cost data is determined not to be generated for a given query expression and/or when the non-normalized cost data is otherwise determined not to be considered for a given query expression. Similarly non-normalized cost data is generated and/or considered only when data is determined to be generated for a given query expression and/or when the non-normalized cost data is otherwise determined to be considered for a given query expression. In particular, the query expression processing module 2512 can dictate whether the non-normalized form is considered as an option by the query form selection module based on the query expression, based on the CNF and DNF costs generated for the query expression, and/or based on another determination.

Figure 27B:
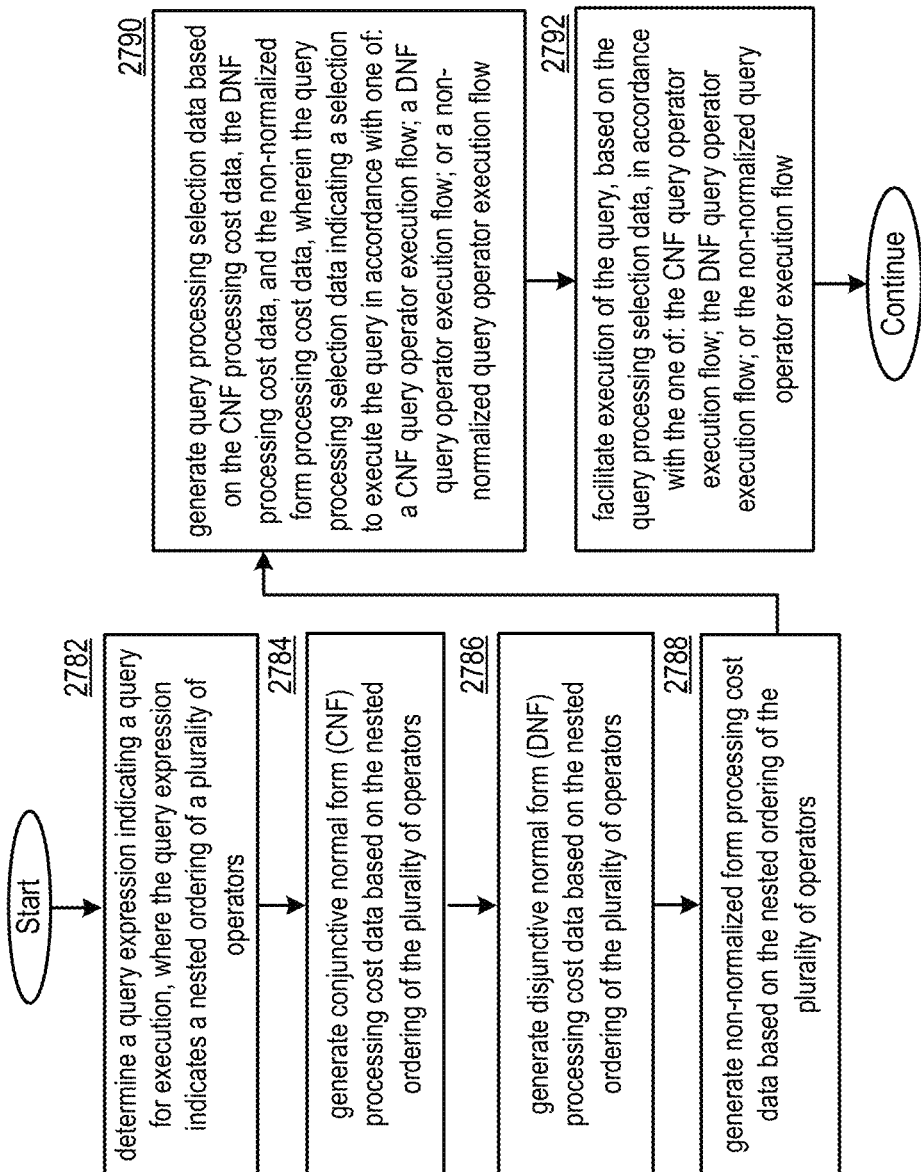
FIG. 27B is a logic diagram illustrating a method of selecting a normalized or non-normalized form for execution of a query in accordance with various embodiments of the present invention.

FIG. 27B illustrates a method for execution by a node 37. For example, the node can utilize at least one processing module of the node 37 to execute operational instructions stored in memory accessible by the node, where the execution of the operational instructions causes the node 37 to execute the steps of FIG. 27B. Different nodes 37 of the same or different computing device 18 can independently execute the method of FIG. 27B concurrently, for example, based on different query expressions for different queries assigned to the different nodes. In some cases, the method of FIG. 27B is performed by a particular processing core resource 48 of a node 37, where different processing core resources 48 of the same node can independently execute the method of FIG. 27B concurrently, for example, on different query expressions for different queries assigned to the different processing core resources 48. The method of FIG. 27B can be performed by a node 37 in accordance with embodiments of node 37 discussed in conjunction with FIGS. 27A, and/or in conjunction with other embodiments of node 37 discussed herein. Some or all of the method of FIG. 27B can be performed by another processing module of the database system 10.

In particular, the method of FIG. 27B can be performed by a query expression processing module 2512 and/or an operator processing module 2435. For example, the query expression processing module 2512 and/or the operator processing module 2435 can include a processor and memory that includes executable instructions. The executable instructions, when executed by the processor, cause the query expression processing module 2512 and/or the operator processing module 2435 to execute some or all of the steps of FIG. 27B.

Step 2782 includes determining a query expression indicating a query for execution, where the query expression indicates a nested ordering of a plurality of operators. Step 2784 includes generating conjunctive normal form (CNF) processing cost data based on the nested ordering of the plurality of operators. Step 2786 includes generating disjunctive normal form (DNF) processing cost data based on the nested ordering of the plurality of operators. Step 2788 includes generating non-normalized form processing cost data based on the nested ordering of the plurality of operators. Step 2790 includes generating query processing selection data based on the CNF processing cost data, the DNF processing cost data, and the non-normalized form processing cost data. The query processing selection data indicating a selection to execute the query in accordance with a CNF query operator execution flow; a DNF query operator execution flow; or a non-normalized query operator execution flow. Step 2792 includes facilitating execution of the query, based on the query processing selection data, in accordance with the selected one of: the CNF query operator execution flow; the DNF query operator execution flow; or the non-normalized query operator execution flow.

In various embodiments, the method further includes generating the CNF query operator execution flow by performing a CNF conversion upon the query expression when the query processing selection data indicates selection of the CNF query operator execution flow. In various embodiments, the method further includes generating the DNF query operator execution flow by performing a DNF conversion upon the query expression when the query processing selection data indicates selection of the DNF query operator execution flow. In various embodiments, the method further includes generating the non-normalized query operator execution flow that preserves the nested ordering of the plurality of operators when the query processing selection data indicates selection of the non-normalized query operator execution flow.

In various embodiments, the CNF processing cost data is based on a calculated CNF conversion cost, and the DNF processing cost data is based on a calculated DNF conversion cost. For example, the calculated CNF conversion cost and the calculated DNF conversion cost are generated as discussed in conjunction with FIGS. 25A-25E. In various embodiments, generating the query processing selection data includes comparing the CNF processing data to a predetermined CNF processing cost threshold. In various embodiments, the CNF processing data is automatically selected when the CNF processing data compares favorably to the predetermined CNF processing cost threshold. In various embodiments generating the query processing selection data further includes, when the CNF processing data compares unfavorably to the predetermined CNF processing cost threshold, identifying the most favorable processing cost by identifying one of: the CNF processing cost data, the DNF processing cost data, or the non-normalized form processing cost data, for example with a lowest or otherwise most favorable cost value. Selecting to execute the query in accordance with the one of: the CNF query operator execution flow; the DNF query operator execution flow; or the non-normalized query operator execution flow is based on selecting the query operator execution flow corresponding to the most favorable processing cost.

In various embodiments, generating the query processing selection data includes comparing the DNF processing data to a predetermined DNF processing cost threshold. The method further includes, when the DNF processing data compares unfavorably to the DNF processing cost threshold, selecting to execute the query in accordance with either the CNF query operator execution flow or the non-normalized query operator execution flow, based on whether the CNF processing cost data or the non-normalized processing cost data has a corresponding most favorable processing cost. The method further includes, when the DNF processing data compares favorably to the DNF processing cost threshold, selecting to execute the query in accordance with the CNF query operator execution flow, the DNF query operator execution flow, or the non-normalized query operator execution flow, based on whether the CNF processing cost data, the DNF processing cost data, or the non-normalized processing cost data has a corresponding most favorable processing cost.

Figure 28A:
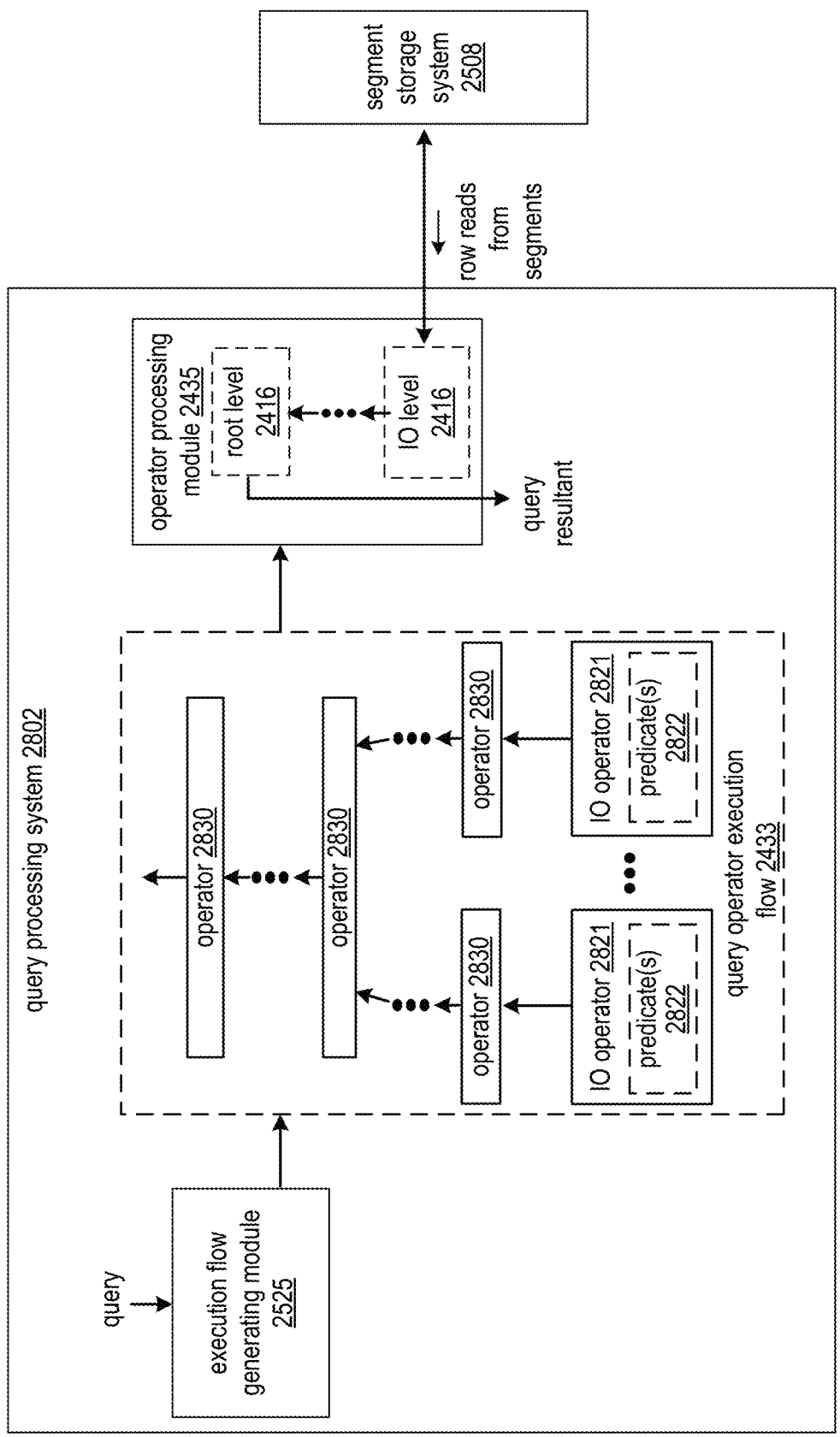
FIG. 28A is a schematic block diagram of a query processing system in accordance with various embodiments.
Figure 28B:
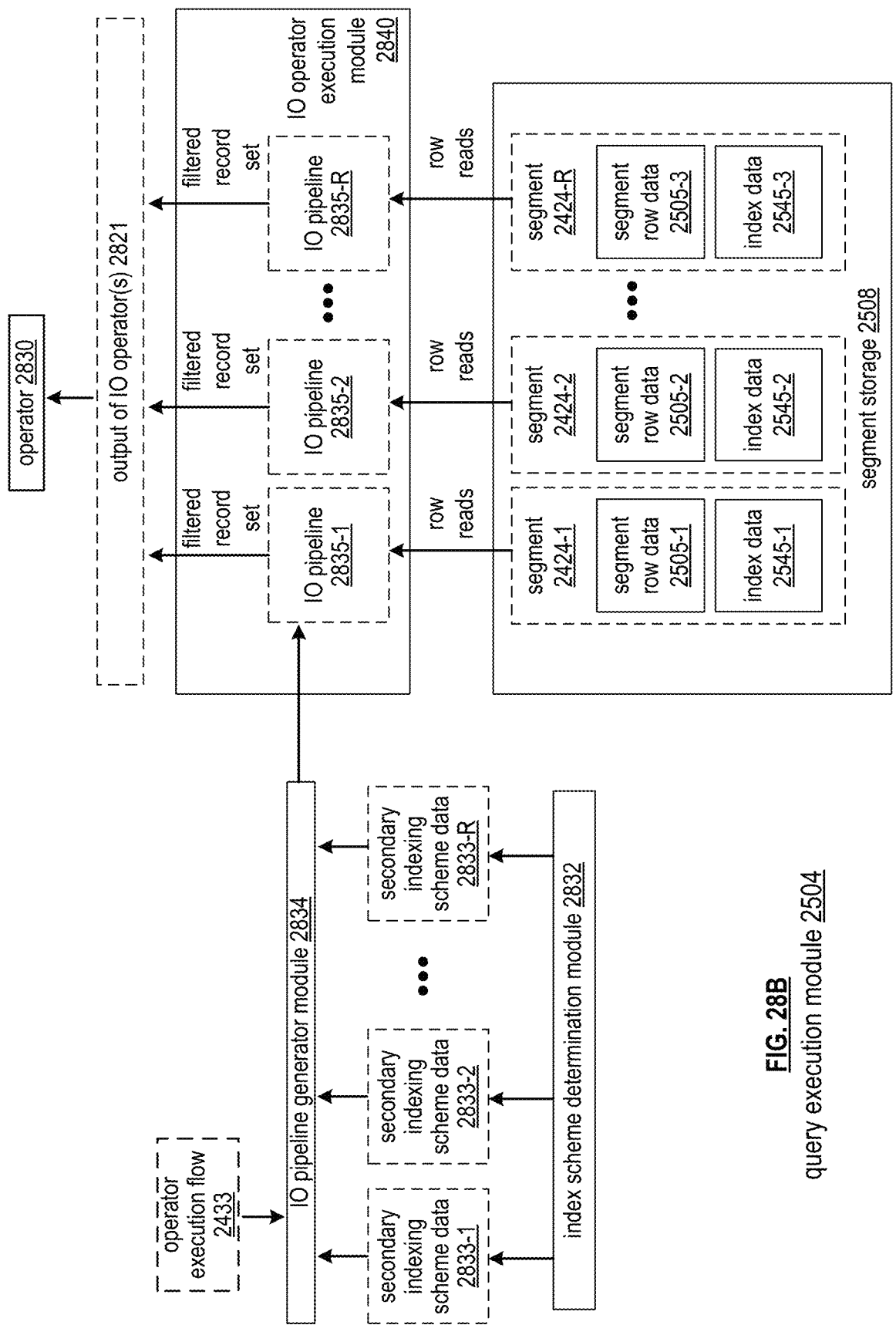
FIG. 28B is a schematic block diagram of a query execution module that implements an IO pipeline generator module and an IO operator execution module in accordance with various embodiments.
Figure 28C:
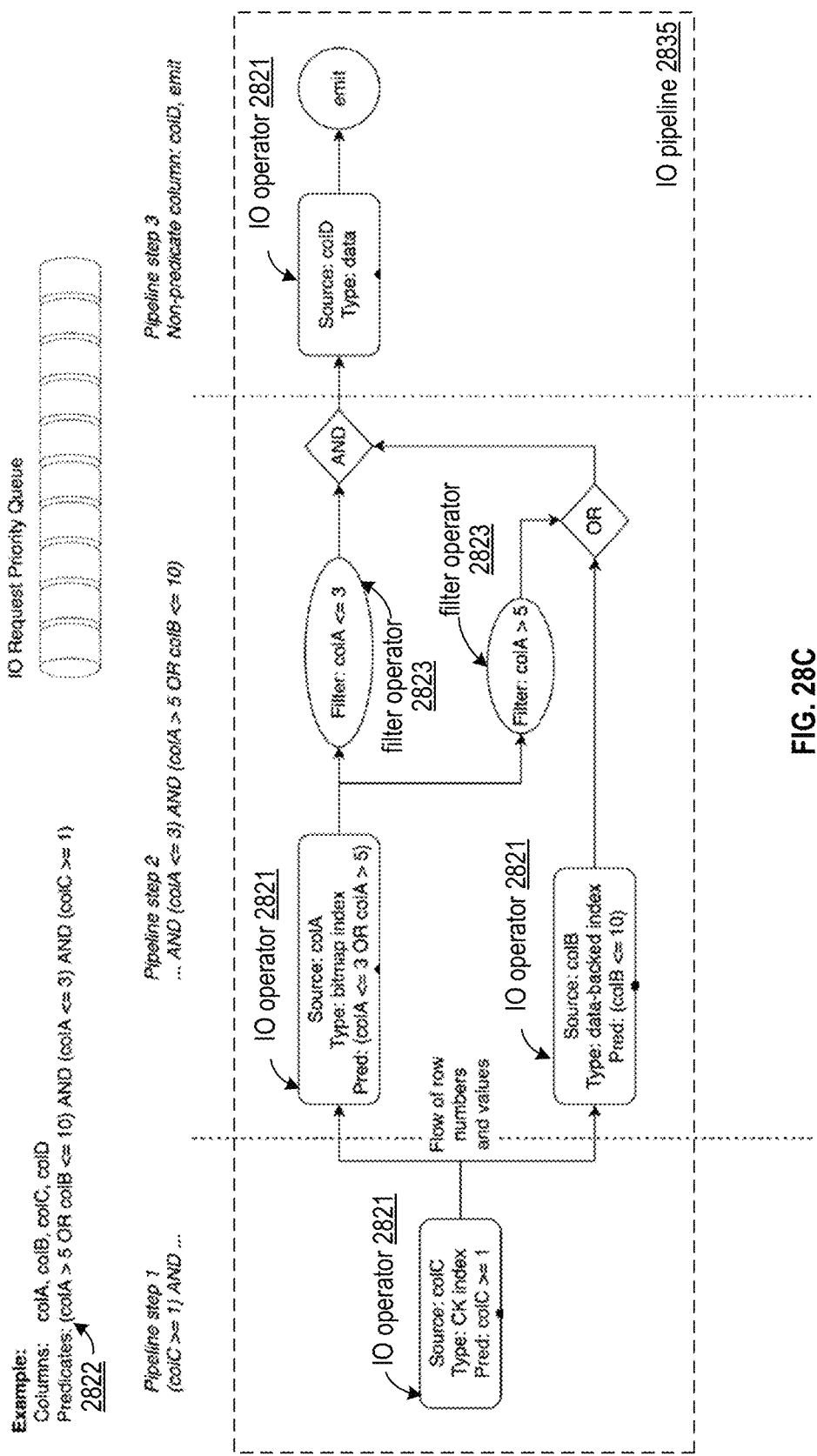
FIG. 28C is a schematic block diagram of an example embodiment of an IO pipeline in accordance with various embodiments.

FIGS. 28A-28C present embodiments of a query processing system 2802 that executes queries against dataset via an operator processing module 2435. Some or all features and/or functionality of the query processing system 2802 described herein can be utilized to implement some or all features and/or functionality of the query expression processing module 2512, the execution flow generating module 2525, and/or the operator processing module 2435. Some or all features and/or functionality of the query processing system 2802 can implement any of the query processing discussed herein.

IO operators in query operator execution flows 2433 can be configured to implement some or all query predicates of a given query. Generating a query operator execution flow 2433 for a given query can include pushing some or all query predicates to the IO operator level for implementing via corresponding indexes if applicable, or via filters after applying row reads.

In some embodiments, performing IO operators for each given segment is based on the secondary indexing for each given segment, where different segments are optionally indexed via different indexing schemes. To ensure all segments are uniformly read and filtered for a given query, despite optionally having different secondary indexing schemes, some or all query predicates can be pushed to the IO operator level. The IO operators can be processed differently for different segments based on their respective indexes via IO pipelines determined for each segment, but can be guaranteed to render the appropriate predicate-based filtering regardless of how and/or whether indexes are applied for each segment. This can improve database systems by guaranteeing query resultants are correct in query executions, while enabling each segment to perform IO operators efficiently based on having their own secondary indexing scheme that may be different from that of other segments.

FIG. 28A illustrates an embodiment of a query processing system 2802 that includes an execution flow generating module 2525 and an operator processing module 2435. Some or all features and/or functionality of the operator processing module 2435 of FIG. 28A can be utilized to implement any other embodiment of the operator processing module 2435 discussed herein.

The execution flow generating module 2525 can be implemented via one or more computing devices and/or via other processing resources and/or memory resources of the database system 10. The execution flow generating module 2525 can generate a query operator execution flow 2433, indicating a flow of operators 2830 of the query to be performed by the operator processing module 2435 to execute the query in accordance with a serial and/or parallelized ordering. Different portions of the query operator execution flow 2433 can optionally be performed by nodes at different corresponding levels of the query execution plan 2405.

At the bottom of the query operator execution flow 2433, one or more IO operators 2821 are included. These operators are performed first to read records required for execution of the query from corresponding segments. For example, the operator processing module 2435 performs a query against a dataset by accessing records of the dataset in respective segments. As a particular example, nodes 37 at IO level 2416 each perform the one or more IO operators 2821 to read records from their respective segments.

Rather than generating a query operator execution flow 2433 with IO operators 2821 that are executed in an identical fashion across all segments, for example, by applying index probing or other use of indexes to filter rows uniformly across all IO operators for all segments, the execution of IO operators can be adapted to account for different secondary indexing schemes that are utilized for different segments. To guarantee query correctness, all IO operators must be guaranteed to filter the correct set of records when performing record reads in the same fashion.

This can be accomplished by pushing all of the query predicates 2822 of the given query down to the IO operators. Executing the IO operators via operator processing module 2435 includes applying the query predicates 2822 to filter records from segments accordingly 2424. In particular, performing the IO operators to perform rows reads for different segment requires that the IO operators are performed differently. For example index probing operations or other filtering via IO operators may be possible for automatically applying query predicates 2822 in performing row reads for segment indexed via a first secondary indexing scheme. However, this same IO process may not be possible for a second segment indexed via a different secondary indexing scheme. In this case, an identical filtering step would be required after reading the rows from the second segment.

FIG. 28B illustrates an embodiment of an operator processing module 2435 that accomplishes such differences in IO operator execution via selection of IO pipelines on a segment-by-segment basis. Some or all features and/or functionality of the operator processing module 2435 of FIG. 28B can be utilized to implement the operator processing module 2435 of FIG. 28A, and/or any other embodiment of the operator processing module 2435 described herein.

The construction of an efficient IO pipeline for a given query and segment can be challenging. While a trivial scan-and-filter pipeline can satisfy many queries, most efficiency gains from building an IO pipeline that uses a combination of indexes, dependent sources, and filters to minimize unneeded TO. As a result, different elements must be used depending on the predicates involved, the indexes present in that segment, the presence or absence of variable-length skip lists, and the version of the cluster key index.

The operator processing module 2435 can include an index scheme determination module 2832 that determines the secondary indexing scheme data 2833-1-2833-R indicating the secondary indexing scheme utilized for each of a set of segments 1-R to be accessed in execution of a given query. For example, the secondary indexing scheme data 2833-1-2833-R is mapped to the respective segments in memory accessible by the operator processing module 2435, is received by the operator processing module 2435, and/or is otherwise determined by the operator processing module 2435. This can include extracting segment layout description data stored for each segment 1-R.

An IO pipeline generator module 2834 can select a set of IO pipelines 2835-1-2835-R for performance upon each segment 1-R to implement the IO operators of the query operator execution flow 2433. In particular, each IO pipeline 2835 can be determined based on: the pushed to the IO operators in the query operator execution flow 2433, and/or the secondary indexing scheme data 2833 for the corresponding segment. Different IO pipelines can be selected for different segments based on the different segments having different secondary indexing schemes.

The segment storage system 2508 can be implemented via one or more computing devices 18 of the database system and/or other memory resources of the database system 10. For example, the segment storage system 2508 can include a plurality of memory drives 2425 of a plurality of nodes 37 of the database system 10. Alternatively or in addition, the segment storage system 2508 can be implemented via computing devices 18 of one or more storage clusters 35. Generated segments can be sent to the segment storage system 2508 via system communication resources 14 and/or via other communication resources. Segment row data and secondary index data, or other index data, can be generated in conjunction with generating corresponding segments 2424 over time from a dataset for storage via segment storage system 2508, and for subsequent access in query executions via access to segment row data and/or secondary indexing data via segment storage system 2508. For example the index data is stored in an index section of a segment, and the row data is stored in a data and parity section of a segment as illustrated in FIG. 23.

An TO operator execution module 2840 can apply each IO pipeline 2835-1-2835-R to perform the IO operators of the query operator execution flow 2433 for each corresponding segment 2424-1-2424-R. Performing a given IO pipeline can include accessing the corresponding segment in segment storage system 2508 to read rows, utilizing the segment's secondary indexing scheme as appropriate and/or as indicated by the IO pipeline. Performing a given IO pipeline can optionally include performing additional filtering operators in accordance with a serial and/or parallelized ordering, for example, based on the corresponding segment not having a secondary indexing scheme that corresponds to corresponding predicates. Performing a given IO pipeline can include ultimately generating a filtered record set emitted by the given IO pipeline 2835 as output. The output of one or more IO operators 2821 as a whole, when applied to all segments 1-R, corresponds to the union of the filtered record sets generated by applying each IO pipeline 2835-1-2835-R to their respective segment. This output can be input to one or more other operators 2830 of the query operator execution flow 2433, such as one or more aggregations and/or join operators applied the read and filtered records.

In some embodiments, a given node 37 implements its own index scheme determination module 2832, its own IO pipeline generator module 2834, and/or its own IO operator execution module 2840 to perform IO operations upon its own set of segments 1-R. for example, each of a plurality of nodes 37 participating at the IO level 2416 of a corresponding query execution plan 2405 generates and executes IO pipelines 2835 for its own subset of a plurality of segments required for execution of the query, such as the ones of the plurality of segments stored in its memory drives 2425.

In some embodiments, the IO pipeline for a given segment is selected and/or optimized based on one or more criteria. For example, the serialized ordering of a plurality of columns to be sources via a plurality of corresponding IO operators is based on distribution information for the column, such as probability distribution function (PDF) data for the columns, for example, based on selecting columns expected to filter the greatest number of columns to be read and filtered via IO operators earlier in the serialized ordering than IO operators for other columns. As another example, the serialized ordering of a plurality of columns to be sources via a plurality of corresponding IO operators is based on the types of secondary indexes applied to each column, where columns with more efficient secondary indexes and/or secondary indexing schemes that are more applicable to the set of query predicates 2822 are selected to be read and filtered via IO operators earlier in the serialized ordering than IO operators for other columns. As another example, index efficiency metrics and/or query efficiency metrics can be measured and tracked overtime for various query executions, where IO pipelines with favorable past efficiency and/or performance for a given segment and/or for types of secondary indexes are selected over other IO pipelines with less favorable past efficiency and/or performance.

FIG. 28C illustrates an example embodiment of an IO pipeline 2835. For example, the IO pipeline 2835 of FIG. 28C was selected, via IO pipeline generator module 2834, for execution via IO operator execution module 2840 upon a corresponding segment 2424 in conjunction with execution of a corresponding query. In this example, the corresponding query involves access to a dataset with columns colA, colB, colC, and colD. The predicates 2822 for this query that were pushed to the IO operators includes (colA>5 OR colB<=10) AND (colA<=3) AND (colC>=1).

As illustrated in FIG. 28C, the IO pipeline 2835 can include a plurality of pipeline elements, which can be implemented as various IO operators 2821 and/or filtering operators 2823. A serial ordering of the plurality of pipeline elements can be in accordance with a plurality of pipeline steps. Some of pipeline elements can be performed in parallel, for example, based on being included in a same pipeline step. This plurality of pipeline steps can be in accordance with subdividing portions of the query predicates 2822. IO operators performed in parallel can be based on logical operators included in the query predicates 2822, such as AND and/or OR operators. A latency until value emission can be proportional to the number of pipeline steps in the IO pipeline.

Each of the plurality of IO operators can be executed to access values of records 2422 in accordance with the query, and thus sourcing values of the segment as required for the query. Each of these IO operators 2821 can be denoted with a source, identifying which column of the dataset is to be accessed via this IO operator. In some cases, a column group of multiple columns is optionally identified as the source for some IO operators, for example, when compound indexes are applied to this column group for the corresponding segment.

Each of these index source IO operators 2821, when executed for the given segment, can output a set of row numbers and/or corresponding values read from the corresponding segment. In particular, IO operators 2821 can utilize a set of row numbers to consider as input, which can be produced as output of one or more prior IO operators. The values produced by an IO operator can be decompressed in order to be evaluated as part of one or more predicates.

Depending on the type of index employed and/or the placement in the IO pipeline 2835, some IO operators 2821 may emit only row numbers, some IO operators 2821 may emit only data values, and/or some IO operators 2821 may emit both row and data values. Depending on the type of index employed, a source element can be followed by a filter that filters rows from a larger list emitted by the source element based on query predicates.

Some or all of the plurality of IO operators 2821 of the IO pipeline 2835 of a given segment can correspond to index sources that utilize primary indexes, cluster key indexes and/or secondary indexes of the corresponding segment to filter ones of the row numbers and/or corresponding values in their respective output when reading from the corresponding segment. These index source IO operators 2821 can further be denoted with an index type, identifying which type of indexing scheme is utilized for access to this source based on the type of indexing scheme was selected and applied to the corresponding column of the corresponding segment, and/or a predicate, which can be a portion of query predicates 2822 applicable to the corresponding source column to be applied when performing the IO upon the segment by utilizing the indexes.

These IO operators 2821 can utilize the denoted predicate as input for internal optimization. This filter predicate can be pushed down into each corresponding index, allowing them to implement optimizations. For example, bitmap indexes only need to examine the columns for a specific range or values.

These index source IO operators 2821 output only a subset of set of row numbers and/or corresponding value identified to meet the criteria of corresponding predicates based on utilizing the corresponding index type of the corresponding source for the corresponding segment. In this example, the IO operators 2821 sourcing colA, colB, and colC are each index source IO operators 2821.

Some or all of the plurality of IO operators 2821 of the IO pipeline 2835 of a given segment can correspond to table data sources. These table data source IO operators 2821 can be applied to columns without an appropriate index and/or can be applied to columns that are not mentioned in query predicates 2822. In this example, the IO operators 2821 sourcing colD is a table data source, based on colD not being mentioned in query predicates 2822. These table data source IO operators can perform a table scan to produce values for a given column. When upstream in the IO pipeline, these table data source IO operators 2821 can skip rows not included in their input list of rows received as output of a prior IO operator when performing the table scan. Some or all these IO operators 2821 can produce values for the cluster key for certain rows, for example, when only secondary indexes are utilized.

Some or all of the plurality of IO operators 2821 of the IO pipeline 2835 of a given segment can correspond to default value sources. These default source IO operators 2821 can always output a default value for a given source column when this column is not present in the corresponding segment.

The various index source, table data source, and default IO operators 2821 included in a given IO pipeline can correspond to various type of pipeline elements that can be included as elements of the IO pipeline. These types can include:

Cluster key index source pipeline element: This type of pipeline element implements a cluster key index search and scan and/or sources values from one or more cluster key columns. When upstream of another source, this IO operator returns values that correspond to the downstream rows that also match this element's predicates (if any)

Legacy clustery key index source pipeline element: This type of pipeline element can implement a cluster key index search and scan, and/or can source values for older segments without row numbers in the cluster key. In some cases, this type of pipeline element is not ever utilized upstream of other pipeline elements.

Inverted index source pipeline element: This type of pipeline element produces values for columns of non-compound types, and/or only row numbers for compound type.

A fixed length table source pipeline element: This type of pipeline element produces values in a fixed-length column. When upstream of another source, skipping blocks containing only rows that have already been filtered and returning only values corresponding to those rows.

A variable length scan table source pipeline element: this type of pipeline element Produces every value in a variable-length column without loading a skip list of row numbers to skip. This type of pipeline element can be faster than variable Length Table Source Pipeline elements. In some embodiments, this type is never used upstream of any other pipeline elements based on being less efficient in scanning a subset of rows.

A variable length table source pipeline element: this type of pipeline element produces values in a variable-length column when a skip list of row numbers to skip is present. In some embodiments, this type of pipeline element is always used upstream of another pipeline element based on efficiently skipping blocks that do not contain any row in the downstream list.

A default value source pipeline element: this type of pipeline element emits default values for a column for any row requested.

The IO pipeline 2835 can further include filtering operators 2823 that filter values outputted by sources serially before these filters based on portions of the query predicates 2822. The filtering operators 2823 can serve as a type of pipeline element that evaluates a predicate expression on each incoming row, filtering rows that do not pass. In some embodiments, every column in the provided predicate must be sourced by other pipeline elements downstream of this pipeline element. In particular, these filtering operators 2823 can be required for some segments that do not have secondary indexes for one or more columns indicated in the query predicates 2822, where the column values of all rows of such columns are first read via a table data source IO operator 2821, and where one or more corresponding filtering operators 2823 are applied to filter the rows accordingly. In some embodiments, the IO pipeline 2835 can further include logical operators such as AND and/or OR operators as necessary for the corresponding query predicates 2822.

In some embodiments, all possible secondary indexing schemes that can be implemented in segments for use in query execution are required to receive a list of predicates to evaluate as input, and return a list of rows that pass those predicates as output, where execution of an index source IO operator includes utilizing the corresponding predicates of the of index source IO operator to evaluate return a list of rows that pass those predicates as output. These row lists can be filtered and/or merged together in the IO pipeline as different indexes are used for the same query via different IO operators. Once the final row list is calculated, columns that are required for the query, but do not yet have values generated by the pipeline, can be read off disk.

In some embodiments, variable length columns are stored as variable-length quantity (VLQ) prefixed regions in row order. For example, VLQs and row data can span across 4 Kilo-byte blocks. Seeking to a given row number can include starting at the first row and cursing through all of the data. Information on a per-LCK basis that enables seeking to the first byte in a variable length column for that key can be stored and utilized. However, in segments with high clustering this can be a large portion of the column span. In order to enable efficient row value lookups by row number for variable length columns, a row offset lookup structure for variable length columns can be included. These can be similar to the fixed length lookup structures used in decompression, but with extra variable-length specific information.

For example, a skip list can be built for every column. For variable length columns, the skip list can encode an extra byte offset of first row, and can be in accordance with a different structure than that of fixed length columns, new skip list structure can be required. Performing IO can include loading skip lists for variable length columns in the query into memory. Given a row number, the first entry that has a larger first row number can be identified. The previous entry in the skip list can be accessed, and one or more blocks that contain the value can be read. In some cases, the subsequent block must always be read based on the end location of the row being unknown. In some cases, every variable length column read can include reads to two 4 Kilo-byte blocks. In some cases, each 4 Kilo-byte data block of segment row data 2505 can be generated to include block delta encoded row offsets and/or a byte offset of first row.

In some embodiments, for queries that use secondary indexes and require cluster key column emission but don't actually require to search the cluster key index, look up of cluster key values by row number can be implemented via the addition of row numbers in the primary cluster key index. This can include adding row ranges to index partition information in index headers and/or Adding row offset in the index. When IO is performed, the index partition a row falls into can be determined, a binary search for a cluster key that contains can be performed, and/or the cluster key can be emitted.

In this example, this example IO pipeline 2835 for this set of example query predicates 2822 can be generated for a first given segment based on colC having a cluster key (CK) index for the first given segment; based on colA having a bitmap index for the first given segment; and/or based on colB having a data-backed index for the first given segment. The respective secondary index data 2545 for colA and colB of this first given segment was generated by the secondary index generator module accordingly to include a bitmap index for colA and a data-backed index for colB. When this IO pipeline 2835 for the first segment is executed, the secondary index data 2545 the bitmap index for colA and a data-backed index for colB of the secondary index data 2545 is accessed to perform their respective TO operators 2821.

While not illustrated, consider a second segment upon which this same query is performed. A different IO pipeline 2835 for this set of example query predicates 2822 can be generated for the second given segment based on the second given segment having different secondary indexing schemes for colA and colB. For example, colA has a bloom filter index and colB has not indexing. The TO operator 2821 sourcing colA in the IO pipeline 2835 for this second segment can thus be generated with an index type of a bloom filter, and/or can similarly the (colA<=3 OR colA>5) predicates. TO operator 2821 sourcing colA in the IO pipeline 2835 for this second segment can be a table data source TO operator based on colB having no secondary indexes in the second segment. A separate filtering operator 2823 can be applied serially after the table data source TO operator sourcing colB to apply the respective (colB<=10) predicate. In particular, this separate filtering operator 2823 can filter the outputted values received from the table data source TO operator for colB by selecting only the values that are less than or equal to 10.

IO operators 2821 and/or filtering operators 2823 further along the pipeline that are serially after prior TO operators 2821 and/or filtering operators 2823 in a serialized ordering of the IO pipeline can utilize output of prior TO operators 2821 and/or filtering operators 2823 as input. In particular, TO operators that receive row numbers from prior ones TO operators in the serial ordering can perform their reads by only accessing rows with the corresponding row numbers outputted by a prior TO operator.

Each pipeline element (e.g. TO operators, filter operators, and/or logical operators) of an IO pipeline can either to union or intersect its incoming row lists from prior pipeline elements in the IO pipeline. In some embodiments, an efficient semi-sparse row list representation can be utilized for fast sparse operations. In some embodiments, pipeline can be optimized to cache derived values (such as filtered row lists) to avoid re-computing them in subsequent pulls.

In this example, the IO operator 2821 sourcing colC outputs a first subset of row numbers of a plurality of row numbers of the segment based on identifying only rows with colC values greater than or equal to 1, based on utilizing the cluster key index for colC. The IO operator 2821 sourcing colA receives this first subset of the plurality of row numbers outputted by the IO operator 2821 sourcing colC, and only access rows with row numbers in the first subset. The first subset is further filtered into a second subset of the first subset by identifying rows with row numbers in the first subset with colA values that are either less than or equal to 3 of are greater than 5, based on utilizing the bitmap index for colA.

Similarly, the IO operator 2821 sourcing colB receives the first subset of the plurality of row numbers outputted by the IO operator 2821 sourcing colC, and also only access rows with row numbers in the first subset. The first subset is filtered into a third subset of the first subset by identifying rows with row numbers in the first subset with colB values that are either less than or equal to 10, based on utilizing the data-backed index for colB. The IO operator 2821 sourcing colB can be performed in parallel with the IO operator 2821 sourcing colA because neither IO operators is dependent on the other's output.

The union of the second subset and third subset are further filtered based on the filtering operators 2823 and logical operators to satisfy the required conditions of the query predicates 2822, where a final set of row numbers utilized as input to the final IO operator sourcing colD includes only the row numbers with values in colA, colB, and colC that satisfy the query predicates 2822. This final set of row numbers is thus utilized by the final IO operator sourcing colD to produce the values emitted for the corresponding segment, where this IO operator reads values of colD for only the row numbers indicated in its input set of row numbers.

The query processing system 2802 of FIGS. 28A-28C can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the execution flow generating module 2525 and/or the operator processing module 2435 can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the execution flow generating module 2525 and/or the operator processing module 2435 at a massive scale. The IO pipeline generator module 2834, the index scheme determination module 2832, and/or the IO operator execution module of the query execution module can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the execution flow generating module 2525 and/or the operator processing module 2435 at a massive scale.

The execution of queries by the query execution module cannot practically be performed by the human mind, particularly when the database system 10 is implemented to store and perform queries against records at a massive scale as discussed previously. In particular, the human mind is not equipped to perform IO pipeline generation and/or processing for millions, billions, and/or trillions of records stored as many Terabytes, Petabytes, and/or Exabytes of data. Furthermore, the human mind is not equipped to distribute and perform IO pipeline generation and/or processing as multiple independent processes, such as hundreds, thousands, and/or millions of independent processes, in parallel and/or within overlapping time spans.

In various embodiments, a query processing system includes at least one processor; and a memory that stores operational instructions. The operational instructions, when executed by the at least one processor, cause the query processing system to identify a plurality of predicates of a query for execution. A query operator flow is generated for a query by including the plurality of predicates in a plurality of IO operators of the query operator flow. Execution of the query is facilitated by, for each given segment of a set of segments stored in memory: generating an IO pipeline for each given segment based on a secondary indexing scheme of a set of secondary indexes of each segment and based on plurality of predicates, and performing the plurality of IO operators upon each given segment by applying the IO pipeline to each segment.

Figure 28D:
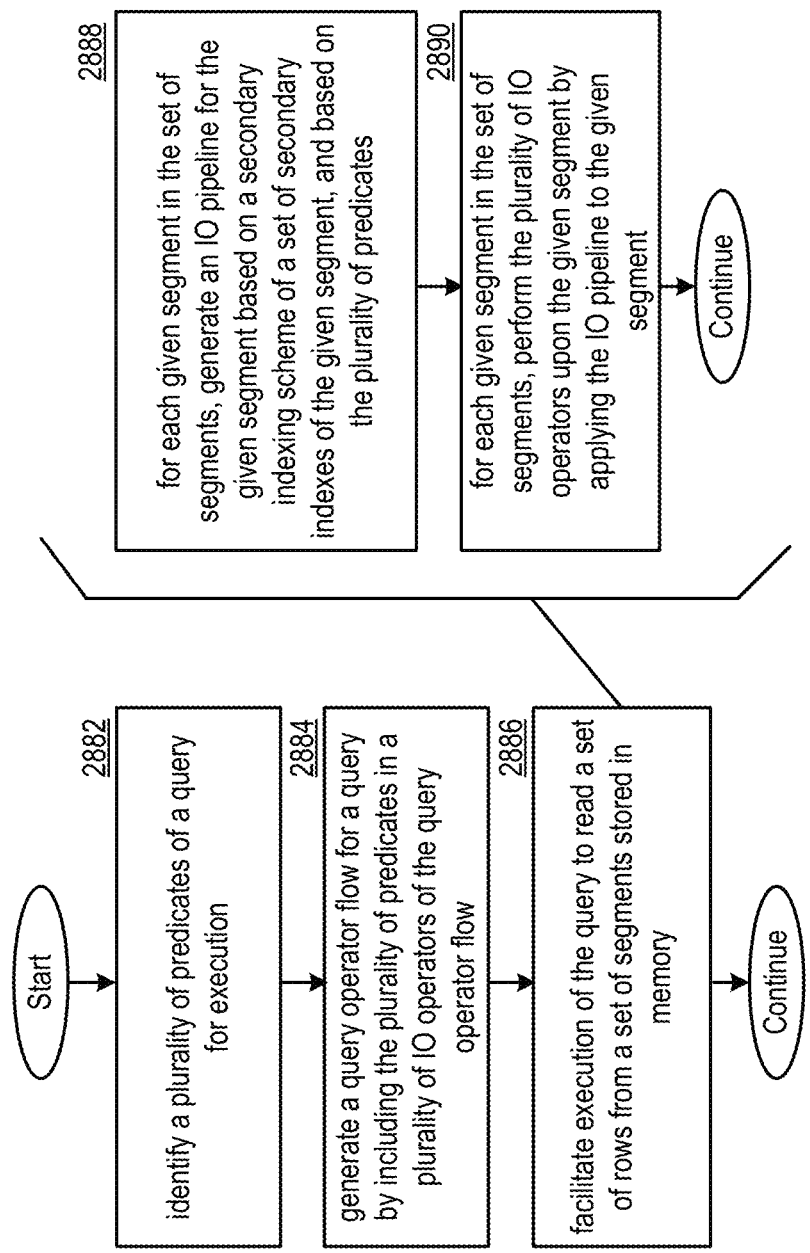
FIG. 28D is a logic diagram illustrating a method of performing IO operators upon different segments in query execution accordance with various embodiments.

FIG. 28D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28D. In particular, a node 37 can utilize the query processing module 2435 to execute some or all of the steps of FIG. 28D, where multiple nodes 37 implement their own query processing modules 2435 to independently execute the steps of FIG. 28D, for example, to facilitate execution of a query as participants in a query execution plan 2405. Some or all of the method of FIG. 28D can be performed by the query processing system 2802, for example, by utilizing an execution flow generating module 2525 and/or an operator processing module 2435. In particular, some or all of the method of FIG. 29B can be performed by the IO pipeline generator module 2834, the index scheme determination module 2832, and/or the IO operator execution module 2840. Some or all of the method of FIG. 28D can be performed via communication with and/or access to a segment storage system 2508, such as memory drives 2425 of one or more nodes 37. Some or all of the steps of FIG. 28D can optionally be performed by any other processing module of the database system 10. Some or all of the steps of FIG. 28D can be performed to implement some or all of the functionality regarding execution of a query via the plurality of nodes in the query execution plan 2405 as described in conjunction with FIGS. 24A-24E. Some or all steps of FIG. 28D can be performed by database system 10 in accordance with other embodiments of the database system 10 and/or nodes 37 discussed herein. Some or all steps of FIG. 28D can be performed in conjunction with some or all steps of FIG. 25E, FIG. 26D, and/or FIG. 27B.

Step 2882 includes identifying a plurality of predicates of a query for execution. Step 2884 includes generating a query operator flow for a query by including the plurality of predicates in a plurality of IO operators of the query operator flow. Step 2886 includes facilitating execution of the query to read a set of rows from a set of segments stored in memory.

Performing step 2886 can include performing steps 2888 and/or 2890 for each given segment of the set of segments. Step 2888 includes generating an IO pipeline for each given segment based on a secondary indexing scheme of a set of secondary indexes of the given segment, and based on the plurality of predicates. Step 2890 includes performing the plurality of IO operators upon the given segment by applying the IO pipeline to the given segment.

In various embodiments, the set of segments are stored in conjunction with different ones of a plurality of corresponding secondary indexing schemes. In various embodiments, a first IO pipeline is generated for a first segment of the set of segments, and a second IO pipeline is generated for a second segment of the set of segments. The first IO pipeline is different from the second IO pipeline based on the set of secondary indexes of the first segment being in accordance with a different secondary indexing scheme than the set of secondary indexes of the second segment.

In various embodiments, performing the plurality of IO operators upon at least one segment of the set of segments includes utilizing the set of secondary indexes of the at least one segment in accordance with the IO pipeline to read at least one row from the at least one segment. In various embodiments, performing the plurality of IO operators upon at least one segment of the set of segments includes filtering at least one row from inclusion in output of the plurality of IO operators based on the plurality of predicates. The set of rows is a proper subset of a plurality of rows stored in the plurality of segments based on the filtering of the at least one row. In various embodiments, the IO pipeline of at least one segment of the set of segments includes at least one source element and further includes at least one filter element. The at least one filter element can be based on at least some of the plurality of predicates.

In various embodiments, generating the IO pipeline for each segment includes selecting the IO pipeline from a plurality of valid IO pipeline options for each segment. In various embodiments selecting the IO pipeline from a plurality of valid IO pipeline options for each segment is based on index efficiency metrics generated for previously utilized IO pipelines of previous queries.

In various embodiments, the IO pipeline is generated for each given segment by one of the plurality of nodes that stores the given segment. Each of the plurality of IO operators are performed upon each segment by the one of the plurality of nodes that stores the given segment. A first node storing a first segment of the set of segments generates the IO pipeline for the first segment and performs the plurality of IO operators upon the first segment, and a second node storing a second segment of the set of segments generates the IO pipeline for the second segment and performs the plurality of IO operators upon the second segment.

In various embodiments, the query operator flow includes a plurality of additional operators, such as aggregation operators and/or join operators, for performance upon the set of rows read from the set of segments via performance of the plurality of IO operators. In various embodiments, the plurality of IO operators are performed by nodes at an IO level of a query execution plan, and these nodes send their output to other nodes at an inner level of the query execution plan, where these additional operators are performed by nodes at an inner level and/or root level of a query execution plan.

In various embodiments, a non-transitory computer readable storage medium includes at least one memory section that stores operational instructions that, when executed by a processing module that includes a processor and a memory, causes the processing module to: identify a plurality of predicates of a query for execution; generate a query operator flow for a query by including the plurality of predicates in a plurality of IO operators of the query operator flow; and/or facilitate execution of the query by, for each given segment of a set of segments stored in memory, generating an IO pipeline for each given segment based on a secondary indexing scheme of a set of secondary indexes of the each segment and based on plurality of predicates, and/or performing the plurality of IO operators upon each given segment by applying the IO pipeline to the each segment.

Figure 29A:
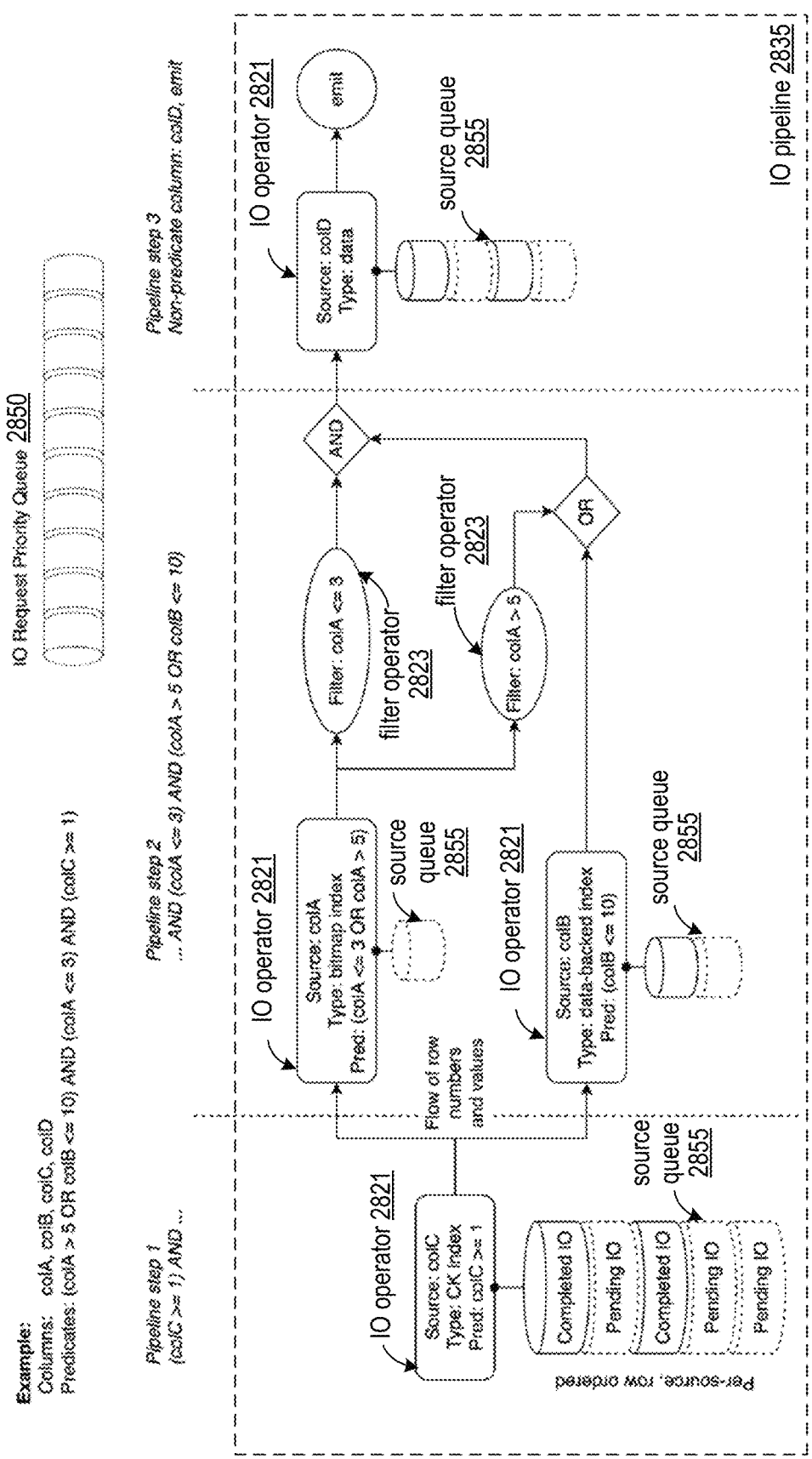
FIG. 29A is a schematic block diagram of an IO operator execution module that executes an example IO pipeline in accordance with various embodiments.

FIG. 29A illustrates an embodiment of an IO operator execution module 2840 that executes the example IO pipeline 2835 of FIG. 28C. Some or all features and/or functionality of the IO operator execution module 2840 of FIG. 29A can be utilized to implement the IO operator execution module 2840 of FIG. 28B and/or any other embodiments of the IO operator execution module 2840 discussed herein.

As discussed in conjunction with FIG. 28C, an IO pipeline 2835 for a given segment can have multiple IO operators 2821 for multiple corresponding sources. Each of these IO operators 2821 is responsible for makings its own requests to the corresponding segment to access rows, for example, by applying a corresponding index and/or corresponding predicates. Each IO operator can thus generate their output as a stream of output, for example, from a stream of corresponding input row numbers outputted by one or more prior IO operators in the serialized ordering.

Each IO operator 2821 can maintain their own source queue 2855 based on the received flow of row numbers from prior sources. For example, as row numbers are received as output from a first IO operator for a first corresponding source, corresponding IO requests indicating these row numbers are appended to the source queue 2855 for a subsequent, second IO operator that is after the first IO operator in the serialized ordering. IO requests with lower row numbers are prioritized in the second IO operator's source queue 2855 are executed before IO requests higher row numbers, and/or IO requests are otherwise ordered by row number in source queues 2855 accordance with a common ordering scheme across all IO operators. In particular, to prevent pipeline stall, the source queues 2855 of all different IO operators can all be ordered in accordance with a shared ordering scheme, for example, where lowest row numbers in source queues 2855 can therefore be read first in source queues for all sources.

As each IO operator reads blocks from disk via a plurality of IO requests, they can each maintain an ordered list of completed and pending requests in their own source queue. The IO operators can serve both row lists and column views (when applicable) from that data.

The shared ordering scheme can be in accordance with an ordering of a shared IO request priority queue 2850. For example, the shared IO request priority queue 2850 is prioritized by row number, where lower row numbers are ordered before higher row numbers. This shared IO request priority queue 2850 can include all IO requests for the IO pipeline across all source queues 2855, prioritized by row number.

For example, the final IO operator 2821 sourcing colD can make requests and read values before the first IO operator 2821 sourcing colC has finished completing all requests to output row numbers of the segment based on the value of colC based on all IO operators making requests in accordance with the shared IO request priority queue 2850.

As a particular example, IO requests across the IO pipeline as a whole are made to the corresponding segment one at a time. At a given time, a lowest row number pending an IO request by one of the plurality of IO operators is read before any other pending IO requests with higher corresponding row numbers based on being most favorably ordered in the shared IO request priority queue 2850. This enables progress to be made for lower row numbers through the IO pipeline, for example, to conserve memory resources. In some embodiments, vectorized reads can be built from the priority queue when enough requests present and/or when IO is forced, for example, for final reads via a final IO operator in the serialized ordering of the pipeline.

The source queue 2855 of a given IO operator can include a plurality of pending IO and completed IO by the corresponding IO operator. For example, completed IO can persist in the corresponding IO operator's queue until the corresponding output, such as a row number or value is processed by a subsequent IO operator to generate its own output.

In general, each disk block needs to be read only once. Multiple row lists and column views can be served from a single block. The IO pipeline can support read-ahead within a pipeline and also into the next pipeline in order to maintain deep IO queues.

The priority queue ordering can be also utilized in cases of pipeline deadlock to enable progress on a current row need when more memory is needed: necessary memory blocks can be allocated by identifying the lowest priority completed IO in the priority queue. When more memory is available, IO operators can read-ahead to maintain a number of in-flight requests. During an out of memory (OOM) event, completed IO can be dropped and turned back into pending TO, which can be placed back in the request queue. In particular, in an OOM condition, read-ahead blocks may need to be discarded and re-read on the subsequent pull when resources are available. Higher row numbers can be discarded first in these cases, for example, from the tail of source queues 2855, to maintain forward progress. In some embodiments, because rows are pulled in order, column leveling is not an issue. In some embodiments, if the current completed IO for a source is dropped, the pipeline will stall until it can be re-read.

In various embodiments, a query processing system includes at least one processor and a memory that stores operational instructions. The operational instructions, when executed by the at least one processor, cause the query processing system to determine an IO pipeline that includes a serialized ordering of a plurality of IO operators for execution upon a segment in accordance with a set of query predicates. An IO request priority queue ordered by row number for a plurality of row-based IO for performance by the plurality of IO operators is maintained. Output for each of the plurality of IO operators is generated based on each of the plurality of row-based IO performing respective ones of the plurality of row-based IO in accordance with the IO request priority queue. A set of values of a proper subset of rows filtered from a plurality of rows stored in the segment are outputted, in accordance with the set of query predicates, based on the output of a last-ordered one of the plurality of IO operators in the serialized ordering.

Figure 29B:
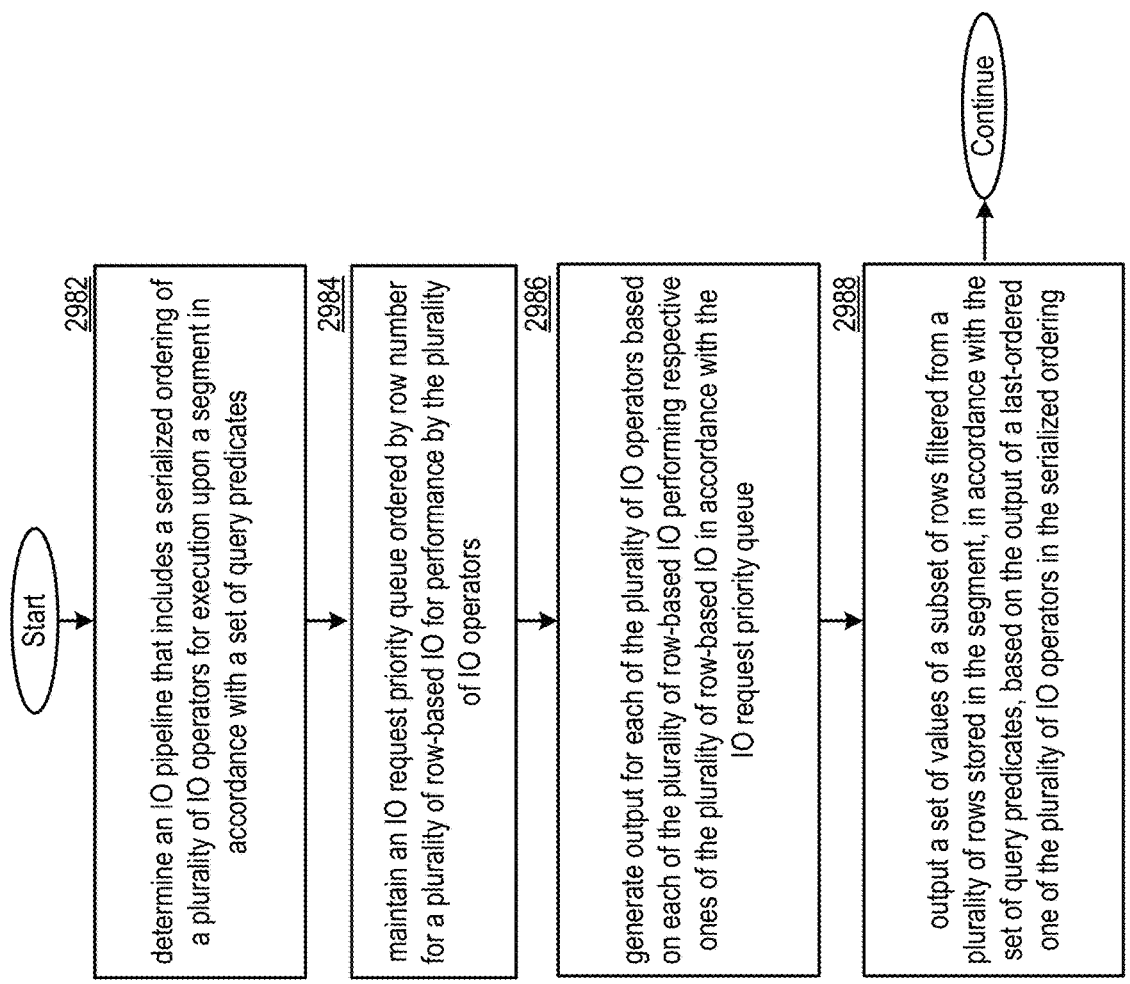
FIG. 29B is a logic diagram illustrating a method of executing row-based reads of an IO pipeline in accordance with various embodiments.

FIG. 29B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29B. In particular, a node 37 can utilize the query processing module 2435 to execute some or all of the steps of FIG. 29B, where multiple nodes 37 implement their own query processing modules 2435 to independently execute the steps of FIG. 29B, for example, to facilitate execution of a query as participants in a query execution plan 2405. Some or all of the method of FIG. 29B can be performed by the query processing system 2802, for example, by utilizing an execution flow generating module 2525 and/or an operator processing module 2435. In particular, some or all of the method of FIG. 29B can be performed by the IO pipeline generator module 2834, the index scheme determination module 2832, and/or the IO operator execution module 2840. Some or all of the method of FIG. 29B can be performed via communication with and/or access to a segment storage system 2508, such as memory drives 2425 of one or more nodes 37. Some or all of the steps of FIG. 29B can optionally be performed by any other processing module of the database system 10. Some or all of the steps of FIG. 29B can be performed to implement some or all of the functionality regarding execution of a query via the plurality of nodes in the query execution plan 2405 as described in conjunction with FIGS. 24A-24E. Some or all steps of FIG. 29B can be performed by database system 10 in accordance with other embodiments of the database system 10 and/or nodes 37 discussed herein. Some or all steps of FIG. 29B can be performed in conjunction with some or all steps of FIG. 25E, FIG. 26D, FIG. 27B, and/or FIG. 28D.

Step 2982 includes determining an IO pipeline that includes a serialized ordering of a plurality of IO operators for execution upon a segment in accordance with a set of query predicates. Step 2984 includes maintaining an IO request priority queue ordered by row number for a plurality of row-based IO for performance by the plurality of IO operators. Step 2986 includes generating output for each of the plurality of IO operators based on each of the plurality of row-based IO performing respective ones of the plurality of row-based IO in accordance with the IO request priority queue. Step 2988 includes outputting a set of values of a subset of rows filtered from a plurality of rows stored in the segment, in accordance with the set of query predicates, based on the output of a last-ordered one of the plurality of IO operators in the serialized ordering.

In various embodiments, the subset of rows is a proper subset of the plurality of rows based on at least one row of the plurality of rows being filtered out by one of the plurality of IO operators due to not meeting the filtering requirements of the set of query predicates. Alternatively, the subset of rows includes all of the plurality of rows based on no rows in the plurality of rows being filtered out by any of the plurality of IO operators due to all rows in the plurality of rows meeting the filtering requirements of the set of query predicates. As another example, the subset of rows includes none of the plurality of rows based on all rows in the plurality of rows being filtered out by the plurality of IO operators due to no rows in the plurality of rows meeting the filtering requirements of the set of query predicates.

In various embodiments, subsequent ones of the plurality of IO operators in the serialized ordering generate their output by utilizing output of prior ones of the ones of the plurality of IO operators in the serialized ordering. In various embodiments, output of each of the plurality of IO operators includes a flow of data ordered by row number based on performing respective ones of the plurality of row-based IO in accordance with the IO request priority queue. In various embodiments, the flow of data outputted by each of the plurality of IO operators includes a flow of row numbers ordered by row number and/or a flow of values of at least one column of rows in the plurality of rows, ordered by row number.

In various embodiments, the segment includes a plurality of secondary indexes generated in accordance with a secondary indexing scheme. The proper subset of rows are filtered from a plurality of rows stored in the segment based on at least one of the plurality of IO operators generating its output as a filtered subset of rows read in its respective ones of the plurality of row-based IO by utilizing the plurality of secondary indexes.

In various embodiments, the plurality of secondary indexes includes a first set of indexes for a first column of the plurality of rows stored in the segment in accordance with a first type of secondary index, and the plurality of secondary indexes includes a second set of indexes for a second column of the plurality of rows stored in the segment in accordance with a second type of secondary index. A first one of the plurality of IO operators generates its output in accordance with a first predicate of the set of predicates corresponding to the first column by utilizing the first set of indexes, and a second one of the plurality of IO operators generates its output in accordance with a second predicate of the set of predicates corresponding to the second column by utilizing the second set of indexes.

In various embodiments, the IO pipeline further includes at least one filtering operator, and the proper subset of rows of the plurality of rows stored is further filtered in by the at least one filtering operator. In various embodiments, the at least one filtering operator is in accordance with one of the set of predicates corresponding to one column of the plurality of rows based on the segment not including any secondary indexes corresponding to the one column.

In various embodiments, generating output for each of the plurality of operator includes, via a first one of the plurality of IO operators, generating first output that includes a first set of row numbers as a proper subset of a plurality of row numbers of the segment via by performing a first set of row-based IO of the plurality of row-based IO in accordance with the IO request priority queue. Generating output for each of the plurality of operators can further include, via a second one of the plurality of IO operators that is serially ordered after the first one of the plurality of IO operators in the serialized ordering, generating second output that includes a second set of row numbers as a proper subset of the first set of row numbers by performing a second set of row-based IO of the plurality of row-based IO for only row numbers included in the first set of row numbers, in accordance with the IO request priority queue.

In various embodiments, the first set of row-based IO includes reads to a first column of the plurality of rows, and the second set of row-based IO includes reads to a second column of the plurality of rows. The first set of row numbers are filtered from the plurality of row numbers by the first one of the plurality of IO operators based on applying a first one of the set of predicates to values of the first column. The second set of row numbers are filtered from first set of row numbers by the second one of the plurality of IO operators based on applying a second one of the set of predicates to values of the second column.

In various embodiments, the serialized ordering of the plurality of IO operators includes a parallelized set of IO operators that is serially after the first one of the plurality of IO operators. The parallelized set of IO operators includes the second one of the plurality of IO operators and further includes a third IO operator of the plurality of IO operators. Generating output for each of the plurality of operators can further include, via the third one of the plurality of IO operators, generating third output that includes a third set of row numbers as a second proper subset of the first set of row number of the segment by performing a second set of row-based IO of the plurality of row-based IO for only row numbers included in the first set of row numbers, in accordance with the IO request priority queue.

In various embodiments, the method further includes generating fourth output via a fourth one of the plurality of IO operators that is serially after the parallelized set of IO operators that corresponds to a proper subset of rows included in a union of outputs of the parallelized set of TO operators.

In various embodiments, respective ones of the plurality of row-based IO are maintained in a queue by the each of the plurality of IO operators in accordance the ordering of the IO request priority queue. In various embodiments, the queue maintained by the each given IO operator of the plurality of IO operators includes a set of IO competed by the given IO operator and further includes a set of IO pending completion by the given IO operator.

In various embodiments, the method includes detecting an out-of-memory condition has been met, and/or removing a subset of the plurality of row-based IO from the queues maintained by the each of the plurality of IO operators by selecting ones of the plurality of row-based IO that are least favorably ordered in the IO request priority queue. In various embodiments, at least one of the plurality of row-based IO removed from a queue maintained by one of the plurality of IO operators was already completed by the one of the one of the plurality of IO operators. The at least one of the plurality of row-based IO is added to the queue maintained by one of the plurality of IO operators as pending completion based on being removed from the queue in response to detecting that memory is again available. The one of the plurality of IO operators re-performs the at least one of the plurality of row-based IO based on being indicated in the queue as pending completion.

In various embodiments, a non-transitory computer readable storage medium includes at least one memory section that stores operational instructions that, when executed by a processing module that includes a processor and a memory, causes the processing module to: determine an IO pipeline that includes a serialized ordering of a plurality of IO operators for execution upon a segment in accordance with a set of query predicates; maintain an IO request priority queue ordered by row number for a plurality of row-based IO for performance by the plurality of IO operators; generate output for each of the plurality of IO operators based on each of the plurality of row-based IO performing respective ones of the plurality of row-based IO in accordance with the IO request priority queue; and/or output a set of values of a proper subset of rows filtered from a plurality of rows stored in the segment, in accordance with the set of query predicates, based on the output of a last-ordered one of the plurality of IO operators in the serialized ordering.

Figure 30:
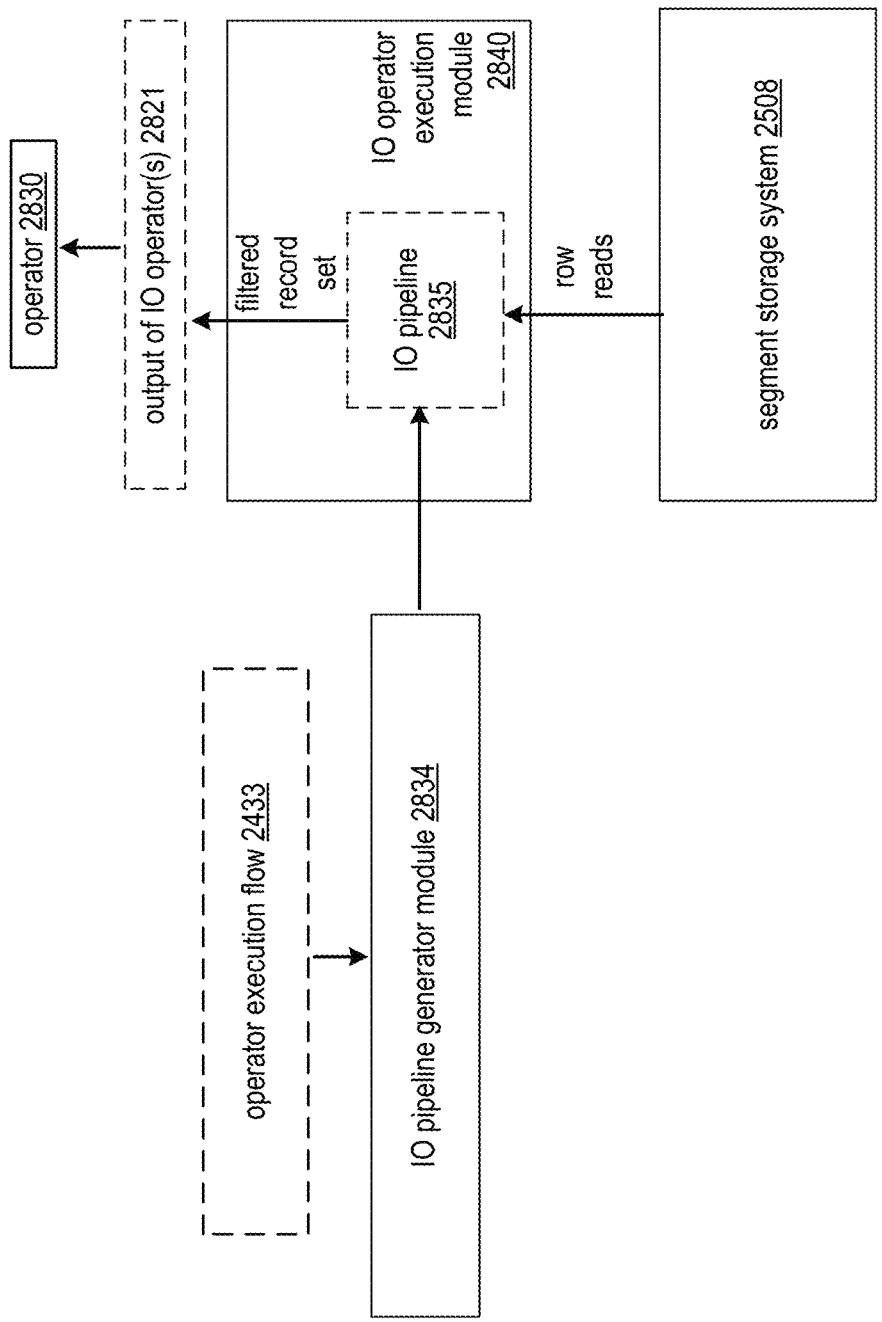
FIG. 30 is a schematic block diagram of a query processing system that implements an IO pipeline generator module and an IO operator execution module in accordance with various embodiments.

As illustrated in FIG. 30, a query processing system 2802 can implement an TO pipeline generator module 2834 via processing resources of the database system 10 to determine an IO pipeline 2835 for execution of a given query based on a query operator execution flow 2433 determined for the given query, for example, as discussed in conjunction with FIGS. 28A-28D. The IO pipeline generator module 2834 can be implemented via one or more nodes 37 of one or more computing devices 18 in conjunction with execution of a given query. For example, the query operator execution flow 2433 is determined for a given query, for example, based on processing and/or optimizing a given query expression.

An IO operator execution module 2840 can execute the IO pipeline 2835 to render a filtered row set from a full set of rows of a corresponding dataset against which the given query is executed. This can include performing row reads based on accessing index data and/or raw data values for rows stored in one or more segments of a segment storage system 2508, for example, as discussed in conjunction with FIGS. 28A-28D. This filtered row set can correspond to output of IO operators 2821 of the query operator execution flow 2433 as discussed in conjunction with FIGS. 28A-28D. However, all segments can optionally be indexed in a same fashion, where the same IO pipeline is optionally applied to all segments based on utilizing same indexing schemes. The IO operator execution module 2840 can execute the IO pipeline 2835 via one or more processing resources, such as a plurality of nodes 37 independently performing row reads at an IO level 2416 of a query execution plan 2405 as discussed in conjunction with FIGS. 24A-24D.

FIGS. 31A-32I illustrate embodiments of a database system that generates and utilizes conjunctive normal form (CNF) superset-guaranteeing expressions in executing queries. Some or all features and/or functionality of FIGS. 31A-32I can be implemented utilizing any other embodiment of database system 10 described herein.

Figure 31A:
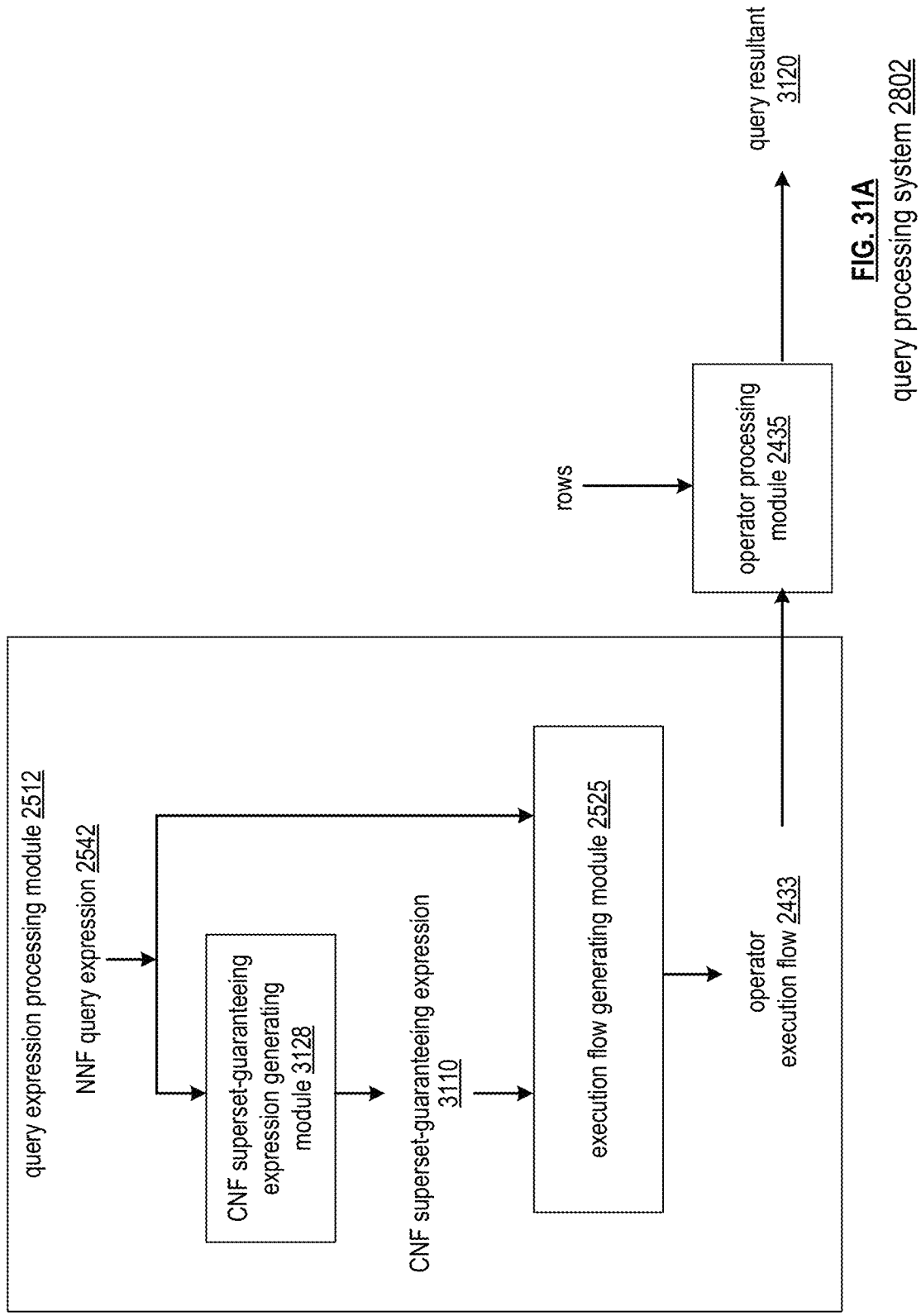
FIG. 31A is a schematic block diagram of an embodiment of a query processing system that implements a conjunctive normal form superset-guaranteeing expression generating module in accordance with various embodiments.

FIG. 31A illustrates an embodiment of a query processing system 2802 that implements a CNF superset-guaranteeing generator module 3128. Some or all features and/or functionality of the query processing system 2802 of FIG. 31A can be utilized to implement the query processing system 2802 of FIG. 28A, FIG. 30, and/or any other query processing system described herein. Some or all features and/or functionality of the query expression processing module 2512 of FIG. 31A can be utilized to implement the query expression processing module of FIG. 25A, FIG. 26A, FIG. 27A, and/or any other embodiment of the query expression processing module described herein.

Generating an operator execution flow 2433 for a given query expression, for example, by implementing an execution flow generating module 2525 via some or all features and/or functionality described previously, can be based on the superset-guaranteeing expression 3110 generated via a CNF superset-guaranteeing generator module 3128. As used herein, a superset-guaranteeing expression 3110 can be based on a corresponding query expression 2542, where the superset-guaranteeing expression 3110 that has a true resultant that is a superset, such as a proper superset or equivalent set, of the true resultant of the corresponding query expression 2542. The superset-guaranteeing expression 3110 can correspond to a logical predicate in CNF form that is based on, and fully covers, the logical predicate of the given query expression. Execution of an operator execution flow corresponding to the superset-guaranteeing expression 3110 alone can be guaranteed to include all rows required for the resultant of the corresponding query expression in its own resultant, where additional rows may optionally also be included. In some or all embodiments, the superset-guaranteeing expression 3110 is not logically non-equivalent to the given query expression 2542, based on not having and/or not guaranteeing the same resultant. For example, the true resultant of the superset-guaranteeing expression 3110 can be a proper superset of the true resultant of the corresponding query expression.

As used herein a "true resultant" of an expression can correspond to the logical set space and/or actual set of rows that satisfy the logical predicates of the corresponding expression. For example, the true resultant of a query expression will be outputted if the corresponding query expression is performed perfectly, based on containing indicating all rows that satisfy the corresponding predicates of expression, and also based on containing and/or indicating no rows that do not satisfy the corresponding predicates of the expression.

The operator execution flow 2433 can implement the superset-guaranteeing expression 3110, for example, at the IO level where indexes are utilized to implement the superset-guaranteeing expression and/or in an upstream portion of the operator execution flow 2433. Additional portions of the operator execution flow 2433 can be implemented to filter any rows that could be included in the true resultant of the superset-guaranteeing expression 3110 that are not to be included in the true resultant of the given query expression 2542. However, additional row reads are not necessary, as the output of the superset-guaranteeing expression 3110 is guaranteed to include all rows to be included in the true resultant of the given query expression 2542.

Furthermore, logical predicates of the superset-guaranteeing expression 3110 can be pushed to the IO level and/or a root portion of a corresponding operator tree based on superset-guaranteeing expression 3110 being in accordance with CNF. This can be ideal in cases where the corresponding query expression is in accordance with a non-normalized form (NNF) that is neither in accordance with CNF form nor DNF form. For example, some or all of the operator execution flow 2433 is generated via some or all features and/or functionality of non-normalized query operator execution flows, for example, via a non-normalized execution flow generating module 2628.

In particular, while it may be expensive to convert the given query expression into CNF or DNF as discussed in conjunction with FIGS. 26A-27B, where non-normalized form for a query operator execution flow may be preferred, CNF structure can still be leveraged to push a apply a substantial amount of filtering at the IO level. Rather than converting the given query expression into CNF, and rather than electing to forego any CNF structure, a superset-guaranteeing expression 3110 can be generated that has a CNF structure, but is generated via a simpler, less expensive algorithm than full conversion of the query expression into CNF. Examples of generating such a superset-guaranteeing expression 3110 in CNF are discussed in further detail in conjunction with FIGS. 32A-32I.

The superset-guaranteeing expression 3110 can still further provide substantial filtering to the full set of rows that would otherwise need to be read in cases where the superset-guaranteeing expression 3110 was not implemented. For example, the superset-guaranteeing expression 3110 can have a true resultant that is a proper subset of the full set of rows, despite still containing some additional rows that require filtering. For example, the true resultant of the superset-guaranteeing expression 3110 corresponds to less than 10% of the full set of rows against which the query expression is executed, where only a small fraction of rows need be read and processed based on implementing the remainder of the query operator execution flow, for example, where the remainder of the query operator execution flow is in accordance with a non-normalized structure as discussed in conjunction with FIGS. 26A-26D.

Implementing a CNF superset-guaranteeing generator module 3128 to generate a superset-guaranteeing expression 3110 that is utilized to build and execute a corresponding query operator execution flow 2433 improves the technology of database systems based on increasing query execution efficiency. In particular, the filtering provided via applying predicates of the superset-guaranteeing expression at the IO level utilizing relevant indexes can reduce the number of rows required to be read, processed, and/or passed between nodes 37 of a query execution plan 2405. This can be highly relevant when the database system is implemented at a massive scale, where reduction of rows being read can tremendously increase database efficiency.

Furthermore, utilizing a superset-guaranteeing expression that does not require a full conversion of an expression into CNF form can further improve the technology of database systems based on increasing efficiency of generating query operator execution flows and corresponding query execution plans. Rather than performing the full conversion, when this conversion could be expensive, benefits of CNF form can be leveraged based on identifying a non-equivalent expression as the superset-guaranteeing expression 3110. Reducing the time and/or processing resources to determine and/or optimize a query operator execution flow 2433, while still rendering efficient query execution due to the filtering provided by the superset-guaranteeing expression 3110, can be highly relevant when the database system is implemented at a massive scale, where processing resources can be better optimized to enable processing and execution of many simultaneous query requests.

FIG. 31B illustrates an embodiment of query expression processing module 2512 where an IO level flow generator module 3134 of a non-normalized execution flow generating module 2628 is utilized to identify and/or generate an ordered structure of index-based IO operators 2821 that implement the superset-guaranteeing expression. The query expression processing module 2512 can be utilized to implement the query expression processing module 2512 of FIG. 31A and/or any other embodiment of query expression processing module 2512 discussed herein. The non-normalized execution flow generating module 2628 of FIG. 31B can be utilized to implement the non-normalized execution flow generating module 2628 of FIGS. 26A-26D.

The non-normalized execution flow generating module 2628 can further process the NNF query expression 2542 to generate the corresponding operator execution flow, for example, to identify a flow of one or more other operators 2820 that filter the corresponding predicates accordingly to guarantee removal of any extra rows generated in output of the index-based IO operators 2821 implementing the superset-guaranteeing expression 3110 due the superset-guaranteeing expression having an resultant that is a proper superset of the NNF query expression 2542. The query operator execution flow 2433 can be implemented in a same or similar fashion as the query operator execution flow 2433 of FIG. 26B due to the query expression 2542 not being converted from NNF as discussed in conjunction with FIGS. 26A-26D.

Figure 31C:
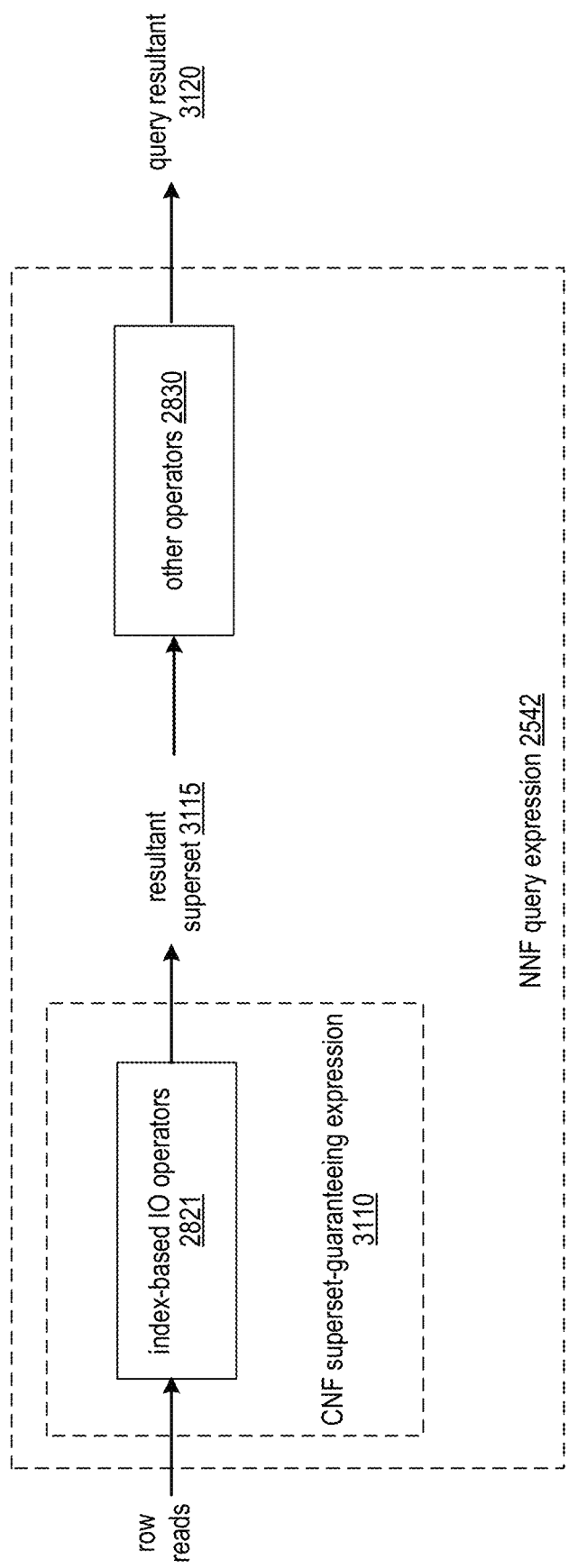
FIG. 31C illustrates an embodiment of a query operator execution flow 2433 in accordance with various embodiments.

FIG. 31C illustrates an example of a query operator execution flow 2433 implementing an NNF query expression of FIG. 31A and/or 31B. The index-based IO operators 2821 can be implemented to implement the CNF superset-guaranteeing expression 3110, which when applied to a set of rows stored in memory, renders a resultant superset 3115 that corresponds to a proper subset of the set of rows. The resultant superset 3115 is further processed buy other operators implementing the NNF query expression to ensure that a resulting query resultant 3120 is guaranteed to remove any additional rows that are included in a set different the true resultant of the CNF superset-guaranteeing expression 3110 and not the true resultant of the NNF query expression 2542. The query resultant 3120 can be a proper subset of the resultant superset 3115.

In some embodiments, the index-based IO operators 2821 of the query operator execution flow 2433 can be processed via one or more nodes 37 at the IO level 2416 of a corresponding query execution plan. In some embodiments, the additional operators 2820 of the query operator execution flow 2433 can be processed via one or more nodes 37 at one or more inner levels 2416 and/or at root level 2412.

Figure 31D:
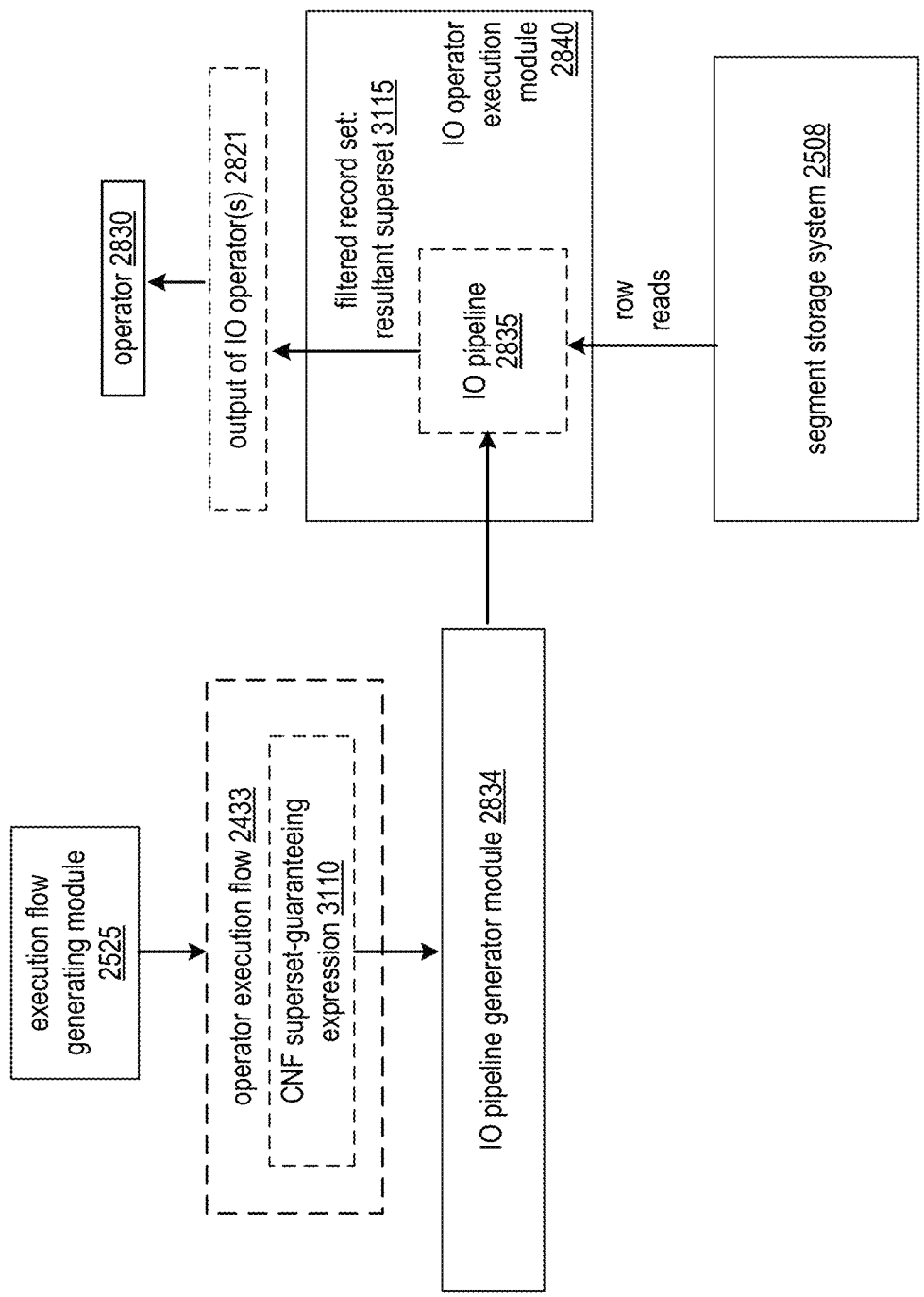
FIG. 31D is a schematic block diagram of an embodiment of a query processing system that generates an IO pipeline based on a superset-guaranteeing expression in accordance with various embodiments.

FIG. 31D illustrates an embodiment of query processing system 2802 where index-based TO operators 2821 are implemented via an IO pipeline 2835. For example, the IO pipeline 2835 is generated to implement predicates of the CNF superset-guaranteeing expression 3110 via some or all features and/or functionality discussed in conjunction with FIGS. 28A-30. Row reads to segment storage system 2508 can include segments implementing same or different types of indexing structures. For example, the IO pipeline 2835 can be the same or different for different segments based on their respective indexes as discussed previously. The filtered record set of FIG. 30 can be implemented as resultant superset 3115 corresponding to the true resultant of the CNF superset-guaranteeing expression 3110.

In some embodiments, some or all filtering required to remove false-positive rows from the output of the CNF superset-guaranteeing expression 3110 is performed via additional operators upon the filtered output of the IO pipeline. Alternatively or in addition, some or all filtering required to remove false-positive rows from the output of the CNF superset-guaranteeing expression 3110 can be performed via filtering operators applied in the IO pipeline, where the IO pipeline further implements some or all additional filtering of the query expression beyond that achieved via the CNF superset-guaranteeing expression 3110.

FIGS. 32A-32G illustrate embodiments of a CNF superset-guaranteeing expression generating module 3128 utilized to generate CNF superset guaranteeing expressions 3110. Some or all features and/or functionality of CNF superset-guaranteeing expression generating module 3128 of FIGS. 32A-32G can be utilized to implement the CNF superset-guaranteeing expression generating module 3128 of FIG. 31A, the query expression processing module 2512 of FIG. 31A, and/or any other embodiment of query expression processing module 2512 discussed herein.

The CNF superset-guaranteeing expression generating module 3128 can be implemented via performing a CNF superset-guaranteeing expression generating function 3208 for multiple expression building parameters 3207.1-3207.G to render a set of G different CNF superset-guaranteeing sub-expressions 3111.1-3111.G.

CNF superset-guaranteeing sub-expressions 3111.1-3111.G can have the some or all properties of a CNF superset-guaranteeing expressions 3110, and different only in the sense that they are utilized to build a final CNF superset-guaranteeing expression 3110. Each CNF superset-guaranteeing sub-expressions 3111 can thus have a true resultant that is a proper superset of the query expression. Each CNF superset-guaranteeing sub-expressions 3111 can be in accordance with CNF. Each CNF superset-guaranteeing sub-expressions 3111 can have a different true resultant, for example, where set differences between each pair of true resultants of the set of G different CNF superset-guaranteeing sub-expressions 3111.1-3111.G is non-null. The value of G can be greater than or equal to two, and/or is optionally strictly greater than two.

The CNF superset-guaranteeing expression generating module 3128 can further be implemented based on performing a CNF superset-guaranteeing subexpression combining function 3209 to generate the CNF superset guaranteeing expressions 3110. The CNF superset-guaranteeing subexpression combining function 3209 can be performed based on performing combining the CNF superset guaranteeing expressions 3110 via a logical conjunction to guarantee maintaining of CNF form. The CNF superset-guaranteeing subexpression combining function 3209 can be performed to otherwise generate the superset guaranteeing expressions 3110 in accordance with CNF based on some or all of the superset-guaranteeing sub-expressions 3111.1-3111.G.

The true resultant of each CNF superset-guaranteeing sub-expressions 3111 can be a proper superset of the CNF superset-guaranteeing expression 3110. For example, any CNF superset-guaranteeing sub-expressions 3111 could be implemented as the CNF superset-guaranteeing expression 3110 on its own. However, to provide further filtering during TO while still guaranteeing a superset-guaranteeing expression, generating and combining multiple superset-guaranteeing sub-expressions 3111 to render a filtered superset-guaranteeing sub-expressions 3110 can be ideal in further increasing IO efficiency, while still enabling the query operator execution flow to be generated without an expensive conversion of the query expression into CNF. In some embodiments, different sets of expression building parameters are selected intelligently for different queries, where different corresponding types and/or numbers of CNF superset-guaranteeing sub-expressions 3111 are generated and combined for to implement the CNF superset-guaranteeing expression 3110 implemented to execute different query expressions.

Figure 32A:
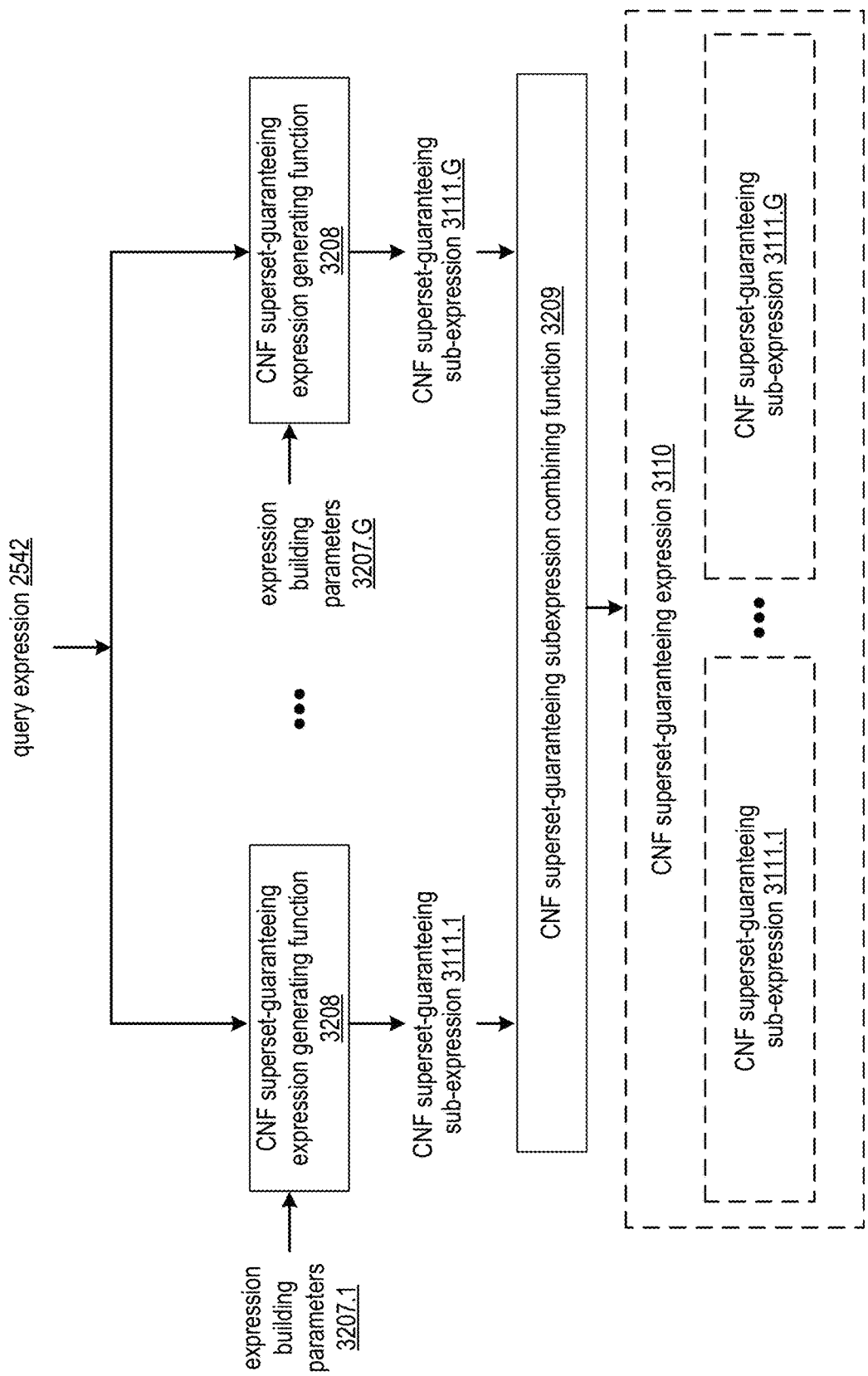
FIG. 32A is a schematic block diagram of an embodiment of a conjunctive normal form superset-guaranteeing expression generating module that generates multiple superset-guaranteeing sub-expressions in accordance with various embodiments.
Figure 32B:
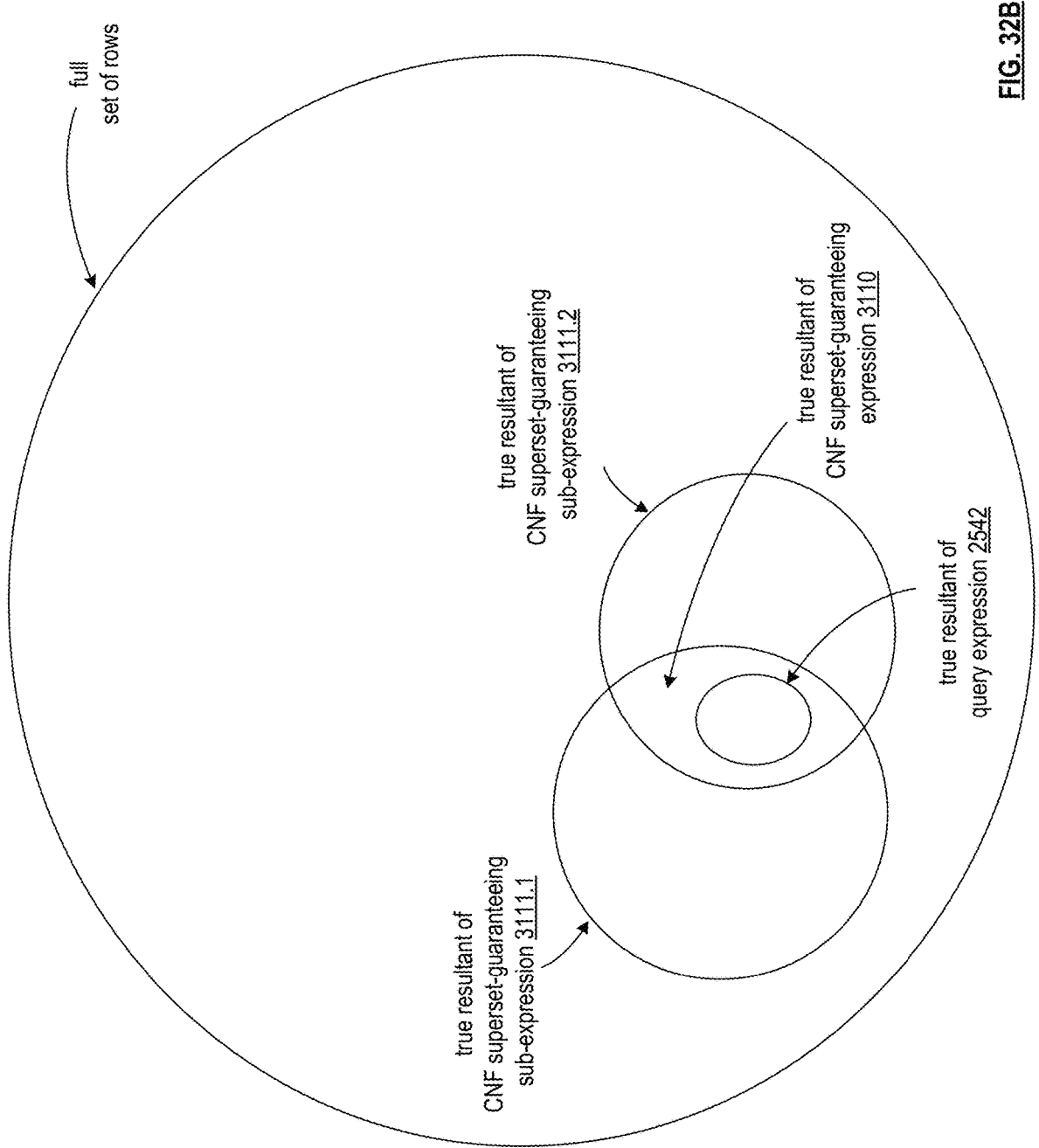
FIG. 32B illustrates the relationship between true resultants of a query expression, multiple superset-guaranteeing sub-expressions, and a superset-guaranteeing expression in accordance with various embodiments.

FIG. 32B illustrates an embodiment of the relationship between the true resultant of the given query expression, the full set of rows against which a query is executed, the true resultants of multiple CNF superset-guaranteeing sub-expressions 3111, and the true resultant of CNF superset-guaranteeing expression 3110 of FIG. 32A. As illustrated and discussed previously, all of the CNF superset-guaranteeing sub-expressions 3111 can be proper subsets of the full set of rows, and are optionally substantially smaller than the full set of rows. However, rather than applying one of the CNF superset-guaranteeing sub-expressions 3111 alone, a conjunction of the set of CNF superset-guaranteeing sub-expressions 3111 can be expressed in CNF form as a conjunction of CNF expressions to render the CNF superset-guaranteeing expression 3110. The true resultant of the CNF superset-guaranteeing expression 3110 can thus correspond to the intersection of the true resultants of the respective set of CNF superset-guaranteeing sub-expressions 3111. The true resultant of the query expression can be a proper subset of this intersection, and thus a proper subset of the true resultant of the CNF superset-guaranteeing expression 3110. While only two CNF superset-guaranteeing sub-expressions 3111 are illustrated in this example, the CNF superset-guaranteeing expression 3110 can correspond to the logical conjunction of more than two CNF superset-guaranteeing sub-expressions 3111, where the intersection of their respective set of their true resultants similarly render the true resultant of the CNF superset-guaranteeing expression 3110, and where this intersection is a proper superset of the true resultant of the given query expression.

In other embodiments, the true resultant of the query expression is equivalent to the intersection and is equivalent to the true resultant of the CNF superset-guaranteeing expression 3110. In such cases, the CNF superset-guaranteeing expression is logically equivalent with the query expression. In some embodiments, the query expression processing module 2512 is optionally not aware of whether the CNF superset-guaranteeing expression 3110 and original query expression 2542 are logically equivalent, and optionally performs filtering in accordance with the original query expression 2542 regardless of whether the CNF superset-guaranteeing expression 3110 is already guaranteed to produce the equivalent resultant or a proper superset of the resultant.

Figure 32C:
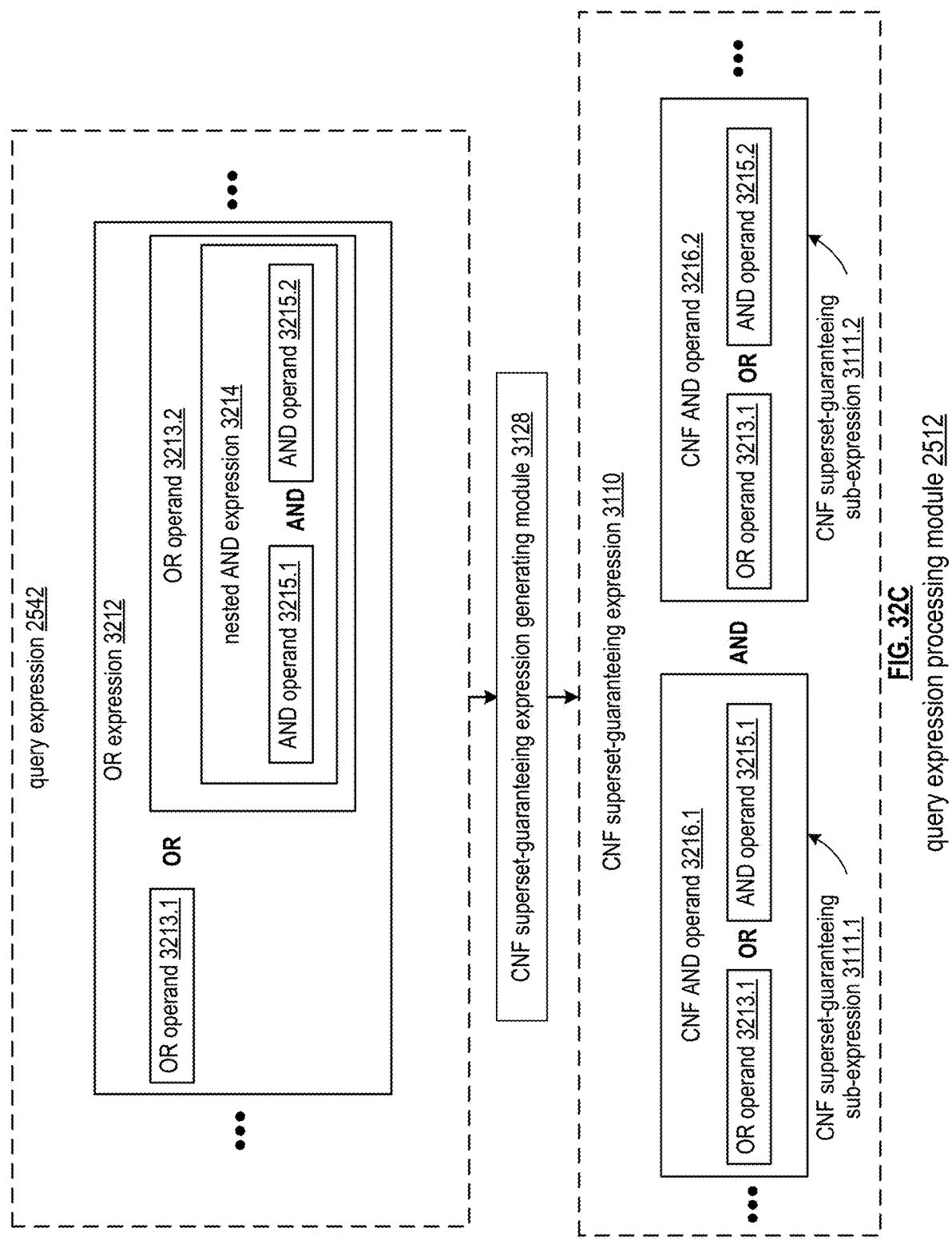
FIGS. 32C-32G are schematic block diagrams of example embodiments of a conjunctive normal form superset-guaranteeing expression generating module in accordance with various embodiments.

FIG. 32C illustrates an embodiment of a query expression processing module 2512 that implements a CNF superset-guaranteeing expression generating module 3128 that generates the CNF superset-guaranteeing expression 3110 as a logical conjunction of two sub-expressions 3111. The CNF superset-guaranteeing expression generating module 3128 of FIG. 32C can implement the CNF superset-guaranteeing expression generating module 3128 of FIG. 31A, FIG. 32A, and/or any CNF superset-guaranteeing expression generating module 3128 described herein.

A given query expression 2542 can include an OR expression 3212 having a pair of OR operands 3213.1 and 3213.2 upon which the corresponding disjunction is to be performed. One of the OR operands 3213 can include a nested AND expression 3214, which can include its own set of AND operands 3215.1 and 3215.2. These operands can be implemented as simple predicates and/or as further complex predicates containing additional operators, such as additional AND and/or OR operators. The given query expression 2542 can be in a form that is not CNF as illustrated in FIG. 32C. The given query expression 2542 can be in a form that is not DNF, for example, where the OR expression 3212 is nested within an AND expression.

The CNF superset-guaranteeing expression generating module 3128 can generate the corresponding CNF superset-guaranteeing expression 3110 as a conjunction of two CNF superset-guaranteeing sub-expressions 3111.1 and 3111.2, thus implemented as an AND expression having two AND operands 3216.1 and 3216.2 in CNF form. The CNF superset-guaranteeing sub-expressions 3111.1 can be generated to include the OR operand 3213.1 and only one AND operand 3215.1 of the nested AND expression of the OR operand 3213.2, dropping the respective AND operator and rendering an expression in CNF form, for example, assuming there are no additional nested AND operators and/or where additional AND operators nested within any OR operators are similarly reduced to only one of their operands. The CNF superset-guaranteeing sub-expressions 3111.2 can similarly be generated to include the OR operand 3213.1 and only the other AND operand 3215.2 of the nested AND expression of the OR operand 3213.2, again dropping the respective AND operator and rendering an expression in CNF form, for example, assuming there are no additional nested AND operators and/or where additional AND operators nested within any OR operators are similarly reduced to only one of their operands. The conjunction between these two CNF sub-expression is a CNF expression itself and is guaranteed to be a subset of each CNF sub-expression 3111.

Figure 32D:
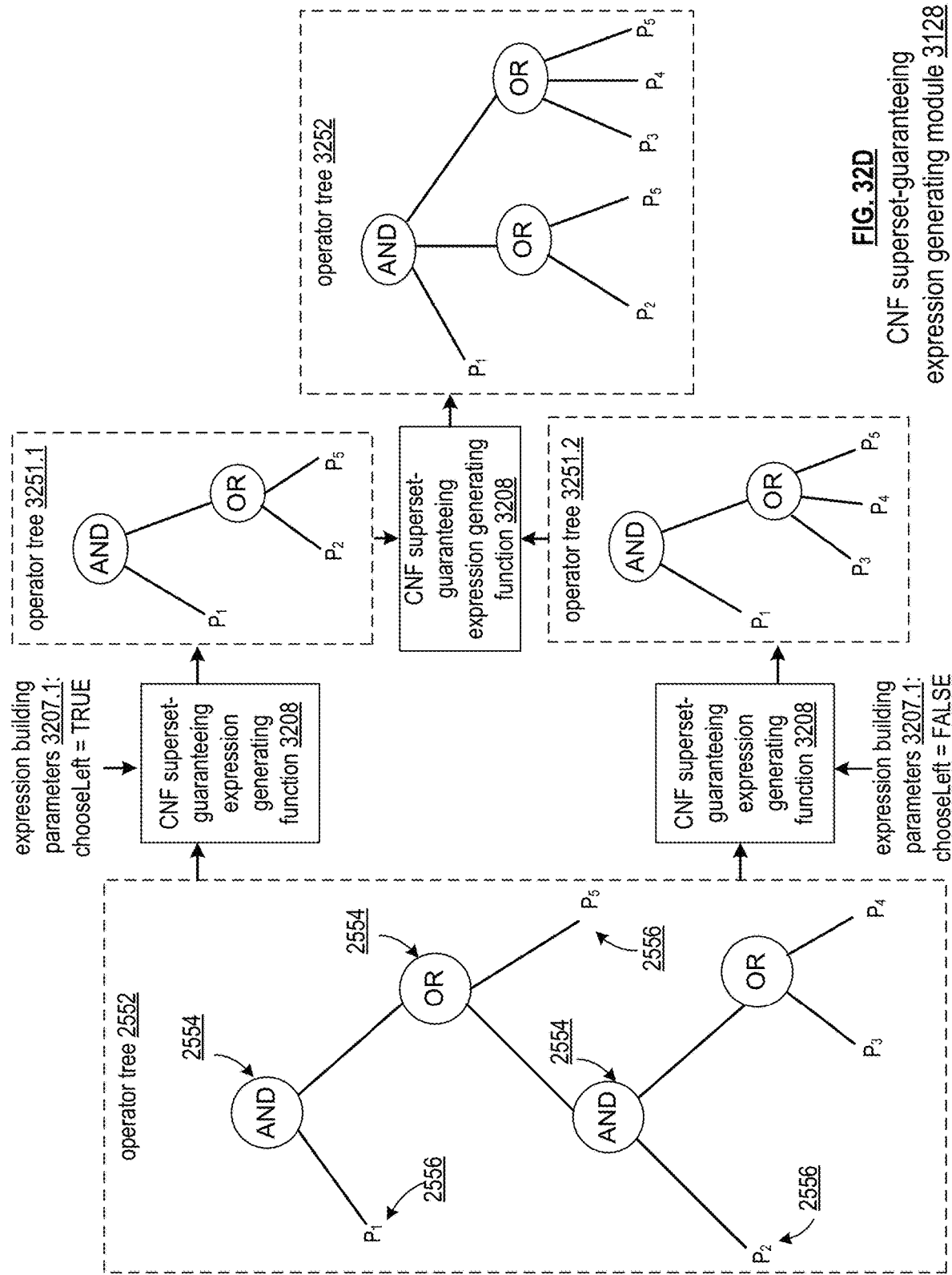

FIG. 32D illustrates an embodiment of the CNF superset-guaranteeing expression generating module 3128 that implements the functionality described in conjunction with FIG. 32C. An operator tree 2552 can be formed from the query expression 2542, for example, via an operator tree generating module 2552 as discussed previously. This can optionally include generating the operator tree based on pushing negations to leaves of the operator tree in accordance with De Morgan's law as discussed previously and/or where the leaves include only simple predicates as discussed previously. Alternatively, the depicted operator tree serves to illustratively depict the functionality of the CNF superset-guaranteeing expression generating module 3128, where no tree-based data structure is generated or processed.

The expression building parameter 3207.1 applied to generate the first CNF superset-guaranteeing sub-expression 3111.1 can utilize a Boolean parameter set to TRUE, while the expression building parameter 3207.1 applied to generate the second CNF superset-guaranteeing sub-expression 3111.2 can utilize this Boolean parameter set to FALSE. The corresponding CNF superset-guaranteeing expression generating function 3208 can utilize this Boolean parameter input to generate two different CNF superset-guaranteeing sub-expressions accordingly based on whether the Boolean parameter is set to TRUE or FALSE.

In some embodiments, the CNF superset-guaranteeing expression generating function 3208 can be implemented as a recursive function applied to operator tree 2552, where the nodes of the tree are traversed and the Boolean parameter is passed accordingly.

As a particular example, the Boolean parameter corresponds to variable denoting whether the left or right branch (or operand) of an AND operator that is nested within an OR operator be utilized in the resulting expression (e.g. a "choose left" Boolean variable). When this condition occurs, (e.g., when recursively traversing through the tree staring from the root node and encountering an AND after encountering an OR), the super-set guaranteeing sub-expression is built based on either choosing the left branch, or right branch, depending on whether the Boolean parameter is set to TRUE or FALSE. The remainder of the expression can be built from the given expression directly.

Performing a CNF superset-guaranteeing expression generating function 3208 implemented as a recursive function can include recursively calling the function, starting at the root node, and propagating to the leaf nodes, passing the same "choose left" Boolean parameter. If an OR operator has not yet been encountered, and an AND is encountered (e.g. the AND is not nested within an OR), the conjunction of calling "the recursive function" on both sides is returned (e.g. the AND is acceptable in generating a CNF expression because it is not nested within an OR operator). If an OR operator is encountered, the disjunction of calling "the recursive function" on both sides is returned (e.g. the OR is acceptable in generating a CNF expression because it is not nested within an OR operator). The encountering of this OR operator can be passed as an additional Boolean variable and/or flag, utilized to determine if an encountered AND operator is within an OR. If a simple Boolean condition/ simple predicate is encountered (e.g. a simple Boolean with no ANDs or ORs, the simple predicate is returned).

When an AND operator is encountered, and when an OR operator has already been encountered (e.g. the AND is nested within the OR as a child node), the recursive function is called for only one side (rather than returning a conjunction for the function call on both sides). When "choose left" is TRUE, only the left side is called, and when "choose left" is FALSE, only the right side is called.

As illustrated in the example of FIG. 32D, operator trees 3251.1 and 3252.2 are built as, or are otherwise illustrated to visually depict, the superset-guaranteeing sub-expressions 3111.1 and 3111.2, respectively. The operator trees 3251.1 built given expression building parameter 3207.1 with this "choose left" Boolean parameter set to TRUE results in the operator tree 3251.1 being built directly from the operator tree 2552 until the AND operator nested within the OR operator is encountered. The left branch extending from this AND operator is selected as the child of the OR node, replacing the and operator and its respective branches. The operator tree 3251.1 is thus in accordance with CNF based on removal of the AND operator, and also guarantees that all rows satisfying the original query expression will be included in its resultant (in addition to rows satisfying predicate $p_2$, but not satisfying $p_3$ or $p_4$, which would not satisfy the original query expression).

The operator trees 3251.2 built given expression building parameter 3207.2 with this "choose left" Boolean parameter set to FALSE results in the operator tree 3251.1 being built directly from the operator tree 2552 until the AND operator nested within the OR operator is encountered. The right branch extending from this AND operator is selected as the child of the OR node, replacing the and operator and its respective branches. The operator tree 3251.2 is thus in accordance with CNF based on removal of the AND operator, and also guarantees that all rows satisfying the original query expression will be included in its resultant (in addition to rows satisfying predicate $p_3$ or $p_4$, but not satisfying $p_2$, which would not satisfy the original query expression).

The CNF superset-guaranteeing expression generating function 3208 combines these resulting operator trees by applying a logical conjunction to the corresponding expressions, which still renders a query expression in CNF that guarantees all rows satisfying the original query expression will be included in its resultant.

Note that while operators in the operator tree are depicted to include more than two branches, other embodiments can be implemented where only two branches are included (e.g. splitting an AND into multiple AND operators and/or splitting an OR operator into multiple OR operators).

In embodiments where multiple nested ANDs persists, all instances can be removed via the recursive function only returning one respective side—either the left or right. This can include returning a single simple predicate when choosing left multiple times in succession. For example, choose left is TRUE, and an OR branch includes a first nested AND operator, which includes a further nested AND operator somewhere in its left branch. Only the result of the recursive function applied to only the left branch of the further nested AND operator is thus returned. Such an embodiment is illustrated and discussed in conjunction with FIG. 32F.

As another example, choose left is TRUE, and an OR branch includes a first nested AND operator on its right branch, and a second AND operator in its left branch. The resulting expression can thus include the disjunction of the simple predicate on the left branch of the first nested AND operator with the simple predicate of the left branch of the second nested AND operator. The result of the recursive function applied to only the left branch of the further nested AND operator is thus returned. Such an embodiment is discussed in conjunction with FIG. 32G.

This mechanism for generating CNF superset-guaranteeing expressions 3110 and/or 3111 thus meets the requirements illustrated and discussed in conjunction with FIGS. 31A-31D and FIGS. 32A-32B. In other embodiments, other types of mechanisms of generating CNF expressions that are supersets of a given expression that is not in CNF and/or not in DNF, without conversion of the expression into CNF, can be implemented (e.g. alternate between choosing left and right, other combinations of choosing left and right, generating and performing conjunction upon more than two sub-expressions 3111, etc.)

Figure 32E:
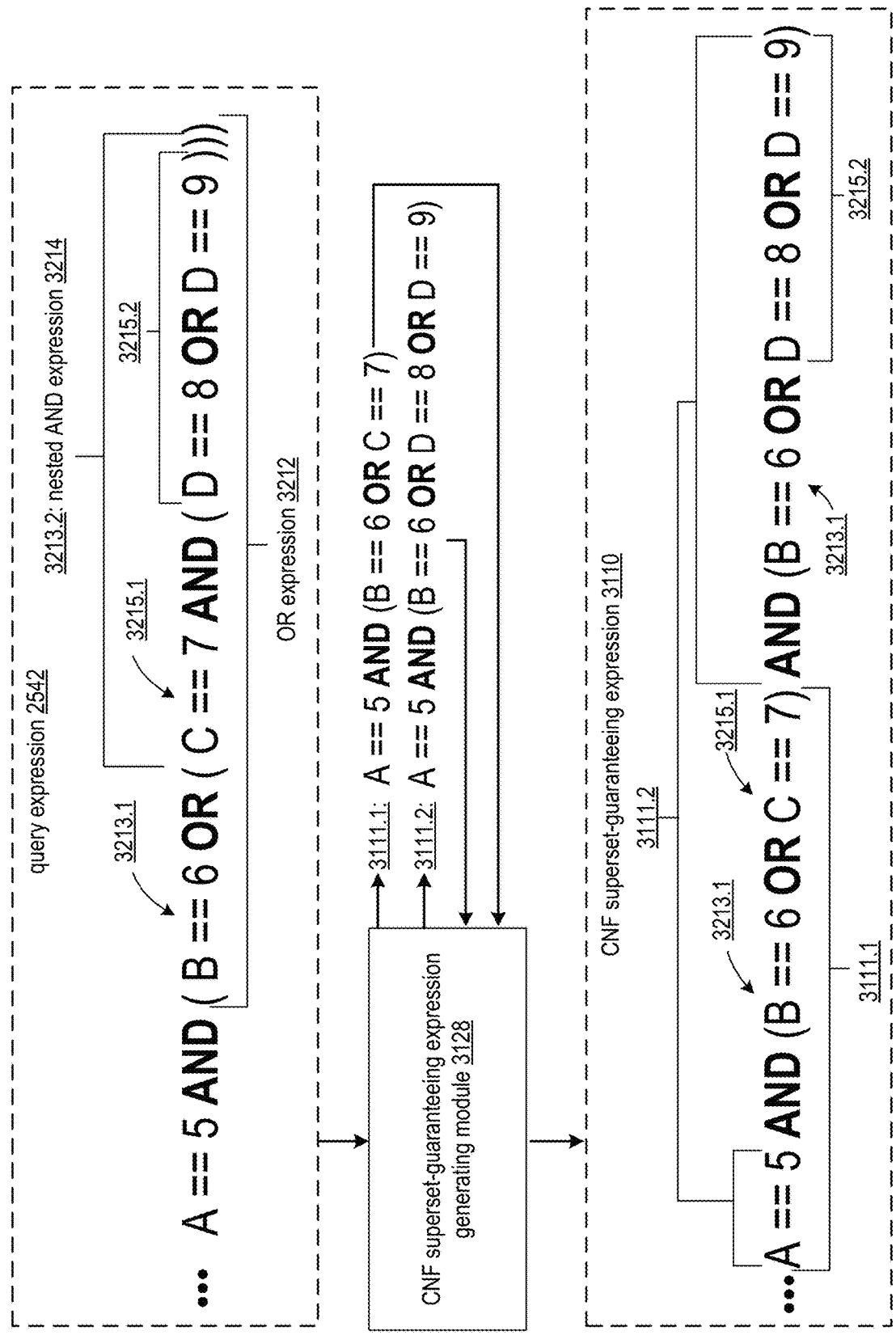

FIG. 32E illustrates an embodiment of a query expression generating module 2512 generating an example superset-guaranteeing expressions 3110 from an example query expression. Some or all features and/or functionality of the query expression generating module 2512 of FIG. 32E can implement a query expression generating module 2512 of FIG. 32C. The example superset-guaranteeing expressions 3110 can optionally be generated via some or all features and/or functionality of FIG. 32D.

In particular, the predicate of an example query expression 2542 includes:

$A==5$ AND ($B==6$ OR ($C==7$ AND ($D==8$ OR $D==9$)))

For example, A, B, C, and D are column names of columns of a dataset against which a corresponding query is performed. This predicate can be included in a WHEREIN clause of a SQL query, or can otherwise indicate all the conditions upon which rows be returned or further processed.

The first superset-guaranteeing sub-expressions 3111.1 can be generated via the first expression building parameter 3207 of the CNG superset-guaranteeing expression generating function 3208 (e.g. with "choose left" equal to TRUE), resulting in the expression A==5 AND (B==6 OR C==7). In particular, upon reaching the nested AND, only the left operand was selected for inclusion, where the right operand was not included.

The second superset-guaranteeing sub-expressions 3111.2 can be generated via the first expression building parameter 3207 of the CNG superset-guaranteeing expression generating function 3208 (e.g. with "choose left" equal to FALSE), resulting in the expression A==5 AND (B==6 OR D==8 OR D==9). In particular, upon reaching the nested AND, only the right operand was selected for inclusion, where the left operand was not included.

The CNF superset-guaranteeing expression generating module 3128 applies a conjunction to the superset guaranteeing sub-expressions 3111.1 and 3111.2 to render a superset-guaranteeing expression 3110 in accordance with CNF:

$$A==5 \text{ AND } (B==6 \text{ OR } C==7) \text{ AND } (B==6 \text{ OR } D==8 \text{ OR } D==9)$$

Note that the superset-guaranteeing expression 3110 can be logically equivalent with the query expression 2542. However, equivalence is not guaranteed, and/or the query expression processing module 2512 is optionally not aware of whether the superset-guaranteeing expression 3110 is logically equivalent with the query expression 2542, and presumes that the superset-guaranteeing expression 3110 renders a superset requiring further filtering.

Figure 32F:
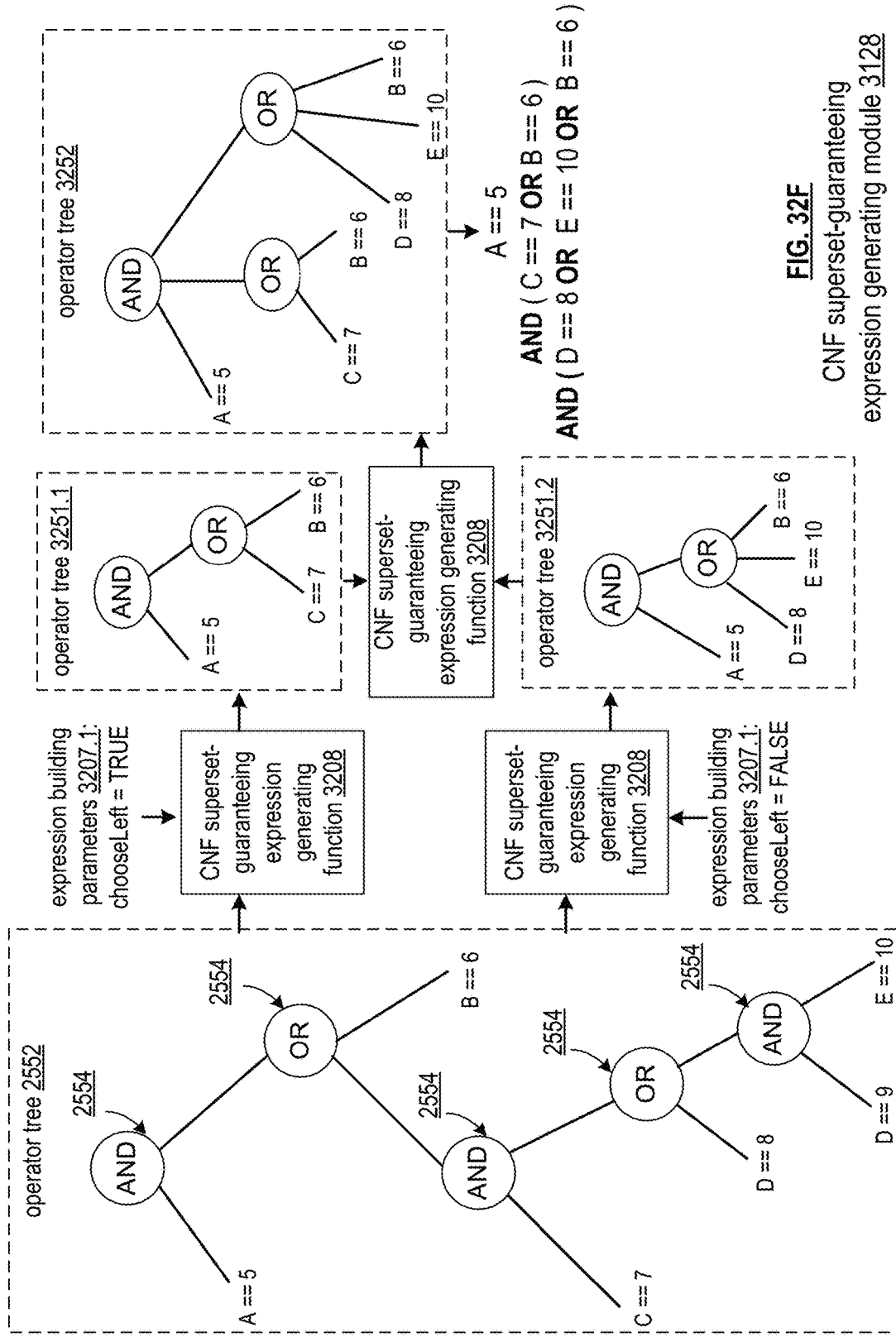

FIG. 32F presents another example processing of another example query expression via the processing discussed in conjunction with FIG. 32C and/or FIG. 32D. In particular, the predicate of an example query expression 2542 includes:

$$A==5 \text{ AND } ((C==7 \text{ AND } (D==8 \text{ OR } (D==9 \text{ AND } E==10))) \text{ OR } B==6)$$

For example, A, B, C, D, and E are column names of columns of a dataset against which a corresponding query is performed. This predicate can be included in a WHEREIN clause of a SQL query, or can otherwise indicate all the conditions upon which rows be returned or further processed. In this example, two nested AND operators are included in the query expression, where a first nested AND includes a second nested AND within one of its operands.

The first superset-guaranteeing sub-expressions 3111.1 can be generated via the first expression building parameter 3207 of the CNG superset-guaranteeing expression generating function 3208 (e.g. with "choose left" equal to TRUE), resulting in the expression A==5 AND (C==7 OR B==6). In particular, upon reaching the first nested AND, only the left operand was selected for inclusion, where the right operand of the first nested AND was not included. Thus, the second nested AND is never reached for this sub-expression.

The second superset-guaranteeing sub-expressions 3111.2 can be generated via the first expression building parameter 3207 of the CNG superset-guaranteeing expression generating function 3208 (e.g. with "choose left" equal to FALSE), resulting in the expression A==5 AND (D==8 OR E==10 OR B==6). In particular, upon reaching the first nested AND, only the right operand was selected for inclusion. At the following OR, both sides were returned. However, at the second nested AND within this first nested AND, only the right side is returned.

The CNF superset-guaranteeing expression generating module 3128 applies a conjunction to the superset guaranteeing sub-expressions 3111.1 and 3111.2 to render a superset-guaranteeing expression 3110 in accordance with CNF:

$$A==5 \text{ AND } (C==7 \text{ OR } B==6) \text{ AND } (D==8 \text{ OR } E==10 \text{ OR } B==6)$$

In this example, the superset-guaranteeing expression 3110 is not logically equivalent with the query expression 2542. For example, consider an example row having A==5, B==2, C==7, D==9, and E 12. This example row satisfies the superset-guaranteeing expression 3110 based on satisfying the first conjunction condition with A==5, the second conjunction condition with C==7, and the third conjunction condition with D==9. However, this example row does not satisfy the original query expression based on B !=6, D !=8, and E !=10. Rows such as this example row can be filtered out, for example after some or all IO operators are performed to implement the superset-guaranteeing expression 3110 as discussed previously.

Figure 32G:
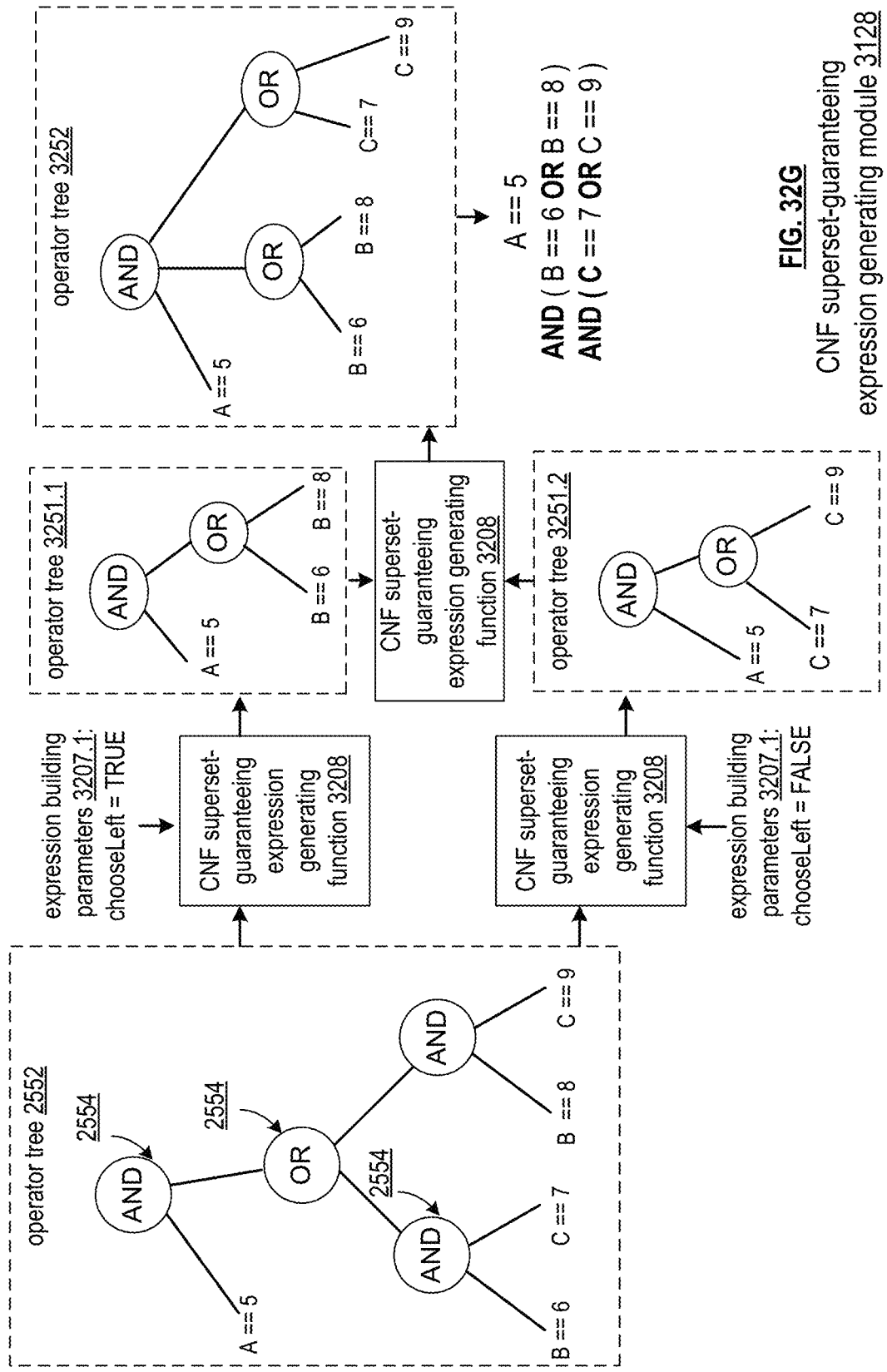

FIG. 32G presents another example processing of another example query expression via the processing discussed in conjunction with FIG. 32C and/or FIG. 32D. In particular, the predicate of an example query expression 2542 includes:

$$A==5 \text{ AND } ((B==6 \text{ AND } C==7) \text{ OR } (B==8 \text{ AND } C==9))$$

For example, A, B, and C are column names of columns of a dataset against which a corresponding query is performed. This predicate can be included in a WHEREIN clause of a SQL query, or can otherwise indicate all the conditions upon which rows be returned or further processed. In this example, two nested AND operators are included in the query expression, where a first nested AND a second nested AND are included within two different operands of a given OR operator.

The first superset-guaranteeing sub-expressions 3111.1 can be generated via the first expression building parameter 3207 of the CNG superset-guaranteeing expression generating function 3208 (e.g. with "choose left" equal to TRUE), resulting in the expression A==5 AND (C==7 OR B==6). In particular, upon reaching the first nested AND of the OR operator, only the left operand was selected for inclusion, where the right operand was not included. Upon reaching the second nested AND on the OR operator, only the left operand was selected for inclusion, where the right operand was again not included.

The second superset-guaranteeing sub-expressions 3111.2 can be generated via the first expression building parameter 3207 of the CNG superset-guaranteeing expression generating function 3208 (e.g. with "choose left" equal to FALSE), resulting in the expression A==5 AND (D==8 OR E==10 OR B==6). In particular, upon reaching the first nested AND of the OR operator, only the right operand was selected for inclusion, where the left operand was not included. Upon reaching the second nested AND on the OR operator, only the right operand was selected for inclusion, where the left operand was again not included.

The CNF superset-guaranteeing expression generating module 3128 applies a conjunction to the superset guaranteeing sub-expressions 3111.1 and 3111.2 to render a superset-guaranteeing expression 3110 in accordance with CNF:

$$A==5 \text{ AND } (B==6 \text{ OR } B==8) \text{ AND } (C==7 \text{ OR } C==9)$$

In this example, the superset-guaranteeing expression 3110 is not logically equivalent with the query expression 2542. For example, consider an example row having A==5, B==6, and C==9. This example row satisfies the superset-guaranteeing expression 3110 based on satisfying the first conjunction condition with A==5, the second conjunction condition with B 6, and the third conjunction condition with C==9. However, this example row does not satisfy the original query expression based on meeting neither requirement that B==6 and C==7, or that B==8 and C==9. Rows such as this example row can be filtered out, for example after some or all IO operators are performed to implement the superset-guaranteeing expression 3110 as discussed previously.

The query processing system 2802 of FIGS. 31A-32G can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the query processing system 2802 of FIGS. 31A-32I can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the query expression processing module 2512 and/or the operator processing module 2435 at a massive scale.

The execution of query operator execution flow by the operator processing module 2435 cannot practically be performed by the human mind, particularly when the database system 10 is implemented to store and perform queries against records at a massive scale as discussed previously. In particular, the human mind is not equipped to execute queries via query operator execution flows for millions, billions, and/or trillions of records stored as many Terabytes, Petabytes, and/or Exabytes of data. Furthermore, the human mind is not equipped to distribute and perform query executions as multiple independent processes, such as hundreds, thousands, and/or millions of independent processes, in parallel and/or within overlapping time spans. The query processing system 2802 of FIGS. 31A-32G can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the query processing system 2802 of FIGS. 31A-32I can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the query expression processing module 2512 and/or the operator processing module 2435 at a massive scale.

The execution of query operator execution flow by the operator processing module 2435 cannot practically be performed by the human mind, particularly when the database system 10 is implemented to store and perform queries against records at a massive scale as discussed previously. In particular, the human mind is not equipped to execute queries via query operator execution flows for millions, billions, and/or trillions of records stored as many Terabytes, Petabytes, and/or Exabytes of data. Furthermore, the human mind is not equipped to distribute and perform query executions as multiple independent processes, such as hundreds, thousands, and/or millions of independent processes, in parallel and/or within overlapping time spans.

Figure 32H:
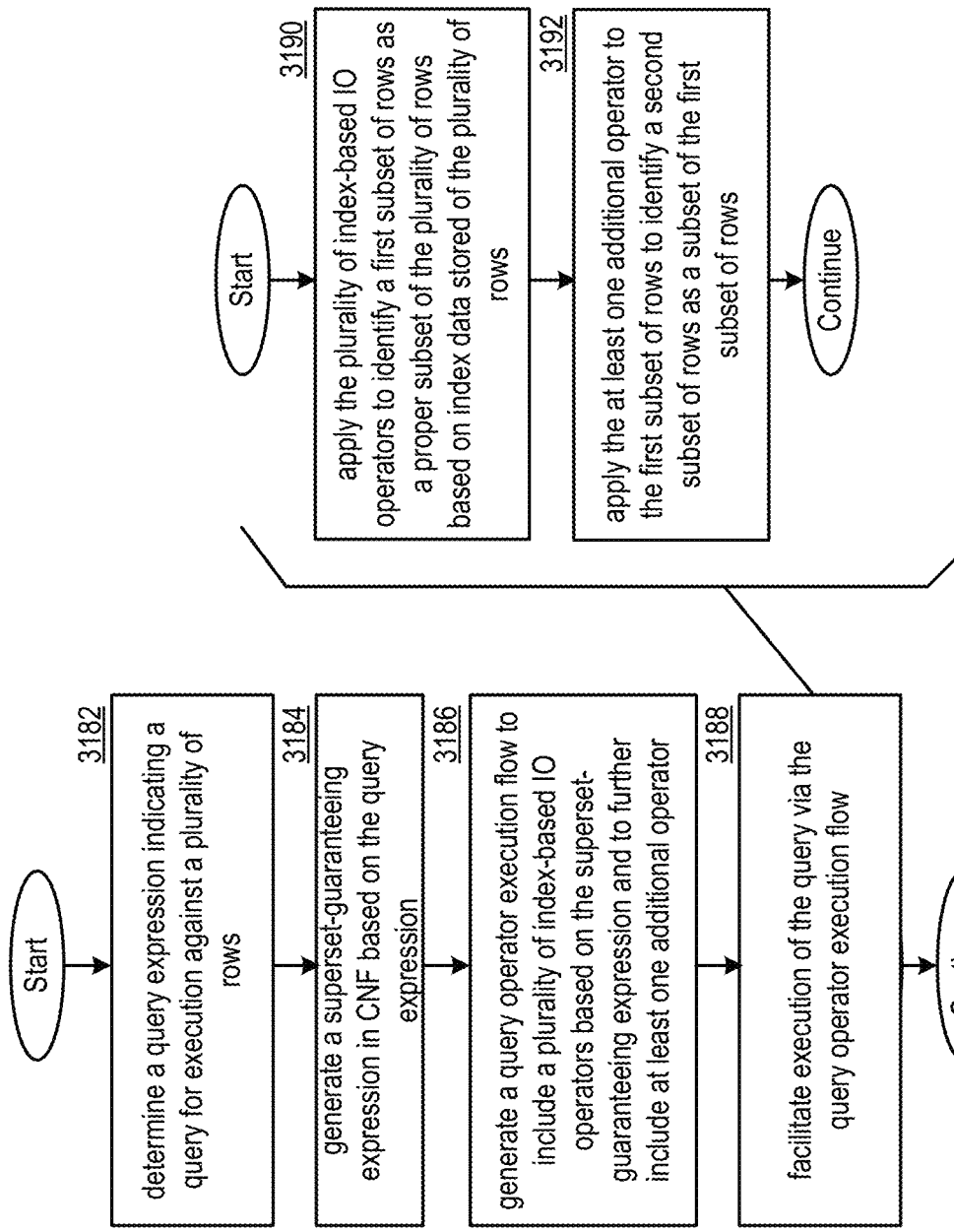
FIG. 32H is a logic diagram illustrating a method for execution in accordance with various embodiments.

FIG. 32H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32H. In particular, a node 37 can utilize the query processing module 2435 to execute some or all of the steps of FIG. 32H, where multiple nodes 37 implement their own query processing modules 2435 to independently execute the steps of FIG. 32H, for example, to facilitate execution of a query as participants in a query execution plan 2405. Some or all of the method of FIG. 32H can be performed by the query processing system 2802, for example, by utilizing an execution flow generating module 2525 and/or an operator processing module 2435. In particular, some or all of the method of FIG. 32H can be performed by the IO pipeline generator module 2834 and/or the IO operator execution module 2840. Some or all of the method of FIG. 32H can be performed via communication with and/or access to a segment storage system 2508, such as memory drives 2425 of one or more nodes 37. Some or all of the steps of FIG. 32H can optionally be performed by any other processing module of the database system 10.

Some or all of the steps of FIG. 32H can be performed to implement some or all of the functionality of the query processing module 2802 as described in conjunction with FIGS. 31A-31D. Some or all of the steps of FIG. 32H can be performed to implement some or all of the functionality regarding execution of a query via the plurality of nodes in the query execution plan 2405 as described in conjunction with FIGS. 24A-24E. Some or all steps of FIG. 32H can be performed by database system 10 in accordance with other embodiments of the database system 10 and/or nodes 37 discussed herein. Some or all steps of FIG. 32H can be performed in conjunction with some or all steps of FIG. 25E, FIG. 26D, FIG. 27B, FIG. 28D, and/or FIG. 29B.

Step 3182 includes determining a query expression indicating a query for execution against a plurality of rows. Step 3184 includes generating a superset-guaranteeing expression in CNF based on the query expression. Step 3186 includes generating a query operator execution flow to include a plurality of index-based IO operators based on the superset-guaranteeing expression and to further include at least one additional operator. Step 3188 includes facilitating execution of the query via the query operator execution flow.

Performing step 3188 can include performing step 3190 and/or step 3192. Step 3190 includes applying the plurality of index-based IO operators to identify a first subset of rows as a proper subset of the plurality of rows based on index data stored of the plurality of rows. Step 3192 includes applying the at least one additional operator to the first subset of rows to identify a second subset of rows as a proper subset of the first subset of rows.

In various embodiments, the superset-guaranteeing expression is not logically equivalent to the query expression, and the second subset of rows is a proper subset of the first subset of rows. In various embodiments, the superset-guaranteeing expression is logically equivalent to the query expression, and the second subset of rows is equivalent to the first subset of rows.

In various embodiments, the query operator execution flow is in accordance with a non-normalized form that is neither CNF nor disjunctive normal form (DNF) based on the query expression being in neither CNF nor DNF.

In various embodiments, generating the query operator execution flow to include the plurality of index-based IO operators is further based on utilizing a plurality of operands of an AND operator being implemented as a root operator of an operator tree generated for the query expression.

In various embodiments, generating the superset-guaranteeing expression includes generating a plurality of superset-guaranteeing sub-expressions based on the query expression. Each of the plurality of superset-guaranteeing sub-expressions is non-equivalent with all other ones of the plurality of superset-guaranteeing sub-expressions. Each of the plurality of superset-guaranteeing sub-expressions can have a corresponding true resultant that is a proper superset of the of the true resultant of the superset-guaranteeing expression. In various embodiments, generating the superset-guaranteeing expression further includes conjunctively combining the plurality of superset-guaranteeing sub-expressions. In various embodiments, each of the plurality of superset-guaranteeing sub-expressions are in CNF. In various embodiments, generating the plurality of superset-guaranteeing sub-expressions includes performing a recursive function upon an operator tree generated from the query expression.

In various embodiments, generating each of the plurality of superset-guaranteeing sub-expressions includes identifying a nested AND expression within an operand of an OR expression of the query expression; selecting one of a plurality of operands of the nested AND expression for inclusion in the each of the plurality of superset-guaranteeing sub-expressions; and/or removing all other ones of the plurality of operands of the nested AND expression from the query expression to generate the each of the plurality of superset-guaranteeing sub-expressions. In various embodiments, generating a first one of the plurality of superset-guaranteeing sub-expressions includes selecting a first operand of the nested AND expression for inclusion in the first one of the plurality of superset-guaranteeing sub-expressions. Generating a second one of the plurality of superset-guaranteeing sub-expressions includes selecting a second operand of the nested AND expression for inclusion in the second one of the plurality of superset-guaranteeing sub-expressions.

In various embodiments, generating the superset-guaranteeing expression in CNF includes removing at least one nested AND expression within at least one operand of at least one OR expression of the query expression from the query expression. In various embodiments, the superset-guaranteeing expression includes no nested AND expressions within any operands of any OR expression.

In various embodiments, the at least one additional operator includes a plurality of parallel sub-flows of the query operator execution flow and/or at least one serialized set of multiple operators within at least one of the plurality of parallel sub-flows.

In various embodiments, applying the at least one additional operator to the first subset of rows to identify a second subset of rows as a proper subset of the first subset of rows includes: assigning each of the first subset of rows an appended identifier by applying an identifier appending operator; generating a plurality of duplicates of the first subset of rows by applying a tee operator; processing each of the plurality of duplicates of the first subset of rows applying each of a plurality of parallel sub-flows; and/or applying a union distinct operator to remove all remaining duplicated ones the plurality of rows outputted by the plurality of parallel sub-flows based on the appended identifiers.

In various embodiments, a query processing system includes at least one processor, and memory that stores executable instructions. The executable instructions, when executed by the at least one processor, can cause the query processing system to: determine a query expression indicating a query for execution against a plurality of rows; generate a superset-guaranteeing expression as a conjunctive normal form (CNF) predicate that is non-equivalent to the query expression; generate a query operator execution flow to include a plurality of index-based IO operators based on the superset-guaranteeing expression and to further include at least one additional operator; and/or facilitate execution of the query. Facilitating execution of the query can include: applying the plurality of index-based IO operators to identify a first subset of rows as a proper subset of the plurality of rows based on index data stored of the plurality of rows, where the first subset of rows corresponds to a true resultant of the superset-guaranteeing expression, and where the first subset of rows corresponds to a superset of a true resultant of the query expression; and/or applying the at least one additional operator to the first subset of rows to identify a second subset of rows as a proper subset of the first subset of rows, where the second subset of rows corresponds to the true resultant of the query expression.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

Figure 32I:
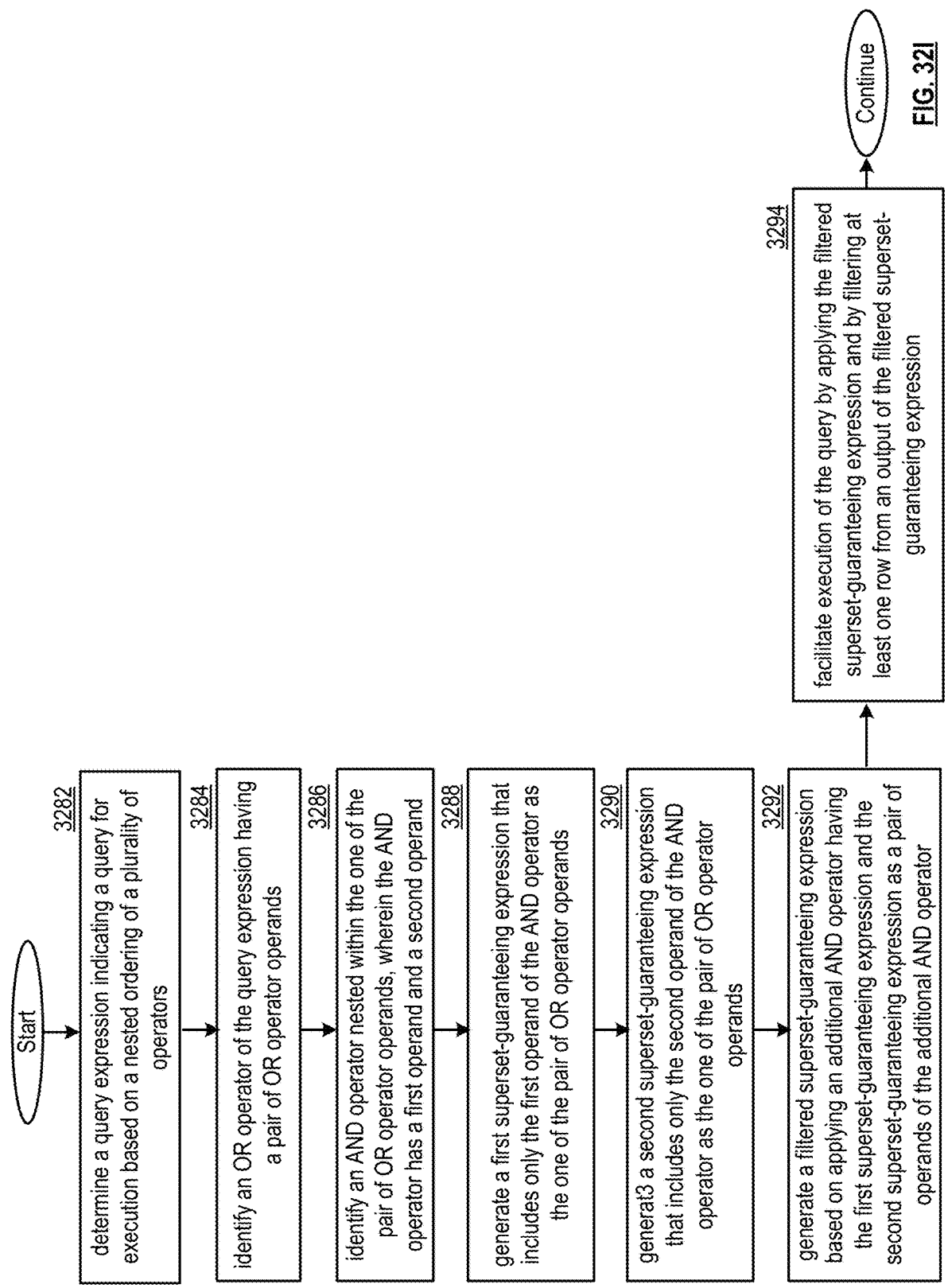
FIG. 32I is a logic diagram illustrating a method for execution in accordance with various embodiments.

FIG. 32I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32I. In particular, a node 37 can utilize the query processing module 2435 to execute some or all of the steps of FIG. 32I, where multiple nodes 37 implement their own query processing modules 2435 to independently execute the steps of FIG. 32I, for example, to facilitate execution of a query as participants in a query execution plan 2405. Some or all of the method of FIG. 32I can be performed by the query processing system 2802, for example, by utilizing an execution flow generating module 2525 and/or an operator processing module 2435. In particular, some or all of the method of FIG. 32I can be performed by the IO pipeline generator module 2834 and/or the IO operator execution module 2840. Some or all of the method of FIG. 32I can be performed via communication with and/or access to a segment storage system 2508, such as memory drives 2425 of one or more nodes 37. Some or all of the steps of FIG. 32I can optionally be performed by any other processing module of the database system 10.

Some or all of the steps of FIG. 32I can be performed to implement some or all of the functionality of the query processing system 2802 as described in conjunction with FIGS. 32A-32G. Some or all of the steps of FIG. 32I can be performed to implement some or all of the functionality regarding execution of a query via the plurality of nodes in the query execution plan 2405 as described in conjunction with FIGS. 24A-24E. Some or all steps of FIG. 32I can be performed by database system 10 in accordance with other embodiments of the database system 10 and/or nodes 37 discussed herein. Some or all steps of FIG. 32I can be performed in conjunction with some or all steps of FIG. 25E, FIG. 26D, FIG. 27B, FIG. 28D, FIG. 29B, and/or FIG. 32H.

Step 3282 includes determining a query expression indicating a query for execution based on a nested ordering of a plurality of operators. Step 3284 includes identifying an OR operator of the query expression having a pair of OR operator operands. Step 3286 includes identifying an AND operator nested within the one of the pair of OR operator operands, where the AND operator has a first operand and a second operand. Step 3288 includes generating a first superset-guaranteeing expression that includes only the first operand of the AND operator as the one of the pair of OR operator operands. Step 3290 includes generating a second superset-guaranteeing expression that includes only the second operand of the AND operator as the one of the pair of OR operator operands.

Step 3292 includes generating a filtered superset-guaranteeing expression based on applying an additional AND operator having the first superset-guaranteeing expression and the second superset-guaranteeing expression as a pair of operands of the additional AND operator. Step 3294 includes facilitating execution of the query by applying the filtered superset-guaranteeing expression and by filtering at least one row from an output of the filtered superset-guaranteeing expression. In various embodiments, facilitating execution of the query includes accessing index data for a plurality of rows based on the filtered superset-guaranteeing expression.

For example, the first superset-guaranteeing expression and the second superset-guaranteeing expression are two different CNF superset guaranteeing sub-expressions 3111 generated from the query expression, where the filtered superset-guaranteeing expression is implemented as a CNF superset-guaranteeing expression 3110 generated from the first superset-guaranteeing expression and the second superset-guaranteeing expression.

In various embodiments, the method further includes performing a recursive process to identify the OR operator, identify the AND operator, generate the first superset-guaranteeing expression and generate the second superset-guaranteeing expression that includes only the second operand of the AND operator as the one of the pair of OR operator operands. In various embodiments, performing the recursive process includes passing a Boolean variable while traversing an operator tree corresponding to the query expression, where the first superset-guaranteeing expression is generated based on the Boolean value being set to a first one of a pair of values, and where the first superset-guaranteeing expression is generated based on the Boolean value being set to a second one of a pair of values.

In various embodiments, generating the first superset-guaranteeing expression includes selecting only a left operand for each of a set of AND operates operator nested within the one of the pair of OR operator operands. In various embodiments, generating the first superset-guaranteeing expression includes selecting only a right operand for each of a set of AND operates operator nested within the one of the pair of OR operator operands.

In various embodiments, generating the first superset-guaranteeing expression includes removing the AND operator from the first operand of the query expression, where the first superset-guaranteeing expression includes no AND operators nested within any operands of any OR operators. In various embodiments, generating the second superset-guaranteeing expression includes removing the AND operator from the first operand of the query expression, where the second superset-guaranteeing expression includes no AND operators nested within any operands of any OR operators.

In various embodiments, the true resultant of the filtered superset-guaranteeing expression is a proper subset of the true resultant of the first superset-guaranteeing expression. In various embodiments, the true resultant of the filtered superset-guaranteeing expression is a proper subset of the true resultant of the second superset-guaranteeing expression. In various embodiments, the true resultant of the query expression is a proper superset of the true resultant of the first superset-guaranteeing expression, and where the true resultant of the query is a proper super of the true resultant of the second superset-guaranteeing expression. In various embodiments, the true resultant of the first superset-guaranteeing expression is non-equivalent to a true resultant of the second superset-guaranteeing expression.

In various embodiments, a query processing system includes at least one processor, and memory that stores executable instructions. The executable instructions, when executed by the at least one processor, can cause the query processing system to: determine a query expression indicating a query for execution based on a nested ordering of a plurality of operators; identify an OR operator of the query expression having a pair of OR operator operands; identify an AND operator nested within the one of the pair of OR operator operands, where the AND operator has a first operand and a second operand; generate a first superset-guaranteeing expression that includes only the first operand of the AND operator as the one of the pair of OR operator operands; generating a second superset-guaranteeing expression that includes only the second operand of the AND operator as the one of the pair of OR operator operands; and generate a filtered superset-guaranteeing expression based on applying an additional AND operator having the first superset-guaranteeing expression and the second superset-guaranteeing expression as a pair of operands of the additional AND operator, where the query operator execution flow performs the filtered superset-guaranteeing expression; and/or facilitate execution of the query by applying the filtered superset-guaranteeing expression and by filtering at least one row from an output of the filtered superset-guaranteeing expression.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

Figure 33A:
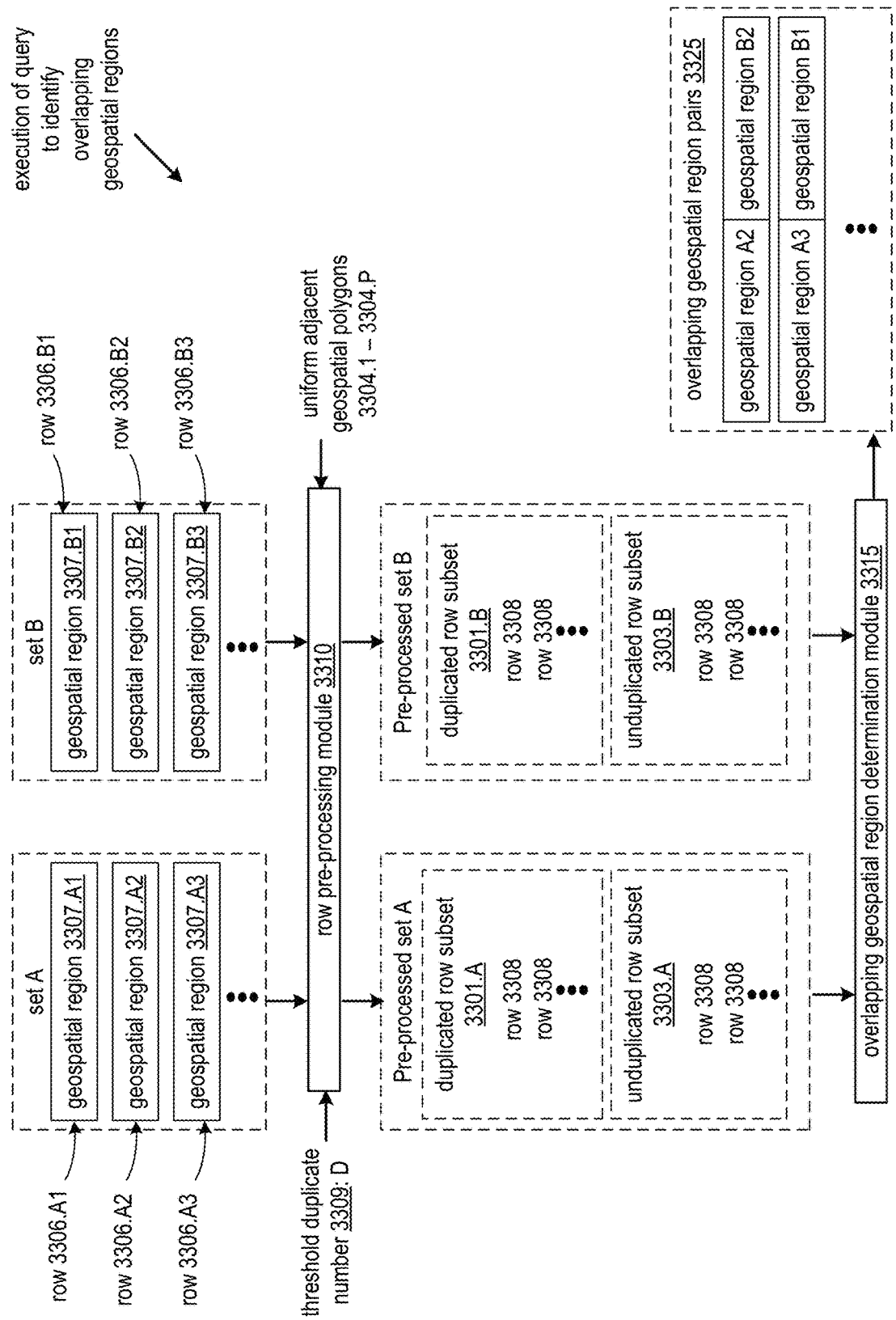
FIG. 33A is a schematic block diagram of a query execution module that implements row pre-processing module and an overlapping geospatial region determination module.
Figure 33B:
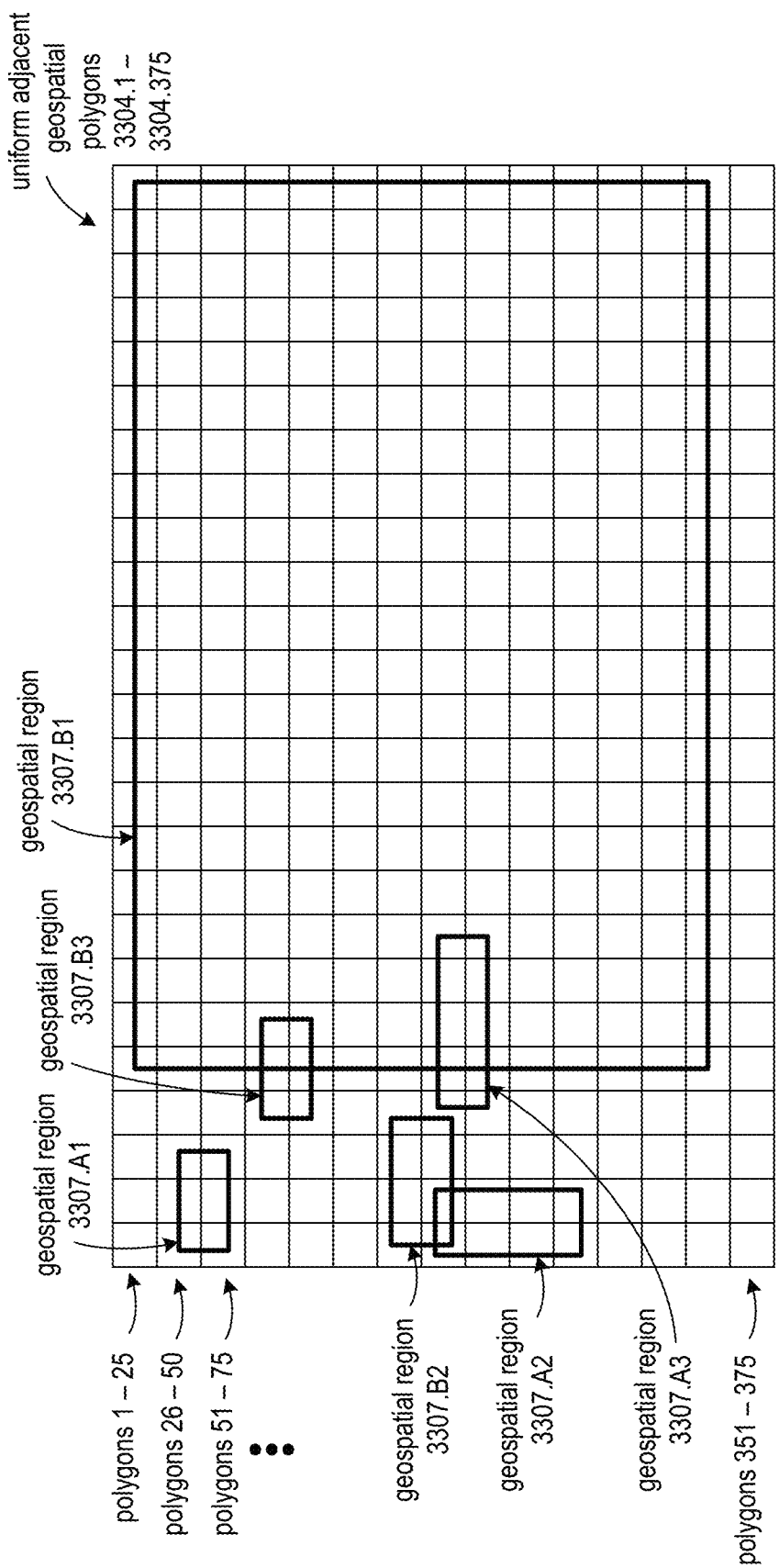
FIG. 33B is an illustration of a plurality of uniform adjacent geospatial polygons containing portions of geospatial regions.
Figure 33C:
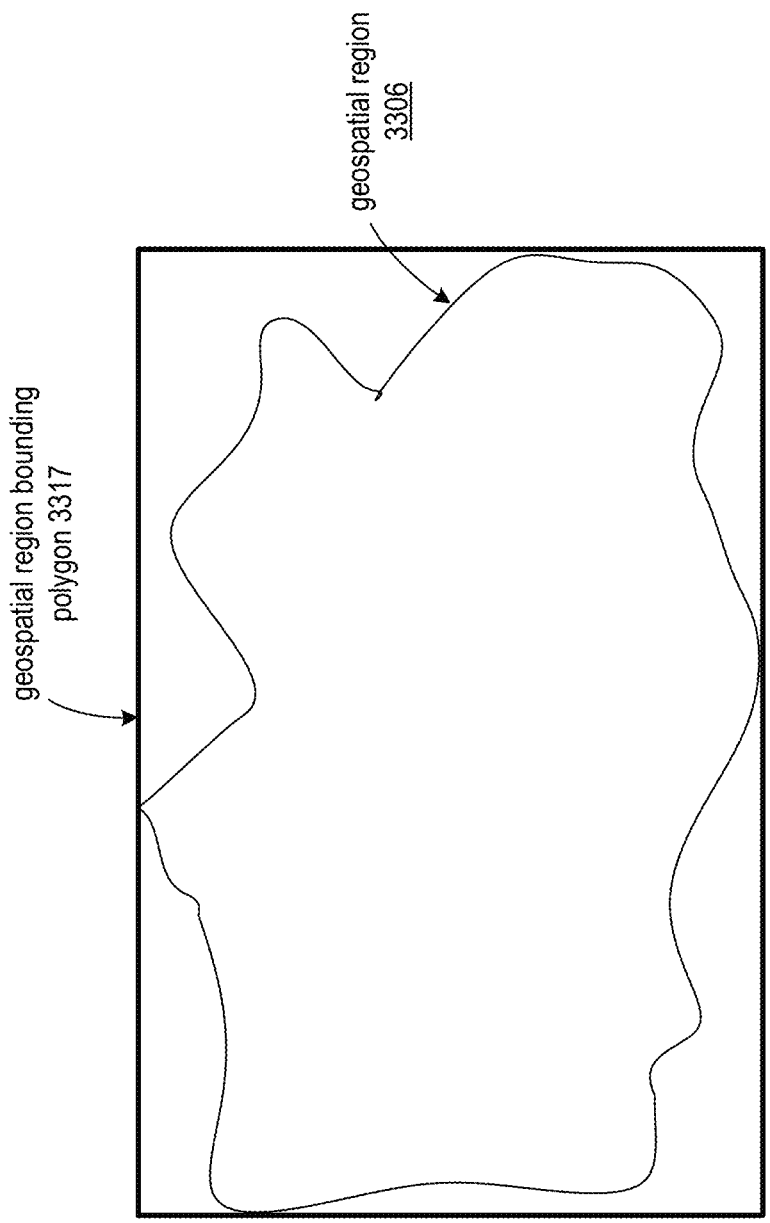
FIG. 33C is an illustration of a geospatial region bounding polygon of a geospatial region.
Figure 33D:
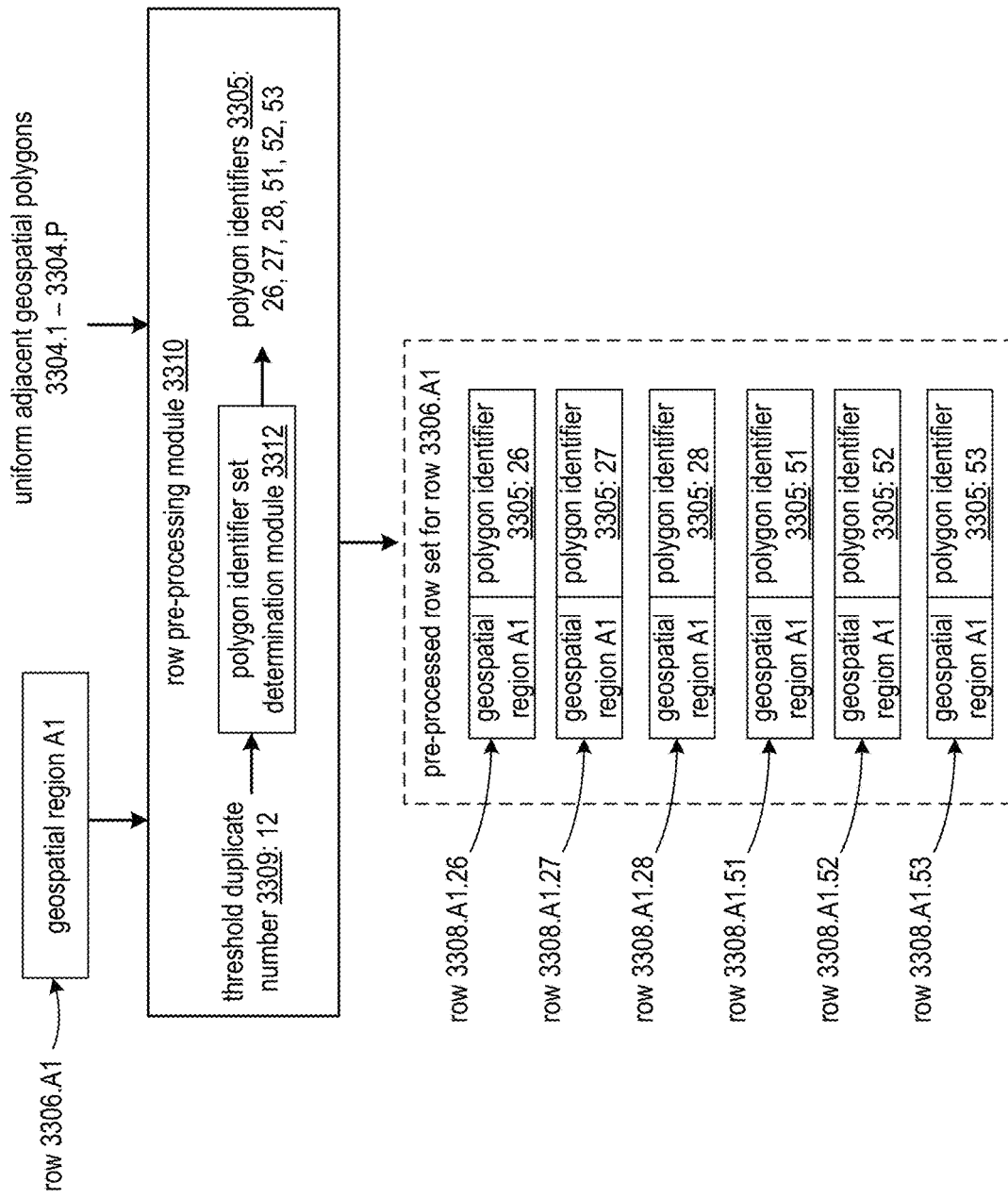
FIG. 33D is a schematic block diagram of a row pre-processing module generating an example pre-processed row set for an example row.
Figure 33E:
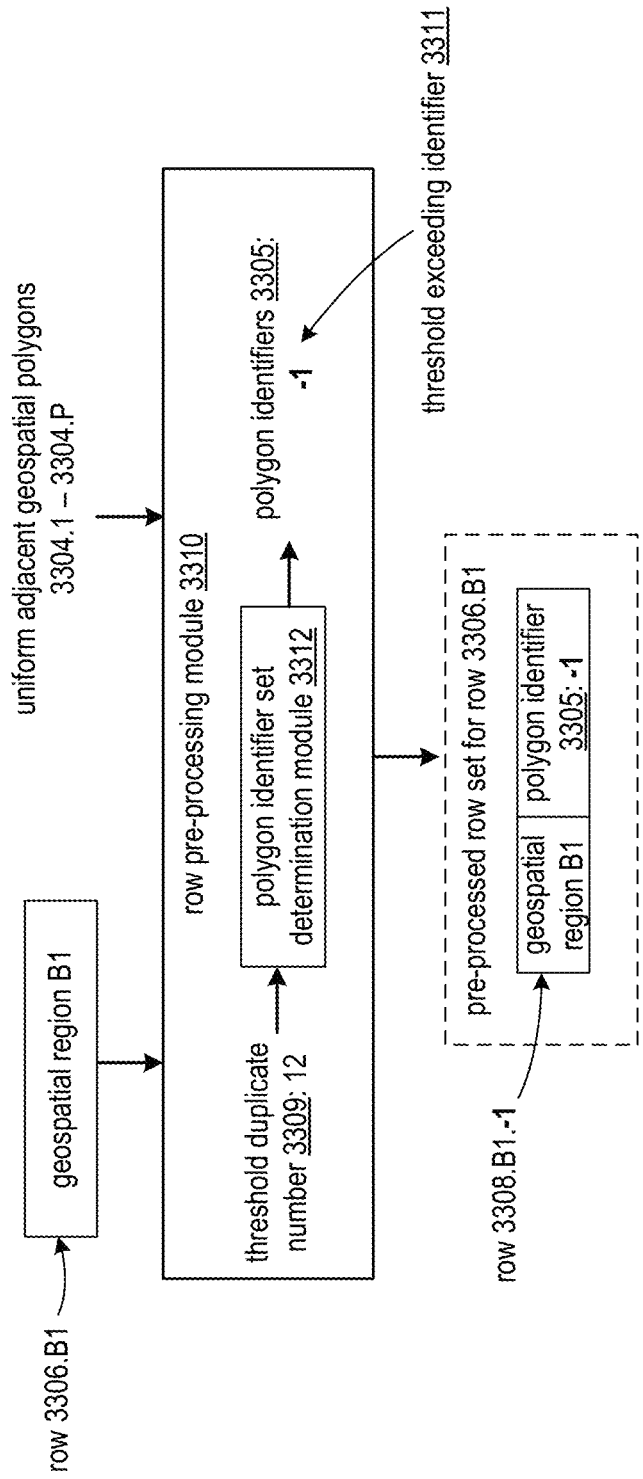
FIG. 33E is a schematic block diagram of a row pre-processing module generating another example pre-processed row set for another example row.
Figure 33F:
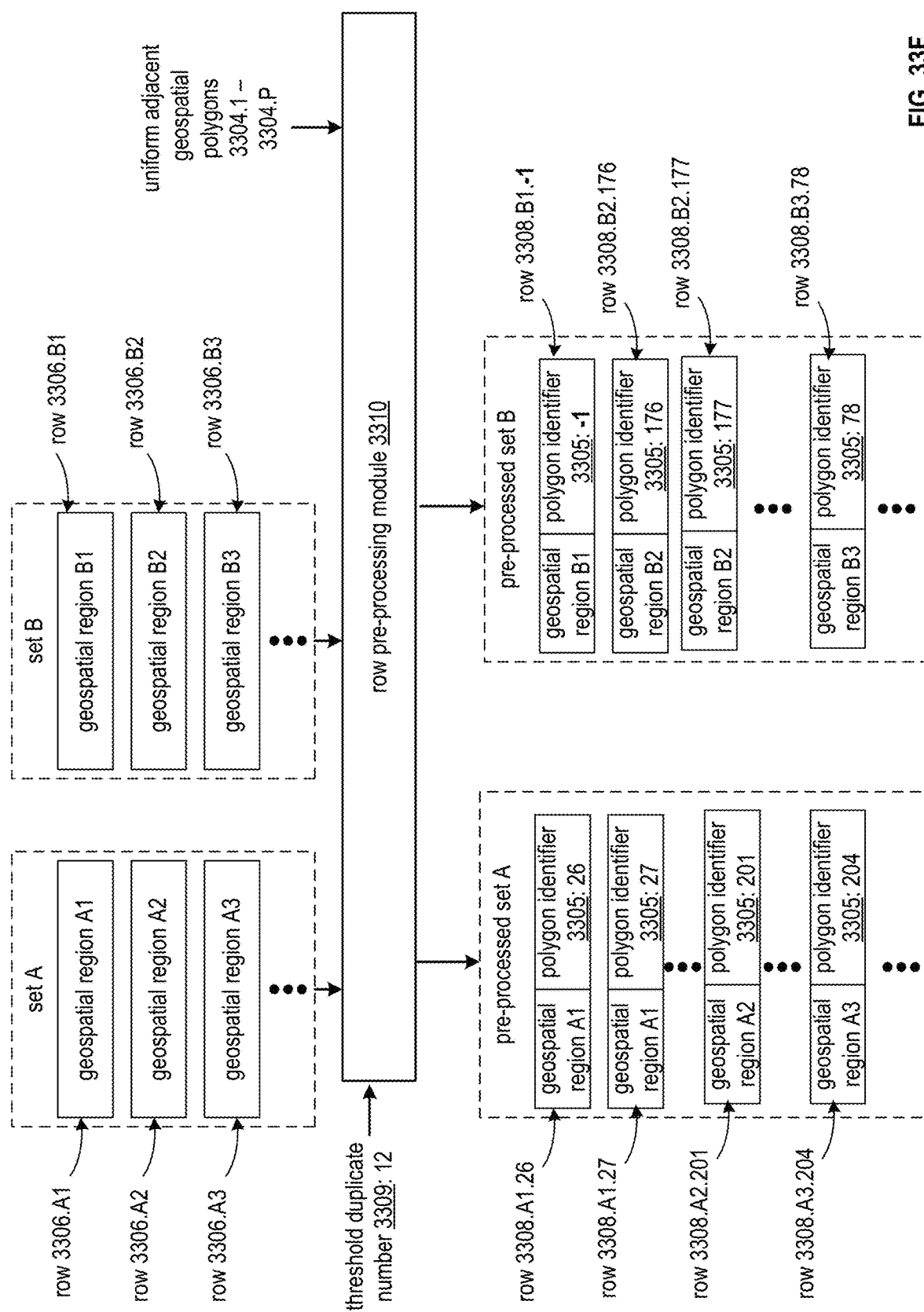
FIG. 33F is a schematic block diagram of a row pre-processing module generating example pre-processed sets for an example set of rows.
Figure 33G:
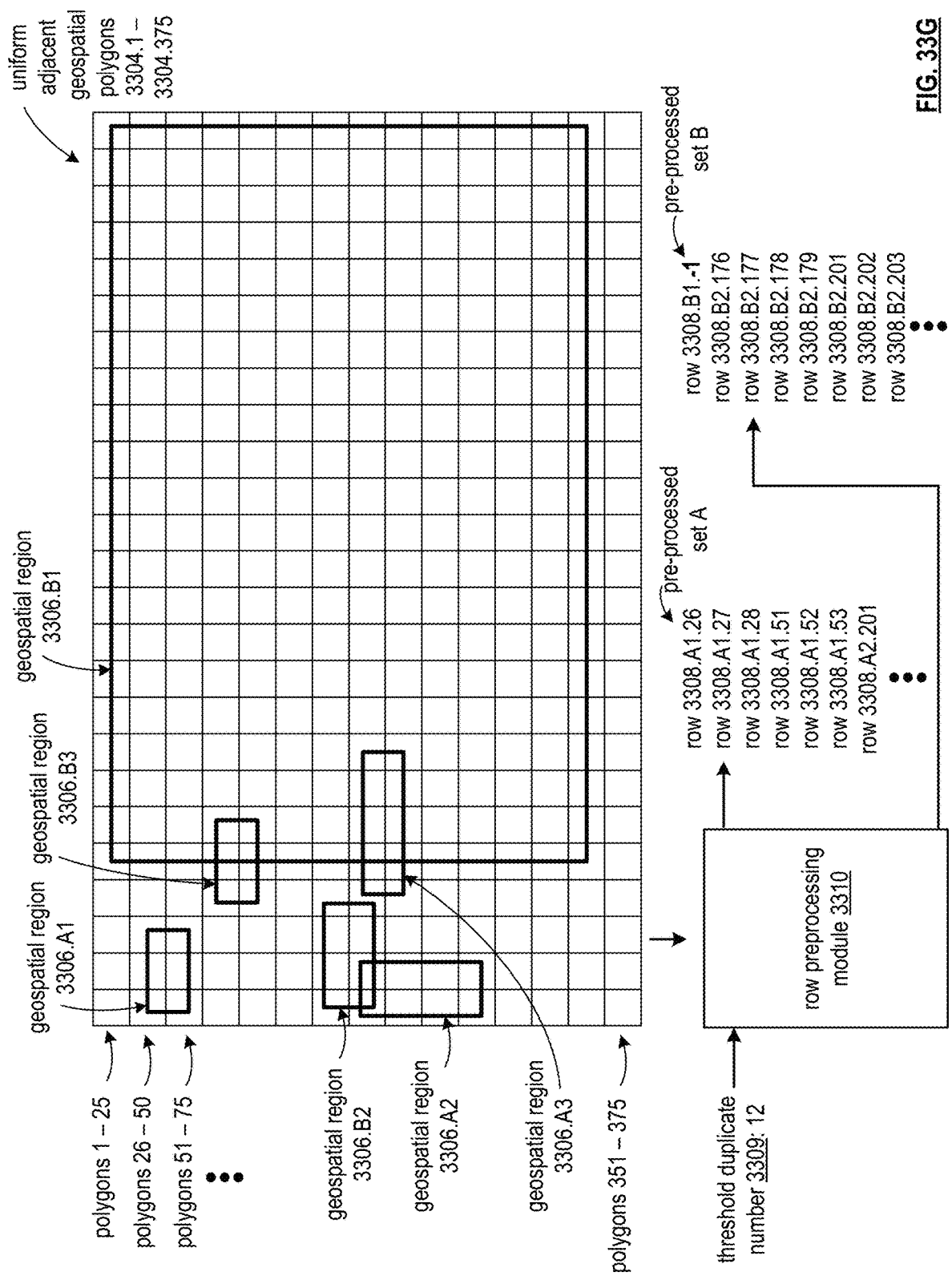
FIG. 33G is a schematic block diagram of a row pre-processing module generating example pre-processed sets for an example set of geospatial regions in relation to plurality of uniform adjacent geospatial polygons.
Figure 33H:
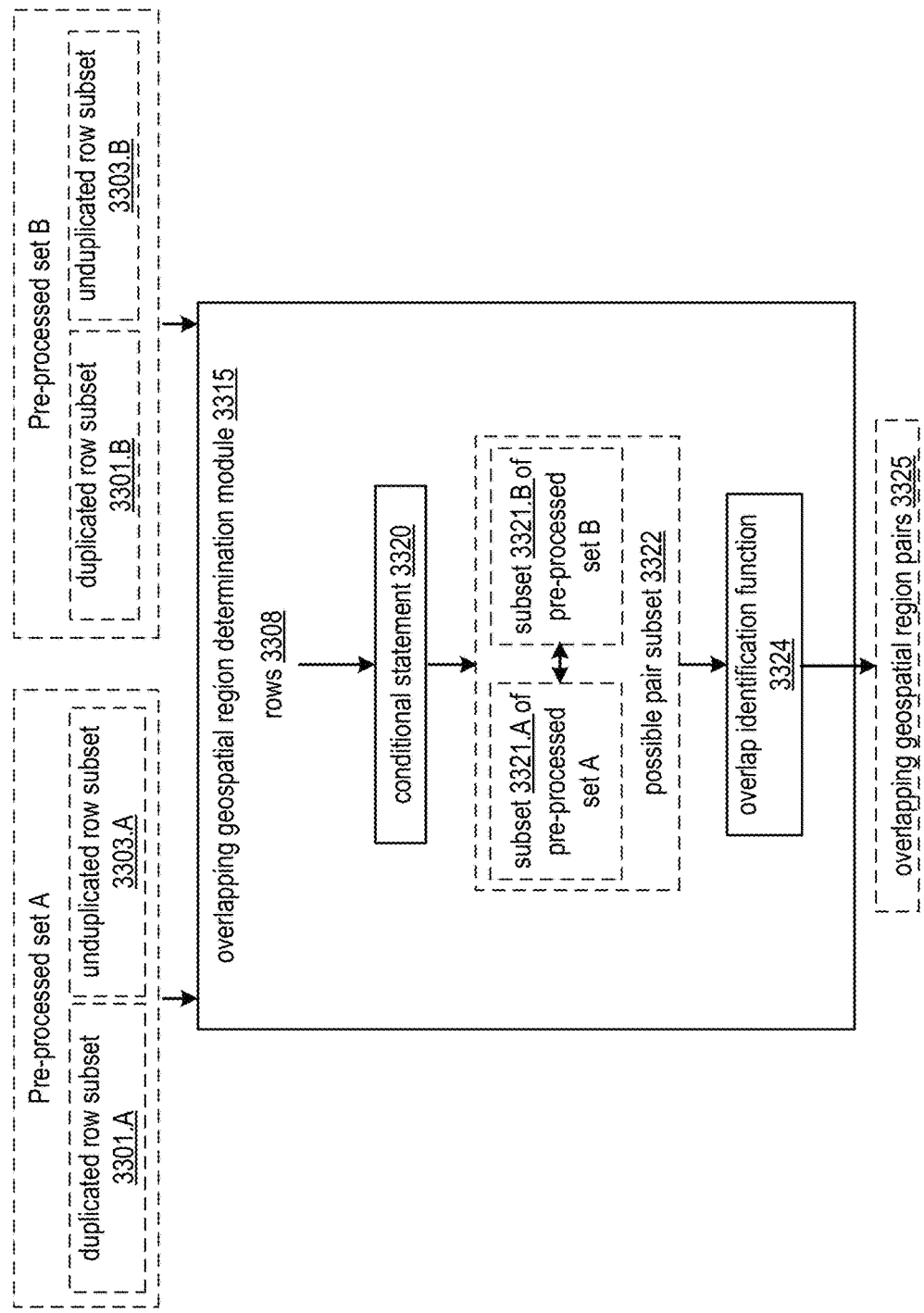
FIG. 33H is a schematic block diagram of an overlapping geospatial region determination module that identifies overlapping geospatial region pairs.
Figure 33I:
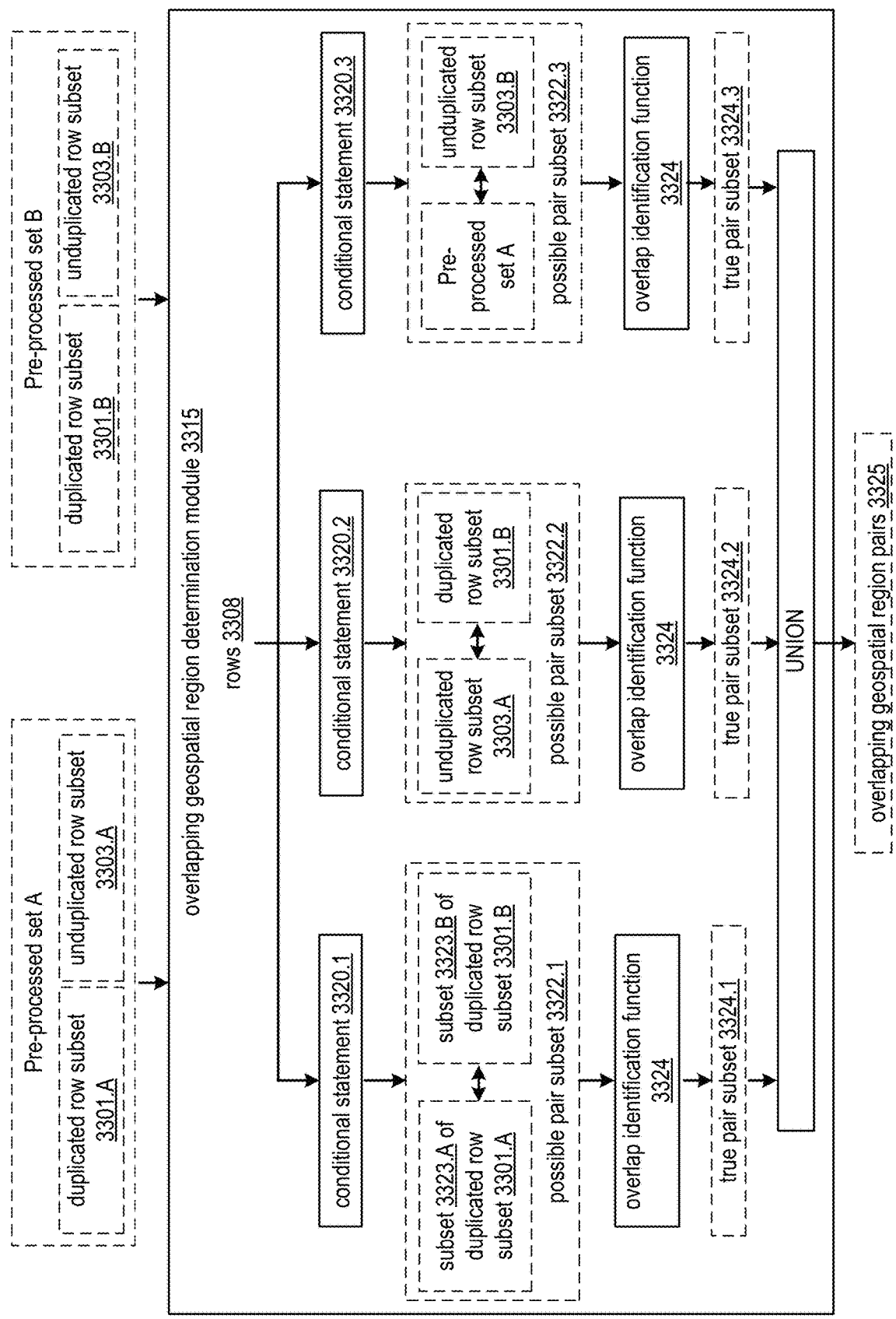
FIG. 33I is a schematic block diagram of an example of an overlapping geospatial region determination module that identifies overlapping geospatial region pairs based on implementing three conditional statements.
Figure 33J:
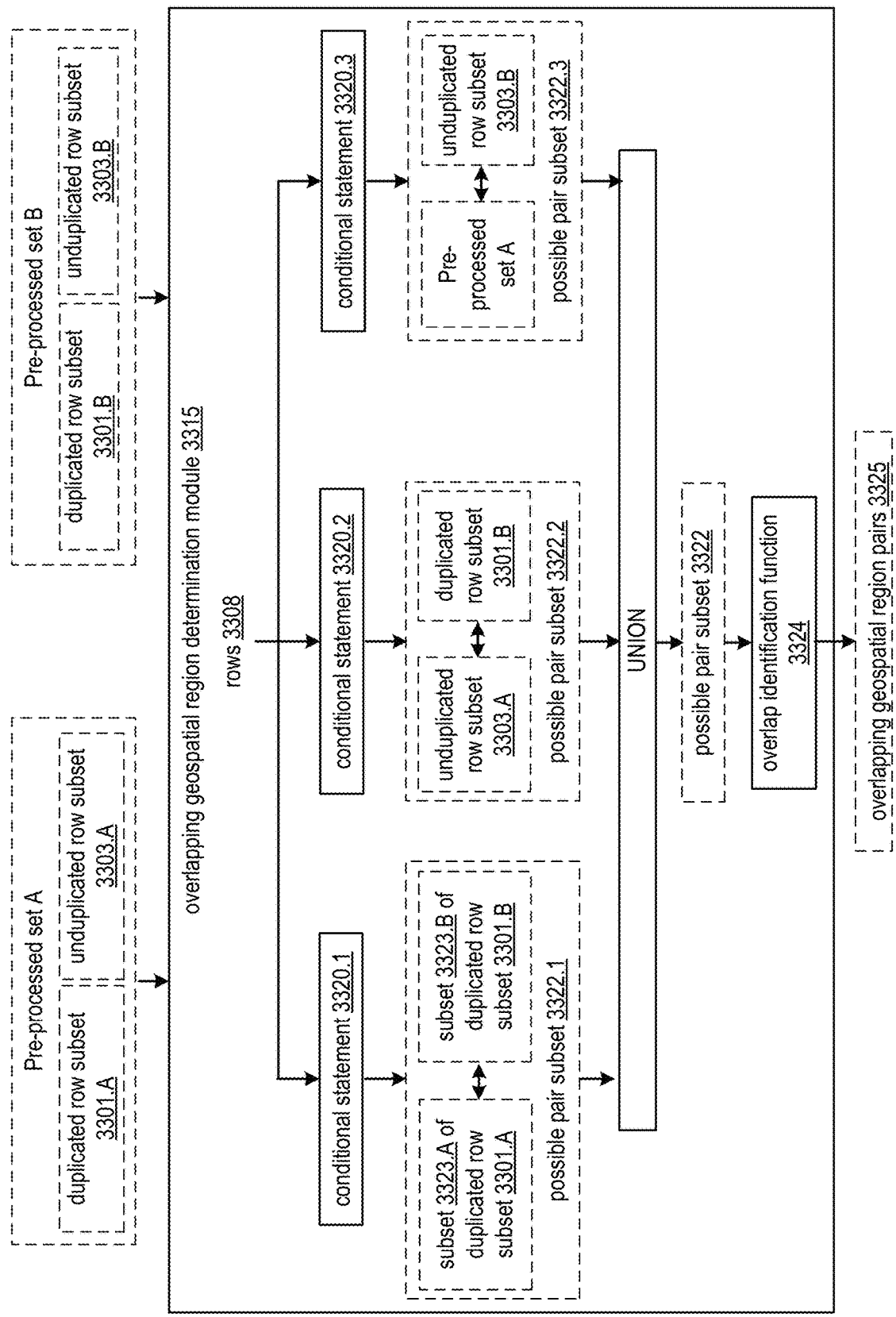
FIG. 33J is a schematic block diagram of another example of an overlapping geospatial region determination module that identifies overlapping geospatial region pairs based on implementing three conditional statements.
Figure 33K:
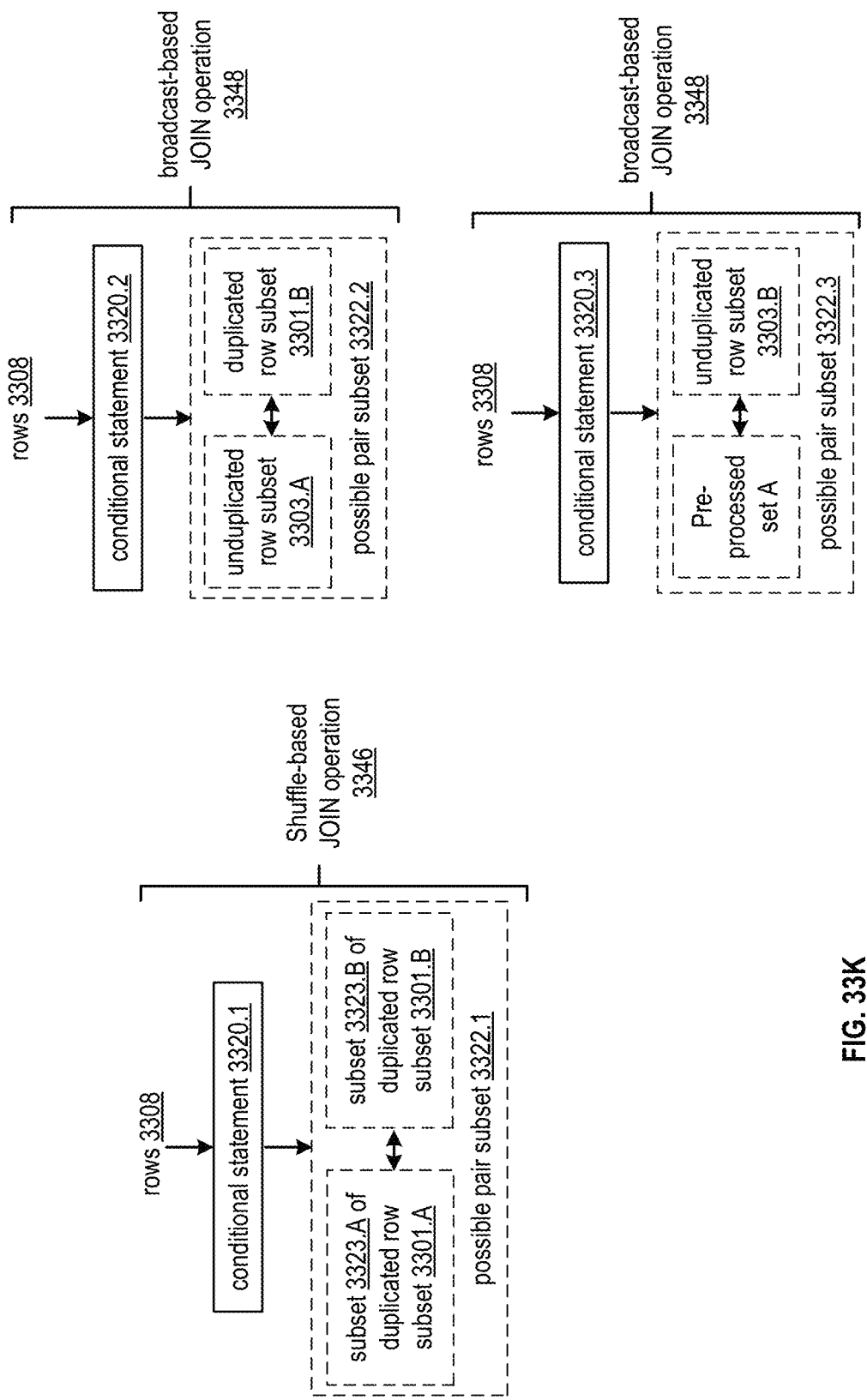
FIG. 33K is a schematic block diagram of an overlapping geospatial region determination module that implements a shuffle-based JOIN operation and broadcast-based JOIN operations.
Figure 33L:
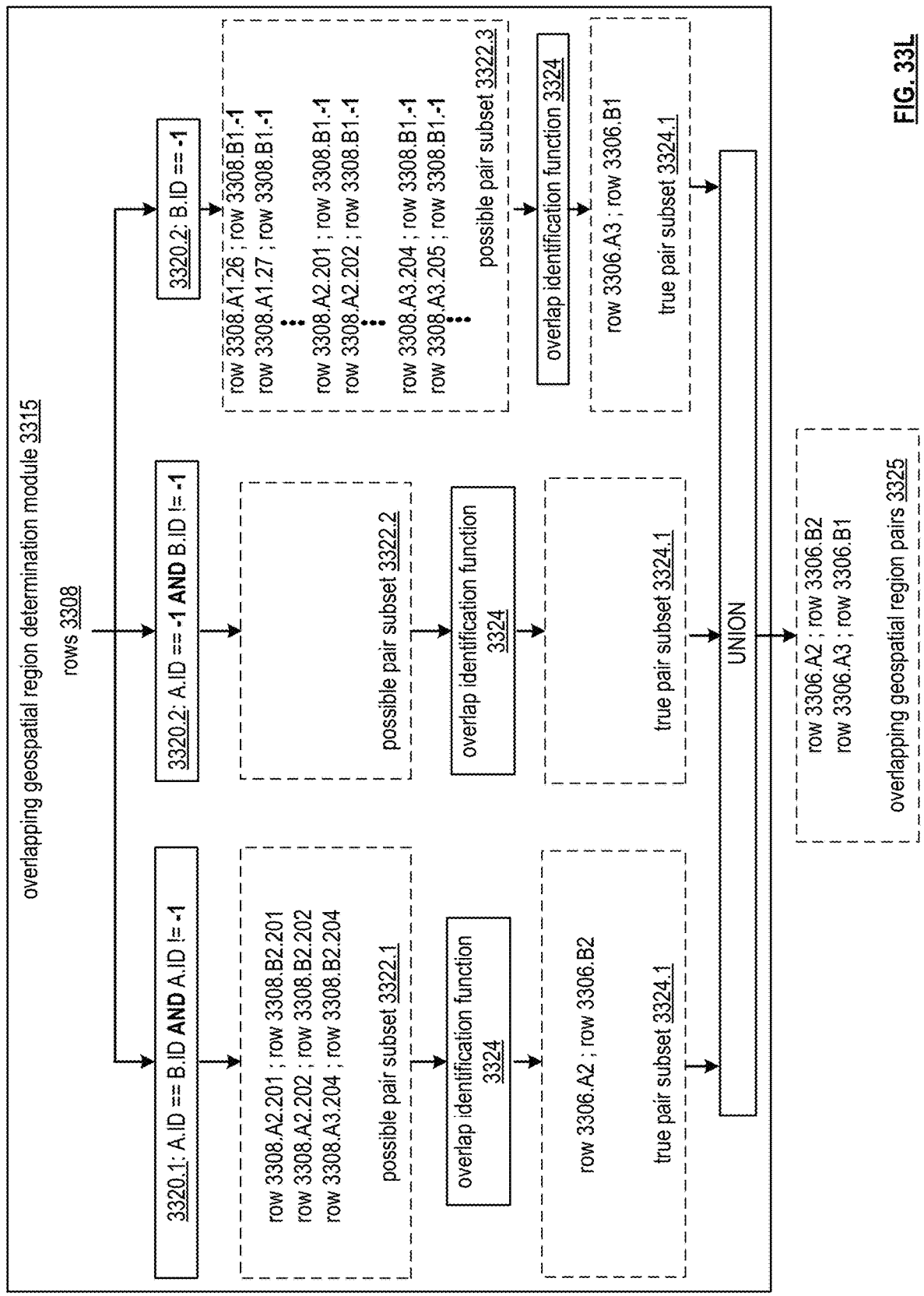
FIG. 33L is a schematic block diagram of an overlapping geospatial region determination module that identifies example overlapping geospatial region pairs for an example set of rows.
Figure 33M:
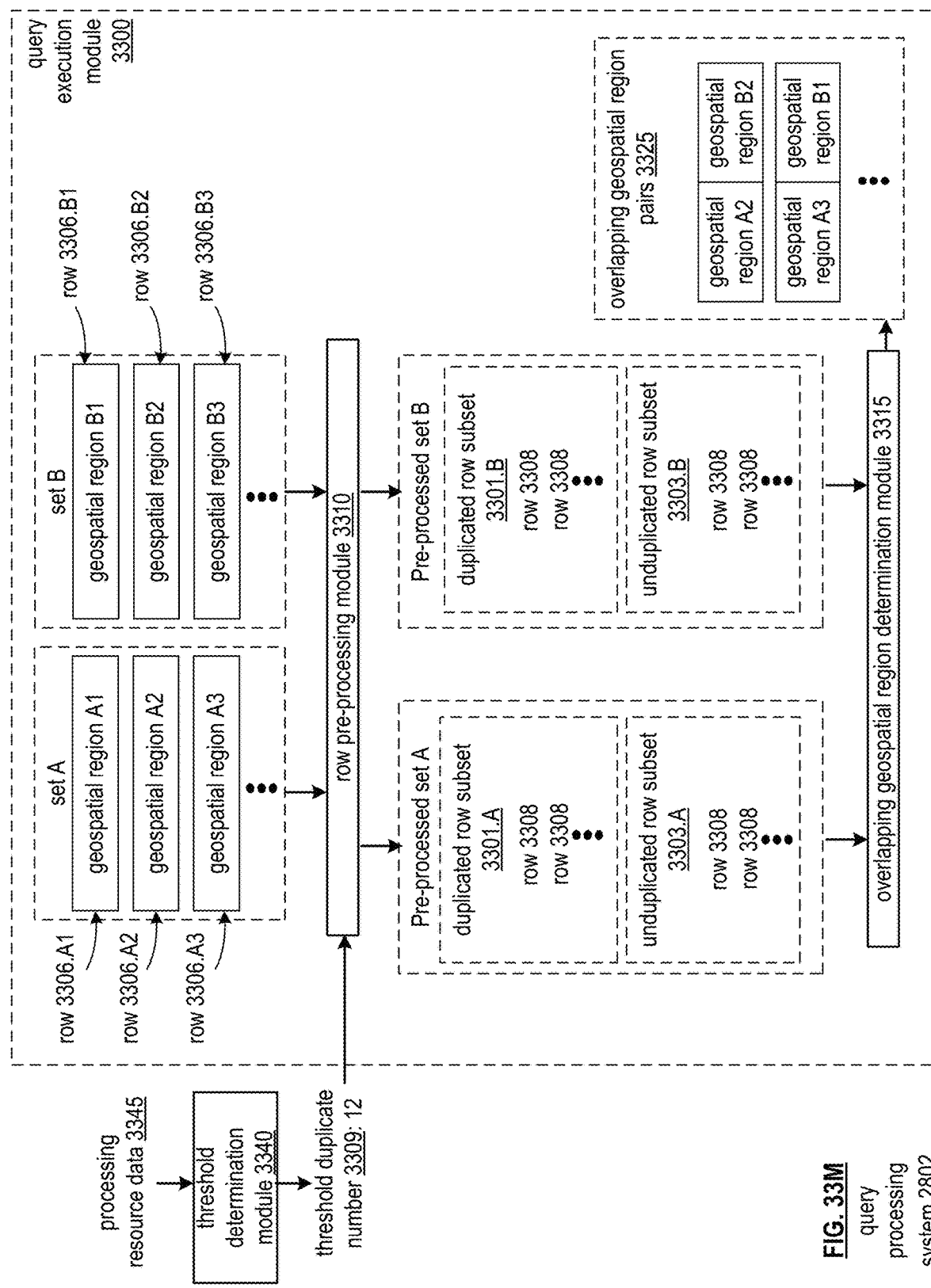
FIG. 33M is a schematic block diagram of a query processing system that implements a threshold determination module.
Figure 33N:
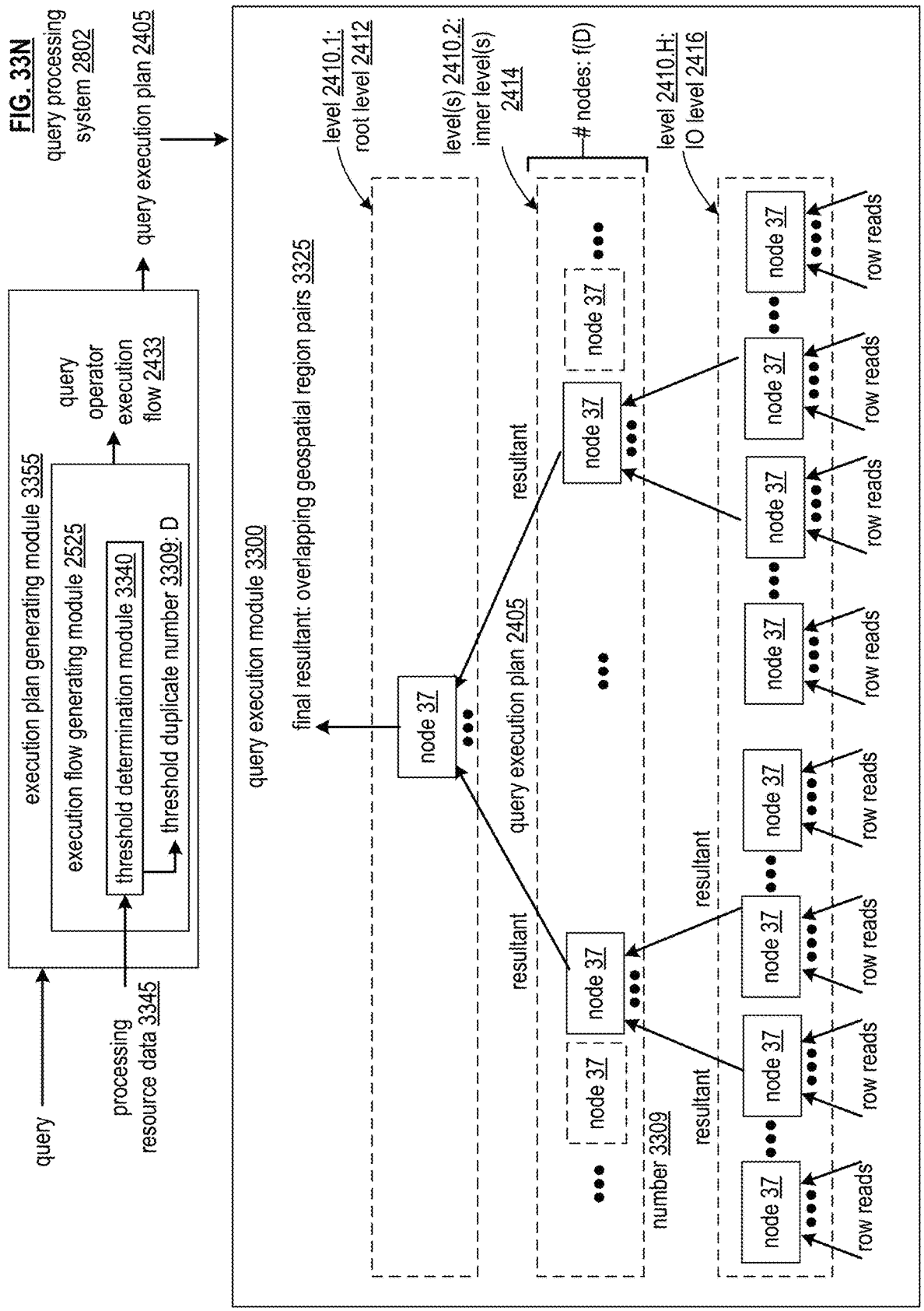
FIG. 33N is a schematic block diagram of a query processing system that selects a threshold duplicate number corresponding to a number of nodes participating in a portion of a query execution plan.
Figure 33O:
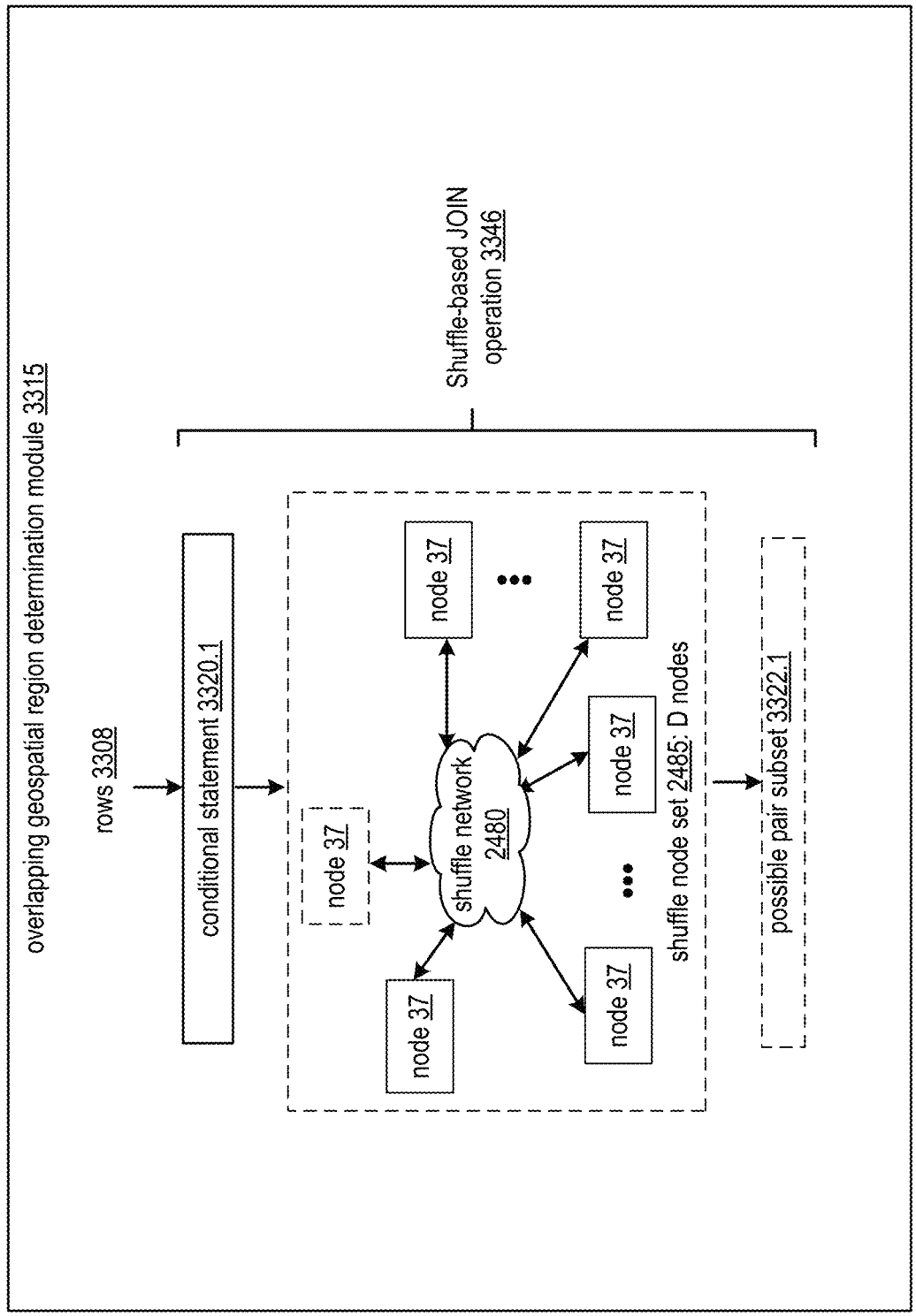
FIG. 33O is a schematic block diagram of an overlapping geospatial region determination module having number of nodes participating in a shuffle-based JOIN operation corresponding to a threshold duplicate number.

FIGS. 33A-33O illustrate embodiments of a query execution module 3300 that is operable to execute queries against one or more datasets of records that include data indicating geospatial regions. The query execution module 3300 can be implemented via the query processing system 2802 and/or can be implemented via the parallelized query and results sub-system 13. The query execution module 3300 can otherwise be implemented via at least one processor operable to execute queries against a data set.

The one or more datasets accessed by the query execution module 3300 storing the geospatial region data can be stored and accessed as segments in a segment storage system 2508, in memory drives 2425 of one or more nodes 37, and/or in any other database and/or memory. For example, multiple rows 3306 of a dataset can each include data indicating a geospatial region 3307, for example, in a field having a data type corresponding to the geospatial region. The rows 3306 can be implemented as these geospatial regions 3307, such as corresponding objects and/or simple features implementing these geospatial regions 3307.

A geospatial region 3307 can be represented as a bounded two dimensional area, such as a polygon, a circle, or other two dimensional shape. For example, a geospatial region 3307 can include plurality of coordinates indicating locations of various portions of a boundary of the geospatial region, such as points defining the perimeter of a corresponding polygon. A geospatial region can be implemented as a geometry data type or geography data type in SQL, such as a Polygon instance of the geometry data type. For example, corresponding queries against the dataset of geospatial regions are SQL queries. A geospatial region 3307 can be implemented as another planar spatial data type, a simple feature, and/or can otherwise define a two-dimensional region in any physical or imaginary two-dimensional or other multi-dimensional space. In some embodiments, the geospatial region 3307 can be in compliance with the Open Geospatial Consortium (OGC) Simple Features for SQL Specification and/or the PostGIS spatial extender for PostgreSQL object-relational databases.

In some embodiments, each geospatial region 3307 can correspond to the boundary of a physical location upon the surface of the Earth. In such embodiments, the plurality of points can correspond to latitude and longitude coordinates defining a location of each point on the surface of the Earth. Alternatively or in addition, the plurality of points can correspond to GPS data generated via an application, for example, collected in rows 3306. Alternatively or in addition, the geospatial region 3307 can be defined based on political regions, man-made landmarks, or natural features. For example, the geospatial region 3307 can be defined based on indicating at least one street address, building, river, body of water, country, state, city, or other known landmark with a known location on the Earth's surface and/or other known region with a known boundary on the Earth's surface. The boundary of the physical location upon the surface of the Earth can be defined based on a corresponding instance of a SQL geometry data type or other planar spatial data type defining the bounds of the region, for example, via latitude and longitude coordinates or other points with defined locations with respect to the Earth and/or with respect to a physical location on Earth and/or in proximity to the Earth. Note that while the geospatial regions 3307 are described and depicted as two-dimensional shapes on a two-dimensional plane for simplicity, the geospatial regions 3307 can be non-flat based on a curvature of the earth and/or optionally based on altitude changes in geographic features upon corresponding portions of the surface of the earth.

In some embodiments, queries are performed to identify pairs rows 3306 having geospatial regions 3307 that overlap with each other, and/or their respective overlap. For example, geospatial regions compared via an STOverlaps( ) SQL function, an STIntersection( ) SQL function, an STTouches( ) SQL function, other Open Geospatial Consortium OGC method executable in SQL; an ST_Interects( ) function, ST_Overlaps( ) and/or function for execution of PostGIS spatial and/or geographic objects executable against a PostgreSQL database; and/or other function identifying intersecting geospatial regions, touching geospatial regions, overlapping geospatial regions, geospatial regions contained within other geospatial regions, and/or geospatial regions that are otherwise touching and/or overlapping somewhere. For example, geometry instances can be determined to overlap when the output of such a comparison function indicates an overlap, such as when a STIntersection( ) comparison function is non-null and/or when output of a STOverlaps( ) function is True. Geometry instances can be determined to not overlap when the output of such a comparison function indicates no overlap, such as when a STIntersection( ) comparison function is null and/or when output of a STOverlaps( ) function is False.

As a particular example, the query includes, is implemented as, is logically equivalent to, and/or logically similar to performance of a join operation on datasets A and B, conditioned on A and B intersecting. For example, the query expression is implemented to include the expression A join B on ST_Intersects(A,B), A join B on STIntersection(A,B), or another expression where datasets A and B are joined on a condition requiring intersection of respective geospatial objects.

FIG. 33A illustrates an embodiment of a query execution module 3300 that identifies overlapping pairs of geospatial regions in two data sets A and B, where a query resultant corresponds to and/or is based on identification of a set of overlapping geospatial region pairs 3325 that indicates ones of the geospatial regions of set A that overlap with ones of the geospatial regions of set B. The set of overlapping geospatial region pairs 3325 can further indicate polygons or geometric regions defined as the intersection between each pair of overlapping geospatial regions.

While the embodiments of FIGS. 33A-33O illustrate identification of overlapping geospatial region pairs 3325 in two different data sets, the overlapping geospatial region pairs 3325 can be identified from a same data set, where geospatial regions of the data set that overlap with other geospatial regions of the same data set are identified. In some embodiments, identification of overlapping geospatial region pairs 3325 in more than two different data sets can be identified, where three or more geospatial regions are identified as all overlapping.

The identification of the overlapping geospatial region pairs 3325 can be achieved via a row pre-processing module 3310 and an overlapping geospatial region determination module 3315. The row pre-processing module 3310 and overlapping geospatial region determination module 3315 can be implemented via at least one processor of the query execution module 3300, such as at least one processor of at least one node 37 participating in a query execution plan 2405 executing the query. The row pre-processing module 3310 and overlapping geospatial region determination module 3315 can be implemented via any other processing resources and/or memory resources of the database system 10.

The row pre-processing module 3310 can be operable to process incoming rows 3306 of one or more datasets involved in the query, such as dataset A and dataset B of FIG. 33A. The row pre-processing module 3310 can generate a pre-processed set of each dataset that includes a plurality of processed rows 3308. The processed rows 3308 can be different from the original rows 3306, for example, where each processed row is generated from an original row 3306 to include an additional appended column and/or additional data. Examples of generating processed rows is discussed in further detail in conjunction with FIGS. 33C-33G.

The pre-processed set for a set of rows 3306 of a dataset can include a duplicated row subset 3301 and an unduplicated row subset 3303. Each row in the duplicated row subset 3301 can be generated based on duplicating corresponding rows 3306, where two or more instances of a given row 3306 is reflected as multiple rows 3308 in the duplicated row subset 3301. Each row in the unduplicated row subset 3303 can include exactly one instance of rows 3308 for any given row 3306.

A given row 3306 can be guaranteed to have corresponding rows 3308 in exactly one of the duplicated row subset 3301 or the unduplicated row subset 3303, where every row 3306 is reflected as one or more rows 3308 in either the duplicated row subset 3301 or the unduplicated row subset 3303, but not both. Note that some rows in the duplicated row subset can include exactly one instance of a given row 3306, where a given row 3306 has only one row 3308 in the duplicated row subset. However, rows in the unduplicated row subset can be guaranteed to be unduplicated, where a given row 3306 is guaranteed to have only one row 3308 in the unduplicated row subset.

Determining whether to generate rows 3308 from rows 3306 as duplicated rows of the duplicated row subset 3301 or unduplicated rows of the unduplicated row subset can be based on a threshold duplicate number 3309, having a value of D. Rows in the duplicated row subset 3301 can be guaranteed to include D or less duplicates. In the case where duplication would require more than D duplicates for a given row 3306, a corresponding row 3308 can be generated as an unduplicated row.

Determining whether to generate rows 3308 from rows 3306 as duplicated rows of the duplicated row subset 3301 or unduplicated rows of the unduplicated row subset can be further based on a plurality of uniform adjacent geospatial polygons 3304.1-3304.P. Rows 3306 that are duplicated as a number of rows 3308 in the duplicated row subset 3301 can be based on overlap with a corresponding number of uniform adjacent geospatial polygons 3304.1-3304.P that is less than or equal to D. Rows 3306 that are not duplicated as a single row 3308 in the unduplicated row subset 3303 can be based on overlap with a number of uniform adjacent geospatial polygons 3304.1-3304.P that is greater than D. The plurality of uniform adjacent geospatial polygons 3304 are discussed in further detail in conjunction with FIG. 33B.

The overlapping geospatial region determination module 3315 can process the duplicated row subsets 3301 and unduplicated row subsets 3303 to identify overlapping geospatial region pairs 3325. This can include performing one or more JOIN operations on the unduplicated row subsets 3301 and unduplicated row subsets 3303.

As discussed in further detail herein, the unduplicated row subsets 3301 and unduplicated row subsets 3303 generated by the row pre-processing module 3310 can be leveraged to improve the efficiency of the identification of overlapping geospatial region pairs 3325 by the overlapping geospatial region determination module 3315. In particular, the generation of unduplicated row subsets 3301 and unduplicated row subsets 3303 via the row pre-processing module 3310 can be implemented to improve the efficiency of the identification of overlapping geospatial region pairs 3325 by the overlapping geospatial region determination module 3315 when processing geospatial regions. This improves the technology of database systems in performing join operations to identify overlapping geospatial regions by increasing the efficiency of query executions, such as enabling faster execution of these queries and/or reducing memory resources required for execution of these queries.

FIG. 33B spatially illustrates an example embodiment of a set of geospatial regions 3307.A1-3307.A3 of dataset A, and a set of geospatial regions 3307.B1-3307.B3 of dataset B of FIG. 33A. The geospatial regions 3307 are depicted with respect to a plurality of uniform adjacent geospatial polygons 3304.1-3304.P. The geospatial regions 3307 can correspond to square "tiles" or other uniform shaped regions upon the two-dimensional space and/or upon the surface of the earth.

The plurality of uniform adjacent geospatial polygons 3304.1-3304.375 of FIG. 33B can implement the plurality of uniform adjacent geospatial polygons 3304.1-3304.P of FIG. 33A, where P is 375 in this example. P can correspond to any other number, and can be based on a size of uniform adjacent geospatial polygons with respect to a size of the Earth or with respect to another full space upon which geospatial regions can be located.

Each uniform adjacent geospatial polygons 3304 can have a unique identifier 3305, such as an integer identifier or other identifier. In this example, the depicted set of 375 uniform adjacent geospatial polygons 3304 are identified via integers 1-375, where integer 1 is in the top left corner, and increments horizontally, and then vertically.

The uniform adjacent geospatial polygons 3304 can optionally be implemented via a regular polygons, such as the squares of FIG. 33B. The uniform adjacent geospatial polygons 3304 can optionally be implemented via other regular polygons, such as hexagons, that can be adjacently placed to fully cover a two-dimensional region. The uniform adjacent geospatial polygons 3304 can be implemented via non-regular polygons, such as rectangles of uniform dimensions. In other embodiments, not all of the uniform adjacent geospatial polygons 3304 have a same size and/or shape.

The size, shape, and/or positions of the plurality of uniform adjacent geospatial polygons 3304 can be predetermined, for example, fixed for each query. In some embodiments, the query processing system 2802 is operable to select the size of the plurality of uniform adjacent geospatial polygons 3304 based on a given query, where the uniform size of the plurality of uniform adjacent geospatial polygons 3304 is determined differently for different queries. In some embodiments, the database system 10 is operable to select the size of the plurality of uniform adjacent geospatial polygons 3304 based on a given one or more datasets, where the uniform size of the plurality of uniform adjacent geospatial polygons 3304 is determined differently for different datasets, for example, based on an average, maximum, and/or minimum area of its geospatial regions 3307 and/or where the uniform size is adjusted over time based on the addition of new geospatial regions 3307 to a given dataset over time.

The overlap of geospatial regions with these unform adjacent geospatial polygons can be leveraged to improve query execution efficiency when identifying overlapping geospatial regions, based on first determining whether pairs of geospatial regions are upon any shared uniform adjacent geospatial polygons 3304. When this is the case, the pair of corresponding geospatial regions can be processed to determine whether they indeed overlap, for example, based on performing an STIntersection( ) function or STOverlaps( ) function upon geometry and/or geography objects implementing the geospatial regions 3307. This can be ideal in reducing the number of pairs upon which the function, such as the STIntersection( ) function or STOverlaps( ) function, need be performed based on first identifying whether they could possibly overlap based on whether they share any uniform adjacent geospatial polygons 3304.

In particular, identifying the overlapping geospatial region pairs 3325 can be achieved based on identifying which uniform adjacent geospatial polygons 3304 with which multiple geospatial regions 3307 from different datasets overlap. For example, each geospatial region's row 3306 can be duplicated as rows 3308, for each uniform adjacent geospatial polygon 3304 with which it overlaps, and each appended with the unique polygon identifiers 3305 of the corresponding uniform adjacent geospatial polygon 3304. A hash join or other join operation can be performed to identify rows 3308 having identical polygon identifiers 3305, and a function such as STIntersection( ) or STOverlaps( ) can be performed to identify which of these rows sharing uniform adjacent geospatial polygons 3304 indeed overlap.

However, in cases where a given geospatial regions 3307 is drastically larger than some or all other geospatial regions 3307, identifying the overlapping geospatial region pairs 3325 via this means would require a tremendous number of duplicates due to this large geospatial region's overlap with a large number of uniform adjacent geospatial polygons 3304. The resulting shuffle performed via the hash join could be incredibly inefficient in this case. Simply adjusting the size of the uniform adjacent geospatial polygons 3304 is not sufficient in preventing inefficiency problems in cases where geospatial regions of datasets are of disproportionate size, as largening the uniform adjacent geospatial polygons 3304 would result in much greater numbers of geospatial regions 3307 needing be shuffled and compared, rendering use of the uniform adjacent geospatial polygons 3304 less useful in filtering possible pairs. For example, in the extreme case where a bounding polygon 3317 of a huge geospatial region 3307 were to cover the whole earth, and where uniform adjacent geospatial polygons 3304 were each one square mile, approximately 197 million rows would be created and shuffled in duplicating and identifying overlapping geospatial regions with this huge example geospatial region.

This problem can be prevented based on implementing the threshold duplicate number 3309 to cap the number of duplicates that can be generated for rows, where large geospatial regions 3307 thus do not render a tremendous number of duplicates that could otherwise induce incredible inefficiency in query execution. The features and functionality presented in FIGS. 33A-33O present improvements to the technology of database systems when performing join operations to identify overlapping geospatial regions by increasing the efficiency of query execution based on capping the number of duplicates for these rows based on implementing the threshold duplicate number 3309. This can improve the efficiency of performing the join operation by reducing the number of rows required to be shuffled in a hash join operation and/or can improve the efficiency of performing the join operation by reducing the memory resources required in generating and storing the duplicated rows.

Identifying which uniform adjacent geospatial polygons 3304 with which a given geospatial regions 3307 overlaps (or possibly overlaps) can optionally be simplified based on first bounding the geospatial regions 3307 via a bounding polygon, such as a rectangle. For example, the geospatial regions 3307 of FIG. 33B are rectangular based on their non-rectangular boundaries having been bounded by the depicted rectangles to simplify determination of overlapping uniform adjacent geospatial polygons 3304.

Such an example is depicted in FIG. 33C. A given geospatial region 3307 can have a non-rectangular shape or other arbitrary shape. The given geospatial region 3307 can be bounded via a geospatial region bounding polygon 3317. For example, the geospatial region bounding polygon 3317 is a rectangle, where the sides of the rectangular geospatial region bounding polygon 3317 can each be parallel to one of two orthogonal axes, such as the x axis and y axis of FIG. 33C.

The x and y axes can correspond to axes of a coordinate system utilized to identify points upon the given geospatial region 3307. Thus, the bounding rectangle can be simply constructed based on identifying the point of the given geospatial region 3307, such as a point of a corresponding polygon, having a greatest x value, the lowest x value, the greatest y value, and the lowest y value, where segments of the rectangle are generated to intersect with these points parallel with the x axis or y axis, respectively, to form a rectangle. In some embodiments, the coordinate system corresponds to latitude and longitude lines of the Earth.

In some embodiments, the sides of square uniform adjacent geospatial polygons 3304 are also each parallel to one of these two orthogonal axes to ensure sides of rectangular geospatial region bounding polygons 3317 are parallel with sides of square uniform adjacent geospatial polygons 3304, for example, as depicted in FIG. 33B. For example, the geospatial regions 3307 of FIG. 33B were already processed to render their geospatial region bounding polygon 3317 depicted as the geospatial regions 3307 of FIG. 33B. In other embodiments, such bounding polygons are not generated for some or all geospatial regions 3307

The polygons 3317 can have a same number of sides as the uniform adjacent geospatial polygons 3304, where this number of sides is optionally different from four. While the geospatial region 3307 is depicted as a curved shape, all geospatial regions 3307 can optionally be implemented as polygons with no curved boundaries.

FIG. 33D illustrates an embodiment of generating a pre-processed row set for a row 3306.A1 via a row pre-processing module 3310. Some or all features or functionality of the row pre-processing module 3310 of FIG. 33D can be utilized to implement the row pre-processing module 3310 of FIG. 33A. The row 3308.A1 can indicate geospatial region 3307.A1 of FIG. 33B. In this example, the threshold duplicate number 3309 has a value of 12. The value of D can be any other integer number. Selection of the value of D is discussed in further detail in conjunction with FIGS. 33M-33O.

The row pre-processing module 3310 can implement a polygon identifier set determination module 3312 that indicates identifiers of a subset of the plurality of uniform adjacent geospatial polygons 3304 that overlap and/or are included within the corresponding geospatial region 3307 and/or its determined geospatial bounding polygon 3317. In this example, a set of six uniform adjacent geospatial polygons 3304 are identified, corresponding to the polygons 3304 with identifiers 26, 27, 28, 51, 52, and 53 as illustrated in FIG. 33B.

The pre-processed row set includes a set of six duplicate rows 3308 for the given row 3306.A1. Each row can be appended with and/or otherwise indicate the corresponding polygon identifier 3305. This set of duplicate rows 3308 can be included in the duplicated row subset 3301.A.

Note that in some embodiments, a given geospatial region 3307 may be included within, and thus overlap with, only one uniform adjacent geospatial polygons 3304. In such embodiments, a single "duplicate" row 3308 is generated for the given row 3306 denoting the identifier of the given uniform adjacent geospatial polygons 3304. While multiple duplicates are not generated for such a row 3306 in this case, the corresponding row 3308 is still considered a member of the duplicate row subset 3301 based on the row being denoted with a true polygon identifier and not overlapping with a number of polygons exceeding the threshold duplicate number 3309.

In particular, because the polygon identifier set determination module 3312 identified that the geospatial region 3307.A1 or corresponding bounding polygon 3317 overlapped with less than the threshold duplicate number 3309 of uniform adjacent polygons (i.e. 6<12), the set of six duplicate rows 3308.A1.26-3308.A1.28 and 3308.A1.51-3308.A1.53 were generated for the given row 3306.A1 accordingly.

Continuing with this example, FIG. 33E illustrates an embodiment of generating a pre-processed row set for another row 3308.B1 via the row pre-processing module 3310. Some or all features or functionality of the row pre-processing module 3310 of FIG. 33E can be utilized to implement the row pre-processing module 3310 of FIG. 33A. The row 3306.B1 can indicate geospatial region 3307.B1 of FIG. 33B. The threshold duplicate number 3309 can again have a value of 12. For example, the pre-processed row sets for rows 3306.A1 and 3306.B1 are generated in accordance with execution of a query that processes datasets that include rows 3306.A1 and 3306.B1, for example, as illustrated in FIG. 33A, where the value of D in FIG. 33A is 12.

As illustrated in FIG. 33B, the geospatial region 3307.B1 overlaps with greater than 12 uniform adjacent geospatial polygons 3304. Based on determining the geospatial region 3307.B1 overlap with more than 12 uniform adjacent geospatial polygons 3304, rather than generating a number of duplicates based on all uniform adjacent geospatial polygons 3304 with which the geospatial region 3307.B1 overlaps, the polygon identifier set determination module 3312 generates a single row 3308. This single row 3308 can be a member of the unduplicated row set 3303.

To distinguish this row 3308 as a row that was not duplicated to denote overlapping with a given uniform adjacent geospatial polygon 3304, a special, threshold exceeding identifier 3311 that is guaranteed to be distinct from all identifiers 3305 of all uniform adjacent geospatial polygons 3304 is utilized as the polygon identifier 3305 for generating the row 3308. In this example, the threshold exceeding identifier 3311 has a value of negative 1, where all identifiers 3305 of actual uniform adjacent geospatial polygons 3304 are positive integers. The threshold exceeding identifier 3311 can have any other distinct value that is different from identifiers 3305 of all uniform adjacent geospatial polygons 3304.1-3304.P.

Thus, members of the unduplicated row set 3303 can be identified based on having the threshold exceeding identifier 3311 as their polygon identifier 3305. Members of the duplicated row set 3303 can be identified based on having polygon identifiers 3305 that are not the threshold exceeding identifier 3311, and thus identify actual uniform adjacent geospatial polygons 3304.

FIG. 33F illustrates generation of pre-processed sets A and B from set A and B of FIG. 33A, for example, where all other geospatial regions are processed as discussed in conjunction with FIGS. 33D and 33E. FIG. 33G illustrates this generation of pre-processed sets A and B of FIG. 33A with respect to the spatial arrangement of geospatial regions with respect to the uniform adjacent geospatial polygons 3304.1-3304.375 of FIG. 33B. Note that these of pre-processed sets A and B include the pre-processed set of rows for row A1 as discussed in conjunction with FIG. 33D, and the pre-processed set of rows for row B1 as discussed in conjunction with FIG. 33E>

The geospatial regions A1, A2, A3, B2, and B3 are all processed by generating duplicates with corresponding polygon identifiers 3305 of overlapping uniform adjacent geospatial polygons 3304, based on overlapping with, or having a bounding polygon 3317 overlapping with, less than 12 polygons as illustrated in FIG. 33B. Additional geospatial regions not depicted can be similarly processed based on identifying overlapping uniform adjacent geospatial polygons 3304, and/or determining whether the number of uniform adjacent geospatial polygons 3304 with which it overlaps is less than or equal to 12, or greater than 12.

FIG. 33H illustrates an embodiment of overlapping geospatial region determination module 3315. Some or all features and/or functionality of the overlapping geospatial region determination module 3315 can be utilized to implement the geospatial region determination module 3315 of FIG. 33A.

The rows 3308 of pre-processed sets A and B can be processed via a conditional statement 3320 to generate a possible pair subset 3322. For example, the possible pair subset 3322 indicates a set of pairs, where each pair includes one row 3308 of pre-processed set A, and another row 3308 of pre-processed set B, having geospatial regions 3307 which may intersect. The possible pair subset 3322 can be a filtered subset of all possible pairs of rows 3308 from pre-processed set A and pre-processed set B, for example, based on the conditional statement 3320 filtering other possible pairs of rows. In particular, the rows from set A in pairs of possible pair subset 3322 can be a subset 3321.A of pre-processed set A, such as a proper subset of pre-processed set A. Furthermore, the rows from set B in pairs of possible pair subset 3322 can be a subset 3321.B of pre-processed set B, such as a proper subset of pre-processed set B. As a particular example, the conditional statement 3320 is implemented as a condition on a corresponding join operation, and can be logically equivalent to, is similar to, and/or renders a subset of the logical output of: A.ID==B.ID OR A.ID==-1 OR B.ID==-1. For example, the query A join B on ST_Intersects(A, B) can be implemented based on a query operator flow implementing: A join B on ((A.ID==B.ID OR A.ID==-1 OR B.ID==-1) AND ST_Intersects(A, B)).

In this example, "A" is the name of a table corresponding to dataset A; "B" is the name of a table corresponding to dataset B; "ID" is the name of a column that includes polygon identifiers 3305, for example, created and/or populated by row pre-processing module 3310; "==" is an operator testing for equality; and/or the integer value -1 is the threshold exceeding identifier 3311. Implementing this conditional statement can ensure that duplicated rows are joined when their polygon identifiers 3305 are equivalent, denoting they overlap with a shared uniform adjacent geospatial polygon 3304, and further ensures that unduplicated rows are also joined with other rows for consideration geospatial regions which could overlap with other geospatial regions. As discussed in further herein, the conditional statement 3320 can be implemented to render a proper subset of this example conditional statement 3320 to further improve query execution efficiency based on further filtering pairs of rows for consideration and/or processing.

An overlap identification function 3324 can be performed on some or all pair of rows in the possible pair subset 3322 to identify whether each given pair of corresponding geospatial regions 3307 indeed overlap. For example, the overlap identification function 3324 is implemented as, or is implemented via some or all features and/or functionality of, an STOverlaps( ) SQL function, an STIntersection( ) SQL function, an STTouches( ) SQL function, other Open Geospatial Consortium OGC method executable in SQL, and/or other function identifying intersecting geospatial regions, touching geospatial regions, overlapping geospatial regions, geospatial regions contained within other geospatial regions, and/or geospatial regions that are otherwise touching and/or overlapping somewhere.

FIG. 33I illustrates an embodiment of overlapping geospatial region determination module 3315 where conditional statement 3320 includes three conditional statements 3320.1, 3320.2, and 3320.3. For example, these three conditional statements can be separated via OR operators, where a disjunction of these three conditional statements 3320.1, 3320.2, and 3320.3 renders conditional statement 3320. Some or all features and/or functionality of the overlapping geospatial region determination module 3315 can be utilized to implement the geospatial region determination module 3315 of FIG. 33H.

Rows 3308 can be processed by each conditional statement 3320.1, 3320.2, and 3320.3, for example, in parallel via different nodes 37 Each conditional statement 3320 can process the incoming rows 3308 to render its own possible pair subset 3322.2, which can be processed via the overlap identification function 3324 to render a corresponding true pair subset 3325. A UNION operator can be applied to the three true pair subset 3324.1, 3324.2, and 3324.E to render the overlapping geospatial regions pairs 3325.

The conditional statements are evaluated in different parallel tracks of an operator execution flow 2433, for example, based on processing the corresponding query in accordance with a non-normalized form that is neither CNF nor DNF as discussed previously herein. The overlap identification function 3324 can be performed in each of these parallel tracks as illustrated in FIG. 33I.

Furthermore, the conditional statements 3320.1, 3320.2, and 3320.3 can be structured to guarantee that no pair of rows satisfies multiple conditional statements 3320.1, 3320.2, and 3320.3. Therefore, their outputted possible pair subsets 3322.1, 3322.2, and 3322.3 can be guaranteed to be mutually exclusive. Thus, when combined via the UNION operator, no deduplication is required based on this guarantee that no pair of rows be reflected in multiple ones of the set of parallel tracks, These outputted possible pair subsets 3322.1, 3322.2, and 3322.3 can further be guaranteed to collectively include all pairs in the true set of overlapping region pairs, where the possible pair subsets 3322.1 3322.2 and 3322.3 are not missing any pairs, guaranteeing the overlapping geospatial region pairs 3325 to be the correct resultant.

To achieve these guarantees, pairs of rows included in the possible pair subset 3322.1 outputted based on satisfying the first conditional statement 3320.1 can correspond to pairs having rows from the duplicated row subset 3301.A and from the duplicated row subset 3301.B. The possible pair subset 3322.1 can be guaranteed to include no rows from unduplicated row subsets 3303.A or 3303.B based on the conditional statement 3320.1. Some rows 3308 of duplicated row subset 3301.A may not be included in any pairs and/or some rows 3308 of duplicated row subset 3301.B may not be included in any pairs on based on the conditional statement 3320.1, and such possible pairs are thus filtered from further processing. For example, each pair includes rows from duplicated row subset 3301.A and duplicated row subset 3301.B having equivalent polygon identifiers 3305, where pairs having non-equivalent polygon identifiers 3305 are not included and thus filtered out. In particular, the rows from duplicated row subset 3301.A in pairs of possible pair subset 3322 can be a subset 3323.A of duplicated row subset 3301.A, such as a proper subset of duplicated row subset 3301.A. Furthermore, the rows from duplicated row subset 3301.B in pairs possible pair subset 3322 can be a subset 3323.B of duplicated row subset 3301.B, such as a proper subset of pre-processed set B. An example of a conditional statement 3320.1 rendering these guarantees is discussed in conjunction with FIG. 33L.

Meanwhile, pairs of rows included in the possible pair subset 3322.2 outputted based on satisfying the second conditional statement 3320.2 can correspond to pairs having rows from the unduplicated row subset 3303.A and from the duplicated row subset 3301.B. The possible pair subset 3322.2 can be guaranteed to include no rows from duplicated row subset 3301.A or from unduplicated row subset 3303.B based on the conditional statement 3320.2. Each row 3308 of unduplicated row subset 3301.A can be guaranteed be included in pairs of possible pair subset 3322 with rows of duplicated row subset 3301.B. An example of a conditional statement 3320.2 rendering these guarantees is discussed in conjunction with FIG. 33L.

Finally, pairs of rows included in the possible pair subset 3322.3 outputted based on satisfying the third conditional statement 3320.3 can correspond to a first set of pairs having rows from the unduplicated row subset 3303.A and from the unduplicated row subset 3303.B, and having rows from the duplicated row subset 3301.A and from the unduplicated row subset 3301.B. The possible pair subset 3322.3 can be guaranteed to include no rows from duplicated row subset 3301.A or from unduplicated row subset 3303.B based on the conditional statement 3320.3. Each row 3308 of unduplicated row subset 3301.B can be guaranteed not be included in pairs of possible pair subset 3322 with rows of both duplicated row subset 3301.A and unduplicated row subset 3303.A. An example of a conditional statement 3320.3 rendering these guarantees is discussed in conjunction with FIG. 33L.

In other embodiments, the third conditional statement 3320.3 is split into two conditional statements, and optionally two corresponding parallel tracks. One of these conditional statements can render a possible pair subset that includes rows from the unduplicated row subset 3303.A and from the unduplicated row subset 3303.B. The other one of these conditional statements can render rows from the duplicated row subset 3301.A and from the unduplicated row subset 3301.B.

FIG. 33J illustrates another embodiment of overlapping geospatial region determination module 3315 where conditional statement 3320 includes the three conditional statements 3320.1, 3320.2, and 3320.3 of FIG. 33I, rendering the possible pair subsets 3322.1, 3322.2, and 3322.3 of FIG. 33I. However, rather than evaluating the overlap identification function 3324 in each parallel path, the overlap identification function 3324 is optionally performed upon rows after the union is performed, for example, via a single node receiving all pairs of possible pair subset 3322 outputted via the UNION.

FIG. 33K illustrates how each set of possible pair subsets 3322.1, 3322.2, and 3322.3 can each be generated by overlapping geospatial region determination module 3315 based on performing a JOIN operator based on the corresponding conditional statement 3320.1, 3320.2, or 3320.3, respectively. Some or all features and/or functionality of FIG. 33K can be utilized to implement the overlapping geospatial region determination module 3315 of FIG. 33I and/or FIG. 33J.

The possible pair subset 3322.1 can be generated based on performing a shuffle-based JOIN operation 3346. For example, a shuffle is performed for rows of pre-processed set A and pre-processed set B via a shuffle node set 2485 of nodes 37 as discussed in conjunction with FIG. 24E. In particular, as the possible pair subsets 3322.1 can be identified based on identifying pairs of rows with equivalent values for their respective polygon identifier 3305, a hash join can be performed and utilized to implement the shuffle-based JOIN operation 3346. Performing the shuffle-based JOIN operation 3346 can include first shuffling rows of pre-processed row set A and pre-processed row set B, where different nodes 37 receive and send different rows to each other for example, via a shuffle network 2480, and/or hashing a smaller side data to hash join with a larger side to ultimately each determine respective mutually exclusive subsets of the possible pair subset 3322.1.

Performing the shuffle-based JOIN operation 3346 to generate the possible pair subset 3322.2 and/or true pair subset 3324.2 can include first broadcasting rows of pre-processed row set A to all nodes 37 of an inner level that are assigned to execute the JOIN, and then sending each row of pre-processed row set B to one node 37 of this inner level, where each node determines pairs of its set B rows and its set A rows meeting the JOIN criteria of conditional statement 3320.2 and/or comparing favorably in the overlap identification function 3324 to generate its own subset of possible pair subsets 3322.2 and/or true pair subset 3324.2. It can be preferred to broadcast the unduplicated row subset 3303.A rather than the duplicated row subset 3301.B, due to unduplicated row subset 3303.A likely having a smaller number of rows to be broadcast based on not having been duplicated.

Performing the shuffle-based JOIN operation 3346 to generate the possible pair subset 3322.3 and/or true pair subset 3324.3 can include first broadcasting rows of pre-processed row set B to all nodes 37 of an inner level that are assigned to execute the JOIN, and then sending each row of pre-processed row set A to one node 37 of this inner level, where each node determines pairs of its set A rows and its set B rows meeting the JOIN criteria of conditional statement 3320.3 and/or comparing favorably in the overlap identification function 3324 to generate its own subset of possible pair subsets 3322.3 and/or true pair subset 3324.3. It can be preferred to broadcast the unduplicated row subset 3303.B rather than the full pre-processed set A including the duplicated row subset 3301.A and unduplicated row subset 3301.A, due to unduplicated row subset 3303.B likely having a smaller number of rows to be broadcast based on not having been duplicated.

The broadcast-based JOIN operation 3348 can optionally be implemented as and/or via some or all features and/or functionality of a Spark SQL broadcast join or any other broadcast-based join operation. The shuffle-based JOIN operation 3346 can optionally be implemented as and/or via some or all features and/or functionality of a Spark SQL shuffle join or any other shuffle-based join operation.

The execution of a hash join upon the duplicated rows can render more efficient performance than if rows were not duplicated and processed via a broadcast-based join. However, the duplication of rows based on uniform adjacent geospatial polygons 3304 can render drastically inefficient performance in cases where a tremendous number of duplicates is generated and shuffled for disproportionately large geospatial regions 3307, as discussed previously. Thus, the other unduplicated rows for these geospatial regions are processed via a hash join based on not being conditioned on equality, and are instead processed via broadcast-based JOIN operations 3348 performed to generate possible pair subsets 3322.2 and 3322.3. Performing these separate broadcast-based JOIN operations 3348 without generating this tremendous number of duplicates for large geospatial regions 3307 overlapping with more than the threshold number of tiles can be more efficient than generating and shuffling this tremendous number of duplicates for these large geospatial regions 3307 via a hash join.

FIG. 33L illustrates an example embodiment of an overlapping geospatial region determination module 3315 with example conditional statements 3320.1, 3320.2, and 3320.3. Some or all features and/or functionality of the overlapping geospatial region determination module 3315 can be utilized to implement the overlapping geospatial region determination module 3315 of FIG. 33H.

The conditional statement 3320 can be implemented as, and/or can be logically equivalent and/or logically similar to:

($A$.ID==$B$.ID AND $A$.ID!=−1) OR ($A$.ID==−1 AND $B$.ID!=−1) OR ($B$.ID==−1)

For example, the query A join B on ST Intersects(A, B) can be implemented based on a query operator flow implementing: A join B on (((A.ID==B.ID AND A.ID !=−1) OR (A.ID==−1 AND B.ID !=−1) OR (B.ID==−1)) AND ST_Intersects(A, B)).

In this example, "A" is the name of a table corresponding to dataset A; "B" is the name of a table corresponding to dataset B; "ID" is the name of a column that includes polygon identifiers 3305, for example, created and/or populated by row pre-processing module 3310; "==" is an operator testing for equality; "!=" is an operator testing for inequality; and/or the integer value −1 is the threshold exceeding identifier 3311.

This conditional statement can optionally be divided into a disjunction of three conditional statements 3320.1, 3320.2, and 3320.3 for parallel processing as discussed in conjunction with FIGS. 33I-33K. Conditional statement 3320.1 can be implemented as and/or can be logically equivalent to and/or logically similar to A.ID==B.ID AND A.ID !=−1. Conditional statement 3320.2 can be implemented as and/or can be logically equivalent to and/or logically similar to A.ID==−1 AND B.ID !=−1. Conditional statement 3320.3 can be implemented as and/or can be logically equivalent to and/or logically similar to B.ID==−1. In this example, the corresponding possible pair subsets 3322.1, 3322.2 and 3322.3 can be guaranteed to be mutually exclusive. Furthermore, the corresponding possible pair subsets 3322.1, 3322.2 and 3322.3 can be guaranteed to collectively include all pairs of rows from set A and set B with geospatial regions that intersect.

Thus, a DNF and/or NNF operator execution flow can be generated to leverage distinct, parallel processing of separate rows that fulfil these different conditional statements via parallelized tracks of an operator execution flow 2433 as described in conjunction with some or all features and/or functionality of FIGS. 25A-32I. This can be ideal in enabling separate join operations to be performed, where the shuffle-based JOIN operation is implemented to leverage the equality condition of conditional statement 3320.1, and where the broadcast-based JOIN is implemented for conditional statements 3320.2 and 3320.3 as discussed in conjunction with FIG. 33K. This can further improve the technology of database systems when performing join operations to identify overlapping geospatial regions by increasing the efficiency of query execution based on enabling parallelized processing of rows based on whether or not they were duplicated, which can improve the efficiency of performing the join operation by optimizing processing of some rows via a hash join operation while still enabling implementation of a row cap to ensure rows for large geospatial regions can be processed separately.

Implementing these conditional statements in continuing the query for the example geospatial regions presented in FIG. 33B, possible pair subset 3322.1 includes a pair that include rows 3308.A2.201 and 3308.B2.201; a pair that include rows 3308.A2.202 and 3308.B2.202; and a pair that includes rows 3308.A3.204 and 3308.B2.204, as these rows have equivalent identifiers that are not equal to the threshold exceeding identifier 3311 due to the corresponding geospatial regions not overlapping with more than the threshold number of uniform adjacent geospatial polygons 3304.

Furthermore, possible pair subset 3322.3 includes plurality of pairs that include all possible rows 3308 of the pre-processed row set A with row 3308.B1. The overlap identification function can be upon each pair to identify only pairs having overlapping geospatial regions, and duplicate geospatial regions can be removed, where a pair identifying row 3306.A3 and 3306.B1 is identified due to the overlap of A3 with B1, and removal of duplicated rows. Note that possible pair subset 3322.2 is empty in this example due to no geospatial regions 3307 of set A overlapping with more than the threshold number of uniform adjacent geospatial polygons 3304.

When the overlap identification function 3324 is ultimately applied (e.g. within the parallel track as illustrated or after the union operation), the pair of rows 3306.A2 and 3306.B2 of possible pair subset 3322.1 are identified as a true overlapping pair for inclusion in the overlapping geospatial region pairs 3325, and the pair of rows 3306.A3 and 3306.B1 of possible pair subset 3322.3 are is identified as a true overlapping pair in the overlapping geospatial region pairs 3325. Note that geospatial regions A3 and B2 of possible pair subset 3322.1 are determined not to overlap, despite sharing overlap with uniform adjacent geospatial polygon 3304.204. Furthermore, the duplicated rows in row pairs of possible pair subsets 3322.1 and 3322.3 are ultimately removed in the overlap identification function 3324, or elsewhere prior to rendering the final resultant. Note that the overlapping geospatial regions B1 and B3 are not identified in this query, as the query involved identification of geospatial regions from set A that intersect with geospatial regions from set B (e.g. A join B on STIntersection(A, B) or A join B on ST_Interects(A, B))

In some embodiments, the conditional statement 3320 can be implemented to further improve efficiency based on further utilizing and requiring "owning IDs" for pairs of rows to facilitate this filtering of duplicated pairs of rows. This can be ideal in further improving efficiency by reducing the number of pairs of rows processed via the overlap identification function 3324, based on eliminating duplicates prior to performing the overlap identification function 3324.

Such owning IDs can correspond to a single polygon identifier 3305 of exactly one uniform adjacent geospatial polygon 3304 for any given pair of geospatial regions 3307 sharing one or more geospatial regions. For example, a function such as "owning(A, B)" when performed on a given pair of geospatial regions 3307 from dataset A and dataset B, returns a single polygon identifier 3305 corresponding to exactly one of the set of shared uniform adjacent geospatial polygons 3304 of this pair of geospatial regions 3307. As a particular example, while the example geospatial regions A2 and B2 of FIG. 33B both overlap with geospatial regions 3304.201 and 3304.202, the "owning(A,B)" function can deterministically return the polygon identifier 3305 of exactly one of these geospatial regions (e.g. the lowest identifier such as 201 in this example, or another deterministically determined polygon identifier 3305). Note that such an owning ID is optionally only determined for a pair of geospatial regions, where identifying an owning ID requires first joining and/or otherwise identifying two given geospatial regions as a possible pair. The owning function can optionally return "null" or another value distinct from all identifiers 3305 of uniform adjacent geospatial polygons 3304 when performed upon two geospatial regions 3307 that share no uniform adjacent geospatial polygons 3304.

As an example embodiment where conditional statement 3320 further utilizes such an owning function, the conditional statement 3320 can be implemented as, can be logically equivalent to, and/or logically similar to:

($A$.ID==$B$.ID AND $A$.ID!=−1 AND owning($A$, $B$)==$A$.ID) OR ($A$.ID==−1 AND $B$.ID!=−1 AND $B$.ID=owning($A$,$B$)) OR ($B$.ID==−1 AND ($A$.ID==31 1 OR owning($A$,$B$)=$A$.ID))

For example, the query A join B on ST Intersects(A, B) can be implemented based on a query operator flow implementing: A join B on (((A.ID==B.ID AND A.ID !=−1 AND owning(A, B)==A.ID) OR (A.ID==−1 AND B.ID !=−1 AND B.ID=owning(A,B)) OR (B.ID==−1 AND (A.ID==−1 OR owning(A,B)=A.ID))) AND ST_Intersects(A, B)).

This conditional statement can similarly optionally be divided into a disjunction of three conditional statements 3320.1, 3320.2, and 3320.3 for parallel processing as discussed in conjunction with FIGS. 33I-33K. Conditional statement 3320.1 can be implemented as and/or can be logically equivalent to and/or logically similar to A.ID==B.ID AND A.ID !=−1 AND owning(A, B)==A.ID. Conditional statement 3320.2 can be implemented as and/or can be logically equivalent to and/or logically similar to A.ID==−1 AND B.ID !=−1 AND B.ID=owning(A,B)). Conditional statement 3320.3 can be implemented as and/or can be logically equivalent to and/or logically similar to B.ID==−1 AND (A.ID==−1 OR owning(A,B)=A.ID). In this example, the corresponding possible pair subsets 3322.1, 3322.2 and 3322.3 can be guaranteed to be mutually exclusive. Furthermore, the corresponding possible pair subsets 3322.1, 3322.2 and 3322.3 can be guaranteed to collectively include all pairs of rows from set A and set B with geospatial regions that intersect.

Implementing this further-filtering example conditional statement 3320 for the example presented in FIG. 33B, the possible pair subset 3322.1 only includes one pair of rows for geospatial regions A2 and B2 (e.g. possible pair subset 3322.1 includes the pair that includes row 3308.A2.201 and row 3308.B2.201, and not the pair that includes row 3308.A2.202 and row 3308.B2.202, based on owning(A2, B2) returning the polygon identifier 3305 with integer value 201 due to the deterministic function assigning the uniform adjacent geospatial polygon 3304.201 as the "owning" uniform adjacent geospatial polygon 3304 for this given pair of geospatial regions A2 and B2.). Similarly, the possible pair subset 3322.3 only includes one pair of rows for geospatial regions A2 and B1 (e.g. possible pair subset 3322.3 includes only the pair that includes row 3308.A3.204 and row 3308.B1.203, and not any other pairs for geospatial region A3, and for no rows for geospatial region A1 or A2, based on owning(A3,B1) returning the polygon identifier 3305 with integer value 204 due to the deterministic function assigning the uniform adjacent geospatial polygon 3304.204 as the "owning" uniform adjacent geospatial polygon 3304 for this given pair of geospatial regions A3 and B1, and/or based on owning(A2,B1) and owning(A1,B1) each returning a value denoting that no uniform adjacent geospatial polygon 3304 is shared by these pairs A2 and B1, or A1 and B1.

FIG. 33M illustrates an embodiment of a query processing system 2802 that implements the query execution module 3300 of FIG. 33A. Some or all features and/or functionality of the query processing system 2802 of FIG. 33N can implement any embodiment of the query processing system 2802 described herein.

The query processing system 2802 can implement a threshold determination module 3340 that automatically selects the threshold duplicate number 3309 based on processing resource data 3345. For example, the threshold duplicate number 3309 is selected via the threshold determination module 3340 once, in predetermined time intervals, and/or on a query-by-query basis. For example, different queries are run, for example, in overlapping time intervals and/or at distinct times, via different processing resources and/or otherwise have different processing resource data 3345, rendering different threshold duplicate numbers 3309 to be selected and implemented for executing these different queries. The processing resource data 3345 can indicate a number of nodes 37 participating in a query, a query execution plan 2405 assigning nodes to different levels of participation in the query, a number of parallelized resources for use in the query, an amount of processing resources and/or memory resources allocated for execution of the query, and/or other information regarding estimated and/or actual processing resources and/or memory resources available in the system.

In some embodiments, the automatically the threshold duplicate number 3309 is selected as, and/or is a monotonically increasing deterministic function of, the number of nodes participating a corresponding query execution plan. In some embodiments, the automatically the threshold duplicate number 3309 is selected as, and/or is a monotonically increasing deterministic function of, the number of nodes participating in an inner level 2414 of a corresponding query execution plan.

Such an embodiment is illustrated in FIG. 33N where the threshold duplicate number 3309 is selected as, and/or is a monotonically increasing deterministic function of, the number of nodes in an inner level 2414 of a corresponding query execution plan. Alternatively or in addition, the threshold duplicate number 3309 is fixed and/or determined based on another means, and the corresponding query execution plan is generated to include a number of nodes in the inner level 2414 that is selected based on this threshold duplicate number 3309, for example, as being equal to or being a monotonically increasing deterministic function of the threshold duplicate number 3309, such as a function of D f(D). Some or all features and/or functionality of the query processing system 2802 of FIG. 33N can be utilized to implement the query processing system 2802 of FIG. 33M.

In particular, an execution plan generating module 3355 can implement the execution flow generating module 2525 to generate a query operator execution flow 2433 for the query that is built based on the threshold duplicate number 3309, where rows are pre-processed in executing the query via the query operator execution flow 2433 based on the value of the threshold duplicate number 3309 as discussed previously. The execution plan generating module 3355 can select the threshold duplicate number 3309 based on implementing the threshold determination module 3340 to select the threshold duplicate number 3309 based on the processing resource data 3345 as discussed in conjunction with FIG. 33M. The execution plan generating module 3355 can further generate a query execution plan 2405 based on selecting a number of nodes, such as the number of nodes participating in an inner level 2414, based on the processing resource data 3345 and/or the value D of the threshold duplicate number 3309.

FIG. 33O illustrates an example of an overlapping geospatial region determination module 3315 that implements a shuffle-based JOIN operation 3346 to identify the possible pair subset 3322.1 by utilizing a shuffle node set 2485 that includes exactly D nodes. Some or all features and/or functionality of the overlapping geospatial region determination module 3315 of FIG. 33O can be utilized to implement the overlapping geospatial region determination module 3315 of FIG. 33M. Some or all features and/or functionality of the shuffle-based JOIN operation 3346 of FIG. 33O can be utilized to implement the shuffle-based JOIN operation 3346 of FIG. 33K.

For example, the threshold duplicate number 3309 can be selected as D based on the processing resource data 3345 indicating D nodes to be implemented in the shuffle node set 2485 of for the corresponding query. As another example, the shuffle node set 2485 can be selected as having exactly D nodes based on the threshold duplicate number 3309 having been selected as D for the given query.

Having a shuffle node set 2485 with a number of nodes equal to the threshold duplicate number 3309 to implement the shuffle-based JOIN operation 3346 can be preferred in optimizing the performance of the shuffle-based JOIN operation 3346. For example, each of the set of D nodes can be guaranteed and/or expected to receive an average of less than or equal to one row 3308 for each given row 3306 based on the threshold duplicate number 3309 guaranteeing that none of the rows 3306 are duplicated as more than D rows 3308. For example, in some embodiments, implementing the shuffle node set 2485 with a number of nodes number of nodes greater than the threshold duplicate number 3309 is less ideal, as some rows are unnecessarily unduplicated and would have been able to be processed via the shuffle node set 2485 based on having a number of overlaps with uniform adjacent geospatial polygons 3304 that is greater than the threshold duplicate number 3309 but less than the number of nodes in the shuffle node set 2485. As another example, in some embodiments, implementing the shuffle node set 2485 with a number of nodes number of nodes less than the threshold duplicate number 3309 is also less ideal, as the shuffle node set 2485 is performed inefficiently due to many duplicates being received and shuffled for rows having a number of overlaps with uniform adjacent geospatial polygons 3304 that is less than the threshold duplicate number 3309 but greater than the number of nodes in the shuffle node set 2485. Thus, setting the number of nodes shuffle node set 2485 to implement the shuffle-based JOIN operation 3346 to be equal with the threshold duplicate number 3309, or vice versa, can further improve the technology of database systems in performing join operations to identify overlapping geospatial regions by further increasing the efficiency of query execution.

Figure 33P:
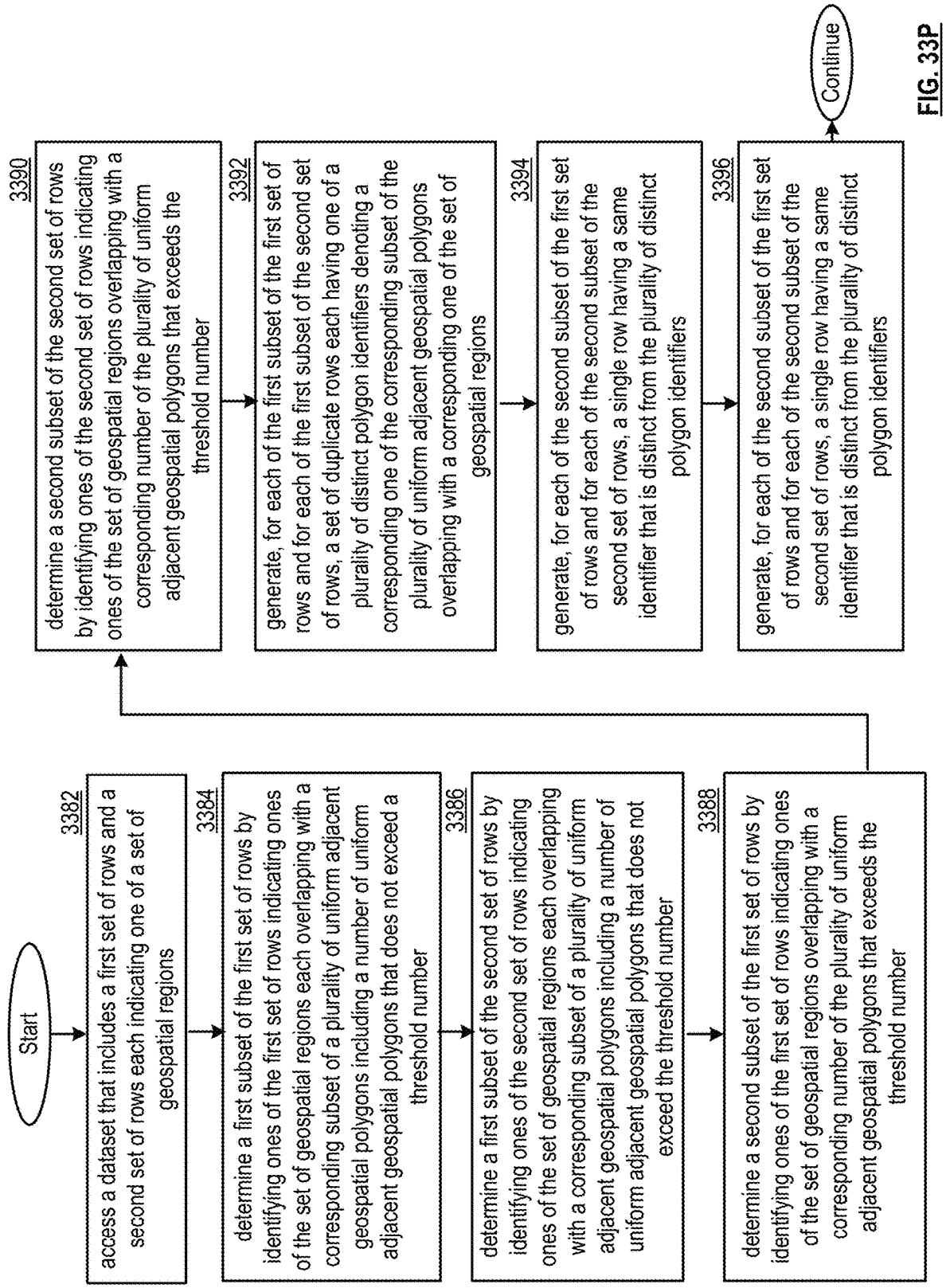
FIG. 33P is a is a logic diagram illustrating a method for execution in accordance with various embodiments.

FIG. 33P illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33P. In particular, a node 37 can utilize the query processing module 2435 to execute some or all of the steps of FIG. 33P, where multiple nodes 37 implement their own query processing modules 2435 to independently execute the steps of FIG. 33P, for example, to facilitate execution of a query as participants in a query execution plan 2405. Some or all of the method of FIG. 33P can be performed by the query processing system 2802, for example, by utilizing an execution flow generating module 2525 and/or an operator processing module 2435. Some or all of the method of FIG. 33P can be performed by the query execution module 3300 of some or all of FIGS. 33A-33O. Some or all of the method of FIG. 33P be performed by the row pre-processing module 3310 and/or the overlapping geospatial region determination module 3315 of some or all of FIGS. 33A-33O. Some or all of the method of FIG. 33P can be performed via communication with and/or access to a segment storage system 2508, such as memory drives 2425 of one or more nodes 37. Some or all of the steps of FIG. 33P can optionally be performed by any other processing module of the database system 10.

Some or all of the steps of FIG. 33P can be performed to implement some or all of the functionality of the query execution module 3300 as described in conjunction with FIGS. 33A-33O and/or of the query processing system 2802 as described in conjunction with FIGS. 33M-33O. Some or all of the steps of FIG. 33P can be performed to implement some or all of the functionality regarding execution of a query via the plurality of nodes in the query execution plan 2405 as described in conjunction with FIGS. 24A-24E. Some or all steps of FIG. 33P can be performed by database system 10 in accordance with other embodiments of the database system 10 and/or nodes 37 discussed herein. Some or all steps of FIG. 33P can be performed in conjunction with some or all steps of FIG. 25E, FIG. 26D, FIG. 27B, FIG. 28D, FIG. 29B, FIG. 32H, and/or FIG. 32I.

Step 3382 includes accessing a dataset that includes a first set of rows and a second set of rows each indicating one of a set of geospatial regions. Step 3384 includes determining a first subset of the first set of rows by identifying ones of the first set of rows indicating ones of the set of geospatial regions each overlapping with a corresponding subset of a plurality of uniform adjacent geospatial polygons including a number of uniform adjacent geospatial polygons that does not exceed a threshold number, such as the threshold duplicate number 3309. Step 3386 includes determining a first subset of the second set of rows by identifying ones of the second set of rows indicating ones of the set of geospatial regions each overlapping with a corresponding subset of a plurality of uniform adjacent geospatial polygons including a number of uniform adjacent geospatial polygons that does not exceed the threshold number.

Step 3388 includes determining a second subset of the first set of rows by identifying ones of the first set of rows indicating ones of the set of geospatial regions overlapping with a corresponding number of the plurality of uniform adjacent geospatial polygons that exceeds the threshold number. Step 3390 includes determining a second subset of the second set of rows by identifying ones of the second set of rows indicating ones of the set of geospatial regions overlapping with a corresponding number of the plurality of uniform adjacent geospatial polygons that exceeds the threshold number.

Step 3392 includes generating, for each of the first subset of the first set of rows and for each of the first subset of the second set of rows, a set of duplicate rows each having one of a plurality of distinct polygon identifiers denoting a corresponding one of the corresponding subset of the plurality of uniform adjacent geospatial polygons overlapping with a corresponding one of the set of geospatial regions. Step 3394 includes generating, for each of the second subset of the first set of rows and for each of the second subset of the second set of rows, a single row having a same identifier that is distinct from the plurality of distinct polygon identifiers. For example, the same identifier is the threshold exceeding identifier 3311.

Step 3396 includes identifying a set of pairs of rows of the first set of rows and the second set of rows indicating overlapping ones of the set of geospatial regions based on processing the set of duplicate rows for each of the first subset of the first set of rows and for each of the first subset of the second set of row, and based on further processing the single row for each of the second subset of the first set of rows and for each of the second subset of the second set of rows. This set of pairs of rows can be a resultant of the query and/or can utilized to generate the resultant. This set of pairs of rows can be implemented as overlapping geospatial region pairs 3325.

In various embodiments, the plurality of distinct polygon identifiers are positive integer identifiers, and the same identifier is a negative integer identifier.

In various embodiments, the method further includes identifying a corresponding bounding polygon for each of one of the set of geospatial regions indicated by one of the first set of rows or the second set of rows. The method can further include determining the corresponding subset of the plurality of uniform adjacent geospatial polygons for each of first subset of the first set of rows and for each of the first subset of the second set of rows based on identifying ones of the plurality of uniform adjacent geospatial polygons overlapping with the corresponding bounding polygon.

In various embodiments, determining the second subset of the first set of rows and the second subset of the second set of rows is based on identifying one more than the number of the plurality of uniform adjacent geospatial polygons overlapping with the one of the set of geospatial regions for each of the second subset of the first set of rows and for each of the second subset of the second set of rows.

In various embodiments, each of the set of pairs of rows includes ones of the first set of rows and one of the second set of rows. Identifying the set of pairs of rows of the first set of rows and the second set of rows indicating overlapping ones of the set of geospatial regions can includes: identifying a first subset of the set of pairs of rows that each includes one of the first subset of the first set of rows and one of the first subset of the second set of rows; identifying a second subset of the set of pairs of rows that includes one of the second subset of the first set of rows; and/or identifying a third subset of the set of pairs of rows that includes one of the second subset of the second set of rows. The first subset of the set of pairs of rows, the second subset of the set of pairs of rows, and the third subset of the set of pairs of rows can be mutually exclusive and collectively exhaustive with respect to the set of pairs of rows.

In various embodiments, identifying each of the first subset of the set pairs of rows is based on identifying one duplicate row of one set of duplicate rows of the first subset of the first set of rows having one of the plurality of distinct polygon identifiers, and identifying one duplicate row of one set of duplicate rows of the first subset of the second set of rows having the one of the plurality of distinct polygon identifiers.

In various embodiments, identifying each of the second subset of the set pairs of rows can be based on determining, for each of the second subset of the first set of rows, whether each of the second set of rows overlaps with the each of the second subset of the first set of rows. Identifying each of the third subset of the set pairs of rows can be based on determining, for each of the second subset of the second set of rows, whether each of the first set of rows overlaps with the each of the second subset of the second set of rows.

In various embodiments, identifying the set of pairs of rows of the first set of rows and the second set of rows is based on performing a join operator. In various embodiments, the join operator is performed based on a union of three conditional statements.

In various embodiments, a first one of the three conditional statements indicates equality between identifiers of the first set of rows and the second set of rows, a second one of the three conditional statements indicates equality between identifiers of the first set of rows with the same identifier, and/or a third one of the three conditional statements indicates equality between identifiers of the second set of rows with the same identifier.

In various embodiments, the first one of the three conditional statements further indicates non-equality of identifiers of the first set of rows and the second set of rows with the same identifier. In various embodiments, the second one of the three conditional statements indicates non-equality between identifiers of the second set of rows with the same identifier. In various embodiments, the third one of the three conditional statements indicates nonequality between identifiers of the first set of rows with the same identifier.

In various embodiments, each of the three conditional statements are further based on performing an ownership function.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

Figure 33Q:
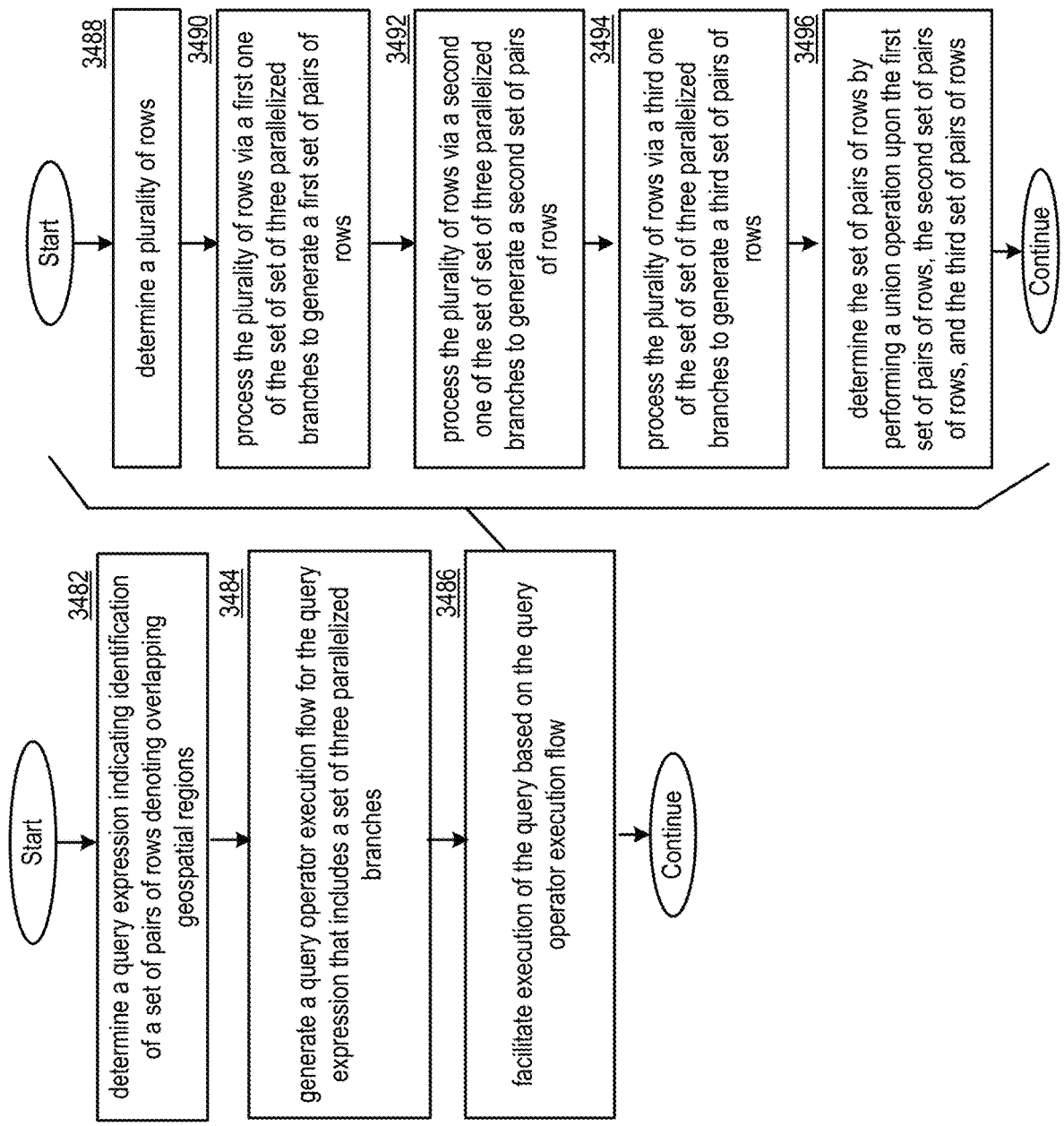
FIG. 33Q is a is a logic diagram illustrating a method for execution in accordance with various embodiments.

FIG. 33Q illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33Q. In particular, a node 37 can utilize the query processing module 2435 to execute some or all of the steps of FIG. 33Q, where multiple nodes 37 implement their own query processing modules 2435 to independently execute the steps of FIG. 33Q, for example, to facilitate execution of a query as participants in a query execution plan 2405. Some or all of the method of FIG. 33Q can be performed by the query processing system 2802, for example, by utilizing an execution flow generating module 2525 and/or an operator processing module 2435. Some or all of the method of FIG. 33P can be performed by the query execution module 3300 of some or all of FIGS. 33A-33O. Some or all of the method of FIG. 33Q be performed by the row pre-processing module 3310 and/or the overlapping geospatial region determination module 3315 of some or all of FIGS. 33A-33O. Some or all of the method of FIG. 33Q can be performed via communication with and/or access to a segment storage system 2508, such as memory drives 2425 of one or more nodes 37. Some or all of the steps of FIG. 33Q can optionally be performed by any other processing module of the database system 10.

Some or all of the steps of FIG. 33Q can be performed to implement some or all of the functionality of the query execution module 3300 as described in conjunction with FIGS. 33A-33O and/or of the query processing system 2802 as described in conjunction with FIGS. 33M-33O. Some or all of the steps of FIG. 33Q can be performed to implement some or all of the functionality regarding execution of a query via the plurality of nodes in the query execution plan 2405 as described in conjunction with FIGS. 24A-24E. Some or all steps of FIG. 33Q can be performed by database system 10 in accordance with other embodiments of the database system 10 and/or nodes 37 discussed herein. Some or all steps of FIG. 33Q can be performed in conjunction with some or all steps of FIG. 25E, FIG. 26D, FIG. 27B, FIG. 28D, FIG. 29B, FIG. 32H, FIG. 32I, and/or FIG. 33P.

Step 3482 includes determining a query expression indicating identification of a set of pairs of rows denoting overlapping geospatial regions. Step 3484 includes generating a query operator execution flow for the query expression that includes a set of three parallelized branches. Step 3486 includes facilitating execution of the query based on the query operator execution flow.

Performing step 3486 can include performing steps 3488, 3490, 3492, 3494, and/or 3496. Step 3488 includes determining a plurality of rows. Step 3490 includes processing the plurality of rows via a first one of the set of set of three parallelized branches to generate a first set of pairs of rows. Step 3492 includes processing the plurality of rows via a second one of the set of set of three parallelized branches to generate a second set of pairs of rows. Step 3494 includes processing the plurality of rows via a third one of the set of set of three parallelized branches to generate a third set of pairs of rows. Step 3496 includes determining the set of pairs of rows by performing a union operation upon the first set of pairs of rows, the second set of pairs of rows, and the third set of pairs of rows.

In various embodiments, the first set of pairs of rows, the second set of pairs of rows, and the third set of pairs of rows are mutually exclusive and/or collectively exhaustive with respect to the set of pairs of rows. For example, these sets of pairs of rows are guaranteed to be mutually exclusive based on a set of three exclusive conditions implemented via the set of set of three parallelized branches to identify these sets of pairs of rows In various embodiments, the plurality of rows includes rows of a first dataset and rows of a second dataset, and where each of the plurality of rows has an identifier value. In various embodiments, determining the plurality of rows includes: generating a set of rows based on accessing rows of the first dataset and the second data set; generating a plurality of sets of duplicates corresponding to a first subset of the set of rows that each having an identifier denoting one of a set of uniform adjacent geospatial polygons overlapping with the geospatial regions of the least some of the first set of rows and the second set of rows; denoting each of a second subset of set of rows via same identifier value that is distinct from identifiers of the uniform adjacent geospatial polygons; and/or generating the plurality of rows as the plurality of sets of duplicates and the second subset of the set of rows.

In various embodiments, the first subset of the set of rows are identified based on indicating geospatial regions each overlapping with a corresponding subset of a plurality of uniform adjacent geospatial polygons including a number of uniform adjacent geospatial polygons that does not exceed a threshold number, such as the threshold duplicate number 3309. In various embodiments, each set of duplicates of the plurality of sets of duplicates is based on the corresponding subset of a plurality of uniform adjacent geospatial polygons. In various embodiments, the second subset of the set of rows are identified based on indicating geospatial regions each overlapping with a number of uniform adjacent geospatial polygons of the plurality of uniform adjacent geospatial polygons that exceeds the threshold number.

In various embodiment, processing the plurality of rows via the first one of the set of set of three parallelized branches to generate the first set of pairs of rows includes determining pairs of rows having a first row of the first dataset and a second row of the second data set having matching identifier values that meet an identifier value condition. In various embodiments, processing the plurality of rows via the second one of the set of set of three parallelized branches to generate the second set of pairs of rows includes determining pairs of rows having rows of the first dataset with identifier values not meeting the identifier value condition. In various embodiments, processing the plurality of rows via the third one of the set of set of three parallelized branches to generate the third set of pairs of rows includes determining pairs of rows having rows of the second dataset with identifier values not meeting the identifier value condition.

In various embodiments, the identifier value condition is non-equality with a single identifier value, such as the threshold exceeding identifier 3311. In various embodiments, the matching identifier values of the first set of pairs of rows each correspond to a set of uniform adjacent geospatial polygons.

In various embodiments, determining the set of pairs of rows further includes identifying a subset of pairs of rows outputted by the union operation having overlapping geospatial regions. For example, the subset of pairs of rows is a proper subset of an output of the union operation.

In various embodiments, the query operator execution flow is in accordance with a non-normalized form that is neither in accordance with conjunctive normal form nor disjunctive normal form.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

Figure 33R:
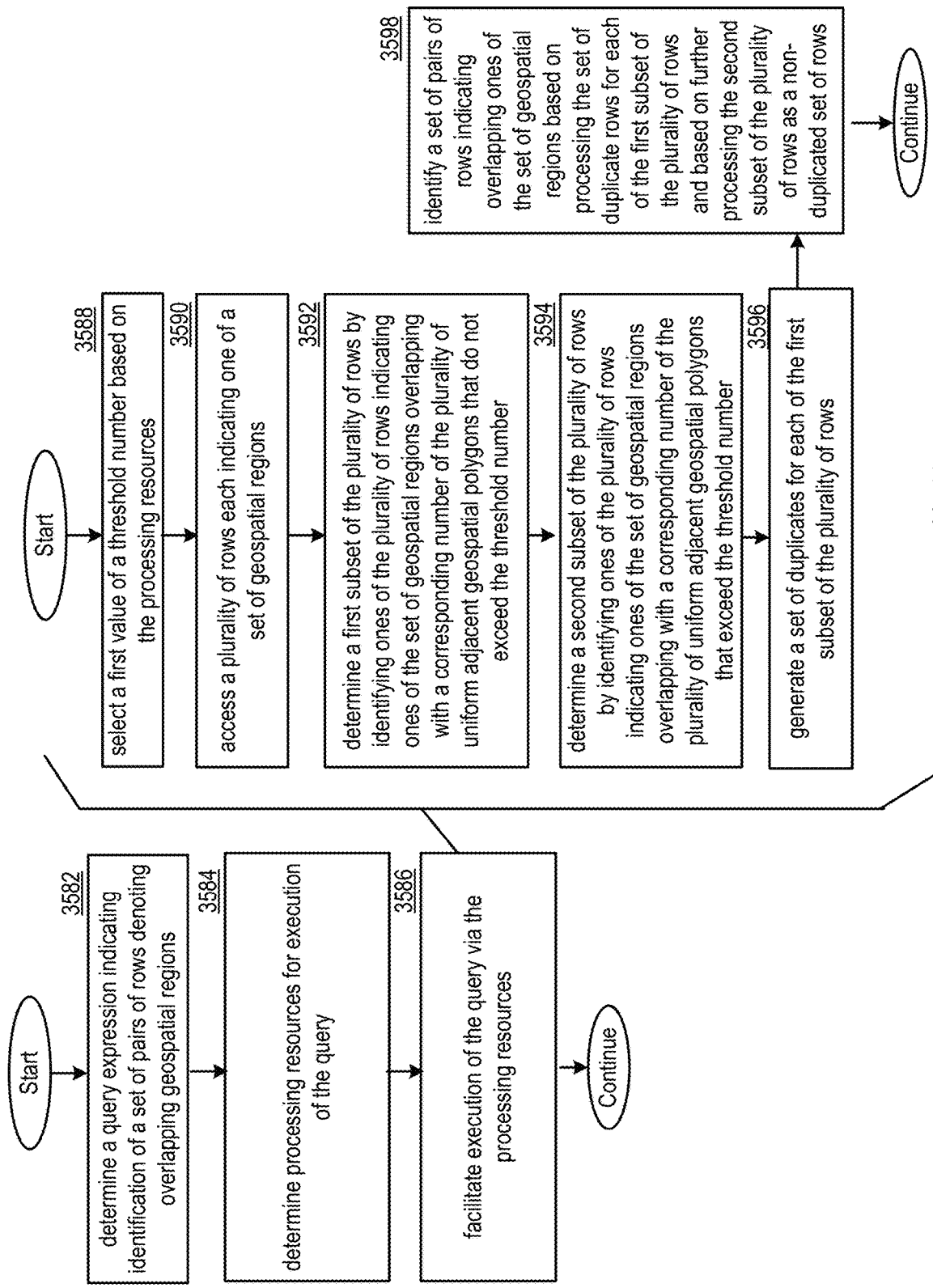
FIG. 33R is a is a logic diagram illustrating a method for execution in accordance with various embodiments.

FIG. 33R illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33R. In particular, a node 37 can utilize the query processing module 2435 to execute some or all of the steps of FIG. 33R, where multiple nodes 37 implement their own query processing modules 2435 to independently execute the steps of FIG. 33R, for example, to facilitate execution of a query as participants in a query execution plan 2405. Some or all of the method of FIG. 33R can be performed by the query processing system 2802, for example, by utilizing an execution flow generating module 2525 and/or an operator processing module 2435. Some or all of the method of FIG. 33R can be performed by the query execution module 3300 of some or all of FIGS. 33A-33O. Some or all of the method of FIG. 33R be performed by the row pre-processing module 3310 and/or the overlapping geospatial region determination module 3315 of some or all of FIGS. 33A-33O. Some or all of the method of FIG. 33R be performed by threshold determination module 3340 of FIG. 33M and/or 33N. Some or all of the method of FIG. 33R can be performed via communication with and/or access to a segment storage system 2508, such as memory drives 2425 of one or more nodes 37. Some or all of the steps of FIG. 33R can optionally be performed by any other processing module of the database system 10.

Some or all of the steps of FIG. 33R can be performed to implement some or all of the functionality of the query execution module 3300 as described in conjunction with FIGS. 33A-33O and/or of the query processing system 2802 as described in conjunction with FIGS. 33M-33O. Some or all of the steps of FIG. 33R can be performed to implement some or all of the functionality regarding execution of a query via the plurality of nodes in the query execution plan 2405 as described in conjunction with FIGS. 24A-24E. Some or all steps of FIG. 33R can be performed by database system 10 in accordance with other embodiments of the database system 10 and/or nodes 37 discussed herein. Some or all steps of FIG. 33R can be performed in conjunction with some or all steps of FIG. 25E, FIG. 26D, FIG. 27B, FIG. 28D, FIG. 29B, FIG. 32H, FIG. 32I, FIG. 33P, and/or FIG. 33Q.

Step 3582 includes determining a query expression indicating identification of a set of pairs of rows denoting overlapping geospatial regions. Step 3584 includes determining processing resources for execution of the query. Step 3586 includes facilitating execution of the query via the processing resources.

Performing step 3586 can include performing one or more of step 3588, 3590, 3592, 3594, 3596, and/or 3598. Step 3588 includes selecting a first value of a threshold number, such as the threshold duplicate number 3309, based on the processing resources. Step 3590 includes accessing a plurality of rows each indicating one of a set of geospatial regions. Step 3592 includes determining a first subset of the plurality of rows by identifying ones of the plurality of rows indicating ones of the set of geospatial regions overlapping with a corresponding number of the plurality of uniform adjacent geospatial polygons that do not exceed the threshold number. Step 3594 includes determining a second subset of the plurality of rows by identifying ones of the plurality of rows indicating ones of the set of geospatial regions overlapping with a corresponding number of the plurality of uniform adjacent geospatial polygons that exceed the threshold number. Step 3596 includes generating a set of duplicates for each of the first subset of the plurality of rows. Step 3598 includes identifying a set of pairs of rows indicating overlapping ones of the set of geospatial regions based on processing the set of duplicate rows for each of the first subset of the plurality of rows and based on further processing the second subset of the plurality of rows as a non-duplicated set of rows.

In various embodiments, selecting the value of the threshold number based on the processing resources includes identifying a set of nodes participating in at least a portion of the query execution, and where the value of the threshold number is set as the number of nodes in the set of nodes. In various embodiments, the set of nodes participate in at least the portion of the query execution based on participating in a shuffle network in accordance with performing a join operation. In various embodiments, the set of nodes participate in at least the portion of the query execution based on different ones of the set of nodes receiving different ones of the set of duplicates of at least one of first subset of the plurality of rows, where each different one of the set of nodes identifies a corresponding subset of the set of pairs of rows that include a corresponding one of the set of duplicates.

In various embodiments, method further includes determining a second query expression indicating identification of a set of pairs of rows denoting overlapping geospatial regions, determining different processing resources for execution of the second query, and facilitating execution of the query via the processing resources by selecting a second value of the threshold number based on the different processing resources, where the second value of the threshold number is different from the first value of the threshold number based on the different processing resources being different from those of the first query. A set of pairs of rows indicating overlapping ones of the set of geospatial regions can be based on the second value of the threshold number, for example, via performance of some or all of steps 3590-3598.

In various embodiments, generating the set of duplicates for each of the first subset of the plurality of rows includes generating each duplicates corresponding to each row in the first subset of the set of rows to include an identifier denoting one of a set of uniform adjacent geospatial polygons overlapping with the geospatial region of each row. The identifier of each of the set of duplicates for each row can be different from all other identifiers of other ones of the set of duplicates for each row.

In various embodiments, the method further includes denoting each of the second subset of the set of rows via a same identifier value that is distinct from identifiers of all of the plurality of sets of duplicates.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

As used herein, an "AND operator" can correspond to any operator implementing logical conjunction. As used herein, an "OR operator" can correspond to any operator implementing logical disjunction.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   determining a query expression indicating a query for execution against a plurality of rows;
   generating a superset-guaranteeing expression in conjunctive normal form (CNF) based on the query expression, wherein the superset-guaranteeing expression is not logically equivalent to the query expression;
   generating a query operator execution flow for the query by selecting an ordered arrangement of a plurality of operators for execution to include:
      a plurality of index-based IO operators operable to implement the superset-guaranteeing expression; and
      at least one additional operator serially after the plurality of index-based IO operators in the ordered arrangement of the plurality of operators; and
   facilitating execution of the query via execution of the query operator execution flow by:
      applying the plurality of index-based IO operators to identify a first subset of rows as a proper subset of the plurality of rows based on index data stored for the plurality of rows, wherein the first subset of rows corresponds to a true resultant of the superset-guaranteeing expression, and wherein the first subset of rows corresponds to a proper superset of a true resultant of the query expression; and
      applying the at least one additional operator to the first subset of rows to identify a second subset of rows as a proper subset of the first subset of rows, wherein the second subset of rows corresponds to the true resultant of the query expression.

2. The method of claim 1, wherein the query operator execution flow is in accordance with a non-normalized form that is neither CNF nor disjunctive normal form (DNF) based on the query expression being in neither CNF nor DNF.

3. The method of claim 1, wherein generating the superset-guaranteeing expression includes generating a plurality of superset-guaranteeing sub-expressions based on the query expression, wherein each of the plurality of superset-guaranteeing sub-expressions is non-equivalent with all other ones of the plurality of superset-guaranteeing sub-expressions, and wherein each of the plurality of superset-guaranteeing sub-expressions has a corresponding true resultant that is a proper superset of the of the true resultant of the superset-guaranteeing expression.

4. The method of claim 3, wherein each of the plurality of superset-guaranteeing sub-expressions are generated in CNF, and wherein generating the superset-guaranteeing expression further includes conjunctively combining the plurality of superset-guaranteeing sub-expressions.

5. The method of claim 3, wherein generating each of the plurality of superset-guaranteeing sub-expressions includes:
 identifying a nested AND expression within an operand of an OR expression of the query expression;
 selecting one of a plurality of operands of the nested AND expression for inclusion in the each of the plurality of superset-guaranteeing sub-expressions; and
 removing all other ones of the plurality of operands of the nested AND expression from the query expression to generate the each of the plurality of superset-guaranteeing sub-expressions.

6. The method of claim 5, wherein generating a first one of the plurality of superset-guaranteeing sub-expressions includes selecting a first operand of the nested AND expression for inclusion in the first one of the plurality of superset-guaranteeing sub-expressions, and wherein generating a second one of the plurality of superset-guaranteeing sub-expressions includes selecting a second operand of the nested AND expression for inclusion in the second one of the plurality of superset-guaranteeing sub-expressions.

7. The method of claim 3, wherein generating the plurality of superset-guaranteeing sub-expressions includes performing a recursive function upon an operator tree generated from the query expression.

8. The method of claim 1, wherein generating the superset-guaranteeing expression in CNF includes removing at least one nested AND expression within at least one operand of at least one OR expression of the query expression from the query expression, wherein the superset-guaranteeing expression includes no nested AND expressions within any operands of any OR expression.

9. The method of claim 1, further comprising:
 storing the plurality of rows, wherein the plurality of rows correspond to relational database rows of a relational database, wherein each of the plurality of rows includes a set of column values for a set of columns of the relational database; and
 further storing the index data indexing the plurality of rows based on column values of at least one column of the set of columns, wherein the index data is stored via at least one structure distinct from the plurality of rows;
 wherein applying the plurality of index-based IO operators to identify the first subset of rows as the proper subset of the plurality of rows includes accessing the index data stored for the plurality of rows.

10. The method of claim 1, wherein the at least one additional operator includes:
 a plurality of parallel sub-flows of the query operator execution flow; and
 at least one serialized set of multiple operators within at least one of the plurality of parallel sub-flows.

11. The method of claim 1, wherein applying the at least one additional operator to the first subset of rows to identify a second subset of rows as a proper subset of the first subset of rows includes:
 assigning each of the first subset of rows an appended identifier by applying an identifier appending operator;
 generating a plurality of duplicates of the first subset of rows by applying a tee operator;
 processing each of the plurality of duplicates of the first subset of rows applying each of a plurality of parallel sub-flows; and
 applying a union distinct operator to remove all remaining duplicated ones the plurality of rows outputted by the plurality of parallel sub-flows based on the appended identifiers.

12. The method of claim 1, wherein generating the query operator execution flow to include a plurality of index-based IO operators is further based on utilizing a plurality of operands of an AND operator being implemented as a root operator of an operator tree generated for the query expression.

13. A query processing system comprising:
 at least one processor; and
 memory that stores executable instructions that, when executed by the at least one processor, cause the query processing system to:
  determine a query expression indicating a query for execution against a plurality of rows;
  generate a superset-guaranteeing expression in a conjunctive normal form (CNF) based on the query expression, wherein the superset-guaranteeing expression is not logically equivalent to the query expression;
  generate a query operator execution flow for the query by selecting an ordered arrangement of a plurality of operators for execution to include:
   a plurality of index-based IO operators operable to implement the superset-guaranteeing expression; and
   at least one additional operator serially after the plurality of index-based IO operators in the ordered arrangement of the plurality of operators; and
  facilitate execution of the query via execution of the query operator execution flow by:
   applying the plurality of index-based IO operators to identify a first subset of rows as a proper subset of the plurality of rows based on index data stored for the plurality of rows, wherein the first subset of rows corresponds to a true resultant of the superset-guaranteeing expression, and wherein the first subset of rows corresponds to a proper superset of a true resultant of the query expression; and
   applying the at least one additional operator to the first subset of rows to identify a second subset of rows as a proper subset of the first subset of rows, wherein the second subset of rows corresponds to the true resultant of the query expression.

14. The query processing system of claim 13, wherein the query operator execution flow is in accordance with a non-normalized form that is neither CNF nor disjunctive normal form (DNF) based on the query expression being in neither CNF nor DNF.

15. The query processing system of claim 13, wherein generating the superset-guaranteeing expression includes generating a plurality of superset-guaranteeing sub-expressions based on the query expression, wherein each of the plurality of superset-guaranteeing sub-expressions is nonequivalent with all other ones of the plurality of superset-guaranteeing sub-expressions, and wherein each of the plurality of superset-guaranteeing sub-expressions has a corresponding true resultant that is a proper superset of the of the true resultant of the superset-guaranteeing expression.

16. The query processing system of claim 13, wherein generating the superset-guaranteeing expression in CNF includes removing at least one nested AND expression within at least one operand of at least one OR expression of the query expression from the query expression, wherein the superset-guaranteeing expression includes no nested AND expressions within any operands of any OR expression.

17. The query processing system of claim 13, wherein the superset-guaranteeing expression is not logically equivalent to the query expression, and wherein the second subset of rows is a proper subset of the first subset of rows.

18. The query processing system of claim 13, wherein the at least one additional operator includes:
 a plurality of parallel sub-flows of the query operator execution flow; and
 at least one serialized set of multiple operators within at least one of the plurality of parallel sub-flows.

19. The query processing system of claim 13, wherein applying the at least one additional operator to the first subset of rows to identify a second subset of rows as a proper subset of the first subset of rows includes:
 assigning each of the first subset of rows an appended identifier by applying an identifier appending operator;
 generating a plurality of duplicates of the first subset of rows by applying a tee operator;
 processing each of the plurality of duplicates of the first subset of rows applying each of a plurality of parallel sub-flows; and
 applying a union distinct operator to remove all remaining duplicated ones the plurality of rows outputted by the plurality of parallel sub-flows based on the appended identifiers.

20. A non-transitory computer readable storage medium comprises:
 at least one memory section that stores operational instructions that, when executed by a processing module that includes a processor and a memory, causes the processing module to:
  determine a query expression indicating a query for execution against a plurality of rows;
  generate a superset-guaranteeing expression in a conjunctive normal form (CNF) based on the query expression, wherein the superset-guaranteeing expression is not logically equivalent to the query expression;
  generate a query operator execution flow for the query by selecting an ordered arrangement of a plurality of operators for execution to include:
   a plurality of index-based IO operators operable to implement the superset-guaranteeing expression; and
   at least one additional operator serially after the plurality of index-based IO operators in the ordered arrangement of the plurality of operators; and
  facilitate execution of the query via execution of the query operator execution flow by:
   applying the plurality of index-based IO operators to identify a first subset of rows as a proper subset of the plurality of rows based on index data stored for the plurality of rows, wherein the first subset of rows corresponds to a true resultant of the superset-guaranteeing expression, and wherein the first subset of rows corresponds to a proper superset of a true resultant of the query expression; and
   applying the at least one additional operator to the first subset of rows to identify a second subset of rows as a proper subset of the first subset of rows, wherein the second subset of rows corresponds to the true resultant of the query expression.

* * * * *